United States Patent
Mori et al.

[19]

[11] Patent Number: 6,085,168
[45] Date of Patent: Jul. 4, 2000

[54] ELECTRONIC COMMERCE SETTLEMENT SYSTEM

[75] Inventors: Nobuyuki Mori, Kawasaki; Michihiro Morita, Tokyo; Masanao Oki, Tokyo; Takaaki Hirota, Tokyo, all of Japan

[73] Assignees: Fujitsu Limited, Kawasaki; The Sakura Bank, Limited, Tokyo, both of Japan

[21] Appl. No.: 09/017,405

[22] Filed: Feb. 3, 1998

[30] Foreign Application Priority Data

Feb. 6, 1997 [JP] Japan ................................ 9-023776

[51] Int. Cl.⁷ .............................................. G06F 17/00
[52] U.S. Cl. ................................ 705/17; 705/35; 705/39
[58] Field of Search ......................... 705/1, 17, 26, 705/27, 30, 35, 39

[56] References Cited

U.S. PATENT DOCUMENTS

| | | |
|---|---|---|
| 5,422,468 | 6/1995 | Abecassis . |
| 5,426,281 | 6/1995 | Abecassis . |
| 5,453,601 | 9/1995 | Rosen . |
| 5,987,438 | 11/1999 | Nakano et al. ............ 705/41 |
| 5,987,439 | 11/1999 | Gustin et al. ............. 705/43 |
| 5,992,738 | 11/1999 | Matsumoto et al. ......... 235/381 |

FOREIGN PATENT DOCUMENTS

| | | |
|---|---|---|
| 0416916A2 | 3/1991 | European Pat. Off. . |
| 95/30211 | 11/1995 | WIPO . |
| 97/03423 | 3/1996 | WIPO . |
| 96/12242 | 4/1996 | WIPO . |
| 96/21192 | 7/1996 | WIPO . |

OTHER PUBLICATIONS

Marvin Sirbu, et al., NetBill: An Internet Commerce System Optimized for Network Delivered Services, Digest of Papers of the Computer Society Computer Conference (Spring) Compcon, Technologies for the Information Superhighway, Mar. 5–9, 1995, pp. 20–25.

*Primary Examiner*—Thomas R. Peeso
*Attorney, Agent, or Firm*—Staas & Halsey, LLP

[57] ABSTRACT

In an electronic commerce, a processing unit in a financial institution freezes an account balance at a request from a purchaser, generates provisional settlement money, that is, money information, and transmits the money to a purchaser—s processing unit. The purchaser's processing unit transmits a goods order request and provisional settlement money to a seller's processing unit. The processing unit in the financial institution makes a final settlement for the provisional settlement money based on a final settlement admission request from the purchaser who received goods and a final settlement request from the seller who received the provisional settlement money.

132 Claims, 97 Drawing Sheets

| | | TRANSACTION OF PHYSICAL GOODS | | | TRANSACTION OF DIGITAL CONTENTS | | |
|---|---|---|---|---|---|---|---|
| | | DATE AND TIME | OK/NG | AUTHENTICATION | DATE AND TIME | OK/NG | AUTHENTICATION |
| A. ORDER ~ DELIVERY | A-1 ORDER | | | PURCHASER+SELLER | | | PURCHASER+SELLER |
| | A-2 ISSUE OF MONEY | | | FINANCIAL INSTITUTION | | | FINANCIAL INSTITUTION |
| | A-3 PROVISIONAL SETTLEMENT | | | PURCHASER | | | PURCHASER |
| | A-4 DELIVERY ACCEPTANCE | | | SELLER | | | SELLER |
| | A-5 DELIVERY RECEIPT | | | PURCHASER+DELIVERER | | | PURCHASER+TRANSACTION MANAGEMENT DEVICE |
| | A-6 FINAL SETTLEMENT REQUEST | | | SELLER | | | SELLER |
| B. NORMAL TRANSACTION | B-1 FINAL SETTLEMENT ADMISSION | | | PURCHASER | | | PURCHASER |
| | B-2 FINAL SETTLEMENT | | | FINANCIAL INSTITUTION | | | FINANCIAL INSTITUTION |
| C. RETURN-OF-GOODS | C-1 RETURN-OF-GOODS REQUEST ACCEPTANCE | | | PURCHASER+DELIVERER | | | PURCHASER+TRANSACTION MANAGEMENT DEVICE |
| | C-2 RETURN-OF-GOODS RECEIPT | | | SELLER+DELIVERER | | | |
| | C-3 PROVISIONAL SETTLEMENT CANCELLATION REQUEST | | | PURCHASER | | | PURCHASER |
| | C-4 RETURN-OF-GOODS CONFIRMATION | | | SELLER | | | TRANSACTION MANAGEMENT DEVICE |
| | C-5 RETURN-OF-GOODS CLAIM | | | SELLER | | | |
| | C-6 PROVISIONAL SETTLEMENT CANCELLATION | | | FINANCIAL INSTITUTION | | | FINANCIAL INSTITUTION |

| RETURN-OF-GOODS MANAGEMENT DB 5600 | | | | | | | | | |
|---|---|---|---|---|---|---|---|---|---|
| PAYMENT ID | RETURN-OF-GOODS MANAGEMENT INFORMATION | MONEY TYPE | PROVISIONAL SETTLEMENT MONEY ID OR ELECTRONIC MONEY ID | PROVISIONAL SETTLEMENT CANCELLATION REQUEST, DATE AND TIME, AND AUTHENTICATION | DELIVERY ID | NUMBER OF DAYS FOR ADJUSTMENT | RETURN-OF-GOODS CLAIM INFORMATION, DATE AND TIME, AND AUTHENTICATION | RETURNED GOODS DELIVERY COMPLETION NOTIFICATION, DATE AND TIME, AND AUTHENTICATION | RETURN-OF-GOODS ADMISSION NOTIFICATION, DATE AND TIME, AND AUTHENTICATION |
| 5601 | 5602 | 5603 | 5604 | 5605 | 5606 | 5607 | 5608 | 5609 | 5610 |

7300 PROVISIONAL SETTLEMENT MONEY MANAGEMENT DB

| PAYMENT ID | MONEY TYPE | RECEIPT DATE AND TIME | PAYMENT MONEY INFORMATION |
|---|---|---|---|
| 7301 | 7302 | 7303 | 7304 |

7310

| PROVISIONAL SETTLEMENT MONEY ID | PAYMENT ID | AMOUNT | ISSUE DATE AND TIME | GOODS PURCHASE INFORMATION | ISSUING FINANCIAL INSTITUTION INFORMATION |
|---|---|---|---|---|---|
| 7311 | 7312 | 7313 | 7314 | 7315 | 7316 |

7330

| ELECTRONIC MONEY ID | | PAYMENT ID | AMOUNT | PAYMENT DATE AND TIME | GOODS PURCHASE INFORMATION | ISSUING FINANCIAL INSTITUTION INFORMATION |
|---|---|---|---|---|---|---|
| SOURCE ID | CHILD ID | | | | | |
| 7331 | 7332 | 7333 | 7334 | 7335 | 7336 | 7337 |

FIG. 81B

7400 FINAL SETTLEMENT REQUEST MANAGEMENT DB

| PAYMENT ID | FINAL SETTLEMENT FINANCIAL INSTITUTION INFORMATION | | FINAL SETTLEMENT REQUEST DATE AND TIME | FINAL SETTLEMENT COMPLETION DATE AND TIME | PROVISIONAL SETTLEMENT CANCELLATION INFORMATION | | FINAL SETTLEMENT CANCELLATION INFORMATION | |
|---|---|---|---|---|---|---|---|---|
| | RECEIPT-OF-TRANSFER REQUESTING FINANCIAL INSTITUTION INFORMATION | EXECUTION REQUESTING FINANCIAL INSTITUTION INFORMATION | | | | REQUEST DATE AND TIME | | REQUEST DATE AND TIME |
| 7401 | 7402 | 7403 | 7404 | 7405 | 7406 | 7407 | 7408 | 7409 |

ELECTRONIC COMMERCE SETTLEMENT SYSTEM

BACKGROUND OF THE INVENTION

1. Field of the Invention

The present invention relates to a provisional settling system, an encryption interchange system, a delivery system, and a digital contents sales system in which payment for goods or services is made from a payer (purchaser, service requester, etc.) to a payee (seller, service provider, etc.) as provisional payment according to money information as digital data containing provisional settlement information, and the payer or a checker, who checks an object for which the payment is made, carefully checks the contents of the received goods and services before the final settlement.

2. Description of the Related Art

As for conventional payment means, payment is popularly made in cash, by check, note, transfer between banking accounts, prepaid card, and credit card.

Common payment methods are prepayment methods in which payment is made before receiving goods, immediate payment on receipt of goods, and delayed payment after receipt of goods. However, in any of these payment methods, a purchaser is subject to a risk of receiving goods and a payment risk, whereas a seller is subject to a collection risk of receiving payment.

That is, in the prepayment method, a purchaser is subject to the risk of receiving goods, namely that the purchaser may not receive goods even after the payment is made by any payment means, or the purchaser may not be satisfied with the received goods. There also may arise the payment risk that the already paid money will not be refunded.

In the immediate payment on receipt of goods, a payment means is limited to cash, check, etc. Furthermore, although a purchaser can receive goods in exchange for the payment, the purchaser cannot carefully check the received goods. Therefore, the purchaser is subject to the risk of receiving goods, in that the received goods are not satisfactory. There is also a payment risk as in the prepayment method.

In the delayed payment after receipt of goods, however, a seller is subject to the collection risk, in any of the above described payment means, that the expense cannot be collected even after goods are delivered.

When a purchaser is not satisfied with the contents of the received goods, he or she can return the goods to the seller of the goods. However, the purchaser is also subject to the risk that the paid money is not refunded, and it may take a long time to get it back even if it should be successfully refunded.

Furthermore, another problem may arise with digital contents such as software, image data, etc. transmitted through a communications network. That is, such intangible goods are subject to the risk that a purchaser may refuse the payment by insisting the poor quality of the received goods even after the goods have been successfully delivered to the purchaser.

When the above described digital contents are marketed through a network, there can be various risks such as an illegal use risk by the third party, an illegal substitution risk, a privacy infringement risk relating to interpretation (wiretapping) by the third party, etc.

At present, it is considered that an encryption process method is the most effective method for reducing the above described risks. However, since the present encryption process method requires a public key, a common key, etc. of each other between the source and the destination (receiver) of data, a complicated process should be performed including user authentication. Furthermore, encrypted data cannot be transmitted between the source and the destination unless the encryption interfaces including the application for encryption are optimally set at both sides.

As described above, in the conventional settlement system in any payment method with any payment means, a payee such as a seller of goods, a service provider, etc. is subject to a collection risk, and a payer such as a purchaser, service requester, etc. is subject to a risk of receiving goods or a payment risk. Both payer and payee are subject to a risk of returning goods.

In transactions through a network, both payer and payee are subject to various risks such as an illegal use risk by the third party, an illegal substitution risk, a privacy infringement risk by wiretapping by the third party, etc.

SUMMARY OF THE INVENTION

The present invention aims at providing a settlement system capable of safely trading in goods (or a commodity) through a network or without a network (of fline) with the above described various risks removed using a payment means such as electronic money (electronic cash) of money information including provisional settlement information, an electronic check, an electronic note, a provisional settlement card, etc. in a definite and simple procedure.

In the first configuration according to the present invention, a provisional settlement system includes a unit for transferring to the payee the money information containing the provisional settlement information, which is settled upon receipt of the confirmation notification that an object item for which payment is to be made has been executed; and a unit for finally settling the money information based on a confirmation notification that the object item has been executed.

With the above described configuration, a payer (purchaser of goods, service requester, etc.) can indicate his or her payment capacity to the payee (seller, service provider, etc.) according to the provisional settlement information contained in the money information when he or she purchases goods or requests a service. The payee can secure the expenses for the goods or services according to the provisional settlement information. Therefore, the payee can solve the problem of a collection risk. When a transaction is processed through a network, a payee can easily authenticate a payer by issuing a request for final settlement of the money information containing the provisional settlement information.

The money information containing the provisional settlement information settled upon receipt of the confirmation notification that the object item has been executed is generated by an issuing financial institution. The information is fixed in the balance in the account of the payer in the issuing financial institution. It is desired that the money information contains the data about the amount of purchased goods or the amount of services which cannot be transferred until the final settlement is made, and contains the authentication of the issuing financial institution.

With the above described configuration, a payee can confirm with authentication of the issuing financial institution that the issuing financial institution has secured in the account of the payer the money information containing the provisional settlement information settled upon receipt of the confirmation notification that object item has been executed. Therefore, an object item (providing goods, services, etc.) can be executed without depending on a payer's personal credit. A service refers to, for example, nursing, white-ant exterminating, cooking, washing, cleaning, and field work of cleaning quilts, carpets, etc.

It is desired that the money information containing the provisional settlement information includes object information about an object for which payment is made. When the money information containing the provisional settlement information includes the object information about an object for which payment is made, the issuing financial institution can confirm necessary information according to more detailed information at the final settlement and can effectively avoid the occurrences of accidents in the settlement performed in response to an illegal settlement request. Furthermore, it prevents a payer from using the money information containing the provisional settlement information for other uses.

In addition to the above described configuration, the system can be designed to include a unit for storing a final settlement request from a payee, a unit for storing a final settlement admission request from a payer, and a unit for performing the final settlement in response to the stored final settlement request and the final settlement admission request.

With the above described configuration, the payment risk of a payer can be avoided because a final settlement request from a payee is accepted but the final settlement is not performed without a final settlement admission from the payer.

It is desired that the above described system includes a transaction management device for mediating transaction information to be transmitted and received. The proceedings of a transaction cannot be confirmed if the transaction is processed only between the parties involved. However, the transaction management device can correctly understand the entire proceedings of the transaction by transmitting and receiving transaction information among a payer, a payee, a confirmor (receiver of goods, services, etc.) who confirms an object for which payment is made, a financial institution, etc. through the transaction management device.

The above described system can include a unit for issuing a final transaction settlement admission request used when goods are purchased through the above described system, and a payer or a goods receiver transmits as authentication information the first third-party return-of-goods certification information containing a payment ID relating to the purchase of goods.

A goods purchaser issues a cancellation request together with, as authentication information, return-of-goods certification information certifying that a return-of-goods request has been received. Thus, the purchaser can also issue a transaction cancellation request to quickly proceed with the cancellation process.

In the above described system, the payee can be provided with a unit for monitoring a final settlement admission request or a return-of-goods request; and a unit for transmitting as authentication information the third-party delivery certification information containing a payment ID relating to the purchase of goods, and for issuing a final transaction settlement admission request when the final settlement admission request or the return-of-goods request is not issued within a predetermined period.

With the above described configuration, a payee manages the term from the receipt of goods by a purchaser to the issue of a final settlement admission request or a return-of-goods request, monitors whether or not a final settlement admission request or a return-of-goods request is issued during the term, and issues a final settlement admission request together with the delivery certification information, which informs that goods have been delivered to a purchaser, of the transaction management device as authentication information when none of the above described requests have been issued. As a result, the payee can issue a final settlement admission request on behalf of the purchaser to quickly proceed with the final settlement process.

According to the second configuration of the present invention, an encryption intermediate system, which includes a transaction management device for mediating data from the first party to the second party, has a unit for encrypting data using a unique encryption key between the first party and the transaction management device and issuing a request to the transaction management device to transmit the data to the second party when the first party transmits the data to the second party.

With the above described configuration, the transaction management device in the encryption intermediate system and the first and second parties who transmit and receive encrypted data manage unique encryption and decryption keys. A transmitter transmits encrypted data with a transmission request specifying a destination without caring about an encryption interface with the destination (receiver) whereas the transaction management device first decrypts the data using the unique decryption key shared between the transmitter and the transaction management device, and then re-encrypts using the unique encryption key shared between the specified destination and the transaction management device the data into encrypted data which can be decrypted by the destination only. The receiver receives the encrypted data from the transaction management device, and decrypts the data using the unique decryption key shared between the transaction management device and the receiver without caring about the encryption interface with the source of the encrypted data. Therefore, there is no risk that the third party may decrypt the data.

That is, since the transmitter transmits data encrypted using a unique encryption key shared between the transaction management device and the transmitter without caring about an encryption key or a decryption key shared between the transmitter and the destination, the transmitter need not transmit or receive any encryption or decryption keys to or from any receiver. Therefore, it is easy on both transmitting and receiving sides to manage an encryption key and a decryption key, and no attention should be paid to an encryption method, an encryption application interface, etc., thereby greatly improving the convenience and safety of data.

According to the third configuration of the present invention, a delivery system includes a seller's processing unit, a purchaser's or goods receiver's processing unit, and a delivery management device provided for a goods deliverer. The delivery management device includes a unit for storing delivery information based on the delivery request from the seller's processing unit; and a unit for generating the third party delivery certification information containing a receiver's signature and a payment ID relating to the purchase of goods.

With the above described configuration, when a delivery management device receives a delivery request from a seller, it manages the receiver's signature at the destination and generates the delivery certification information containing the payment ID relating to the delivered goods. Therefore, the delivery management device can certify the delivery of goods.

According to the fourth configuration of the present invention, the delivery system includes the seller's processing unit, the purchaser's or goods receiver's processing unit, and the delivery management device provided for the goods deliverer. The delivery management device includes a unit for storing return-of-goods delivery information at a returned goods delivery request from a goods receiver; and a unit for generating the first third party return-of-goods certification information containing the signature of the return-of-goods requester and the payment ID relating to the purchase of goods.

With the above described configuration, the delivery management device manages the signature of a return-of-goods requester at a returned goods delivery request from a goods receiver, and generates the delivery certification information containing the payment ID relating to the goods to be returned.

Therefore, the delivery management device can certify that the return-of-goods process has been started.

According to the fifth configuration of the present invention, the system for selling digital contents includes at least a seller's processing unit, a purchaser's processing unit, and an intermediating transaction management device. The transaction management device includes a management unit for managing a decryption key for digital contents on behalf of a seller of the digital contents; and a unit for sending the decryption key to the purchaser's processing unit at a request from the purchaser's processing unit.

With the above described configuration, the transaction management device in the digital contents sales system manages a decryption key for the digital contents on behalf of a seller of the digital contents, and sends the decryption key at a request from a purchaser of the digital contents. Therefore, the transaction management device can correctly manage whether or not the digital contents has been successfully transmitted to a purchaser.

According to the sixth configuration of the present invention, the transaction management device functions as an intermediate with the first party and the second party in the data transmission, and includes a unit for receiving data using a unique encryption protocol between the first party and the transaction management device; and a unit for transmitting the received data using a unique encryption protocol between the transaction management device and the second party.

With the above described configuration, a transaction is processed through a transaction management device. Therefore, a transmitter of transaction information need not request to receive a receiver's encryption key or send its own encryption key. Additionally, since the transmitter transmits data encrypted using a unique encryption key shared between the transaction management device and the transmitter, the transmitter need not transmit or receive any encryption or decryption keys to or from any receiver. Therefore, there is no risk that the third party may decrypt the transaction information. Furthermore, it is easy for the transmitter to manage an encryption key, and no attention should be paid to an encryption method, an encryption application interface, etc., thereby greatly improving the convenience and safety of data.

According to the seventh configuration of the present invention, the transaction management device for functioning as an intermediate in a provisional settlement process in which a settlement is made upon receipt of a confirmation notification that an object item for which payment is to be made has been executed. The transaction management device includes a unit for monitoring a final settlement admission request or a return-of-goods request issued by a goods receiver upon receipt of goods; and a unit for transmitting the third party delivery certification information as authentication information and issues a final settlement admission request as a substitute when no final settlement admission request or return-of-goods request are issued within a predetermined period.

With the above described configuration, the transaction management device monitors based on the receipt date and time of the goods whether or not the purchaser has issued a final settlement admission request. Therefore, the transaction condition can be correctly understood as to whether or not a provisional settlement should be switched to the final settlement, the transaction is to be canceled, etc.

According to the eighth configuration of the present invention, the transaction management device functions as an intermediate in a provisional settlement process in which a settlement is made upon receipt of a confirmation notification that an object item for which payment is to be made has been executed. The transaction management device includes a unit for monitoring whether or not the seller issues a cancellation request as a result of return of goods; and a unit for transmitting the third party return-of-goods certification information as authentication information and issues a cancellation request as a substitute when no cancellation requests are issued within a predetermined period.

With the above described configuration, when the seller (payee) has to issue a transaction cancellation request to the transaction management device after an unsuccessful transaction, the transaction management device monitors the existence of a transaction cancellation request process to be performed by the seller, and the purchaser or a goods receiver need not check the transaction cancellation state.

According to the ninth configuration of the present invention, the transaction management device which functions as an intermediate in the sales of digital contents includes a unit for managing a decryption key to the digital contents to be encrypted and transmitted from a seller to a purchaser; a unit for transmitting the decryption key to the purchaser; and a unit for issuing certification information of a third-party witness.

With the above described configuration, the transaction management device in an digital contents sales system manages a decryption key to digital contents on behalf of a seller of the digital contents, and transmits the decryption key at a request of an digital contents purchaser. Therefore, the transaction management device can correctly manage the information as to whether or not the digital contents has been successfully transmitted to the purchaser.

According to the tenth configuration of the present invention, the transaction management device which functions as an intermediate in the sales of digital contents includes a unit for determining whether or not the data received by a purchaser is defective; a unit for notifying the purchaser of the defect when it determines that the data is defective; and a unit for re-transmitting a decryption key to the purchaser when it is determined that the decryption key is defective.

With the above described configuration, the transaction management device in an digital contents sales system manages a decryption key to digital contents on behalf of a seller of the digital contents, and transmits the decryption key at a request of an digital contents purchaser. Therefore, the transaction management device can correctly manage the information as to whether or not the digital contents has been successfully transmitted to the purchaser.

According to the eleventh configuration of the present invention, the transaction management device functions as an intermediate with a delivery management device provided for a goods deliverer, a seller's processing unit, and a purchaser's or goods receiver's processing unit. The transaction management device includes a unit for accepting the entry of the third-party delivery certification information of the delivery management device; a unit for accepting the entry of the first third-party return-of-goods certification information certifying that a return-of-goods request has been issued; a unit for accepting the entry of the second third-party return-of-goods certification information certifying that the seller has received the returned goods.

With the above described configuration, when the delivery management device generates the delivery certification information certifying that goods have been delivered, the return-of-goods certification information certifying that the returned goods have been accepted, and the final return-of-goods certification information certifying that the returned goods have been delivered to the seller, all the above mentioned information are entered in the transaction management device. Therefore, the transaction management device can understand exact situation in each process of a transaction. Furthermore, trouble with a transaction can be avoided by using each piece of the certification information as third-party admission information.

According to the twelfth configuration of the present invention, a portable storage medium stores money information containing provisional settlement information transferred to a payee and settled upon receipt of a confirmation notification informing that an object item for which payment is to be made has been executed.

With the above described configuration, when the money information, which contains the provisional settlement information settled upon receipt of the confirmation notification that the object item has been executed, is stored in a portable storage medium such as a portable card, etc., a payee can receive payment online through a network, etc. when goods are purchased, or can receive the payment by directly providing a portable storage medium. As a result, the convenience in payment can be improved and the opportunities that the goods are sold can be extended.

According to the thirteenth configuration of the present invention, a terminal unit connected to a financial institution includes a unit for issuing a portable storage medium storing money information containing the provisional settlement information settled upon receipt of the confirmation notification that an object item for which payment is to be made has been executed.

With the above described configuration, the portable storage medium can be issued from a terminal such as an ATM (automatic teller machine), etc. connected to an issuing financial institution. As a result, an issue of a forged portable storage medium can be suppressed.

Furthermore, since a portable storage medium can be issued by any terminal unit without designating a specific unit, a payer (a person who requests an issue of a portable storage medium) can obtain the medium at any time when a terminal unit is operable even after the windows of the issuing financial institution are closed.

According to the fourteenth configuration of the present invention, a terminal unit connected to a financial institution includes a unit for transmitting a final settlement request to the financial institution using a portable storage medium storing money information containing the provisional settlement information settled upon receipt of the confirmation notification that an object item for which payment is to be made has been executed.

With the above described configuration, a payee puts the portable storage medium transferred as provisional settlement money from a payer into the terminal unit such as an ATM, etc. connected to the financial institution to issue a final settlement request. Therefore, even a payee not provided with a sales management device connected through a network can process a transaction using the provisional settlement system.

According to the fifteenth configuration of the present invention, a terminal unit connected to a financial institution includes a unit for automatically collecting an inserted portable storage medium after the completion of a process if the medium stores collection information.

With the above described configuration, when a portable storage medium is issued from a terminal unit such as an ATM, etc. connected to an issuing financial institution, it is indicated whether or not an automatic collection is performed upon completion of a process. If it is indicated that a portable storage medium is automatically collected, it can be collected upon confirmation of completion of a process, thereby avoiding illegal operations and saving resources by re-using the portable storage medium.

According to the sixteenth configuration of the present invention, the delivery management device provided for a goods deliverer includes a unit for storing goods delivery information at a goods delivery request from a seller, and a unit for generating third-party delivery certification information containing a goods receiver's or substitute's signature certifying the receipt of goods and a payment ID relating to the purchase of the goods when the goods are delivered to the goods receiver.

With the above described configuration, the delivery management device which accepts a delivery request from a seller manages the receiver's signature at the delivery destination and generates delivery certification information including a payment ID relating to the delivered goods, thereby certifies that the goods have been delivered.

According to the seventeenth configuration of the present invention, the delivery management device provided for a goods deliverer includes a unit for storing return-of-goods delivery information at a returned goods delivery request from a goods receiver, and a unit for generating the first third-party return-of-goods certification information containing the receiver's signature who issued a return-of-goods request or a substitute's signature and a payment ID relating to the purchase of goods.

With the above described configuration, when the delivery management device receives a returned goods delivery request from a goods receiver, it manages the signature of the requester, generates delivery certification information containing a payment ID relating to the goods to be returned, thereby certifying the fact that a return-of-goods process has been started.

According to the eighteenth configuration of the present invention, the financial process unit provided for a financial institution includes a unit for accepting a request for an issue of money information containing the provisional settlement information settled upon receipt of the confirmation notification that an object item for which payment is to be made has been executed, a unit for freezing the amount of the money information within the balance of the account of the payer, and managing the amount as untransferable until the final settlement, and a unit for issuing money information containing the provisional settlement information.

With the above described configuration, the financial process unit can freeze the amount relating to an issue request within the balance of the account of the payer. Therefore, the receiver of the money information can be credited with the amount of money reserved in the financial institution.

According to the nineteenth configuration of the present invention, the financial process unit provided for a financial institution includes a unit for receiving a request for a transfer regarding provisional settlement money from a payee, a unit for confirming whether or not a final settlement request has been issued, a unit for transferring money or transferring electronic money to a payee based on the contents of the transfer request if the final settlement admission has been obtained, and a unit for storing request-for-receipt-of-transfer information in a database if the final settlement admission has not been obtained.

With the above described configuration, a payee need not issue a final settlement request to a financial process unit of his or her financial institution. A final settlement can be quickly made by directly notifying the financial process unit of payer's financial institution of the destination (payee's account in the financial institution, payee's electronic wallet, etc.) of the transfer of the finally settled amount of money. Since a notification about the destination of a transfer can be issued with a final settlement request, the entire process can be more conveniently performed. Furthermore, the final settlement can be automatically made by the financial process unit of the financial institution of a payer.

According to the twentieth configuration of the present invention, the financial process unit provided for a financial institution includes a unit for accepting a final settlement admission request, and a unit for checking the validity of the accepted final settlement admission request.

With the above described configuration, the financial process unit of the financial institution of the payer can quickly and correctly check the validity of the final settlement admission request, and automatically perform the final settlement.

According to the twenty-first configuration of the present invention, the financial process unit provided for a financial institution includes a unit for accepting a provisional settlement cancellation request, and a unit for checking the validity of the accepted provisional settlement cancellation request.

With the above described configuration, the financial process unit of a payer can stop the payment according to the money information containing the provisional settlement information settled upon receipt of the confirmation notification that an object item for which payment is to be made has been executed if a payer or a goods receiver returns goods, or if the object item has not been executed. Therefore, the payer or the goods receiver can safely cancel a transaction or perform a return-of-goods process, etc.

According to the twenty-second configuration of the present invention, the financial process unit provided in a financial institution includes a unit for accepting a provisional settlement cancellation request, a unit for accepting a claim to return-of-goods (return-of-goods claim), and a unit for reserving the provisional settlement cancellation request when a return-of-goods claim is issued in response to the provisional settlement cancellation request.

With the above described configuration, a seller can reserve a one-directional provisional settlement cancellation request by issuing a return-of-goods claim that there is a problem with the returned goods (substituted goods, damaged goods, shortage in number) if there is certainly a problem with the returned goods even if the payer or the goods receiver has issued a provisional settlement cancellation request relating to the return of goods through the financial process unit of a payer.

According to the twenty-third configuration of the present invention, the payment process unit provided for a payer includes a unit for issuing a request to issue money information containing provisional settlement information settled upon receipt of a confirmation notification that an object item for which payment is to be made has been executed.

With the above described configuration, money information containing provisional settlement information can be issued through the payment process unit.

According to the twenty-fourth configuration, the payment process unit provided for a payer includes a unit for requesting a payee to execute an object item for which payment is made; and a unit for transfer to the payee the money information containing provisional settlement information settled upon receipt of a confirmation notification that the object item for which payment is to be made has been executed.

With the above described configuration, the payment process unit can easily order goods, request for services, and transfer the money information for payment.

According to the twenty-fifth configuration of the present invention, the sales management device includes a unit for accepting an order of goods from a purchaser of goods, a unit for accepting money information containing provisional settlement information from the purchaser, and a unit for requesting a final settlement after delivering the goods to a goods receiver.

With the above described configuration, a seller uses the sales management device to confirm that the cost of the goods is reserved by a financial institution according to the money information containing provisional settlement information settled upon receipt of a confirmation notification that an object item for which payment is to be made has been executed. Therefore, goods can be safely sold without depending on personal credit.

According to the twenty-sixth configuration of the present invention, the sales management device provided for a seller includes a unit for monitoring a final settlement admission request or a return-of-goods request after a goods receiver receives the goods, and a unit for transmitting the third-party delivery certification information as authentication information informing that the goods receiver has received the goods when the final settlement admission request or the return-of-goods request is not issued within a predetermined period, and functioning as a substitute for issuing a final settlement admission request.

With the above described configuration, the sales management device can issue a final settlement admission request on behalf of a payer on condition that no cancellation request or returned goods is received from a payer or a goods receiver within a predetermined period, thereby collecting the cost of goods without fail.

According to the twenty-seventh configuration of the present invention, the receipt process unit provided for a goods receiver includes a unit for issuing a final settlement admission request when goods delivered from a seller are accepted based on a receipt confirmation of the goods.

With the above described configuration, the receipt process unit compares the received goods with the ordered goods, checks the details (manufacturer's name, quality, authentication, etc.) of the received goods, and the payment can be easily made.

According to the twenty-eighth configuration of the present invention, the payment process unit provided for a payer or a confirmor who confirms an object for which payment is made includes a unit for monitoring an execution term, that is, payment condition information, of an object item for which payment is to be made, and a unit for issuing a transaction cancellation request after transmitting the payment condition information as authentication information if the object item has not been executed within the execution term.

With the above described configuration, the payment process unit can easily issue a transaction cancellation request if a payer does not execute the object item for which payment is to be made within the execution term (delivery date of ordered goods, starting date of services, etc.).

According to the twenty-ninth configuration of the present invention, the sales management device provided for a payee includes a unit for accepting an object item for which payment is made from a payer, a unit for accepting money information containing provisional settlement information settled upon receipt of a confirmation notification that the object item has been executed, a unit for monitoring the execution term, which is payment condition information of the object item, and a unit for notifying a payer or a confirmor, who confirms the object item when the object item is not executed within the execution term.

With the above described configuration, the sales management device automatically notifies a payer or a confirmor, who confirms the object item for which payment is made, when the object item is not executed within the execution term, thereby establishing the mutual credit between the payer and the payee.

BRIEF DESCRIPTION OF THE DRAWINGS

FIG. 26 shows the configuration of a transaction status;

FIG. 61 shows the configuration of the return-of-goods management database;

FIG. 81A shows the configuration of the provisional settlement money management database;

FIG. 81B shows the configuration of the final settlement request management database;

DESCRIPTION OF THE PREFERRED EMBODIMENT

The preferred embodiments of the present invention are described below by referring to FIGS. 1 through 96. The above described delivery management device corresponds to the deliverer's processing unit according to the present embodiment. The above described financial process unit corresponds to the processing unit of the purchaser's financial institution or the processing unit of the seller's financial institution. The above described payment process unit corresponds to the purchaser's processing unit according to the present embodiment. The above described sales management device corresponds to the eller's processing unit according to the present embodiment. If a goods receiver is the purchaser, the above described receipt process unit corresponds to the purchaser's processing unit according to the present embodiment.

The preferred embodiment of the present invention includes eight embodiments from the first to the eighth embodiments. In this specification, the general configuration and process of the first through eighth embodiments are briefly explained by referring to FIGS. 1 through 20. Then, embodiments of the components of the system according to the present invention are described by referring to FIGS. 21 through 96.

First, the general configuration and the procedure of the process according to the first embodiment of the present invention is described below by referring to FIGS. 1 and 2.

Figure 1:
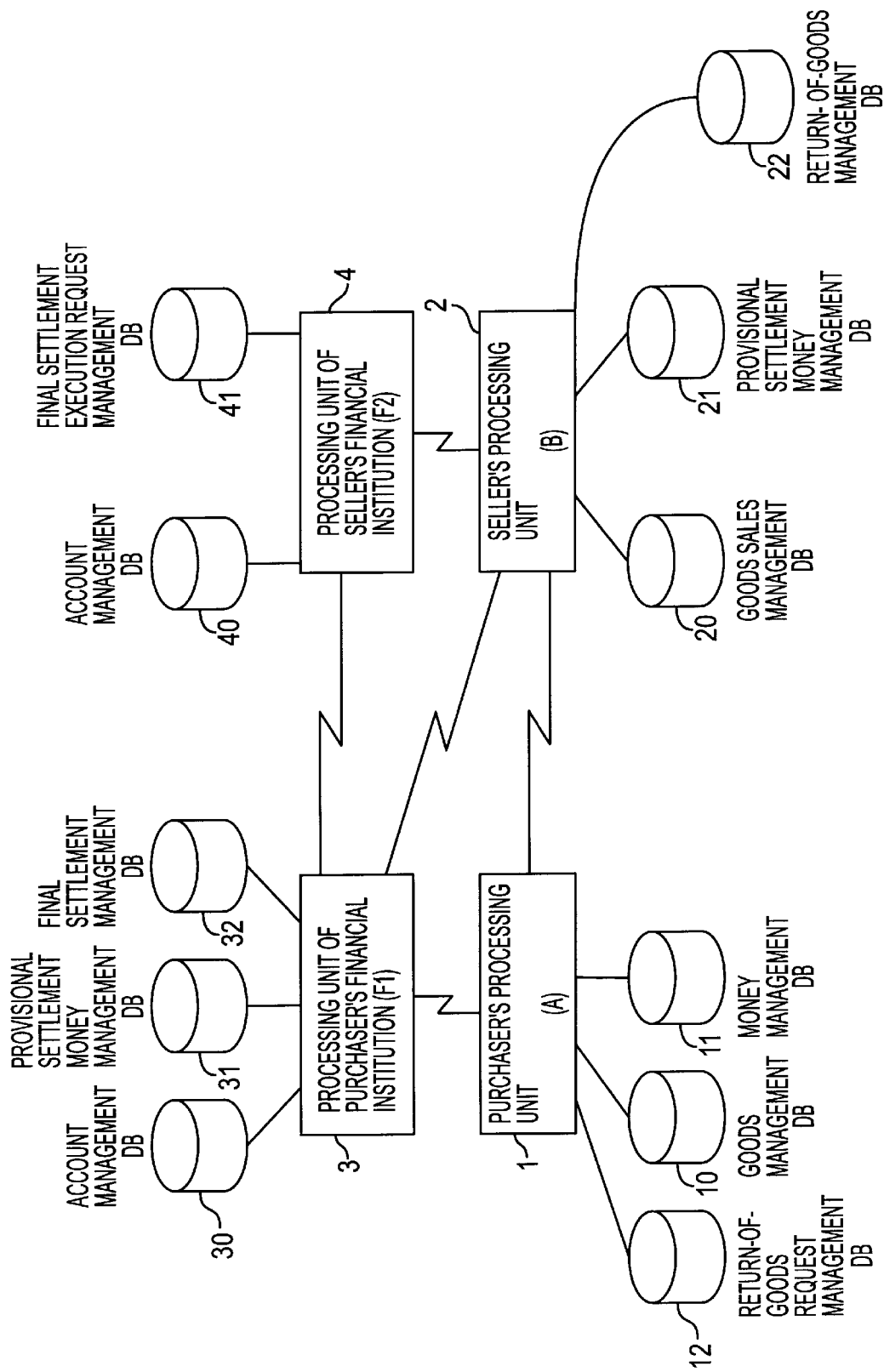
FIG. 1 shows the general configuration of the settlement system according to the first embodiment of the present invention.

FIG. 1 shows the configuration of the system according to the first embodiment of the present invention. In FIG. 1, a purchaser's processing unit 1 is provided for a purchaser of goods. A seller's processing unit 2 is provided for a seller of goods.

A processing unit of the purchaser's financial institution 3 is provided at a financial institution in which a purchaser has opened an account. A processing unit of the seller's financial institution 4 is provided at a financial institution in which a seller has opened an account. A financial institution corresponds to, for example, a bank.

The purchaser's processing unit 1 comprises a goods management database (hereinafter referred to as DB) 10 for storing information about goods to be purchased; a money management DB 11 for use in managing the information about electronic money (money information) of a purchaser of goods; and a return-of-goods request management DB 12 for use in managing a request for return of purchased goods.

The seller's processing unit 2 comprises a goods sales management DB 20 for use in managing the sales of goods; a money management DB 21 for use in managing the information about electronic money received from a purchaser; and a return-of-goods management DB 22 for use in managing the return of goods from a purchaser.

The processing unit of the purchaser's financial institution 3 comprises an account management DB 30 for use in managing an account of a customer (purchaser) of a financial institution; a provisional settlement money management DB 31 for use in managing the provisional settlement money issued at a request of a customer; a final settlement management DB 32 for use in managing the payment process (final settlement) of the provisional settlement money issued by the processing unit of the purchaser's financial institution 3.

'Provisional settlement money' refers to electronic money (money information containing provisional settlement information) issued by a financial institution, and can be actually credited to a seller's account at a financial institution only after a purchaser has confirmed the receipt of goods. As described later, a process of, for example, confirming the receipt of goods, etc. can be performed by a third party on behalf of the purchaser.

The processing unit of the seller's financial institution 4 comprises an account management DB 40 for use in managing the account of a customer (seller) in the financial institution; and a final settlement execution request management DB 41 for use in managing the final settlement request of the provisional settlement from the customer having an account in the processing unit of the seller's financial institution 4.

The final settlement process according to the first embodiment of the present invention is described below by referring to the flowchart shown in FIG. 2. In FIG. 2, each of the processes performed by the purchaser's processing unit 1, the seller's processing unit 2, the processing unit of the purchaser's financial institution 3, and the processing unit of the seller's financial institution 4 (in order from left column to right column) is represented as an item in each column. The process line covering more than one column indicates the relationship between the processes of respective units. For convenience in explanation, the purchaser's processing unit 1 can be indicated by (A), the seller's processing unit 2 can be indicated by (B), the processing unit of the purchaser's financial institution 3 can be indicated by (F1), and the processing unit of the seller's financial institution 4 can be indicated by (F2).

Figure 2:
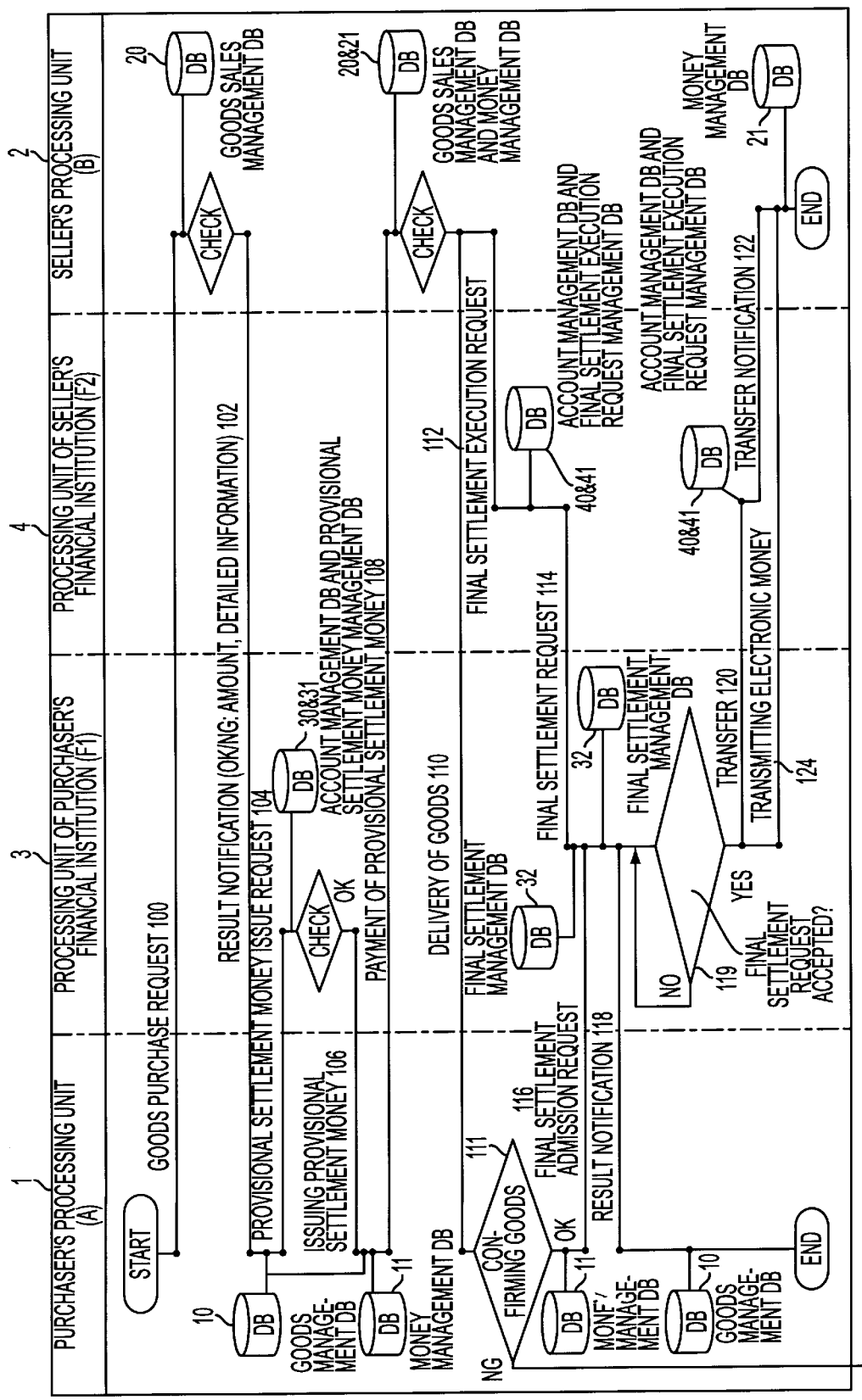
FIG. 2 shows the procedures of the process (settlement process for provisional settlement money) according to the first embodiment of the present invention.

In FIG. 2, the purchaser's processing unit 1 transmits a goods purchase request to the seller's processing unit 2 (step 100 (hereinafter referred to as S100)). The seller's processing unit 2 which has received a goods purchase request checks the stock, sales price, etc. of the goods related to the request by searching the goods sales management DB 20, and transmits the result to the purchaser's processing unit 1 (S102). Upon receipt of the information about sales price, etc., the purchaser's processing unit 1 stores the information in the goods management DB 10.

The purchaser's processing unit 1 transmits to the processing unit of the purchaser's financial institution 3 a provisional settlement money issue request for the price of the goods related to the purchase request (S104). The purchaser's processing unit 1 simultaneously transmits identification information (detailed purchase information), as a use of provisional settlement money, about the goods to be purchased.

The processing unit of the purchaser's financial institution 3 which has received the provisional settlement money issue request determines whether or not the provisional settlement money for the specified amount (price) can be issued through the account of the purchaser by referring to the balance information, etc. in the account management DB 30. If yes, the amount in the balance of the account is frozen and the provisional settlement money is issued. The provisional settlement money is issued by transmitting the provisional settlement money information to the purchaser after the provisional settlement money information has been stored in the provisional settlement money management DB 31 (S106).

The provisional settlement money contains amount information, issuing financial institution identification information, information which identifies the provisional settlement money or a corresponding transaction (money ID or payment ID hereinafter referred to as payment ID), goods identification information which identifies a use of provisional settlement money, seller information, etc.

When the provisional settlement money is issued, the processing unit of the purchaser's financial institution 3 assigns a blind signature to the important contents (amount, goods identification information, seller information) of the provisional settlement money in order to avoid an illegal write to the provisional settlement money or an illegal use other than a specified use. A blind signature relates to a method of encrypting data using a private encryption key, which is not open to the public, so as not to allow a third party to decrypt the encrypted data. When a seller issues a final settlement request to the processing unit of the purchaser's financial institution 3, the processing unit of the purchaser's financial institution 3 decrypts the blind signature using the private decryption key, and compares the contents of the blind signature with the corresponding contents of the non-encrypted description (plain text) of the provisional settlement money. If a person who has received provisional settlement money with a blind signature has changed any of the contents of the blind signature or the contents of the non-encrypted description of the provisional settlement money, then the two contents do not match each other, and indicate that the provisional settlement money has been illegally rewritten. When the purchaser's processing unit 1 transmits the provisional settlement money to the seller's processing unit 2, it encrypts the un-encrypted description of the provisional settlement money, the blind signature, and the authentication of a financial institution using a common key of the purchaser. The seller receives the provisional settlement money, and decrypts it after obtaining the purchaser's common key.

As described above, when the processing unit of the purchaser's financial institution 3 issues provisional settlement money, it freezes the amount of the issued provisional settlement money in the balance of the purchaser's account. That is, the specified amount is subtracted from the balance information of the purchaser's account in the account management DB 30, and the money information of the provisional settlement money issued corresponding to the customer's account is stored in the provisional settlement money management DB 31 with the information identifying the transaction (payment ID). The amount information stored in the provisional settlement money management DB described later in detail indicates that the provisional settlement money corresponding to the payment ID can be credited to the seller's account when the notification that the goods corresponding to the payment ID have been delivered to the purchaser (or goods receiver) is received. On the other hand, if the notification that the transaction has been canceled due to return of goods corresponding to the payment ID is received, the provisional settlement money corresponding to the payment ID is added to the balance of the account of the purchaser in the account management DB 30, and then the purchaser can use the amount for another use.

When the purchaser's processing unit 1 receives provisional settlement money (including a payment ID, identification information of a financial institution, and use identification information)(S106), it stores the information about the provisional settlement money in the money management DB 11. Simultaneously, the purchaser's processing unit 1 stores the payment ID assigned to the provisional settlement money corresponding to the goods to be purchased, so that which provisional settlement money has been used for payment can be identified.

Next, the purchaser's processing unit 1 transmits the provisional settlement money to the seller's processing unit 2 (payment of provisional settlement money in S108). As described above, the payment ID assigned to the provisional settlement money is also transmitted. The payment ID can be money ID for use in identifying the provisional settlement money by the processing unit of the purchaser's financial institution 3, but can be optionally generated by the purchaser and the seller and entered in the processing unit of the purchaser's financial institution 3 when the provisional settlement money is issued.

When the seller's processing unit 2 receives the provisional settlement money, it checks the legality (validity) of the provisional settlement money as follows. Assume that the provisional settlement money contains as authentication information the un-encrypted description of financial institution identification information, a message digest function of the financial institution (one-directional function such as a hash function, etc.), and the digital signature of the authentication station for the financial institution identification information. At this time, the seller's processing unit 2 first applies a message digest function to the un-encrypted description of the financial institution identification information. Then, it obtains a public key of the authentication station to decrypt the digital signature of the authentication station. Then, the seller's processing unit 2 compares the application result of the message digest function with the decryption result of the digital signature. If they match each other, the provisional settlement money is recognized as valid. In addition to the check of the financial institution identification information, the authentication of the purchaser, the validity of the payment ID, etc. can also be checked. If the authentication is checked about the purchaser, it is checked in a method similar to the method of checking the financial institution identification information. If the check result is 'OK', then the provisional settlement money information is stored in the money management DB 21, and the corresponding payment ID is stored in the goods sales management DB 20.

Figure 3:
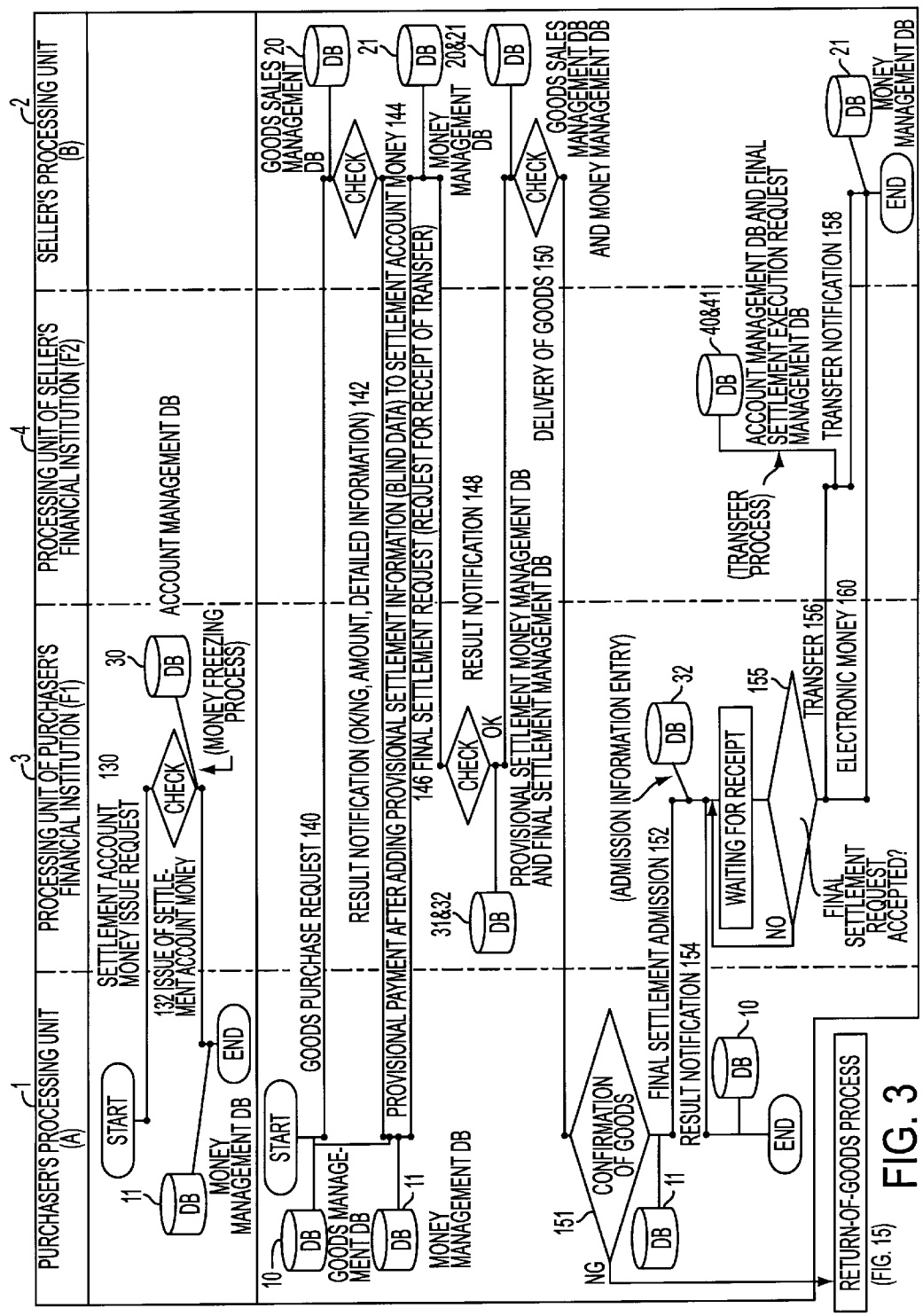
FIG. 3 shows the procedures of the process (settlement process through provisional payment in settlement account money) according to the second embodiment of the present invention.
Figure 14:
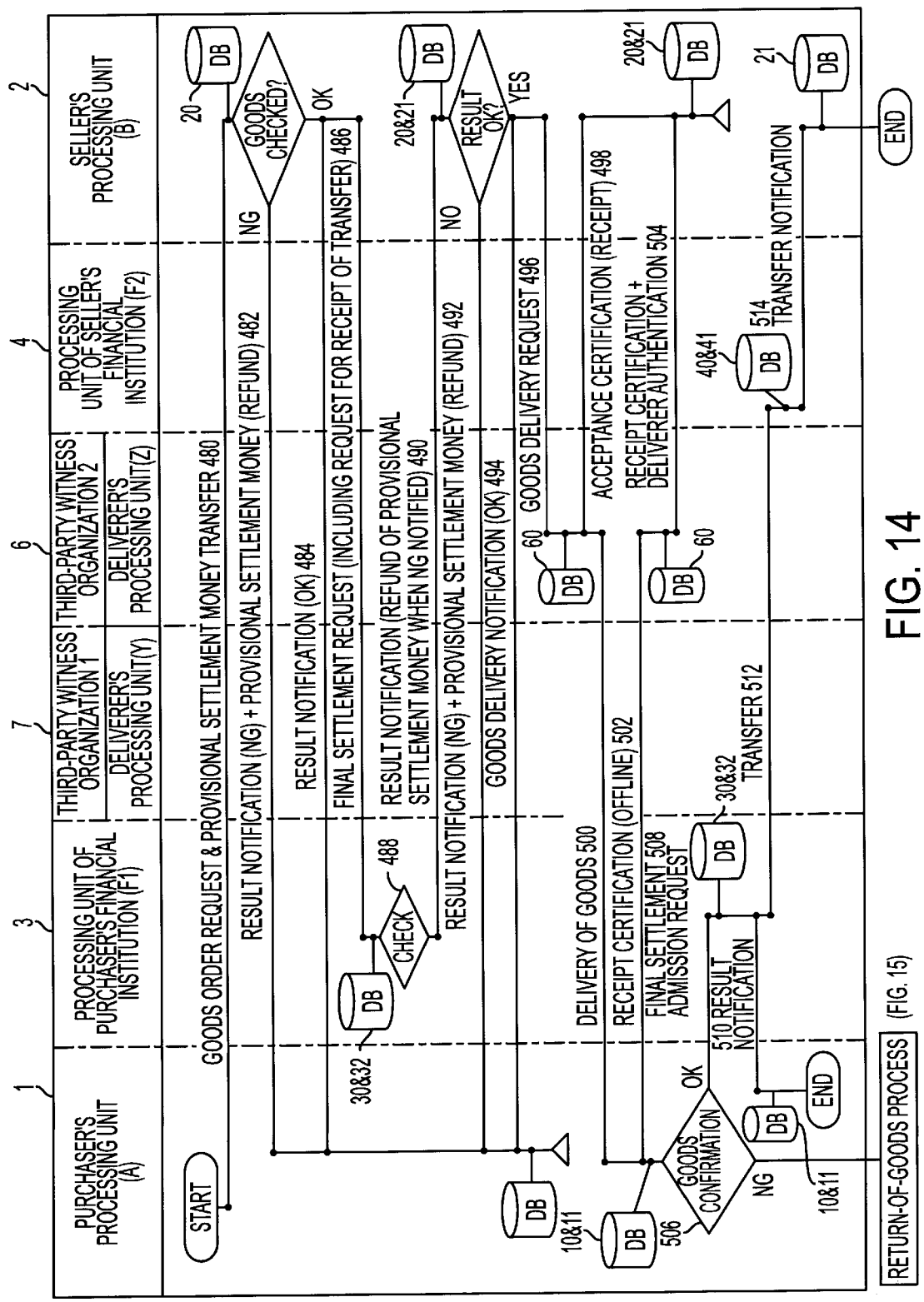
FIG. 14 shows the procedures of the process (goods purchase process) according to the sixth embodiment of the present invention.

As another method, as shown in FIGS. 3 and 14 described later, the validity of the provisional settlement money can be confirmed by the financial institution using the identification information about the financial institution and the payment ID contained in the provisional settlement money before the transmission of goods (upon receipt of the provisional settlement money). At this time, the identification information about the goods to be sold is transmitted to the financial institution to have the validity of its use checked in order to detect an illegal copy of the provisional settlement money.

Then, the seller's processing unit 2 instructs the transmission of goods (S110). If there is provisional settlement money corresponding to the transmission of the goods, then a final settlement execution request is issued to the processing unit of the seller's financial institution 4 containing the seller's account relating to the corresponding provisional settlement money (S112). This execution request refers to a request for a substitute service of issuing a final settlement request to the processing unit of the purchaser's financial institution 3. At this time, the account number of the seller and the goods list are transmitted with the provisional settlement money. It is obvious that the seller's processing unit 2 can transmit the final settlement request directly to the processing unit of the purchaser's financial institution 3 which has issued the provisional settlement money without transmitting a final settlement execution request (request for a substitute service) to the processing unit of the seller's financial institution 4.

When the processing unit of the seller's financial institution 4 receives from the seller's processing unit 2 a final settlement execution request for the provisional settlement money, it stores the information about the received final settlement execution request in the final settlement execution request management DB 41 together with the account information according to which payment is performed, and transmits to the processing unit of the financial institution which has issued the provisional settlement money (processing unit of the purchaser's financial institution 3) the final settlement request with the specified account to which the amount is credited (S114).

When goods are transmitted to (or received by) a purchaser, the purchaser checks the received goods. If the goods are what the purchaser has ordered (OK), then the purchaser inputs the information that the goods have been confirmed as 'OK'. If the received goods are defective and the purchaser is not satisfied with them, then, a return-of-goods process is performed as shown in FIG. 2. The return-of-goods process is described later in details by referring to FIG. 15, but can be summarized as a process of canceling the provisional settlement money to nullify the final settlement and restore the account of the purchaser to the balance before the provisional settlement.

When the purchaser's processing unit 1 receives input information that the goods have been confirmed as 'OK', it transmits a final settlement admission request for the provisional settlement money corresponding to the goods to the processing unit of the purchaser's financial institution 3 (S116). The final settlement admission request is provided with at least a payment ID for use in identifying the provisional settlement money.

Upon receipt of a final settlement request from a seller, the processing unit of the purchaser's financial institution 3 checks the validity of the request by, for example, comparing the goods list transmitted together with the final settlement request with the goods information stored in the provisional settlement money. If the check result is 'OK', the final settlement request is stored in the final settlement management DB 32.

Upon receipt of the final settlement admission request from a purchaser, the processing unit of the purchaser's financial institution 3 stores the request in the final settlement management DB 32.

When a final settlement request and a final settlement admission request having the same payment ID are entered, the processing unit of the purchaser's financial institution 3 performs a final settlement process based on the final settlement request (S120). The final settlement process is, for example, to transfer the amount of the provisional settlement money if the account to be credited to is specified. If the transfer of electronic money is specified when a final settlement request is transmitted from the seller's processing unit 2 to the processing unit of the purchaser's financial institution 3, the electronic money is transmitted to the corresponding processing unit (S124).

The processing unit of the seller's financial institution 4 transmits the final settlement request to the processing unit of the purchaser's financial institution 3, receives the transfer from the processing unit of the purchaser's financial institution 3, updates the account balance information corresponding to the account management DB 40, and records the completion of the requested process in the final settlement execution request management DB 41. Then, it notifies the seller's processing unit 2, which issued a final settlement execution request, of the transfer (S122). Thus, the final settlement is completed.

According to the above described first embodiment of the present invention, the following effects can be obtained.

First, the settlement is made using the provisional settlement money available based on a final settlement request. Therefore, neither the seller nor the purchaser takes a risk.

That is, the seller can be informed that the purchase amount of the goods is frozen and reserved in the financial institution of the purchaser by confirming the contents of the provisional settlement money. Therefore, the seller can safely deliver the goods to the purchaser.

On the other hand, when the purchaser confirms the goods, the settlement can be made by issuing a final settlement admission request. As a result, the purchaser is not subject to the risk of receiving undesired goods with the price prepaid.

Furthermore, since the information about the purchase of goods and the provisional settlement money information are managed by the database and can be used in automatically performing each process, the operator (purchaser or seller) is not prompted to input data except when an order of goods is issued or confirmed. This realizes a safe and easy purchase.

Next, the process flow according to the second embodiment is described by referring to FIG. 3. The units also involved in the above described first embodiment are assigned the same identification numbers, and the detailed explanation is omitted here.

According to the first embodiment of the present invention, a purchaser issues to the processing unit of the purchaser's financial institution 3 a request to issue the provisional settlement money each time goods are purchased. According to the second embodiment of the present invention, the configuration is the same as that shown in FIG. 1. However, the settlement account money is preliminarily stored in the purchaser's processing unit 1 as the electronic money which can be used as if it were cash, and can be selectively used as provisional settlement money or common electronic money when goods are purchased.

The settlement account money contains amount information and is circulated as electronic money. However, it is issued based on the account of a purchaser, and can be credited only after the final settlement is made for the account at a valid final settlement request.

The process flow according to the second embodiment is described below by referring to FIG. 3.

First, the purchaser's processing unit 1 transmits a final settlement account money issue request for a desired amount to the processing unit at the purchaser's financial institution 3 (S130).

Upon receipt of the final settlement account money issue request, the processing unit at the purchaser's financial institution 3 determines whether or not the final settlement account money can be issued from the purchaser's account for the specified amount (whether or not the balance or the creditable amount is enough for the issue) by referring to the balance information, etc. of the account management DB 30 as in the case of the provisional settlement money shown in FIG. 2. If yes, the specified amount is subtracted from the balance information of the purchaser's account in the account management DB 30, and the amount information is stored in the settlement account management record in the account management DB 30 together with the information (money ID) for identifying the settlement account money corresponding to the amount. The settlement account money for the amount is transmitted (issued) to the purchaser's processing unit 1 (S132).

Described below is the procedure for purchasing goods using the settlement account money.

First, the purchaser's processing unit 1 storing the settlement account money transmits a goods purchase request to the seller's processing unit 2 (S140). Upon receipt of the goods purchase request, the seller's processing unit 2 checks the stock, sales price, etc. of the goods by searching the goods sales management DB 20, and transmits the result to the purchaser's processing unit 1 (S142). Upon receipt of the goods sales prices, etc., the purchaser's processing unit 1 stores the received information in the goods management DB 10.

The purchaser's processing unit 1 prompts the purchaser to select and input the method of a payment to the seller. For example, the purchaser selects one of the following methods.

(1) final settlement using settlement account money without receipt confirmation (2) final settlement using settlement account money after receipt confirmation Unlike the provisional settlement money according to the first embodiment of the present invention, the use of the settlement account money is not preliminarily determined. Therefore, a person who receives the settlement account money can be actually credited with the settlement account money only by showing the valid final settlement request and the settlement account money ID to the issuing financial institution (processing unit at the purchaser's financial institution 3). The seller is allowed to this process according to the above described selection (1). According to the above described selection (2), the first embodiment of the present invention can be realized.

According to the second embodiment of the present invention, the above described selection (2), that is, the process of final settlement using settlement account money after receipt confirmation, is described below.

In this case, the purchaser's processing unit 1 generates the settlement account money for the cost of the purchased goods according to the settlement account money information stored in the money management DB 11, and subtracts the amount for the purchased goods from the balance of the settlement account money. The purchaser's processing unit 1 generates 'provisional settlement money' by adding to the generated settlement account money for the cost of the purchased goods the identification information indicating that the settlement account money is for a provisional settlement, and the ID added to the money ID (for example, the payment ID which is identification information specifying the transaction), and generates the blind signature of the purchaser. The blind signature of the purchaser is generated so that the processing unit at the purchaser's financial institution 3 which finally received the settlement account money can confirm that a valid customer issued the money.

Next, the purchaser's processing unit 1 transmits the generated settlement account money to the seller's processing unit 2 (S144).

Upon receipt of the settlement account money, the seller's processing unit 2 performs a goods delivery process and issues a settlement account money final settlement request. According to the first embodiment (FIG. 2), the seller's processing unit 2 issues a final settlement request when or after goods are delivered. However, according to the present embodiment, the seller's processing unit 2 requests the processing unit at the purchaser's financial institution 3 to confirm the validity of the received settlement account money, and issues a final settlement request in step S146. The final settlement request contains payee information. For example, when the transfer (issue of money) of finally settled money to a specified account in the purchaser's financial institution is requested, the information about the account is contained. When electronic money is requested, the address of the purchaser (address of the purchaser's processing unit) can be specified.

Upon receipt of the request for a validity check of the settlement account money and the final settlement request, according to the information stored in the account management DB 30 and the settlement account money, the processing unit at the purchaser's financial institution 3 checks the blind signature information of the settlement account money to confirm the validity of the settlement account money. At this time, for example, the blind signature information is decrypted using the decryption key of the purchaser, and the result is compared with the corresponding information. If they match each other, the validity of the settlement account money is confirmed. The processing unit at the purchaser's financial institution 3 authenticates the seller according to the personal information about the seller who is a requester. The method of authentication is similar to the above described method of checking the validity of the provisional settlement money. If these check results are acceptable, the processing unit at the purchaser's financial institution 3 stores the settlement account money and the account information about the seller, who is a payee, in the final settlement management DB 32, and transmits the check result to the seller's processing unit 2 (S148).

Upon receipt of the above described check result, the seller's processing unit 2 stores information required in goods sales management if the check result is OK, and performs a delivery process of the goods (S150).

Upon receipt of the goods, the purchaser or the goods receiver, who is a third party specified by the purchaser, confirms the received goods (S151), and inputs a goods confirmation OK to the purchaser's processing unit 1 if the received goods are OK. On the other hand, if the goods are defective, control is passed to the return-of-goods process described later by referring to FIG. 15.

Then, the purchaser's processing unit 1 transmits a final settlement admission request for the settlement account money corresponding to the goods whose receipt has been confirmed by the purchaser to the processing unit at the purchaser's financial institution 3 (S152). The final settlement admission request contains at least a payment ID for identifying the settlement account money.

Upon receipt of the final settlement admission request from the purchaser, the processing unit at the purchaser's financial institution 3 stores it in the final settlement management DB 32, and notifies the purchaser's processing unit 1 of the result (S154).

The processing unit at the purchaser's financial institution 3 performs the final settlement process based on the final settlement request when both the final settlement request and the final settlement admission request are entered (S155). If the account of the seller, who is a payee, is specified, the amount indicated by the money information containing the provisional settlement information is transferred to the account (S156). Furthermore, if the transfer of electronic money is specified, then the electronic money is transmitted to the corresponding processing unit (S160).

Upon receipt of the transfer from the processing unit at the purchaser's financial institution 3, the processing unit at the seller's financial institution 4 storing the account of the seller updates the corresponding account balance information in the account management DB 40, and notifies the seller's processing unit 2 of the transfer (S158).

Thereby the final settlement process according to the second embodiment terminates.

According to the above described configuration, the provisional payment can be made by transferring the settlement account money preliminarily issued as money information, which includes the provisional settlement information with a blind signature indicating that the payment is made on condition of a final settlement admission request. Therefore, the effect similar to that obtained according to the first embodiment of the present invention can be acquired.

Furthermore, since the provisional settlement information is endorsed by the blind signature and transferred with the settlement account money, an illegal write by a third party or an illegal use using an illegal copy can be effectively avoided.

According to the first embodiment of the present invention, a blind signature of an issuing financial institution is added to the provisional settlement money. According to the second embodiment of the present invention, a blind signature of a purchaser is added to the settlement account money. In any of the two embodiments, the blind signatures of the issuing financial institution and the purchaser can be used in combination.

The third embodiment of the present invention is described below by referring to FIGS. 4 and 5.

Figure 4:
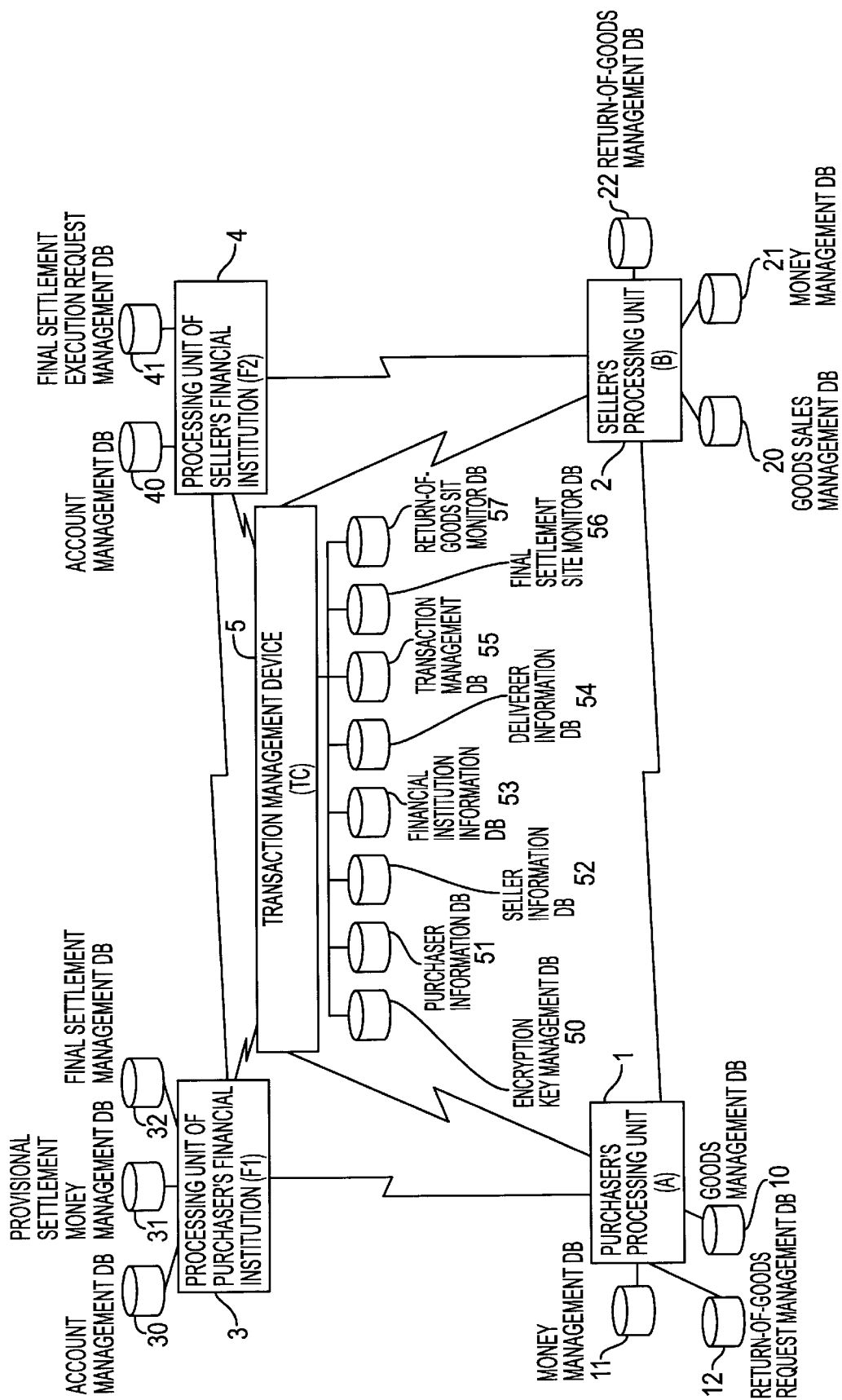
FIG. 4 shows the general configuration of the settlement system according to the third embodiment of the present invention.

The settlement system according to the present embodiment comprises a transaction management device 5 provided in the transaction management center for managing a transaction as shown in FIG. 4. The components similar to those according to the first embodiment are assigned the same identification numbers, and the detailed explanation is omitted here.

As shown in FIG. 4, the transaction management device 5 comprises an encryption key management DB 50, a purchaser information DB 51, a seller information DB 52, a financial institution information DB 53, a seller information DB 54, a transaction management DB 55, a final settlement site monitor DB 56, and a return-of-goods site monitor DB 57.

The encryption key management DB 50 stores and manages the public keys and the common keys of all users who transmit and receive data through the transaction management device 5, the unique common keys between a transaction management device and users, and the private key of the transaction management device.

The purchaser information DB 51 stores and manages the purchaser's personal information, a network ID, the transaction financial institution information, etc. about a purchaser.

The seller information DB 52 stores and manages the seller's personal information, a network ID, the transaction financial institution information, etc. about a seller.

The financial institution information DB 53 stores and manages the personal information, a network ID, etc. of the financial institution which issue electronic money, perform a settlement, etc. through the transaction management device 5.

The deliverer information DB 54 stores and manages the personal information, a network ID, etc. of a house-to-house deliverer (deliverer of goods) who delivers goods or returned goods.

In the transaction management DB 55, goods purchase information, payment information, a settlement result, etc. of a purchaser are managed. Also, goods sales information, goods delivery information, return-of-goods information, cancellation information related to the return of goods, etc. are managed in the transaction management DB 55. Furthermore managed are the third-party delivery certification information, the first third-party return-of-goods certification information, and the second third-party return-of-goods certification information from a deliverer as described later.

The final settlement site monitor DB 56 monitors whether or not a purchaser or a goods receiver issues a final settlement admission request or a return-of-goods request within a predetermined time upon receipt of goods.

The return-of-goods site monitor DB 57 is used to perform a monitor process of the state of the issue of a return-of-goods request from a goods receiver or a purchaser, the substitution of a cancellation request process related to the issue of the return-of-goods request, a site monitor of the cancellation process of the seller, a monitor of the claim state of return-of-goods from a seller, etc.

The detailed configuration of the transaction management device 5 is explained after describing the processes according to the third through eighth embodiments.

Figure 5:
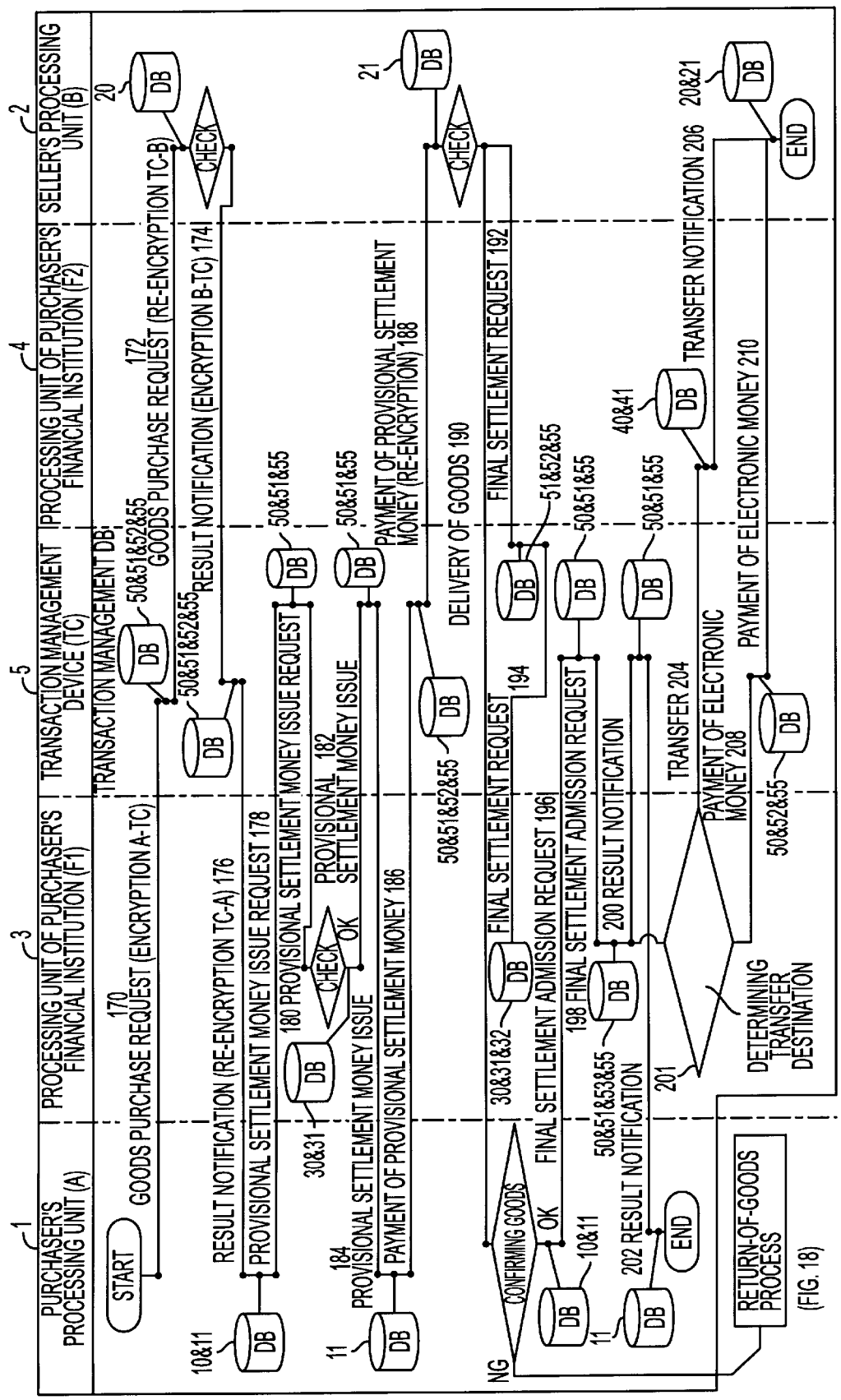
FIG. 5 shows the procedures of the process (settlement process for provisional settlement money through the transaction management device) according to the third embodiment of the present invention.

FIG. 5 shows the process flow of the final settlement performed through the transaction management device 5. A transmission message is encrypted and decrypted in the process according to the present embodiment. To simply indicating the encryption and decryption, the purchaser's processing unit 1 is shown as A; the processing unit of the purchaser's financial institution 3 is shown as F1; the transaction management device 5 is shown as TC; the processing unit of the seller's financial institution 4 is shown as F2; and the seller's processing unit 2 is shown as B.

For example, in the goods purchase request in step 170 (S170), the description 'encryption A-TC' indicates that the purchaser's processing unit A encrypts a message using an encryption key for the transaction management device TC, and the transaction management device TC decrypts the message using a decryption key for the purchaser's processing unit A. The word 'encryption' includes digital authentication, and an encryption using a common key for the purchaser's processing unit A of the transaction management device TC. Furthermore, it also includes an encryption using a combination of a plurality of keys and an encryption using a message digest function. That is, the message is encrypted in such a way that it can be decrypted (or confirmed) only by a receiver of the message. The subsequent processes are described as, for example, A-TC, and the detailed explanation is omitted here.

According to the third embodiment, information is transmitted and received through the transaction management device 5 as a rule. That is, the transaction management device 5 receives encrypted information from a transmitter, decrypts the information using a decryption key for the transmitter, then re-encrypts the information using an encryption key for the receiver with the authentication of the transaction management device 5, and transmits it to the receiver.

For example, when a goods purchase request is transmitted in step 170, the transaction management device 5 receives encrypted goods purchase request information, accesses the purchaser information DB 51 to authenticate the purchaser, retrieves the decryption key for the purchaser from the encryption key management DB 50, and decrypts the received goods purchase request. Then, it stores the goods purchase information in the transaction management DB 55, retrieves from the encryption key management DB 50 the encryption key for the seller who is the receiver of the information, and re-encrypts the goods purchase information with the authentication of the transaction management device 5. In step 172, the re-encrypted goods purchase information is transmitted to the seller's processing unit 2.

Thus, the transaction management device 5 always functions as an intermediate when information is transmitted or received, decrypts the received information using the decryption key, retrieved from the encryption key management DB 50, for the transmitter, and stores the decrypted information in the transaction management DB 55. Simultaneously, it re-encrypts the information using the encryption key, retrieved from the encryption key management DB, for the receiver, and transmits the re-encrypted information to the receiver.

The processes S170 through S210 shown in FIG. 5 are the same as those according to the first embodiment of the present invention except the transaction management device 5 as an intermediate. Therefore, the detailed explanation is omitted here.

With the configuration according to the third embodiment of the present invention, the following effects can be obtained.

First, it is not necessary to exchange encryption and decryption keys between the purchaser's processing unit 1 and the seller's processing unit 2 by mediating the transmission and receipt of information among the processing units 1 through 4 by the transaction management device 5. Therefore, the security is improved and it is not necessary to generate and change an encryption/decryption key for each transaction.

Second, since the transaction management device 5 can totally manage the proceedings of transactions, the conformity of the transactions can be obtained and a problem can be successfully avoided among the processing units 1 through 4.

The fourth embodiment of the present invention is described below by referring to FIGS. 6 through 10.

The system according to the fourth embodiment has the configuration similar to that according to the third embodiment (FIG. 4), and is different in that digital contents are processed as objects of transactions, and the transaction management device 5 (TC) does not only function as an intermediate with the information communications but also as the third party witness.

A 'transaction of digital contents' is referred to as opposed to a 'transaction of goods', that is, a transaction of tangible goods. In other words, a transaction of digital contents refers to a transaction of intangible goods such as software, etc. circulated through a network, and is different from the transaction of tangible goods in that digital contents can be so easily copied that they cannot be objects to be returned. Therefore, according to the present embodiment, the transaction management device 5 manages the transaction as the third-party witness organization.

Figure 8:
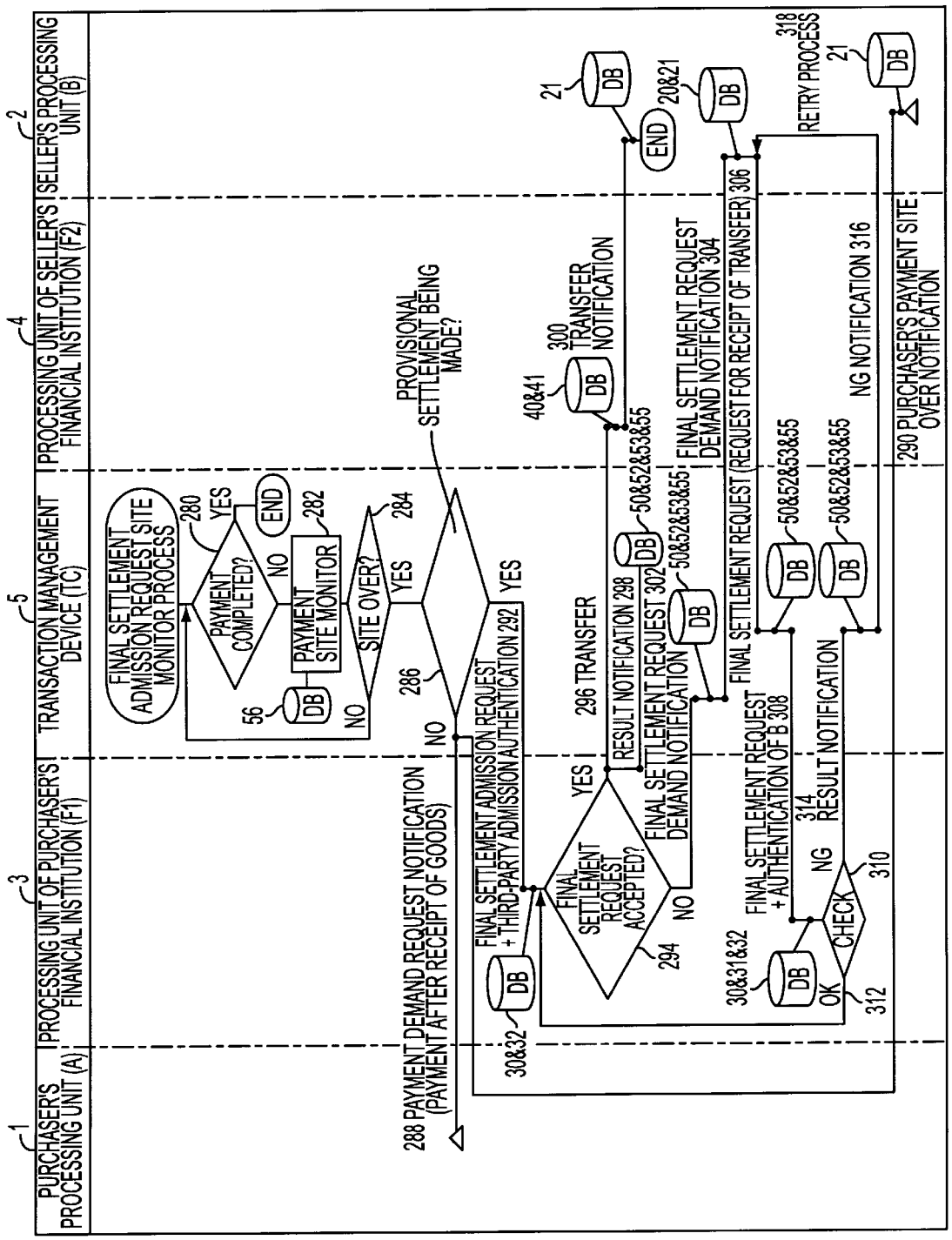
FIG. 8 shows the procedures of the process (site monitor process for a final settlement admission request) according to the fourth embodiment of the present invention.
Figure 9:
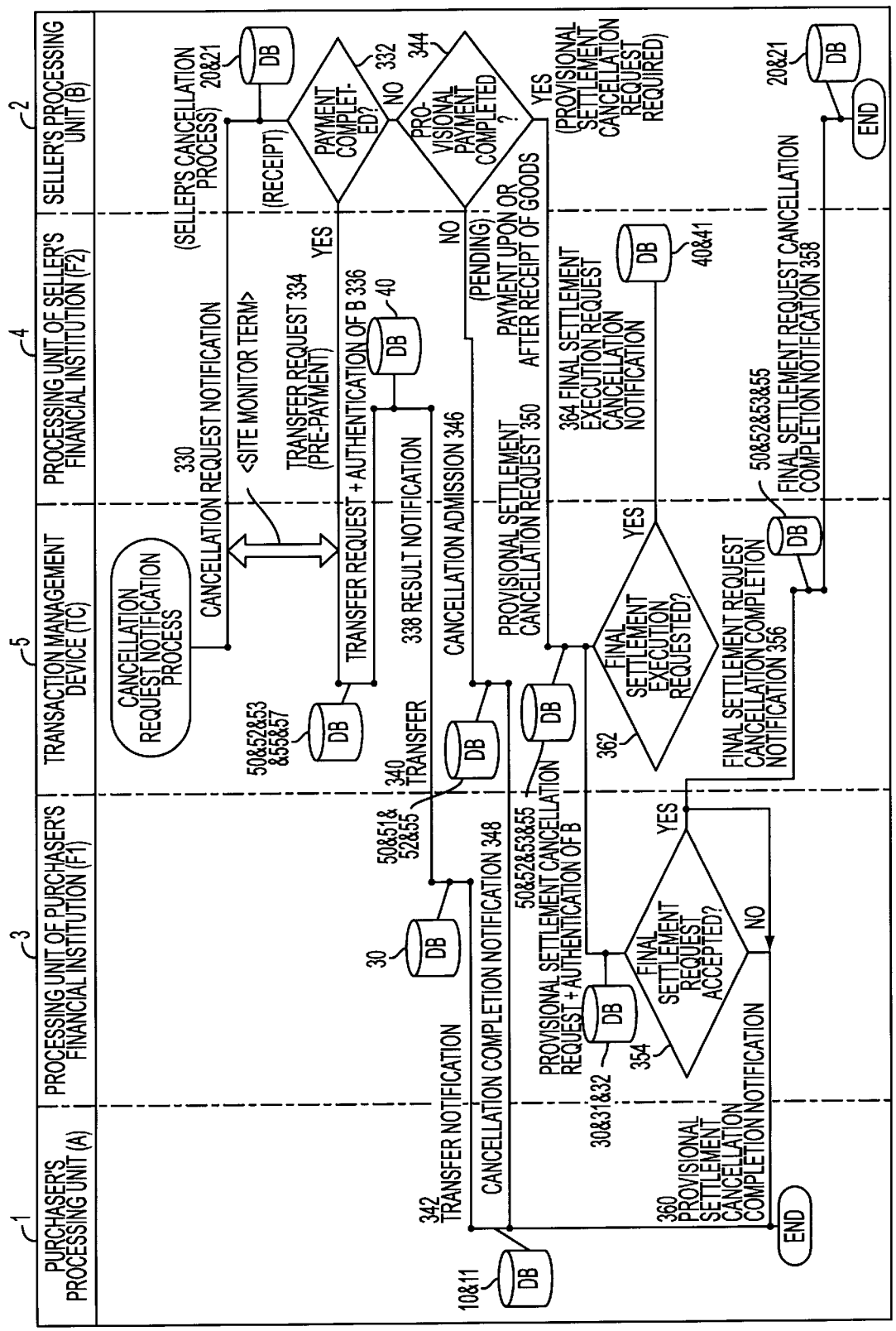
FIG. 9 shows the procedures of the process (cancellation request notification process) according to the fourth embodiment of the present invention.
Figure 10:
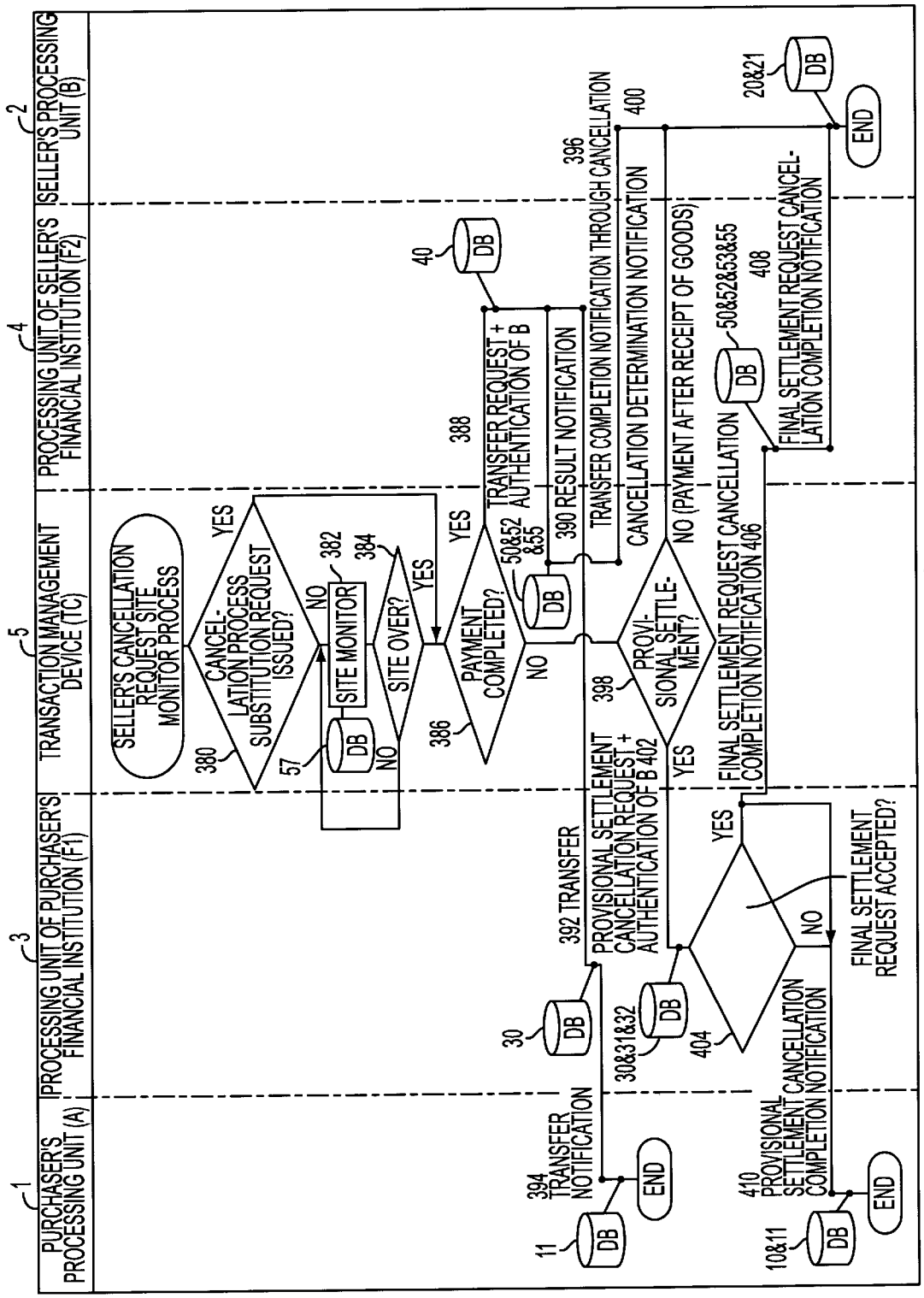
FIG. 10 shows the procedures of the process (site monitor process for a cancellation request) according to the fourth embodiment of the present invention.

According to the present embodiment, unlike the above described embodiment, when necessary access is not gained from the seller's processing unit 2 (B) or the purchaser's processing unit 1 (A) within a predetermined time during the payment process or the cancellation process, a settlement process or a cancellation process are forced to be performed at the responsibility of the transaction management device 5 (TC) as shown in FIGS. 8, 9, and 10.

A normal settlement process is described below by referring to FIGS. 6 and 7.

In the present embodiment, the explanation about the process of issuing provisional settlement money is omitted. The provisional settlement money can be that in the first embodiment of the present invention, or the settlement account money in the second embodiment. The processes similar to those in the above described embodiments are omitted here. In the present embodiment, the transaction management device 5 decrypts and re-encrypts information, but the detailed explanation is omitted here.

First, the purchaser's processing unit 1 transmits an order of goods and the provisional settlement money to the transaction management device 5 (S220). Then, the transaction management device 5 enters the goods purchase information and the provisional settlement money information in the transaction management DB 55, and re-encrypts and transmits the information to the seller's processing unit 2 (S222). The seller's processing unit 2 accesses the goods sales management DB 20, confirms the stock, retrieves digital contents, and transmits them to the purchaser's processing unit 1 (S224). The transmitted digital contents include 'digest' and 'contents'. A digest is a trial version or an introductory version of contents. According to the digest, the purchaser is generally informed of the contents. The digest is transmitted without encryption. The contents, that is, the body of the digital contents, are encrypted using a different encryption key for each purchaser. Unless there is a different contents decryption key provided from the seller for each purchaser, the contents cannot be accessed. Furthermore, an illegal copy can be easily traced by printing, into a plurality of portions of the contents, seller's different blind signatures for respective purchasers.

The seller's processing unit 2 transmits the contents decryption key to the transaction management device 5 in step 226. The transaction management device 5 stores the key information as transaction information in the transaction management DB 55.

Upon receipt of the digital contents, the purchaser checks the digest (S225). If the purchaser likes the digest, he or she issues a request for the contents decryption key (S234) to the transaction management device 5. Thus, through a request from the purchaser's processing unit 1 for the contents decryption key, the purchaser's intention to pay for the contents can be expressed. The transaction management device 5 can be the witness (third-party witness) by entering the request in the transaction management DB 55.

Next, the transaction management device 5 transmits the contents decryption key to the purchaser's processing unit 1 (S236). The purchaser's processing unit 1 decrypts the contents using the contents decryption key. If the contents can be successfully decrypted, the final settlement admission request process shown in FIG. 7 is performed (S241). If the contents cannot be successfully decrypted, they are transmitted to the transaction management device 5 with a cancellation request (S240). The transaction management device 5 issues a request for digital contents to the seller's processing unit 2 to confirm whether or not the digital contents can be decrypted at a cancellation request (S242). In response to the request, the seller's processing unit 2 transmits the encrypted digital contents to the transaction management device 5 (S244). Then, the transaction management device 5 tries to decrypt the encrypted contents using the contents decryption key is the device 5. If the contents can be decrypted, the decryption key is transmitted to the purchaser's processing unit 1 (S246) again. If the contents cannot be decrypted, a cancellation acceptance notification is transmitted to the purchaser's processing unit 1 (S248).

The final settlement admission process (S241) is described below by referring to FIG. 7.

In the payment process, the purchaser's processing unit 1 first transmits a final settlement admission request to the transaction management device 5 (S250). The transaction management device 5 enters it in the transaction management DB 55 and transmits the final settlement admission request to the processing unit of the purchaser's financial institution 3 with the authentication of the purchaser (A) (S252). The authentication of the purchaser refers to the information indicating that the transaction management device 5 has confirmed the purchaser information.

The processing unit of the purchaser's financial institution 3 confirms, through the provisional settlement money management DB 31, whether or not it has received a final settlement request (execution request) from the seller's processing unit 2 (S253). If the processing unit of the purchaser's financial institution 3 has already received the final settlement request from the seller, the processing unit of the purchaser's financial institution 3 performs a final settlement by transferring required money to the processing unit of the seller's financial institution 4 (S254), and the processing unit of the seller's financial institution 4 transmits the transfer notification to the seller's processing unit 2 (S258).

If the final settlement request has not been entered, then the processing unit of the purchaser's financial institution 3 transmits a demand notification of the final settlement request to the transaction management device 5 (S260). According to the notification, the transaction management device 5 transmits a demand for the final settlement request to the seller's processing unit 2 (S262). In response to the demand, the seller's processing unit 2 transmits the final settlement request to the transaction management device 5 (S264), and the transaction management device 5 transmits the final settlement request containing a request for receipt of transfer to the processing unit of the purchaser's financial institution 3 with authentication of the seller (B)(S266). As a result, the processing unit of the purchaser's financial institution 3 transfers money in the final settlement process as described above if the condition of the final settlement is satisfied (S254). If the condition is not satisfied, the result is transmitted to the seller's processing unit 2 through the transaction management device 5 (S268 and S270).

The process of monitoring the payment process site is described by referring to FIG. 8. The site monitor indicates the monitor of the term. According to the present embodiment, the transaction management device 5 forcefully performs the payment process as a third-party witness organization if the purchaser does not perform a necessary payment process (a final settlement admission request) within a predetermined term.

Therefore, the transaction management device 5 determines whether or not the payment has been made (S280) as shown in FIG. 8. If the payment has not been made yet, the payment site monitor is performed (S282). As for the term of the payment site monitor, a system site monitor term (for example, 7 days) or the site monitor term in the third-party delivery certification information is set using the receipt date of the goods in the third-party delivery certification information or the decryption key delivery date as the start point of the term. If the payment process shown in FIG. 7 is not performed within the term, a 'site-over' is determined (S284). Then, the transaction management device 5 determines whether or not the process is being provisionally settled. If not, a payment demand notification is issued to the purchaser's processing unit 1 (S288). If the process is being provisionally settled, a final settlement admission request (request for substitution) and a third-party witness authentication are transmitted to the processing unit of the purchaser's financial institution 3 (S292). The processing unit of the purchaser's financial institution 3 assumes that the purchaser has issued a final settlement request based on the third-party authentication of the transaction management device 5, and the payment process is forcefully performed in the processes (S292 through S318) similar to the processes in and after step 252 shown in FIG. 7.

Figure 6:
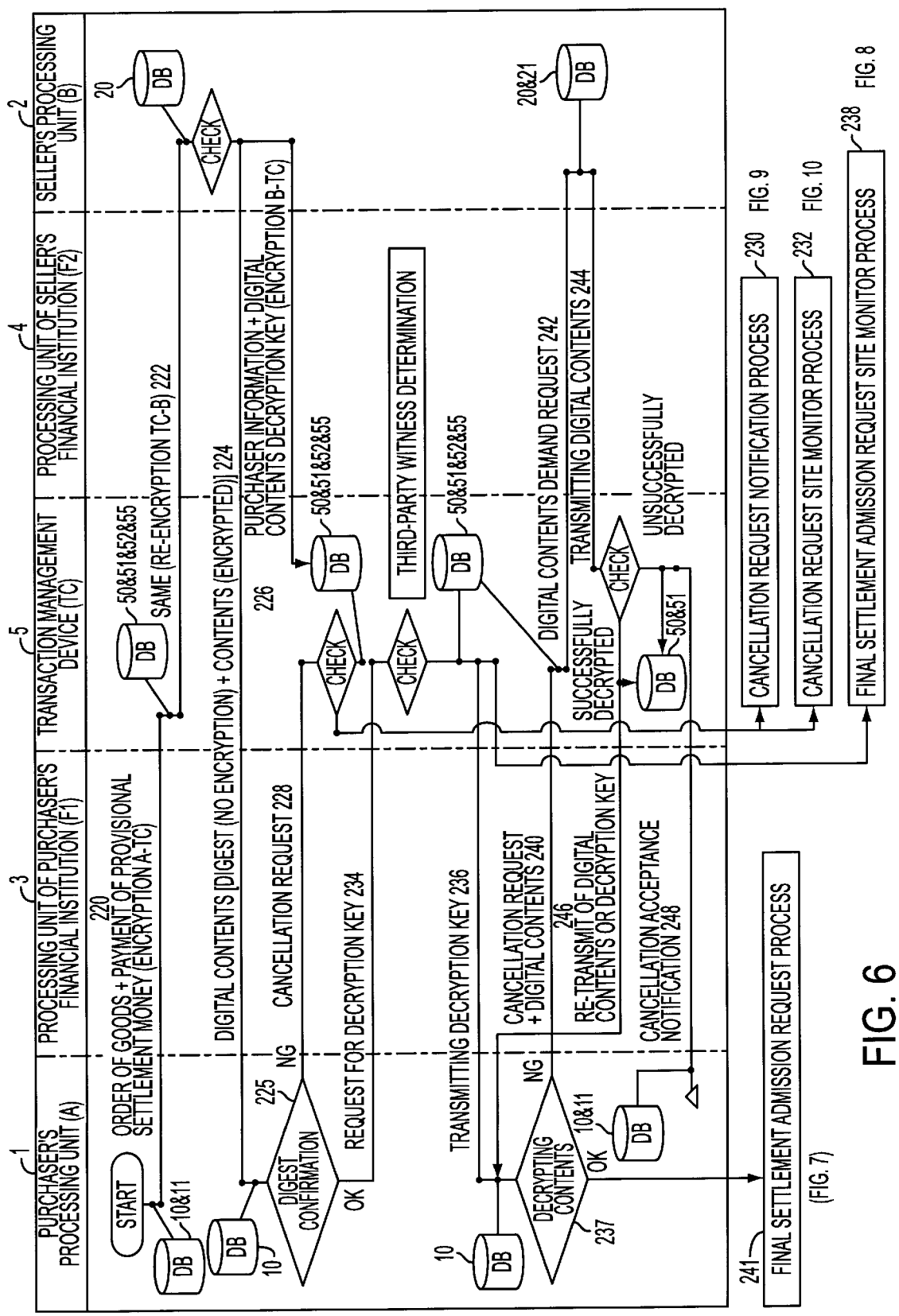
FIG. 6 shows the procedures of the process (settlement process for purchase of digital contents) according to the fourth embodiment of the present invention.
Figure 7:
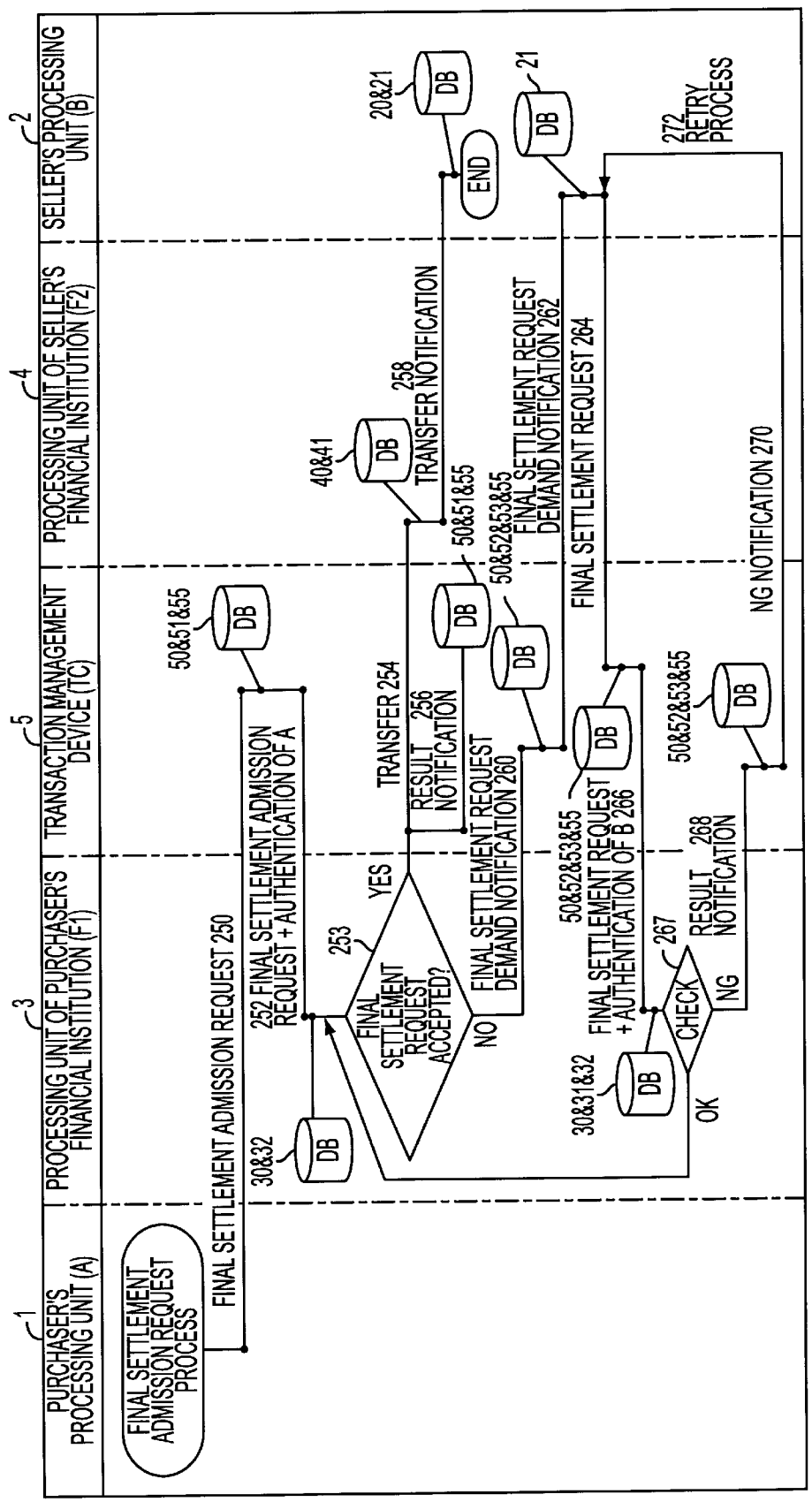
FIG. 7 shows the procedures of the process (final settlement admission request process for the purchase of digital contents) according to the fourth embodiment of the present invention.

The payment site monitor is started from the time point (S236) when the transaction management device 5 transmits the decryption key as shown in FIG. 6.

Since the fact that the purchaser has received the contents and demanded the decryption key is stored in the transaction management DB 55 of the transaction management device 5 (third-party witness), the purchaser cannot reject the final settlement admission request. Therefore, the transaction management device 5 can perform the above described automatic payment process.

The above described cancellation request notification process is described by referring to FIG. 9.

The cancellation process is started when the purchaser does not like the digest of the digital contents and transmits a transaction cancellation request to the transaction management device 5 (S230).

As shown in step 330 in FIG. 9, the transaction management device 5 transmits a cancellation request notification to the seller's processing unit 2. Upon receipt of the cancellation request notification, the seller's processing unit 2 performs the cancellation process. First, the seller's processing unit 2 inquires the goods sales management DB 20 and the money management DB 21 whether or not the cost of the goods has been paid (in the case of prepayment) (S332). If the payment has been made, the transaction management device 5 transmits a transfer request to the transaction management device 5 to return money to the purchaser (S334). Upon receipt of the request, the transaction management device 5 inquires the encryption key management DB 50, seller information DB 52, financial institution information DB 53, transaction management DB 55, and return-of-goods site monitor DB 57, and transmits the request for receipt of transfer to the processing unit of the seller's financial institution 4 with the authentication of the seller (B)(S336).

In response to the request, the processing unit of the seller's financial institution 4 accesses the account management DB 40, and transfers the predetermined amount of money from the account of the seller to the purchaser's predetermined account (account management DB 30) in the purchaser's financial institution (S340). When the transfer is performed, the processing unit of the seller's financial institution 4 notifies the transaction management device 5 of the transfer result, and enters the result.

The processing unit of the purchaser's financial institution 3 transmits a transfer notification to the purchaser's processing unit 1 (S342), thereby terminating a refund process.

On the other hand, if it is determined in step S332 that the payment has not been made (not prepaid), then it is determined whether or not the provisional payment has been made, that is, the provisional settlement can be applied to the transaction (S344). If it is determined that the provisional payment has not been made, that is, if the payment is made after or upon receipt of the goods, then the seller's processing unit 2 notifies the transaction management device 5 of the cancellation admission (S346). In this case, since the payment has not been made, and the purchaser has not seen the digital contents (has not received the goods yet), the purchaser only has to cancel the transaction. Therefore, after the transaction management device 5 has entered the cancellation in the predetermined encryption key management DB 50, purchaser information DB 51, seller information DB 52, and transaction management DB 55, the transaction management device 5 transmits a cancellation completion notification to the purchaser's processing unit 1 (S348).

If it is determined that the provisional payment has been made in the process in step S332, that is, if the payment is made using provisional settlement money, then the seller's processing unit 2 transmits a provisional settlement cancellation request to the transaction management device 5 (S350). The transaction management device 5 enters this request in the predetermined DBs 50, 52, 53, and 55, and transmits the provisional settlement cancellation request to the processing unit at the purchaser's financial institution 3 with the authentication of the seller (B) (S352). On the other hand, the transaction management device 5 determines whether or not the final settlement execution request has been received from the seller's processing unit 2 (S362). If yes, the transaction management device 5 cancels the request and notifies the processing unit at the seller's financial institution 4 of the cancellation.

Next, the processing unit at the purchaser's financial institution 3 determines in step 354 whether or not a final settlement request (or final settlement admission request) has been received. If yes, the processing unit at the purchaser's financial institution 3 cancels the request, transmits a provisional settlement cancellation completion notification to the purchaser's processing unit 1 (S360), and transmits a final settlement request cancellation completion notification to the seller's processing unit 2 through the transaction management device 5 (S356 and S358).

The site monitor process in the cancellation process is described by referring to FIG. 10.

The site monitor process in the cancellation process is performed when the seller's processing unit 2 does not perform any process (S334, S346, or S350) for cancellation although a cancellation request notification has been received from the transaction management device 5 (S330) as shown in FIG. 9. Therefore, the site monitor is started when the cancellation request notification is issued in step 330 as shown in FIG. 9.

As shown in FIG. 10, the transaction management device 5 first determines whether or not it has received a cancellation process substitution request (S380). If yes, the transaction management device 5 independently performs the cancellation process in and after step 386 without the site monitor and regardless of the notification from the seller's processing unit 2.

The cancellation process is the same as the process in and after step 332 shown in FIG. 9 except that the transaction management device 5 determines in steps 386 and 398 respectively as shown in FIG. 10 whether or not the payment has been made and whether or not the provisional settlement has been made, which are determined in S332 and S344 respectively by the seller's processing unit 2 as shown in FIG. 9. Therefore, the detailed explanation is omitted here.

Thus, the process can be performed without a seller's confirmation because the transaction management device 5 can certify as a third-party witness that the purchaser's processing unit 1 has not received a digital contents decryption key and does not intend to purchase the digital contents, and because the transaction management device 5 stores all records of the transaction. Therefore, the transaction management device 5 can quickly and exactly perform a cancellation process by functioning as a third-party witness regardless of the current intention of the purchaser.

On the other hand, if the cancellation process substitution request is not received, the transaction management device 5 performs the site monitor in steps 382 and 384, and determines a 'site over' as long as the seller's processing unit 2 does not perform the process shown in FIG. 9 within a monitor term, and performs the cancellation process in and after step 386 without a confirmation of the seller's processing unit 2.

With the above described configuration, the following effect can be obtained.

First, since the transaction management device 5 mediates a transaction, the effect obtained with the third embodiment can be realized.

Second, when digital contents are processed, the transmission of provisional settlement money and a decryption key of the digital contents are mediated and managed. Therefore, the transaction management device 5 certifies the transmission processes as a third-party witness organization. As a result, processes can be automatically performed according to the information stored in the transaction management DB 55 even if a seller or a purchaser does not take necessary procedures within a predetermined period. Therefore, a transaction settlement process can be performed easily, safely, quickly, and certainly.

Figure 11:
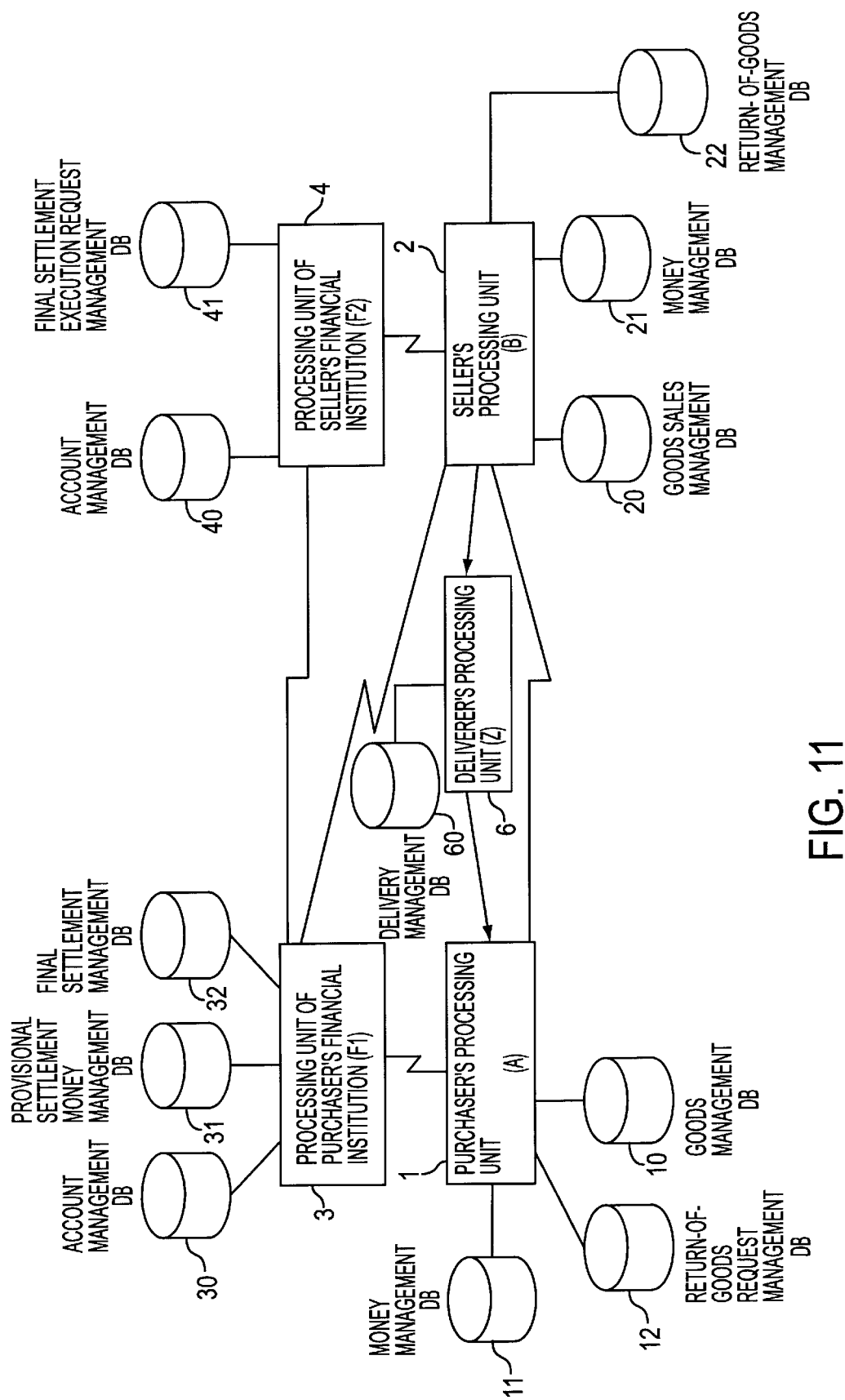
FIG. 11 shows the general configuration of the settlement system according to the fifth embodiment of the present invention.
Figure 12:
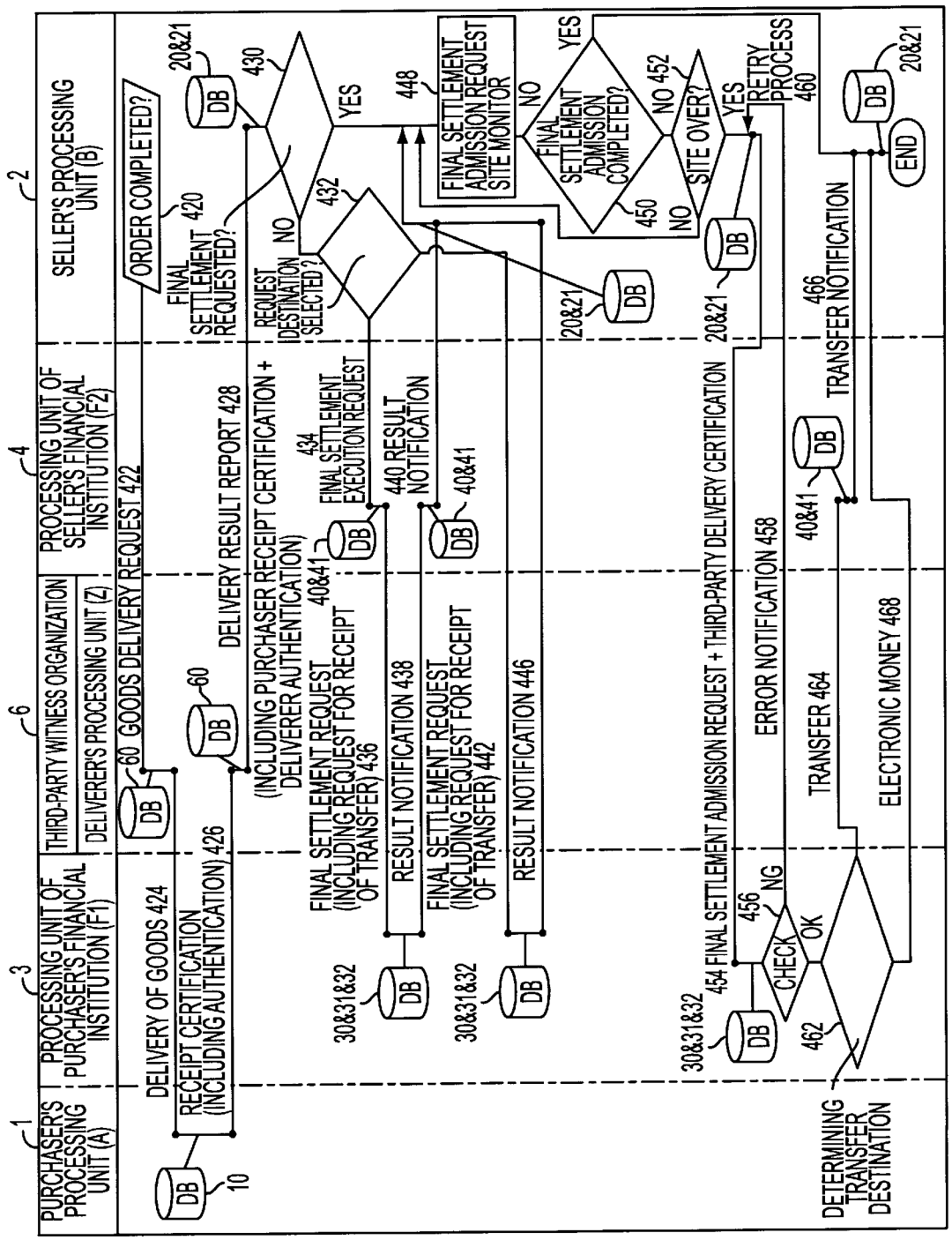
FIG. 12 shows the procedures of the process (process for a final settlement request from a seller) according to the fifth embodiment of the present invention.

The fifth embodiment is described by referring to FIGS. 11 and 12.

According to the fourth embodiment of the present invention, when a transaction of electronic contents is performed, the transaction management device 5 is used as the third-party witness. However, the fifth embodiment refers to a system for distribution of physical goods, and includes a deliverer's processing unit 6 (delivery management device) provided at a house-to-house delivery agent, etc. as a third-party witness organization.

As shown in FIG. 11, the deliverer's processing unit 6 comprises a delivery management DB 60. Since other components are similar to those according to the first embodiment, the explanation of them is omitted. The operations of the system is described below by referring to FIG. 12.

First, assume that the seller's processing unit 2 has received an order from the purchaser's processing unit 1. That is, the seller's processing unit 2 has received provisional settlement money and goods purchase information from the purchaser's processing unit 1. In this case, the seller's processing unit 2 first transmits a goods delivery request to the deliverer's processing unit 6 (S422). The deliverer's processing unit 6 enters goods delivery information in the delivery management DB 60, and delivers requested goods to the purchaser or a receiver A specified by the purchaser (S424).

The deliverer's processing unit 6 receives a receipt certificate containing authentication from the purchaser's processing unit 1 (S426), and enters the certificate in the delivery management DB 60 together with the delivery date. The deliverer's processing unit 6 transmits delivery result receives a receipt certification including authentication from the purchaser's processing unit 1 (S426), and enters the delivery management DB 60 with the delivery date. The deliverer's processing unit 6 transmits the delivery result report information to the seller's processing unit 2 (S428). The delivery result report information contains the receipt certification of the purchaser's processing unit 1 and the authentication of the deliverer's processing unit 6. These pieces of information are entered in the goods sales management DB 20 and 21 of the seller's processing unit 2.

Then, the seller's processing unit 2 determines whether or not a final settlement request has been issued (S430). If it has not been issued yet, a unit to which the final settlement request is issued is determined in step 432. The final settlement request destination can be either (a) the processing unit of the seller's financial institution 4, or (b) the processing unit of the purchaser's financial institution 3. Since the processes of the final settlement execution request (S434 through S440, S442 through 446) are similar to the above described processes of the final settlement request, the detailed explanation is omitted here.

On the other hand, after the seller's processing unit 2 has issued the final settlement execution request, it starts the site monitor for the final settlement admission request (S448 through S452). The site monitor is performed to forcefully execute the final settlement if the final settlement execution request has been issued but the transfer of money has not been confirmed, or if no return-of-goods process has been performed. A reasonable number of days is set as a monitor term required from an execution request to a transfer of money.

If the monitor term has passed without a final settlement completion notification (S450), the seller's processing unit 2 forcefully starts the final settlement admission request process as a result of a 'site over' (S452). The final settlement admission request process is performed based on the fact that the house-to-house deliverer (deliverer's processing unit 6) functions as a third-party witness organization for certifying the delivery of goods, and a purchaser cannot deny his or her intention of purchasing the goods unless the purchaser returns the goods.

Therefore, the seller's processing unit 2 transmits the final settlement admission request with the third-party certification (house-to-house-delivery certification of the deliverer's processing unit 6) to the processing unit of the purchaser's financial institution 3. The processing unit of the purchaser's financial institution 3 checks that the request is issued with the third-party certification (S456). If the request is recognized as valid, then the destination of the transfer is determined in step 462. When transfer is addressed to the seller's financial institution, money is transferred to the account of the seller B in the seller's financial institution (S464). If money has been transferred, the processing unit of the seller's financial institution 4 notifies the seller's processing unit 2 of the transfer (S466).

On the other hand, if money is transferred to the seller's processing unit 2, then the processing unit of the purchaser's financial institution 3 transmits electronic money to the seller's processing unit 2 (S468), thereby terminating the final settlement.

With the above described configuration, a third-party witness organization other than the seller and the purchaser exists as in the fourth embodiment of the present invention, and the authentication data can be added to the provisional settlement money. Therefore, the settlement process can be performed through the third-party certification even if the purchaser does not issue a final settlement admission request. Therefore, the settlement process can be performed quickly and definitely.

The sixth embodiment of the present invention is described below by referring to FIGS. 13 through 15.

Figure 13:
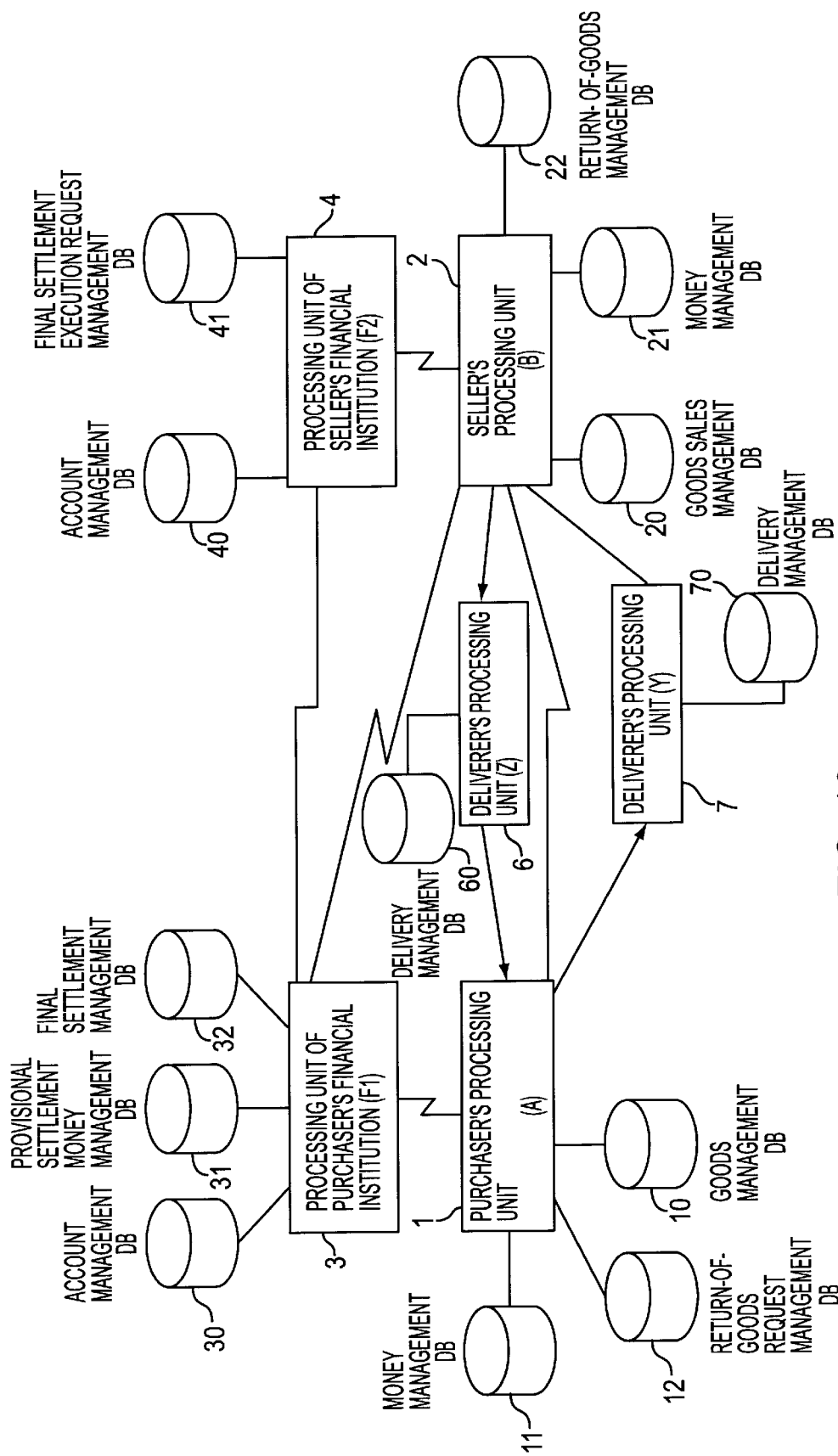
FIG. 13 shows the general configuration of the settlement system according to the sixth embodiment of the present invention.

The system according to the fifth embodiment comprises the deliverer's processing unit 6 for delivering goods to a purchaser, whereas the system according to the present embodiment further comprises a deliverer's processing unit 7 for delivering returned goods as shown in FIG. 13. The deliverer's processing unit 7 also comprises a delivery management DB 70.

FIG. 14 shows a normal settlement process. FIG. 15 shows a return-of-goods process. In FIG. 14, the deliverer's processing unit 7 for returning goods does not work, but the deliverer's processing unit 6 for delivering goods works.

First, purchaser's processing unit 1 transmits a goods order request and provisional settlement money to the seller's processing unit 2 (S480). Based on them, the seller's processing unit 2 confirms the stock in the goods sales management DB 20. If there is no stock, then the result is transmitted (returned) to the purchaser's processing unit 1 together with the received provisional settlement money (S482). If there is any stock, the notification is transmitted to the purchaser's processing unit 1 (S484). Then, the seller's processing unit 2 transmits a final settlement request (request for receipt of transfer) to the processing unit of the purchaser's financial institution 3 (S486). The processing unit of the purchaser's financial institution 3 checks the contents (S488), and notifies the seller's processing unit 2 of the result (S490). If the check result indicates 'OK', the processing unit of the purchaser's financial institution 3 notifies the seller's processing unit 2 of the result only. However, if the check result indicates 'NG', the result is transmitted to the seller's processing unit 2 together with the provisional settlement money. If the result indicates 'NG', the seller's processing unit 2 returns the provisional settlement money regardless of the delivery of goods (S492).

If the result indicates 'OK', the seller's processing unit 2 transmits a goods delivery notification to the purchaser's processing unit 1 (S494), and transmits a goods delivery request to the deliverer's processing unit 6 (S496). The deliverer's processing unit 6 returns a receipt certification (receipt) to the seller's processing unit 2 (S498).

On the other hand, based on the delivery request received by the deliverer's processing unit 6, the house-to-house deliverer delivers the goods to the purchaser (S500). The purchaser's processing unit 1 issues a receipt certification (S502), and the deliverer's processing unit 6 adds deliverer authentication to the receipt certification and transmits them to the seller's processing unit 2 (S504).

In step 506, the purchaser confirms a delivered goods. If the purchaser is satisfied with the goods, he or she issues a final settlement admission request to the processing unit of the purchaser's financial institution 3 (S508). Based on the request, the processing unit of the purchaser's financial institution 3 transfers the cost of the purchased goods to the account of the seller in the seller's financial institution (S512). The processing unit of the seller's financial institution 4 transmits a transfer notification to the seller's processing unit 2 (S514). The processing unit of the purchaser's financial institution 3 transmits the transfer result to the purchaser's processing unit 1 (S510).

Thus, the normal settlement process terminates.

Figure 15:
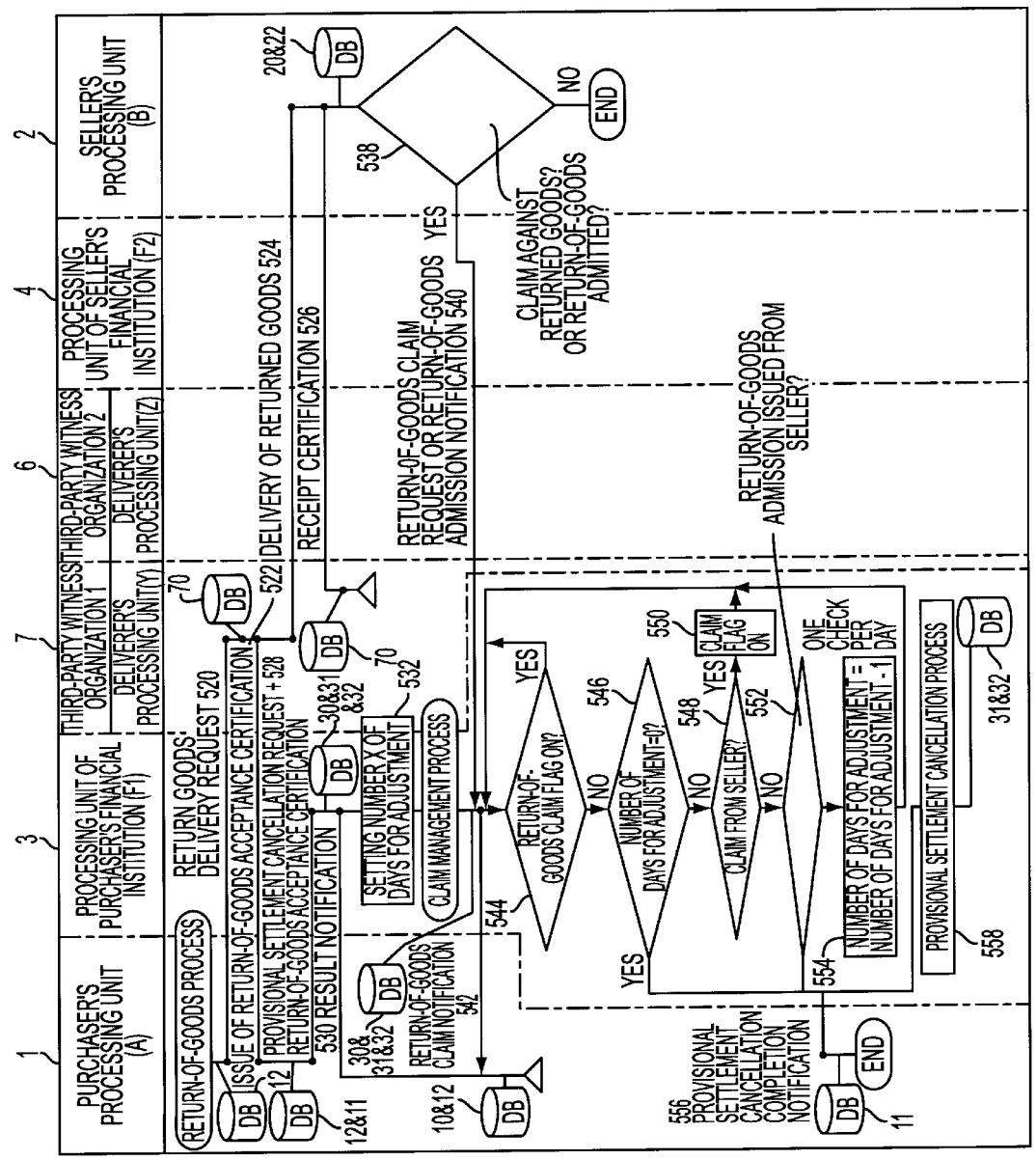
FIG. 15 shows the procedures of the process (return-of-goods process) according to the sixth embodiment of the present invention.

If the purchaser is not satisfied with the goods in step S506, then the return-of-goods process shown in FIG. 15 is performed. In this return-of-goods process, either the deliverer's processing unit 6 for normally delivering goods or the deliverer's processing unit 7 for returning goods can be used. Described below is the process performed by the deliverer's processing unit 7.

First, the purchaser's processing unit 1 requests the deliverer's processing unit 7 to deliver goods to be returned (S520), and receives the request receipt certification (receipt) (S522). The deliverer Y delivers the goods to be returned to the seller (S524), and receives the receipt certification (S526)

The purchaser's processing unit 1 stores the returned goods receipt certification (receipt) in the return-of-goods request management DB 12, and, based on the receipt, transmits a provisional settlement cancellation request and a returned goods acceptance certification to the processing unit of the purchaser's financial institution 3 (S528). The processing unit of the purchaser's financial institution 3 transmits the receipt result to the purchaser's processing unit 1 (S530).

The transaction management device 5 does not immediately perform a transaction cancellation process, but sets the number (X) of days for adjustment (S532), and monitors whether or not a claim about the returned goods is received from the seller.

That is, the seller checks the returned goods and determines whether the return of goods can be admitted or refused (a claim against the return of goods) in step 538. Then, the seller transmits an admission of the return of goods or a claim against the return of goods to the processing unit of the purchaser's financial institution 3 (S540).

The processing unit of the purchaser's financial institution 3 monitors a claim against the return of goods or an admission of the return of goods while the number of days for adjustment is decremented by 1 every day (S546 through S554). If a return-of-goods claim is issued, then a claim flag is set ON (S544), and the purchaser's processing unit 1 is informed of the claim (S542) without releasing the provisional settlement process.

If the number of days for adjustment becomes 0 without a claim flag set ON (S546), the processing unit of the purchaser's financial institution 3 performs a provisional settlement cancellation process (S558), and notifies the purchaser's processing unit 1 of the process (S556).

With the configuration, the effect similar to hat obtained in the fifth embodiment can be realized. dditionally, the number of days for adjustment is set and a claim is processed based on the third-party certification of the house-to-house deliverer by using the house-to-house deliverer Y as a third-party witness organization for return of goods.

The seventh embodiment of the present invention is described below by referring to FIGS. 16 through 18.

Figure 16:
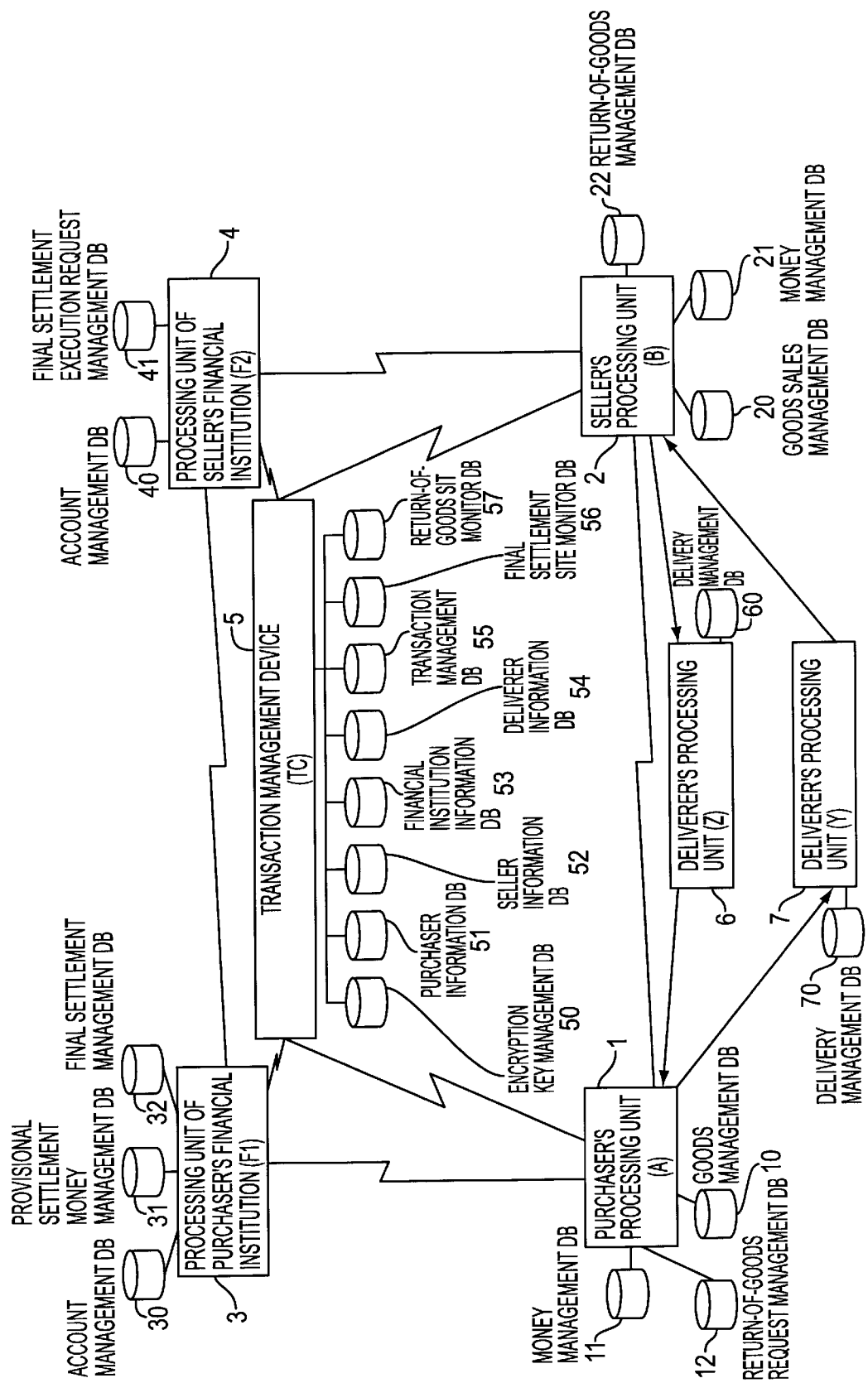
FIG. 16 shows the general configuration of the settlement system according to the seventh embodiment of the present invention.
Figure 17:
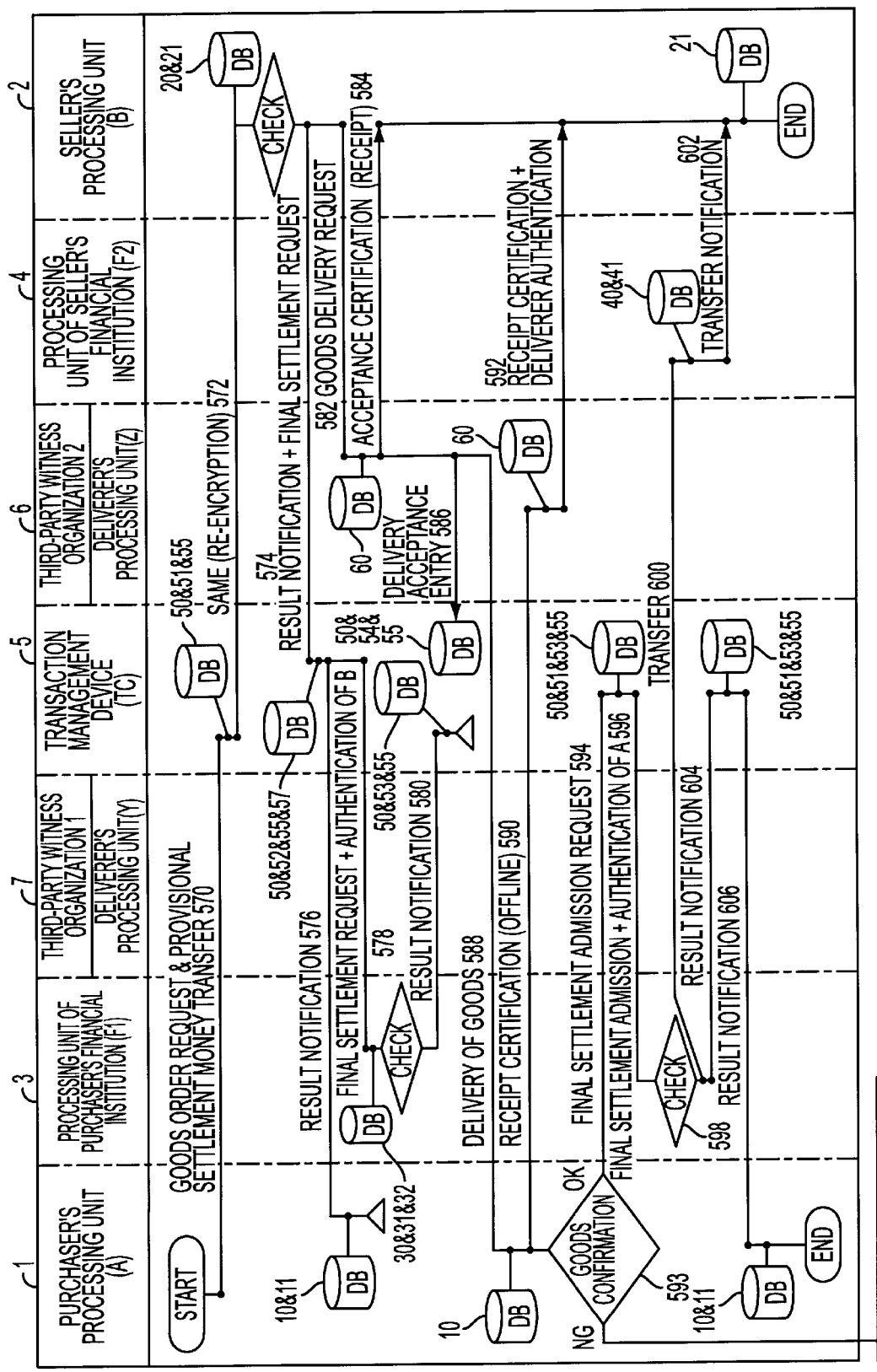
FIG. 17 shows the procedures of the process (goods purchase process through the transaction management device) according to the seventh embodiment of the present invention.

The system according to the seventh embodiment of the present invention is obtained by designing the system according to the sixth embodiment (FIG. 13) in such a way that the transaction management device 5 mediates and manages a transaction as in the third embodiment as shown in FIG. 16. The components described above are assigned the same numbers and the detailed explanation is omitted here.

The transaction process flow according to the present embodiment is described below by referring to FIG. 17.

The purchaser's processing unit 1 transmits a goods order request and provisional settlement money to the seller's processing unit 2 through the transaction management device 5 (S570 and S572). At this time, the transaction management device 5 decrypts and re-encrypts information and enters the transaction in the transaction management DB 55 as described according to the third embodiment.

The seller's processing unit 2 stores the received provisional settlement money in the provisional settlement money management DB 21, accesses goods sales management DB 20, to check the stock of the goods, and transmits the result notification and a final settlement request to the transaction management device 5 (S574). The transaction management device 5 stores them in the transaction management DB 55 and transmits only the result notification to the purchaser's processing unit 1 (S576). The final settlement request is transmitted together with the authentication of the seller B to the processing unit of the purchaser's financial institution 3 (S578). The processing unit of the purchaser's financial institution 3 stores them in the final settlement management DB 32, and transmits the entry result to the transaction management device 5 (S580).

On the other hand, the seller's processing unit 2 transmits a goods delivery request to the deliverer's processing unit 6 for delivering goods (S582). The deliverer's processing unit 6 transmits the acceptance certification (receipt) to the seller's processing unit 2 (S584).

The deliverer's processing unit 6 transmits the acceptance entry of goods delivery to the transaction management device 5 (S586), and delivers the goods to the purchaser (S588). Upon receipt of the goods, the purchaser issues receipt certification to the deliverer (S590). The deliverer's processing unit 6 enters the receipt certification in the delivery management DB 60, and transmits the receipt certification together with deliverer authentication to the seller's processing unit 2 (S592).

On the other hand, upon receipt of the goods, the purchaser confirms the goods (S593), and transmits a final settlement admission request to the transaction management device 5 when the goods are acceptable (S594).

The transaction management device 5 enters a final settlement admission request in the transaction management DB 55. If the final settlement request has been entered, the final settlement admission request is transmitted to the processing unit of the purchaser's financial institution 3 together with the authentication of the purchaser A on condition of the entry (S596).

Based on them, the processing unit of the purchaser's financial institution 3 transfers money to the account of the seller in the seller's financial institution (S600), and the processing unit at the seller's financial institution 4 issues a transfer notification to the seller's processing unit 2 (S602). When the processing unit at the purchaser's financial institution 3 transfers the money, it issues a result notification to the purchaser's processing unit 1 through the transaction management device 5 (S604 and S606).

When a purchaser transfers money information containing provisional settlement information to a seller and the goods are delivered to a third party as a goods receiver, the personal information about the goods receiver is added to the money information containing the provisional settlement information containing a payment ID. As in the case where a purchaser receives goods, the goods receiver confirms the receipt of the goods. If the result is 'OK', the goods receiver issues a final settlement admission request according to the payment ID and the personal information about the receiver. If the confirmation result is 'NG', the goods receiver issues a return-of-goods request to the deliverer, transmits the first third-party return-of-goods certification information received from the deliverer, and requests the cancellation of the provisional settlement.

Figure 18:
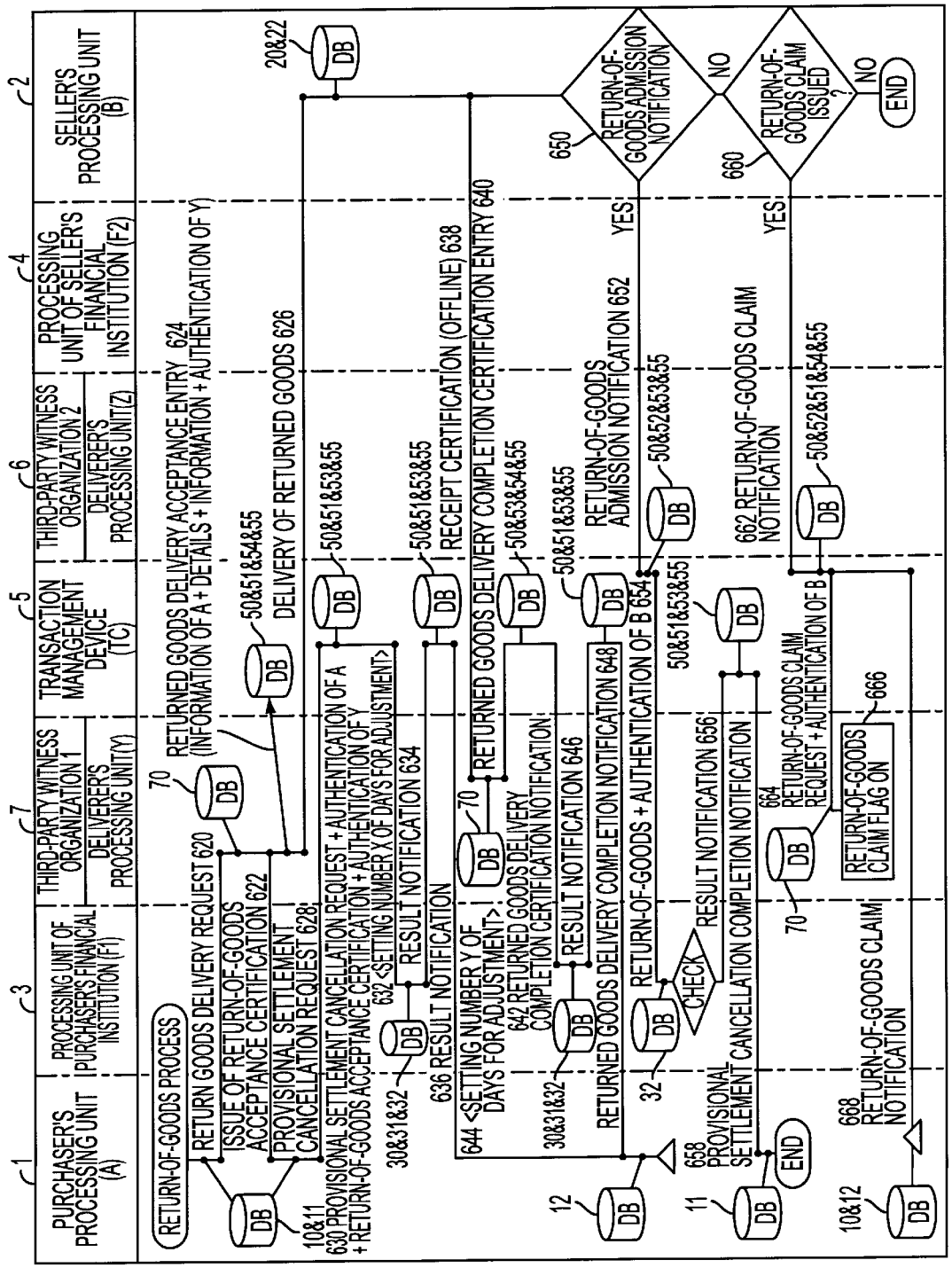
FIG. 18 shows the procedures of the process (return-of-goods process through the transaction management device) according to the seventh embodiment of the present invention.

On the other hand, if a purchaser is not satisfied with received goods in step 593, then the return-of-goods process shown in FIG. 18 is performed.

As shown in FIG. 18, the return-of-goods process is started by transmitting a returned goods delivery request to the deliverer's processing unit 7 for delivering the goods to be returned from the purchaser's processing unit 1 (S620). The returned goods delivery request is entered in the delivery management DB 70 of the deliverer's processing unit 7, and returned goods acceptance certification is issued to the purchaser's processing unit 1 (S622). Simultaneously, the deliverer's processing unit 7 accesses the transaction management device 5, and enters the acceptance of the returned goods delivery request (S624). The acceptance of the returned goods delivery request contains the information about a purchaser, the details about the purchase of goods, the information about a seller, and the authentication of a deliverer. The deliverer delivers returned goods to the seller (S626).

Then, the purchaser's processing unit 1 transmits the provisional settlement cancellation request to the transaction management device 5 (S628), and the transaction management device 5 enters it in the transaction management DB 55. The transaction management device 5 transmits the provisional settlement cancellation request, purchaser authentication, a return-of-goods request, and deliverer authentication to the processing unit at the purchaser's financial institution 3 (S630).

The processing unit at the purchaser's financial institution 3 enters these data in the database, and sets the number of days X as an adjustment term. The adjustment term is set to monitor a return-of-goods admission or a claim against return-of-goods from a seller. If a claim against return-of-goods is received during the adjustment term, the provisional settlement release process described later is suppressed. The adjustment term X (number of days) is obtained by adding additional days such as the average number of days for delivery and the number of allowance days in consideration of delivery delay, etc. to the number Y of days normally required to check returned goods. The number of days for adjustment is computed starting with the day on which a return-of-goods request is issued to the deliverer's processing unit 7.

The processing unit at the purchaser's financial institution 3 notifies the purchaser's processing unit 1 of the result through the transaction management device 5 (S636). On the other hand, a seller issues returned goods acceptance certification to a deliverer (S638). The deliverer's processing unit 7 notifies the transaction management device 5 of the completion of returned goods delivery upon receipt of the receipt certification (S640). The transaction management device 5 enters it in the database, and notifies the processing unit at the purchaser's financial institution 3 of the completion (S642).

Since the actual delivery date is given to the processing unit at the purchaser's financial institution 3 at this time point, the processing unit at the purchaser's financial institution 3 newly sets the term of the number Y of days starting with the delivery date as the above described adjustment term. The number Y of days is normally required to check goods. Thus, the return of goods can be more correctly monitored by newly setting the adjustment term.

Next, the processing unit at the purchaser's financial institution 3 enters the result of a return-of-goods completion entry in the transaction management device 5 (S646), and the transaction management device 5 notifies the purchaser's processing unit 1 of the completion of the return of goods (S648).

On the other hand, the seller checks the returned goods, and determines in step 650 whether or not the return of the goods can be admitted. When the return of goods is admitted, the seller notifies the processing unit at the purchaser's financial institution 3 of the admission through the transaction management device 5 (S652 and S654). The processing unit at the purchaser's financial institution 3 performs the provisional settlement release process (cancellation of freezing the account, etc.) according to the notification, and transmits a provisional settlement release notification to the transaction management device 5 (S656). The transaction management device 5 transmits the purchaser's processing unit 1 of the provisional settlement release notification (S658). If the return of goods is not admitted within the adjustment term, this process is not performed.

When the return of goods is not admitted, the seller's processing unit 2 determines in step 660 whether or not there is a claim against the return of goods. If yes, the claim against the return of goods is entered in the transaction management device 5 (S662). The claim is further entered in the delivery management DB 70 of the deliverer's processing unit 7, and a return-of-goods claim flag is set ON (S666). The notification of the return-of-goods claim is transmitted from the transaction management device 5 to the purchaser's processing unit 1 (S668).

Thus, the return-of-goods process terminates.

With the above described configuration, the following effects can be obtained.

That is, according to the present embodiment, the transaction management device 5 can collectively manage the proceedings of the transaction of goods to check the consistency of the transaction. Additionally, a seller or a substitution of transactions can proceed with the transaction according to the authentication information from a deliverer by using a deliverer Z for delivering goods and a deliverer Y for returning goods as the third-party witnesses. Therefore, the goods transaction settlement process can be quickly and certainly performed.

The eighth embodiment of the present invention is described below by referring to FIGS. 19 and 20.

According to the eighth embodiment of the present invention, a magnetic card or an IC card, etc. are used as information storage medium used in the transfer of provisional settlement money.

That is, according to the above described first through seventh embodiments, the provisional settlement money is stored as data in the money management DB 11 of the purchaser's processing unit 1, and transferred through communications between communications devices such as servers, etc. However, the provisional settlement money is not limited to this application, but can be issued as information storage medium.

Figure 19:
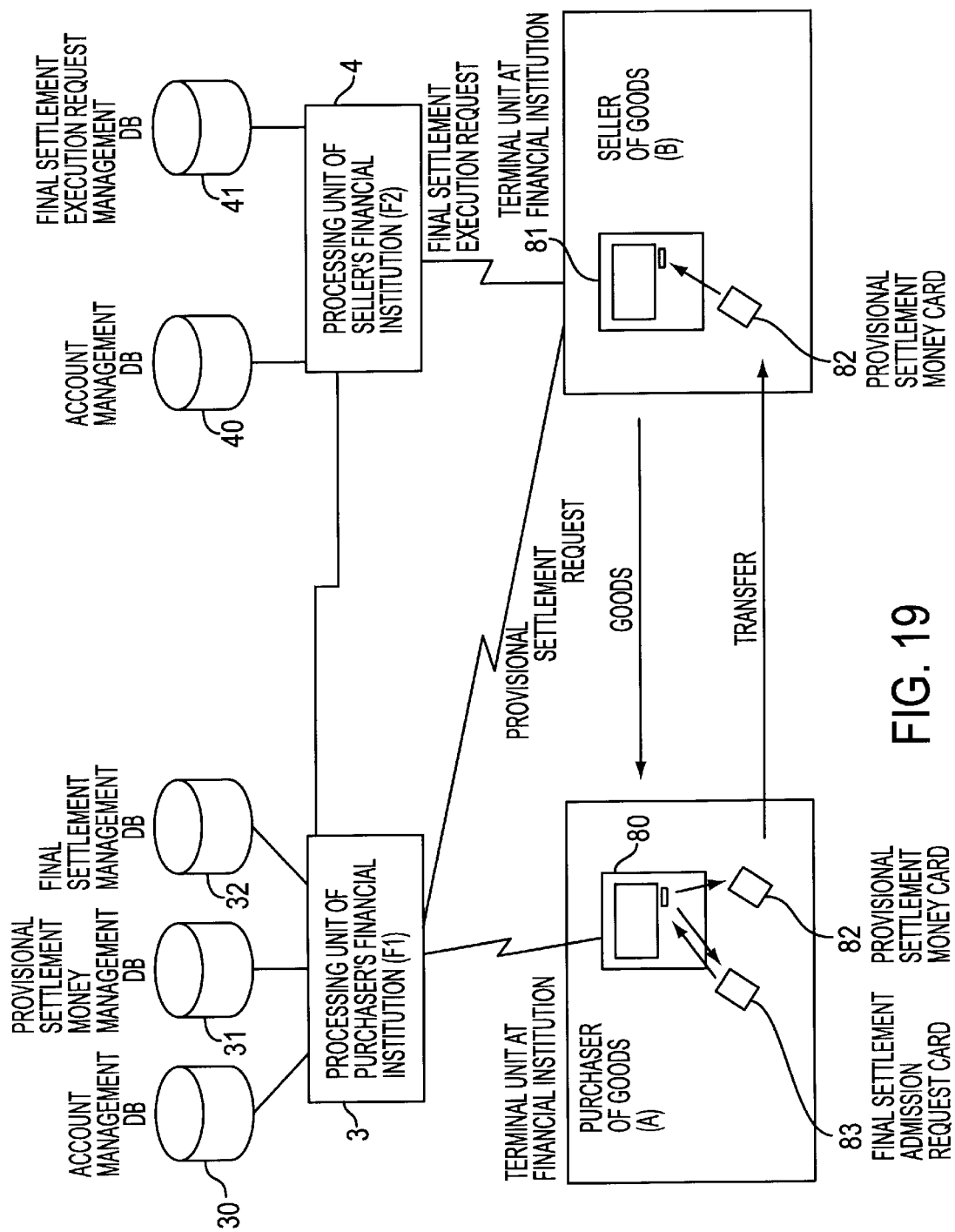
FIG. 19 shows the general configuration of the settlement system according to the eighth embodiment of the present invention.

FIG. 19 shows the entire configuration of the system. The component also appearing in the above described embodiment is assigned the same identification number and the detailed explanation is omitted here.

In FIG. 19, terminal units 80 and 81 at a financial institution are terminals (ATM terminal units, etc.) connected online to the processing units at the financial institution 3 and 4. A purchaser A accesses the purchaser's processing unit 1 through the terminal unit 80 at the financial institution, and receives a provisional settlement money card 82 issued as a storage medium in which the provisional settlement money information is stored in a magnetic storage unit. Simultaneously, the purchaser receives a final settlement admission request card 83, which stores the final settlement admission request information, issued through the terminal unit 80 at the financial institution.

The purchaser transmits the provisional settlement money card 82 to a seller upon or before receipt of goods. The seller applies the provisional settlement money card 82 to the terminal unit 81 at the financial institution, and inputs authentication information and payee information into the terminal unit 81 at the financial institution. Then, the terminal unit 81 at the financial institution can issue a final settlement request to the processing unit at the purchaser's financial institution 3 and a final settlement execution request to the processing unit at the seller's financial institution 4. At this time, the terminal unit 81 at the financial institution collects the provisional settlement money card 82 and issues a receipt indicating that the final settlement is executed. Thus, an illegal reuse of a card can be avoided by collecting the provisional settlement money card 82, thereby legally reusing the card later on.

On the other hand, after checking received goods, the purchaser transmits a final settlement admission request to the processing unit at the purchaser's financial institution 3 through the terminal unit 80 at the financial institution using the final settlement admission request card 83 storing final settlement admission request information. The final settlement admission request card 83 is also collected by the terminal unit 80 at the financial institution for legal reuse.

Figure 20:
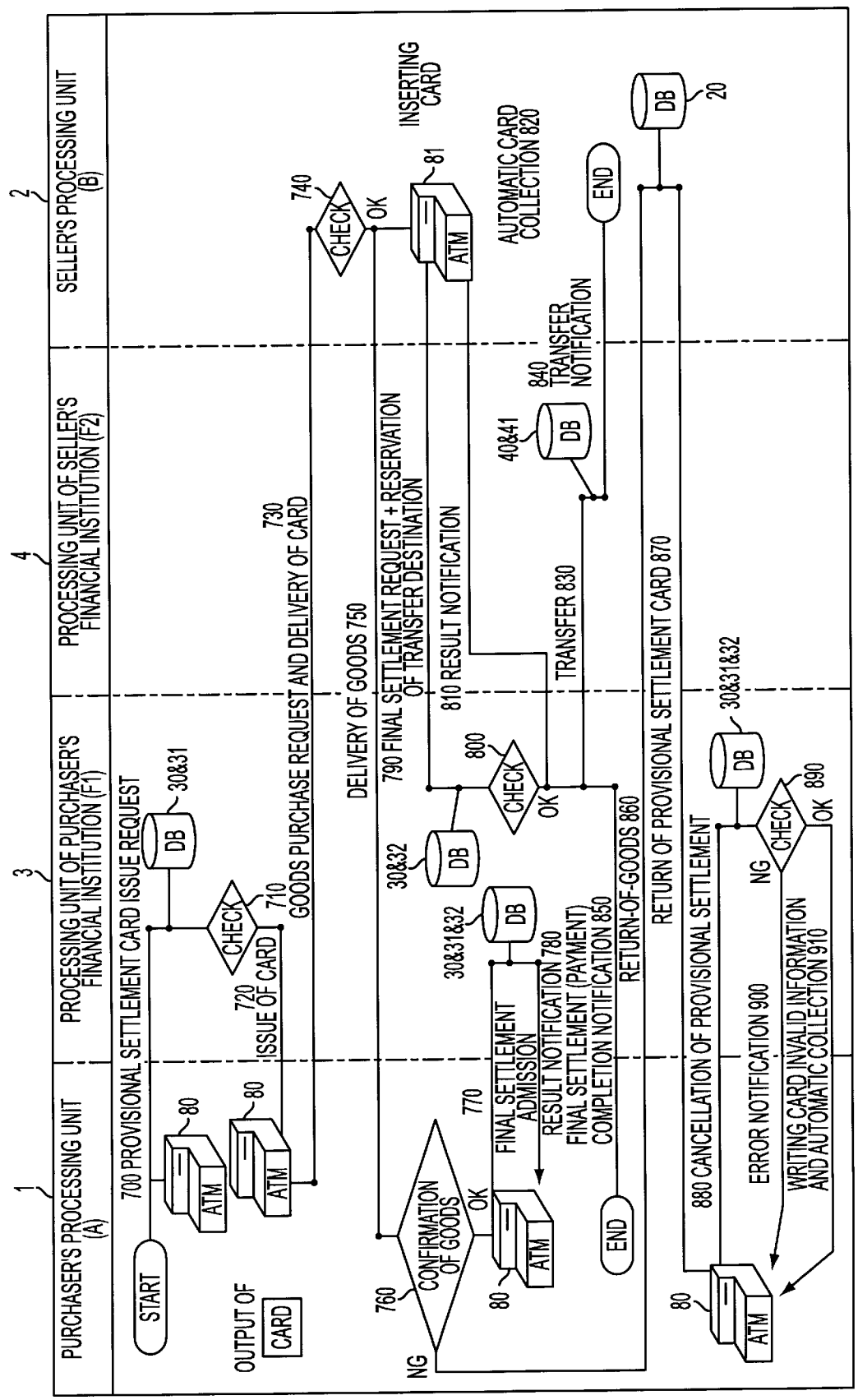
FIG. 20 shows the procedures of the process (settlement process using a portable storage medium) according to the eighth embodiment of the present invention.

Then, the process flow of the system is described furthermore in detail by referring to FIG. 20.

First, the purchaser requests the processing unit at the purchaser's financial institution 3 through the terminal unit 80 at the financial institution to issue a provisional settlement money card (S700). The processing unit at the purchaser's financial institution 3 accesses the account management DB 30, checks the balance, etc. (S710), generates provisional settlement money information in the provisional settlement money management DB 31, and issues from the terminal unit the provisional settlement money card 82 storing the information (S720). Practically, the terminal unit 80 stores a number of card bases, and a card reader/writer provided in the terminal unit 80 enters provisional settlement money information in the magnetic recording unit of the card base. Then, a card is output and issued to a purchaser.

Then, the purchaser issues a purchase request to the seller, and transmits the provisional settlement money card (S730). After checking the purchase request and the provisional settlement money card 82 (S740), the seller transmits the goods to the purchaser (S750). The purchaser checks the goods (S760). If the purchaser is satisfied with the goods, then the purchaser applies the final settlement admission request card 83 to the terminal unit 80, and transmits a final settlement admission request to the processing unit at the purchaser's financial institution 3 (S770). If the processing unit at the purchaser's financial institution 3 accepts the final settlement admission request, it is displayed on the terminal unit 80 (S780).

On the other hand, after the seller delivers the goods, applies the provisional settlement money card 82 to the terminal unit 81 at the financial institution, and inputs the transfer destination of the cost (reservation of the destination). The information and the reservation of the destination stored in the provisional settlement money card are transmitted to the processing unit at the purchaser's financial institution 3 (S790). The processing unit at the purchaser's financial institution 3 accesses the provisional settlement money management DB 31, compares them with the provisional settlement money information to check them (S800), notifies the terminal unit 81 at the financial institution operated by the seller (S810), and displays the check result. If the check result is OK, the final settlement request is accepted, and the reservation of the transfer destination is made, then the terminal unit 81 automatically collects the provisional settlement money card 82 as used money (S820). If the card has been collected, then the processing unit at the purchaser's financial institution 3 transfers money to the processing unit at the seller's financial institution 4 (S830), and the processing unit at the seller's financial institution 4 issues a transfer notification to the seller based on the money transfer (S840).

In step S850, the processing unit at the purchaser's financial institution 3 issues a final settlement (payment) completion notification to the purchaser.

In these processes, the normal payment process terminates.

In step S760, if the received goods are not desired goods, the purchaser returns the goods to the seller (S860). The seller enters the return of the goods in the goods sales management DB 20, and returns the provisional settlement money card 82 to the purchaser (S870). Upon receipt of the provisional settlement money card 82, the purchaser applies the provisional settlement money card 82 to the terminal unit 80 at the financial institution and inputs the provisional settlement money cancellation process to transmit the message to the processing unit at the purchaser's financial institution 3 (S880). Based on this, the processing unit at the purchaser's financial institution 3 instructs the terminal unit 80 to delete the information written in the card, and automatically collects the card (S910). In case of an error, an error message is displayed (S900).

With the above described configuration, even a purchaser or a seller having no communications devices such as servers, etc. can use the electronic provisional settlement system. Additionally, since the necessary procedure can be followed only by applying the provisional settlement money card to an ATM, thereby saving time-consuming inputting operations for the purchaser and seller.

According to the present embodiment, when the purchaser issues a final settlement admission request, the purchaser can manually input the final settlement admission request into an ATM terminal unit. However, since it is necessary to input various information such as goods purchase information, etc., the manual input is a time-consuming operation. Using the final settlement admission request card 83, the operation is not required, and the final settlement admission request can be correctly issued.

When the purchaser transfers the money information containing the provisional settlement information to the seller, and transmits the goods to the third party as a goods receiver, the purchaser adds the personal information about the goods receiver to the money information containing the provisional settlement information including a payment ID. The goods receiver confirms the receipt of the goods as in the case where the purchaser receives the goods. If the result is 'OK', then the goods receiver issues a final settlement admission request according to the payment ID and the personal information about the goods receiver. If the confirmation result is 'NG', the goods receiver issues a return-of-goods request to the deliverer, transmits the first third-party return-of-goods certification information received from the deliverer, and issues a provisional settlement cancellation request.

Next, the components of the system according to the above described first through eighth embodiments, that is, the purchaser's processing unit 1, the seller's processing unit 2, the processing unit at the purchaser's financial institution 3, the processing unit at the seller's financial institution 4, the transaction management device 5, the deliverer's processing unit 6, and the deliverer's processing unit 7 are described below.

The function of each of the units described below may not be used in some of the first through eighth embodiments, but is used in other embodiments.

First, the transaction management device 5 is explained for convenience.

The transaction management device 5 mediates the information communications among the purchaser's processing unit 1, the seller's processing unit 2, the processing unit at the purchaser's financial institution 3, the processing unit at the seller's financial institution 4, the deliverer's processing unit 6, and the deliverer's processing unit 7. The transaction management device 5 has the following functions.

First, the transaction management device 5 has the function of transmitting and receiving data through the unique encryption protocol of each of the transmitter and the receiver when it mediates the transmission and receipt between the units.

Second, when the transaction management device 5 mediates the provisional settlement process, the transaction management device 5 monitors whether or not the purchaser issues a final settlement admission request or a return-of-goods request within a predetermined period. If no respondent processes are performed, the third-party delivery certification information is used as authentication information and the final settlement admission request is issued by the transaction management device 5 as a substitute.

Third, the transaction management device 5 monitors where or not the seller issues a return-of-goods cancellation request. If the cancellation request is not issued within a predetermined period, the transaction management device 5 uses the third-party return-of-goods certification information as authentication information, and issues the cancellation request as a substitute.

Fourth, when the transaction management device 5 mediates the transaction of digital contents, the transaction management device 5 has the function of managing the decryption key of the digital contents encrypted by the seller's processing unit 2 and transmitted to the purchaser's processing unit 1; transmitting the decryption key to the purchaser; and issuing a third-party witness certification information.

Fifth, in addition to the fourth function, the transaction management device 5 has the function of determining whether or not the digital contents are defective; notifying the purchaser's processing unit 1 of the defectiveness when they are defective; and transmitting a decryption key again to the purchaser when it is defective.

Sixth, when the transaction management device 5 mediates the deliverer, the seller (goods delivery requester), and the purchaser (goods receiver), the transaction management device 5 has the function of accepting the entry of the third-party delivery certification information from the deliverer's processing units 6 and 7; accepting the entry of the first third-party return-of-goods certification information certifying that return of goods has occurred; and accepting the entry of the second third-party return-of-goods certification information certifying that the seller has received the returned goods.

Figure 21:
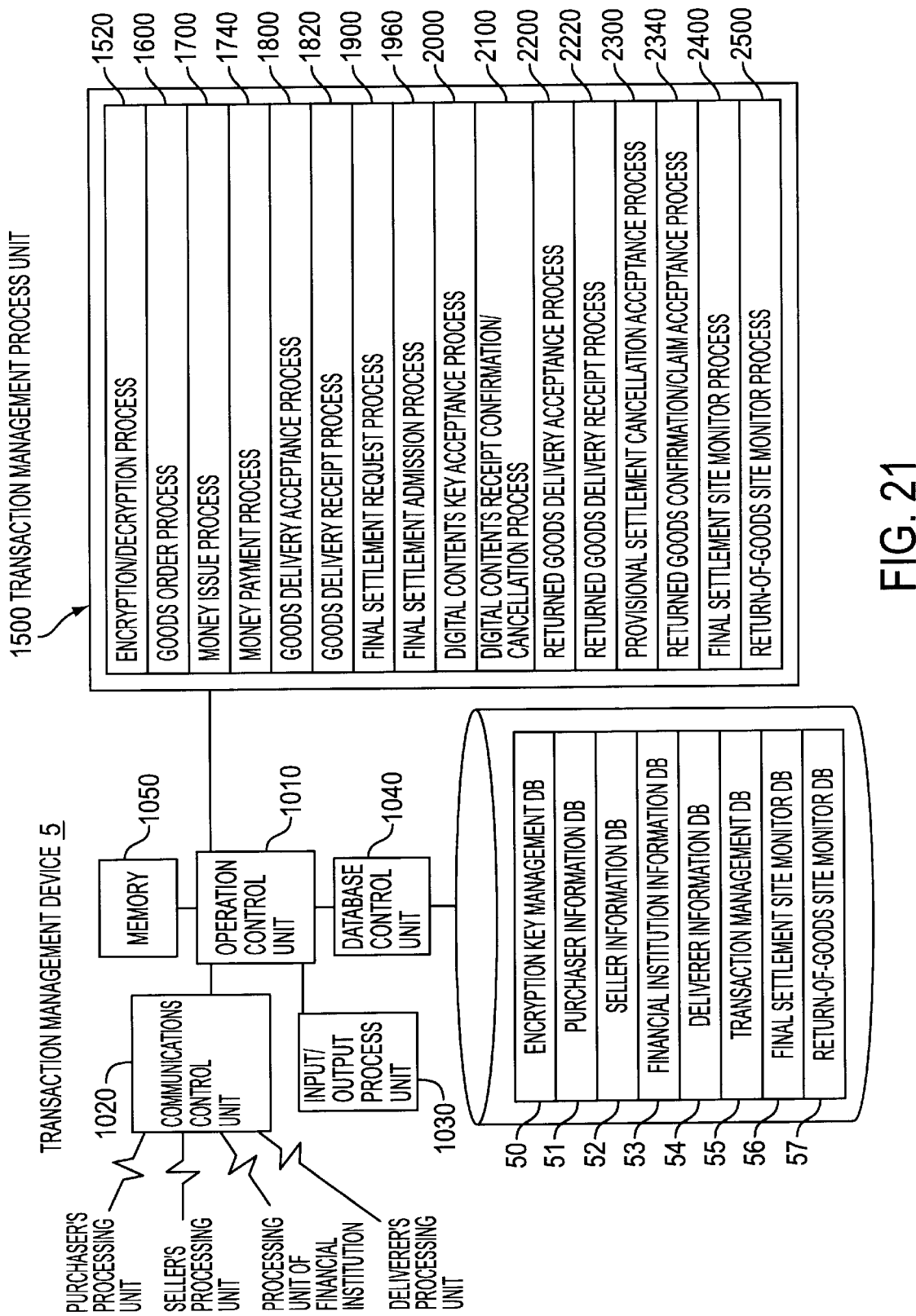
FIG. 21 shows the general configuration of an embodiment of the transaction management device.

To attain the above described functions, the transaction management device 5 is designed as shown in FIG. 21. That is, the transaction management device 5 comprises an operation control unit 1010 for controlling the entire system; a communications control unit 1020 for line-connection to each unit which data is transmitted to or received from; a database control unit 1040 for controlling each database; a transaction management process unit 1500 for executing each function of the transaction management device 5; an input/output process unit 1030; and a memory (random access memory) 1050.

The database control unit 1040 manages and controls the encryption key management DB 50; the purchaser information DB 51 (purchaser's processing unit information management DB); the seller information DB 52 (seller's processing unit information management DB); the financial institution information DB 53 (financial institution' processing unit information management DB); the seller information DB 54 (deliverer's processing unit information management DB); the transaction management DB 55; the final settlement site monitor DB 56; and the return-of-goods site monitor DB 57 as shown in FIG. 21.

Figure 22:
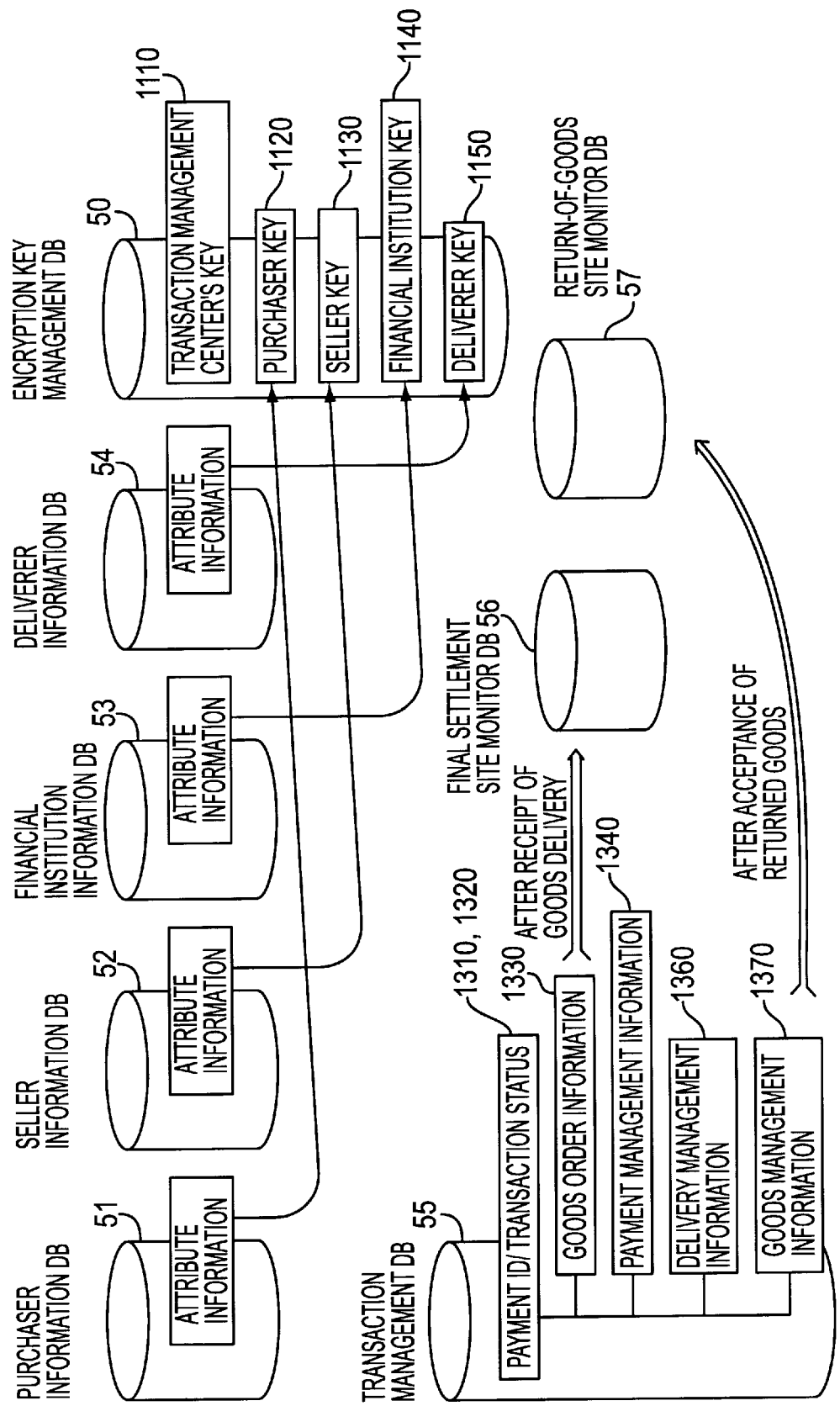
FIG. 22 shows the configuration of the databases of the transaction management device.

The configuration of the above described databases managed and controlled by the database control unit 1040 is shown in FIG. 22.

That is, the purchaser information DB 51, the seller information DB 52, the financial institution information DB 53, and the deliverer information DB 54 manages the necessary information such as an ID, a network address, the transmission/receipt protocol, etc. required in transmitting/receiving data to and from the units such as the purchaser's processing unit 1, the seller's processing unit 2, the processing unit at the financial institution 3 and 4, the deliverer's processing units 6 and 7.

The encryption key management DB 50 manages an encryption key and an encryption protocol specific to each unit used in transmitting and receiving data to and from each unit. Encryption keys 1110, 1120, 1130, 1140, and 1150 for each unit are referred to through the attribute information indicated by each unit information stored in the purchaser information DB 51, the seller information DB 52, the financial institution information DB 53, and the seller information DB 54.

Furthermore, the transaction management DB 55 stores the contents of each transaction, the proceedings of the transaction, and the authentication information based on which the transaction is processed. That is, it stores goods order information 1330, payment management information 1340, delivery management information 1360, and return-of-goods management information 1370 referred to through a payment ID 1310 and a transaction status 1320, as shown in FIG. 22.

Then, the final settlement site monitor DB 56 is a database for use in monitoring a final settlement admission request and a return-of-goods request after receipt of goods as described above. After receipt of the goods delivery certification, the goods order information 1330 is transferred to a final settlement site monitor DB 1400 for monitor.

The return-of-goods site monitor DB 57 is a database for use in monitoring a cancellation request when goods are returned as described above. After receiving returned goods, the goods management information 1370 is stored as returnof-goods management information for use in return-of-goods site monitoring.

In the above described information, the encryption key management DB 50, the transaction management DB 55, the final settlement site monitor DB 56, and the return-of-goods site monitor DB 57 are described below further in detail.

Figure 23:
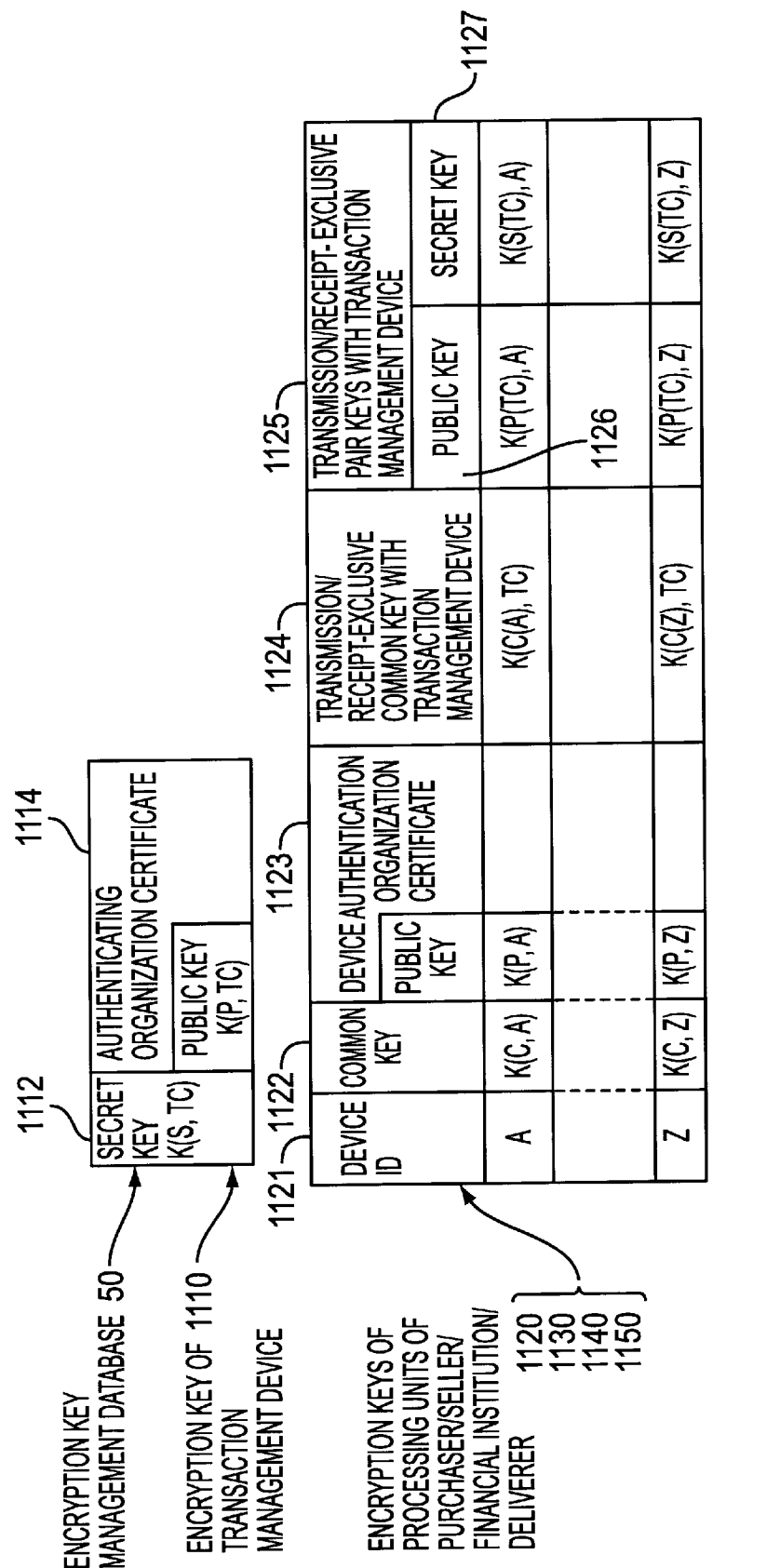
FIG. 23 shows the configuration of the encryption key management database.

FIG. 23 shows the configuration of the data stored in the encryption key management DB 50.

An encryption key 1110 of the transaction management device 5 includes an authenticating organization certificate 1114 of a transaction management device containing a secret key K (S, TC) 1112 of the transaction management device 5 and a public key K (P, TC).

A purchaser key 1120, a seller key 1130, a financial institution key 1140, and a deliverer key 1150 include a device ID 1121, a common key 1122 for each device ID, a device authenticating organization certificate 1123 for each device ID, a transmission/receipt-exclusive common key 1124 between the transaction management device and each device, and a transmission/receipt-exclusive pair keys 1125 between transaction management device and each device as shown in FIG. 23. The transmission/receipt-exclusive pair keys 1125 contains a public key 1126 and a secret key 1127.

The characteristics of the encryption and decryption using the above described encryption keys are described below by referring to FIG. 24.

First, the background of the encryption and decryption according to the present embodiment is described.

Generally, in a goods order, payment in electronic money, transmission of digital contents, transmission, transfer, etc. of electronic money through a final settlement, etc. in the electronic commerce, privacy cannot be protected or may be illegally used if an electronic message is transmitted or received as a plain text.

Various encryption methods such as a secret key/public key method in which different keys are used for encryption and decryption including the RSA (Rivest-Shamir-Adleman) method, the DSA (digital signature algorithm) method, etc., and a common key method in which the same key is used for encryption and decryption including the DES (data encryption standard) method, the FEAL (fast encryption algorithm) method, etc. have been developed. Using the above described methods, messages are transmitted after being encrypted so that the third parties cannot read them. The current encryption methods are classified into the following two types.

In the first type of encryption method, a transmitter requests to receive a public key which is an encryption key of a receiver, or obtains a public key after receiving the receiver's authentication certificate so that messages can be encrypted using the public key. The receiver uses his or her own secret key which forms a pair with the public key to decrypt the received messages.

In the second type of encryption method, a transmitter encrypts electronic messages using a common key which is an encryption key of the transmitter. The transmitter also encrypts the transmitter's common key using the receiver's public key separately obtained and transmits the encrypted key together with the encrypted messages so that the receiver can decrypt the encrypted messages. The receiver decrypts the encrypted key using his or her own secret key to obtain the transmitter's common key, and decrypts the encrypted messages using the obtained transmitter's common key. However, if the transmitter's common key is preliminarily transmitted to the receiver, only the messages are encrypted before transmission using the transmitter's common key.

However, in the above described conventional encrypt methods, when a transmitter encrypts a message using his or her common key, the transmitter has to publish it to another person (receiver). Therefore, the common key should be changed each time to avoid an illegal use or to protect privacy. If a message is encrypted using the receiver's public key, a complicated process of obtaining the receiver's public key should be performed. If the transmitter sends second and subsequent messages to the same receiver, the receiver's public key can be managed in the database so that the transmitter does not have to obtain again the receiver's public key. In this case, however, the management file becomes large, and no synchronization can be gained if the receiver's public key is changed, thereby generating the possibility that messages cannot be correctly transmitted to the receiver.

Figure 24:
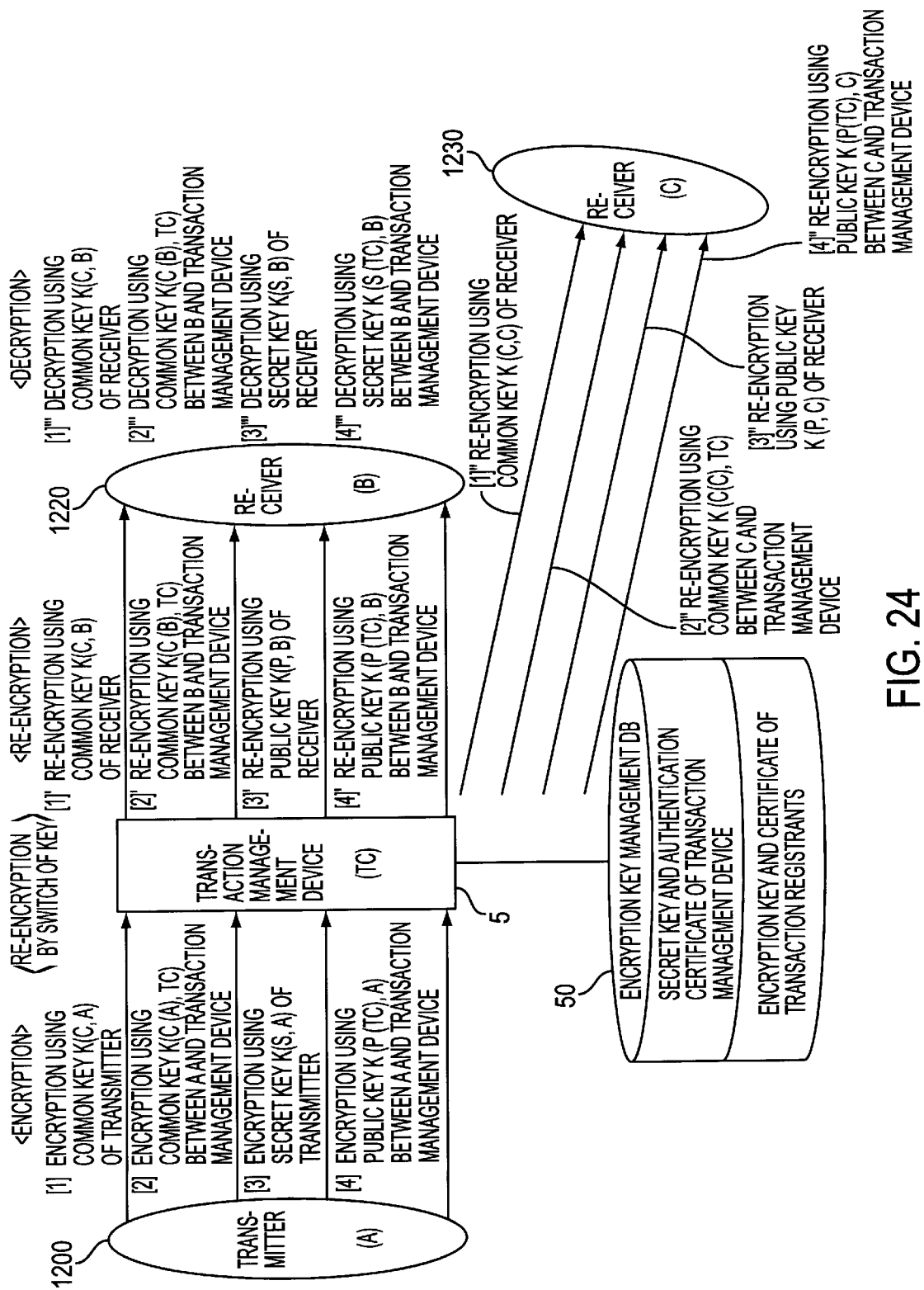
FIG. 24 shows the characteristics of the encryption/decryption system through the transaction management device.

A method of solving the above described problem is an encryption/decryption method through the transaction management device 5 according to the present invention as shown in FIG. 24.

In FIG. 24, the symbol representing an encryption key is, for example, K ($\alpha(\beta)$, $\gamma$). a indicates the type of encryption key, P indicates a public key, S indicates a secret key, and C indicates a common key. $\gamma$ indicates the owner of the encryption key of $\alpha$. $\beta$ indicates a user of the transaction management device 5 (TC) when the owner $\gamma$ is the transaction management device 5 (TC), and indicates the transaction management device 5 (TC) when the owner $\gamma$ is a user of the transaction management device 5 (TC). The user has the only and unique encryption key to be used in the communications with the transaction management device 5, and the key is not published to the third party. An encryption key with no entry of $\beta$ can be published if the owner $\gamma$ desires.

Assume that, in FIG. 24, a transmitter 1200 (A) simultaneously transmits the same electronic message to a plurality of receivers 1220 (B) and 1230 (C), or transmits different electronic messages to respective receivers 1220 (B) and 1230 (C). In these cases, the transmitter 1200 (A) encrypts an electronic message containing the receiver identification information (receiver's unit ID, personal information, etc.) using one of the three types of encryption keys entered in the transaction management device 5 (TC) ([1] transmitter's common key K (C, A), [2] unique common key K (C(A), TC) between a transmitter and the transaction management device 5 (TC), and [4] unique public key K (P(CT), A) between a transmitter and the transaction management device 5 (TC)) or [3] the transmitter's secret key K(S,A) for a digital signature. Then, the transmitter 1200 (A) transmits the encrypted electronic message to a transaction management device (TC) 5. At this time, the transmitter 1200 (A) need not consider the encryption keys of the receivers 1220 (B) and 1230 (C).

The transaction management device 5 (TC) refers to the encryption key management DB 50 according to the transmitter's identification information (transmitter's device ID, personal information, etc.) in the received electronic message, and decrypts the received information by retrieving one of the four types of decryption keys for the transmitter 1200 (A) ([1] transmitter's common key 1122 K (C, A), [2] unique common key 1124 K (C(A), TC) between a transmitter and the transaction management device 5 (TC), [3] transmitter's public key 1123 K(P,A), and [4] unique secret key 1127 K (S(TC), A) between a transmitter and the transaction management device (TC)).

Then, the transaction management device 5 (TC) refers to the encryption key management DB 50 according to the receiver's identification information in the decrypted electronic message, re-encrypts the electronic message received from the transmitter 1200 (A) using one of the four types of encryption keys for the receiver 1220 (B) or the receiver 1230 (C), and transmits the re-encrypted electronic message to the receiver 1220 (B) or the receiver 1230 (C). The four types of encryption keys are: a receiver's common key K (C, γ) ([1]' and [1]"); a unique common key K (C(β), TC) between a receiver and the transaction management device (TC) ([2]' and [2]"); a receiver's public key K(P,γ) ([3]' and [3]"); and a unique public key K (P(TC), γ) between the receiver and the transaction management device (TC). The γ and the β indicate B or C.

Upon receipt of information, the receiver 1220 (B) or 1230 (C) refers to the transmitter's identification information in the electronic message. If a mediator is the transaction management device 5 (TC), the encrypted message is decrypted using one of the three ([1]'" a receiver's common key K (C, γ); [2]'" a unique common key K (C(β), TC) between a receiver and the transaction management device 5 (TC); and [4]'" a unique secret key K (S(TC), γ) between the receiver and the transaction management device (TC)) among the four types of encryption keys entered in the transaction management device 5 (TC), or [3]'" a receiver's secret key K(S,γ).

Thus, when an encrypted electronic message is transmitted and received through the transaction management device 5 (TC), the transmitter transmits a message without considering the receiver's encryption key and without the possibility that a third party may read the message, whereas the receiver can safely receive the message without considering the transmitter's encryption key.

Each of the four types of encryption keys/decryption keys shown in FIG. 24 is not only independently used, but also used in an appropriate combination with other encryption keys/decryption keys. For example, a transmitter (A or TC) can encrypt an electronic message using a transmitter's common key K(C, A) or K(C,TC), and transmit the encrypted message together with a common key encrypted using the unique public key K(P(TC), γ) (where γ is A or B, C) between the transmitter and the receiver (TC or B, C). In this case, the receiver decrypts the encrypted common key using a secret key, and decrypts the electronic message using the decrypted common key.

To furthermore improve the security of the electronic message, the transmitter 1200 (A) can also execute a digital signature as a part of the authentication of a message using the transmitter's secret key K(S,A), assign a blind signature using the transmitter's common key K(C,A), and encrypt the entire message using the only and unique encryption key K(C(A), TC) or K(P(TC), A) between the transmitter and the transaction management device (TC). Thus, the authentication can be correctly performed and an illegal use or write can be avoided. However, when the transaction management device 5 (TC) re-encrypts the message and sends it to the receiver, the transaction management device 5 (TC) does not decrypt the blind signature, but transmits it as 'blind'.

Figure 25:
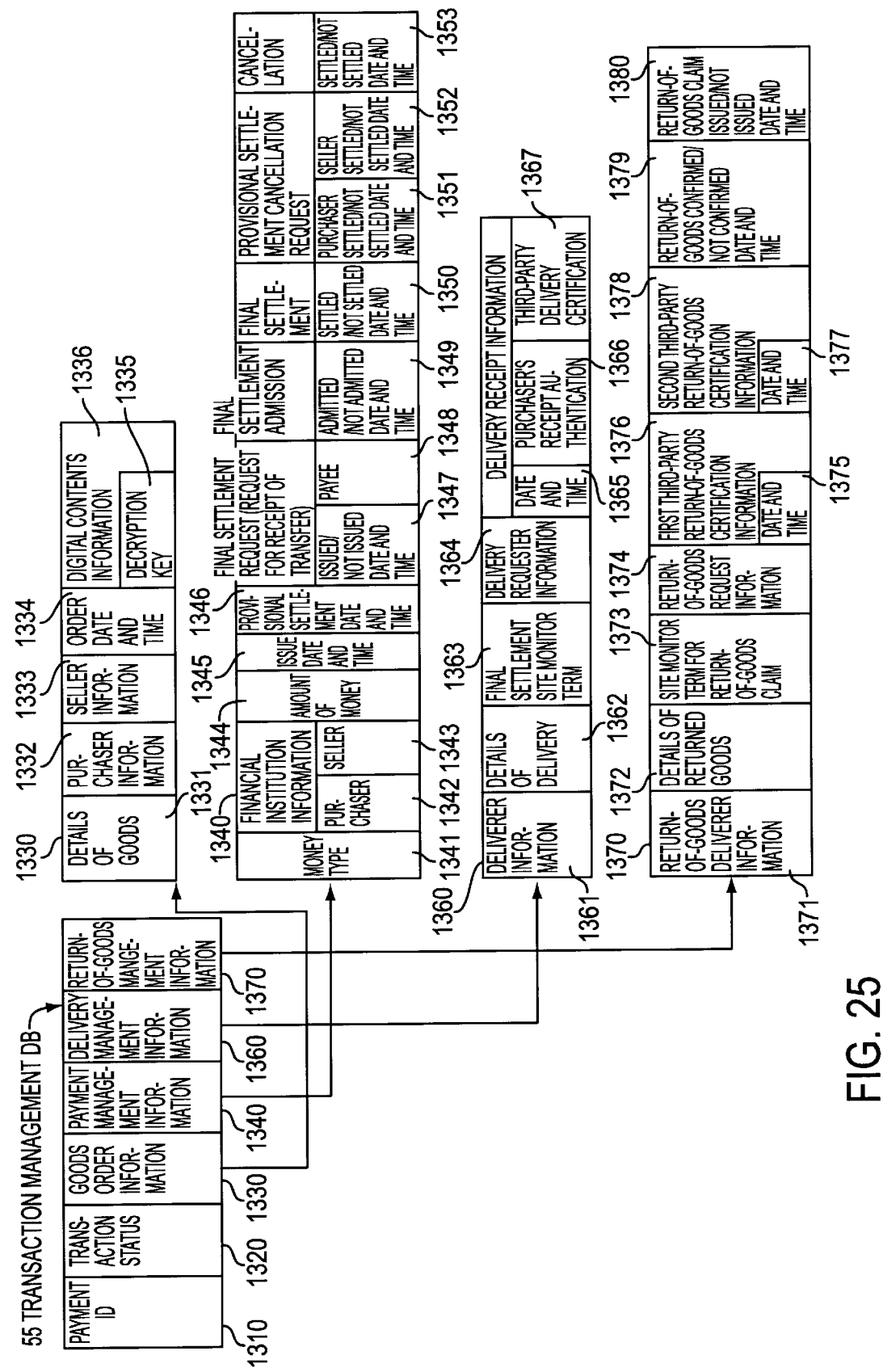
FIG. 25 shows the configuration of the transaction management database.

The configuration of the transaction management DB 55 is described below in detail by referring to FIG. 25. As shown in FIG. 25, the transaction management DB 55 stores the payment ID 1310, the transaction status 1320, the goods order information 1330, the payment management information 1340, the delivery management information 1360, and the return-of-goods management information 1370.

The payment ID 1310 indicates the key of the entire records. The payment ID is determined when an order of goods is placed between the purchaser and the seller, and referred to when information is transmitted in all steps including the subsequent delivery and settlement for goods.

The transaction status 1320 indicates the proceeding step of a transaction, and is required to check whether or not the transaction proceeds with correct steps. The transaction status is described later by referring to FIG. 26.

The goods order information 1330 contains details of ordered goods 1331, purchaser information 1332, seller information 1333, an order date and time 1334, and digital contents information 1336 as shown in FIG. 25. The purchaser information 1332 and the seller information 1333 contain their own authentication information. Furthermore, a decryption key 1335 required in the sales of digital contents is stored when it is provided from the seller. Then, it is managed by the transaction management device 5.

The payment management information 1340 contains the money information about provisional settlement money, etc. that is, a money type 1341, purchaser's financial institution information 1342 (issuing financial institution information), seller's financial institution information 1343, an amount of money 1344, an issue date and time 1345, and a provisional settlement date and time 1346. It further contains the information about the proceedings from the provisional settlement to the final settlement, that is, the discrimination as to whether or not the final settlement request has been issued, which is set at the final settlement request from the seller, and the issue date and time 1347, a payee 1348 of final settlement, the discrimination as to whether or not the purchaser has admitted the final settlement, and the admission date and time 1349, the discrimination as to whether or not the final settlement has been completed, and the completion date and time 1350. The payment management information 1340 further contains the information about the proceedings of a provisional settlement cancellation request through return of goods, that is, the discrimination as to whether or not the purchaser has issued a provisional settlement cancellation request and whether or not it has been processed, and the issue date and time 1351, the discrimination as to whether or not the seller has issued a provisional settlement cancellation request and whether or not it has been processed, and the issue date and time 1352, and the discrimination as to whether or not the provisional settlement has been canceled, and the cancellation date and time 1353.

The delivery management information 1360 is stored and managed when the deliverer's processing units 6 and 7 mediate. It contains deliverer information 1361 and details of delivery 1362 which are necessary for delivery, a final settlement site monitor term 1363 in which a final settlement admission request and a return-of-goods request are monitored after receipt of goods, delivery requester information 1364 including the authentication of a delivery requester, delivered goods receipt information (receipt date and time 1365, receipt authentication 1366, and third-party delivery certification 1367) including third-party delivery certification 1367 issued by the deliverer's processing units 6 and 7 upon receipt of delivered goods. As described above, the third-party delivery certification 1367 is used when the transaction management device 5 (TC) issues, on behalf of the purchaser, a final settlement admission request if no final settlement admission request or return-of-goods request is issued from the purchaser or the goods receiver within a predetermined period after receipt of the goods.

The return-of-goods management information 1370 basically stores information similar to the delivery management information 1360. In this case, important data are a site monitor term 1373 for a return-of-goods claim in monitoring a return-of-goods confirmation/claim after receipt of returned goods, first third-party return-of-goods certification 1375 and 1376 issued by a deliverer when a goods receiver issues a return-of-goods request, second third-party return-of-goods certification 1377 and 1378 issued by a deliverer when the seller receives returned goods, the discrimination as to whether or not a return-of-goods confirmation has been issued after the seller receives returned goods, and the issue date and time 1379, and the discrimination as to whether or not the return-of-goods claim has been issued, and the issue date and time 1380. The first third-party return-of-goods certification 1375 and 1376, and the second third-party return-of-goods certification 1377 and 1378 are used when a cancellation request is issued on behalf of the seller if no return-of-goods confirmation or return-of-goods claim is issued from the seller within a predetermined period after receipt of returned goods.

The transaction status 1320 is described below by referring to FIG. 26.

As shown in FIG. 26, the transaction status 1320 stores the proceedings of each of the processes A. order through delivery of goods (A-1 to A-6), B. settlement for a normal transaction (B-1, B-2), and C. cancellation at return-of-goods (C-1 to C-6). It includes process generation date and time 1321 and 1326, a result (OK/NG) 1322 and 1327, and authentication information 1323 and 1328 which is used as evidence. The transaction status 1320 is managed after being divided into a physical goods transaction and a digital contents transaction.

As for the transaction status 1320, the status changes in this order. Therefore, the transaction management device 5 checks the consistency between the transaction status 1320 and the transmitted data when the transaction management device 5 receives the transaction data from each device in order to avoid a passing-over or an accident due to an illegal operation or mistake, thereby performing successful control during the processes.

The configurations of the final settlement site monitor DB 56 and the return-of-goods site monitor DB 57 are described below by referring to FIGS. 27A and 27B.

Figure 27A:
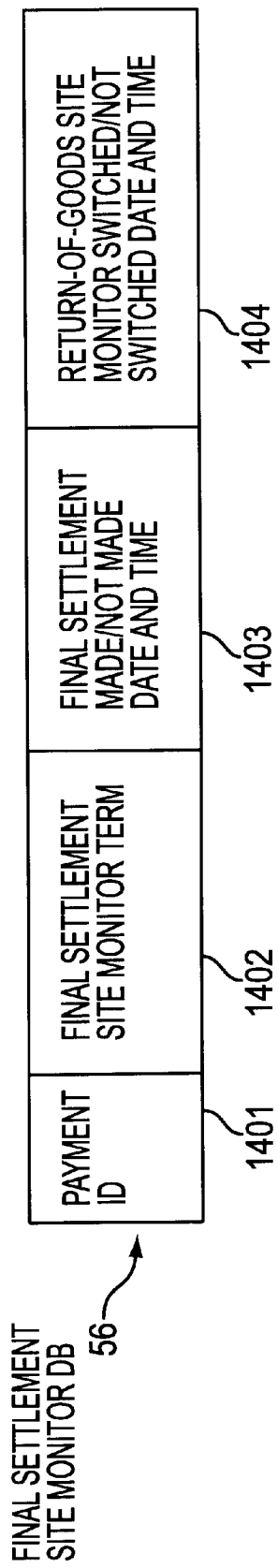
FIG. 27A shows the configuration of the final settlement site monitor database.

The final settlement site monitor DB 56 shown in FIG. 27A is generated upon receipt of goods as described above, and stores a payment ID 1401, a final settlement site monitor term 1402, a discrimination as to whether or not a final settlement has been made, and the final settlement date and time 1403, and a discrimination as to whether or not there is a switch to a return-of-goods site monitor set when the return-of-goods occurs, and the switch date and time 1404.

Figure 27B:
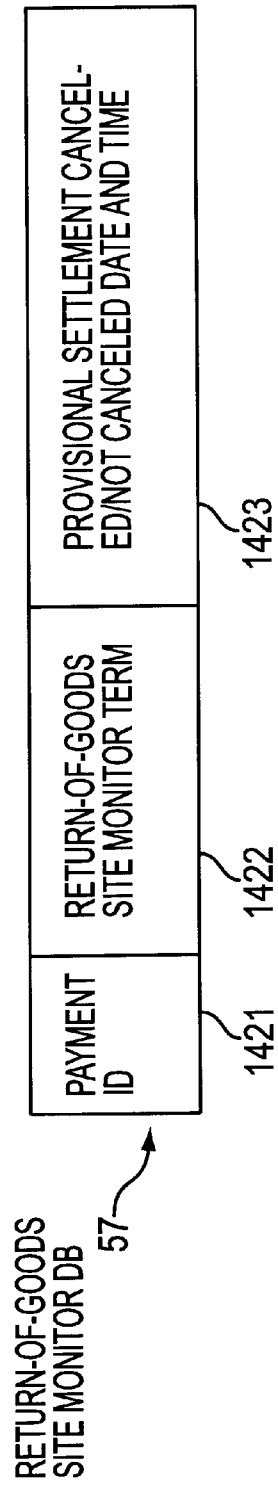
FIG. 27B shows the configuration of the return-of-goods site monitor database.

The return-of-goods site monitor DB 57 shown in FIG. 27B is generated when a return-of-goods request is issued as described above, and stores a payment ID 1421, a return-of-goods site monitor term 1422, and a discrimination as to whether or not a provisional settlement cancellation is issued, and the cancellation date and time 1423.

A transaction management process unit 1500 shown in FIG. 21 is described below in detail.

As shown in FIG. 21, the transaction management process unit 1500 comprises an encryption/decryption process 1520, a goods order process 1600, a money issue process 1700, a money payment process 1740, a goods delivery acceptance process 1800, a goods delivery receipt process 1820, a final settlement request process 1900, a final settlement admission process 1960, a digital contents key acceptance process 2000, a digital contents receipt confirmation/cancellation process 2100, a returned goods delivery acceptance process 2200, a returned goods delivery receipt process 2220, a provisional settlement cancellation acceptance process 2300, a returned goods confirmation/claim acceptance process 2340, a final settlement site monitor process 2400, and a return-of-goods site monitor process 2500.

In the data transmission/receipt, the encryption/decryption process 1520 decrypts data encrypted by a transmitter when it receives the data, and transmits the data after encrypting it using an encryption key exclusively used for a receiver. This process is a common process used in the other 15 processes.

Each process from order to deliver of goods is performed in the processes from the goods order process 1600 to the goods delivery receipt process 1820. The final settlement request process 1900 and the final settlement admission process 1960 are processes for a normal settlement.

On the other hand, the digital contents key acceptance process 2000 and the digital contents receipt confirmation/cancellation process 2100 are provided for a process specific to the sales of digital contents. The processes from the returned goods delivery acceptance process 2200 to the returned goods confirmation/claim acceptance process 2340 are the processes from acceptance of return-of-goods to cancellation of settlement.

The final settlement site monitor process 2400 is, as described above, a process of monitoring a period from the delivery of goods to the final settlement or the return of goods. The return-of-goods site monitor process 2500 monitors a period from the occurrence of return-of-goods to the cancellation of provisional settlement.

Each of the following processes is described below by referring to the flow of the processes shown in and after FIG. 28.

Figure 28:
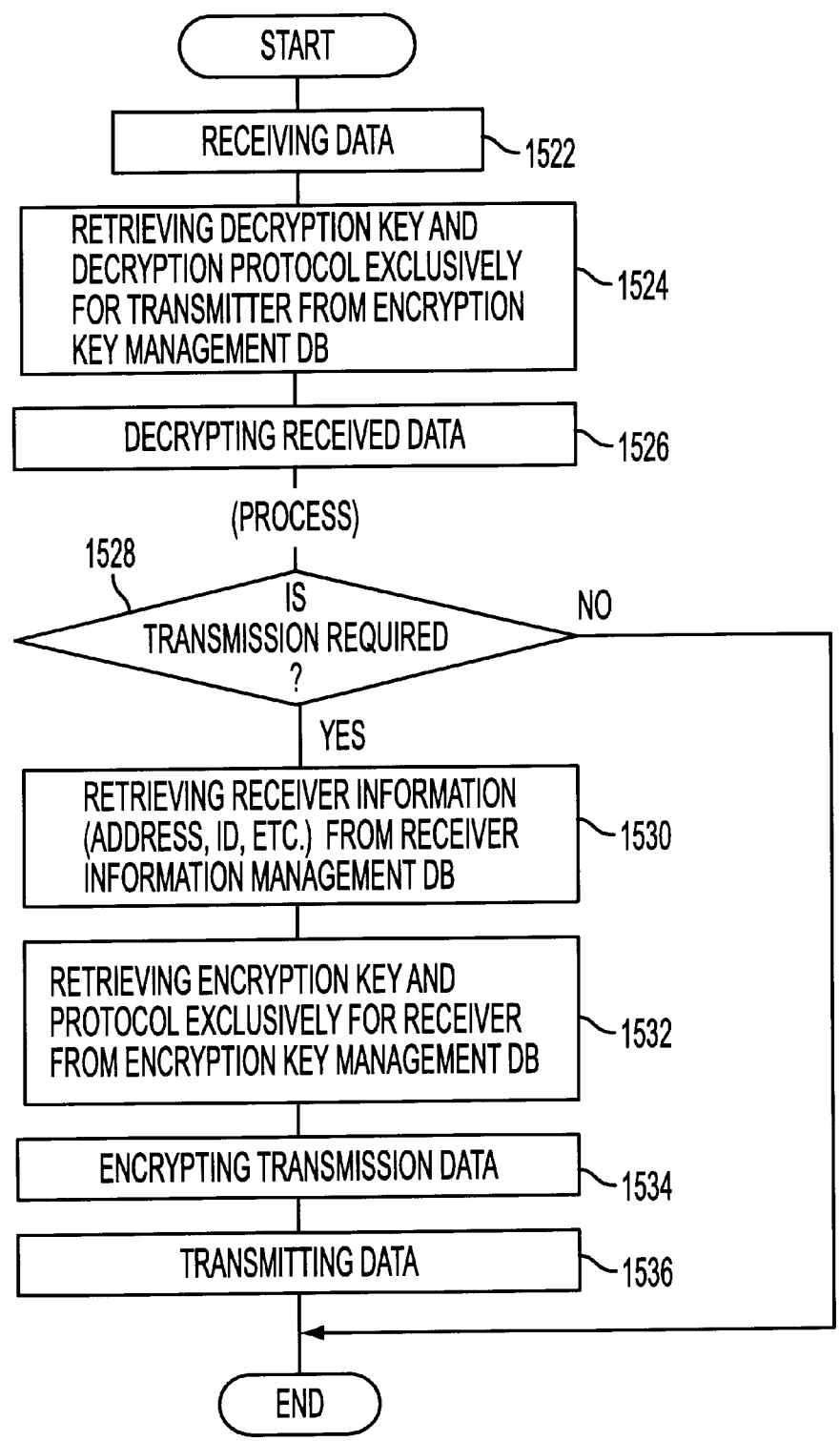
FIG. 28 is a flowchart showing the procedure of the encryption/decryption process.

First, the encryption/decryption process 1520 is described by referring to FIG. 28.

The encryption/decryption process 1520 functions in the data transmission/receipt to and from each device. If it receives data in step 1522, the transmitter-exclusive decryption key 1120 is retrieved from the encryption key management DB 50 in the transaction management device 5 as described above in step 1524. In step 1526, the data encrypted using the transmitter-exclusive encryption key is decrypted using the retrieved key.

When data is transmitted after a predetermined process is performed, it is determined in step 1528 whether or not the data should be transmitted. In step 1530, receiver information is extracted from a receiver information management DB such as the seller information DB 52, and the transmitter-exclusive encryption key 1120 is retrieved from the encryption key management DB 50 in step 1532. In step 1534, the transmission data is encrypted using the encryption key 1120. In step 1536, the encrypted data is transmitted according to the receiver information.

When a transaction is mediated between two devices, the transmitter's encrypted electronic message is decrypted in the above described procedure, and then re-encrypted using the receiver's encryption key for transmission as shown in FIG. 24.

In the process flow in the transaction management process unit 1500, all transmission and receipt processes are performed as the process shown in FIG. 28 in principle.

Then, if a final settlement admission request or a return-of-goods request is monitored after receipt of goods by a goods receiver, and no such requests have been detected within a predetermined period, then the third-party delivery certification information is transmitted as authentication information, and a final settlement admission request is issued by a substitute such as the goods delivery receipt process 1820, the digital contents receipt confirmation/ cancellation process 2100, the final settlement admission process 1960, the final settlement request process 1900, and the final settlement site monitor process 2400.

These processes are performed based on the third-party delivery certification 1367 contained in the delivery management information 1360 in the final settlement site monitor DB 56 and the transaction management DB 55. The third-party delivery certification 1367 in the final settlement site monitor DB 56 and the transaction management DB 55 is set in the goods delivery receipt process 1820 for common goods, and in the digital contents receipt confirmation/cancellation process 2100 for digital contents.

Figure 33:
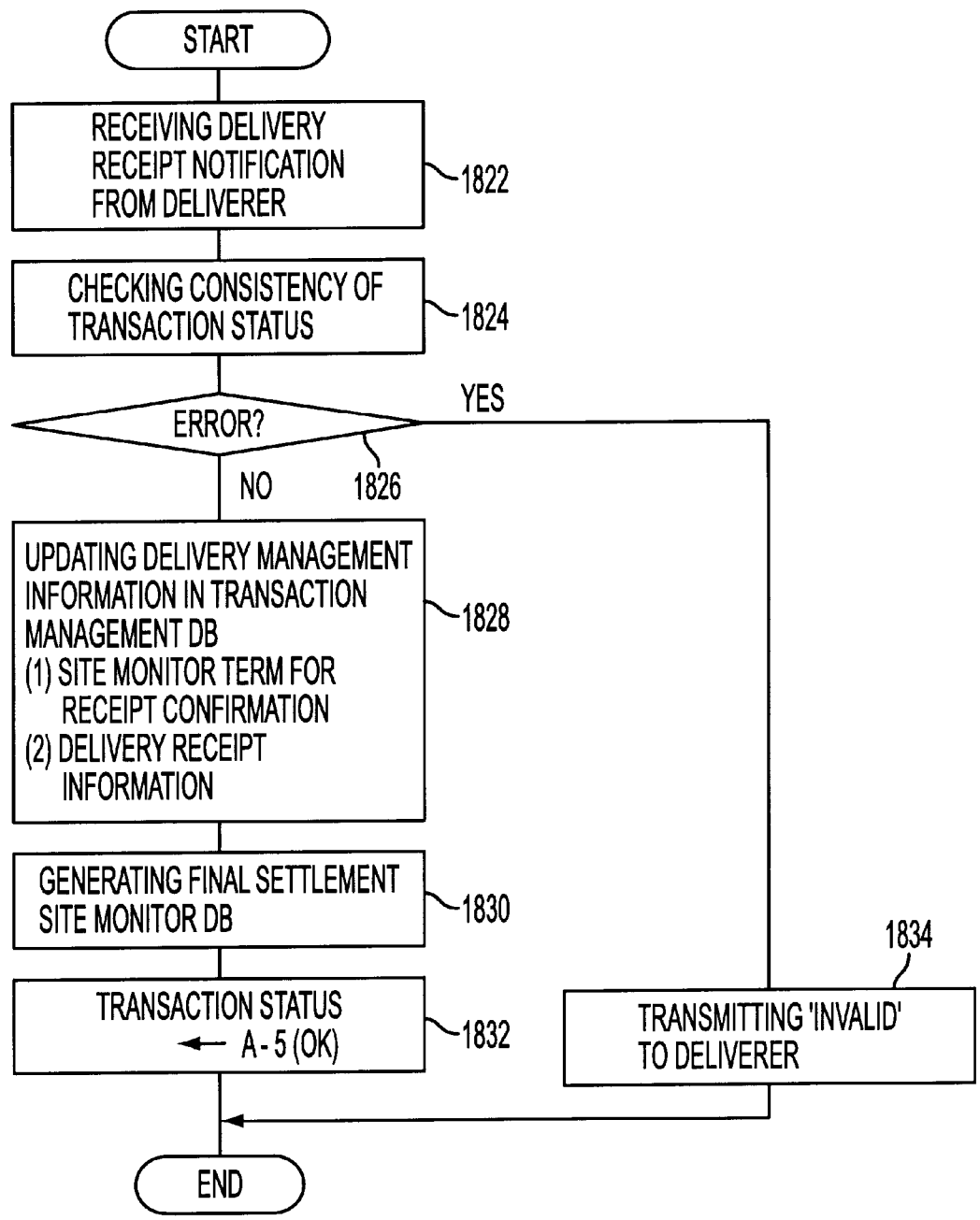
FIG. 33 is a flowchart showing the procedure of the goods delivery receipt entry process.

The process flow in the goods delivery receipt process 1820 is shown in FIG. 33. In the goods delivery receipt process 1820, the deliverer's processing unit 6 or 7 informs that delivered goods are received by a goods receiver (a purchaser or a receiver specified by the purchaser or a substitute) when common goods are delivered, and the information is entered. As shown in FIG. 33, if there is no problem found in a transaction status consistency check (step 1824), then the final settlement site monitor term 1363 and the delivery receipt information 1365/1366/1367 (the third-party delivery certification by the deliverer's processing units 6 and 7) in the delivery management information 1360 in the transaction management DB 55 are set (step 1828), the final settlement site monitor DB 56 is generated (step 1830), and stored in the transaction status (step 1832). Using the DB 56, it is monitored whether or not a final settlement request or a return-of-goods request has been issued.

Figure 37:
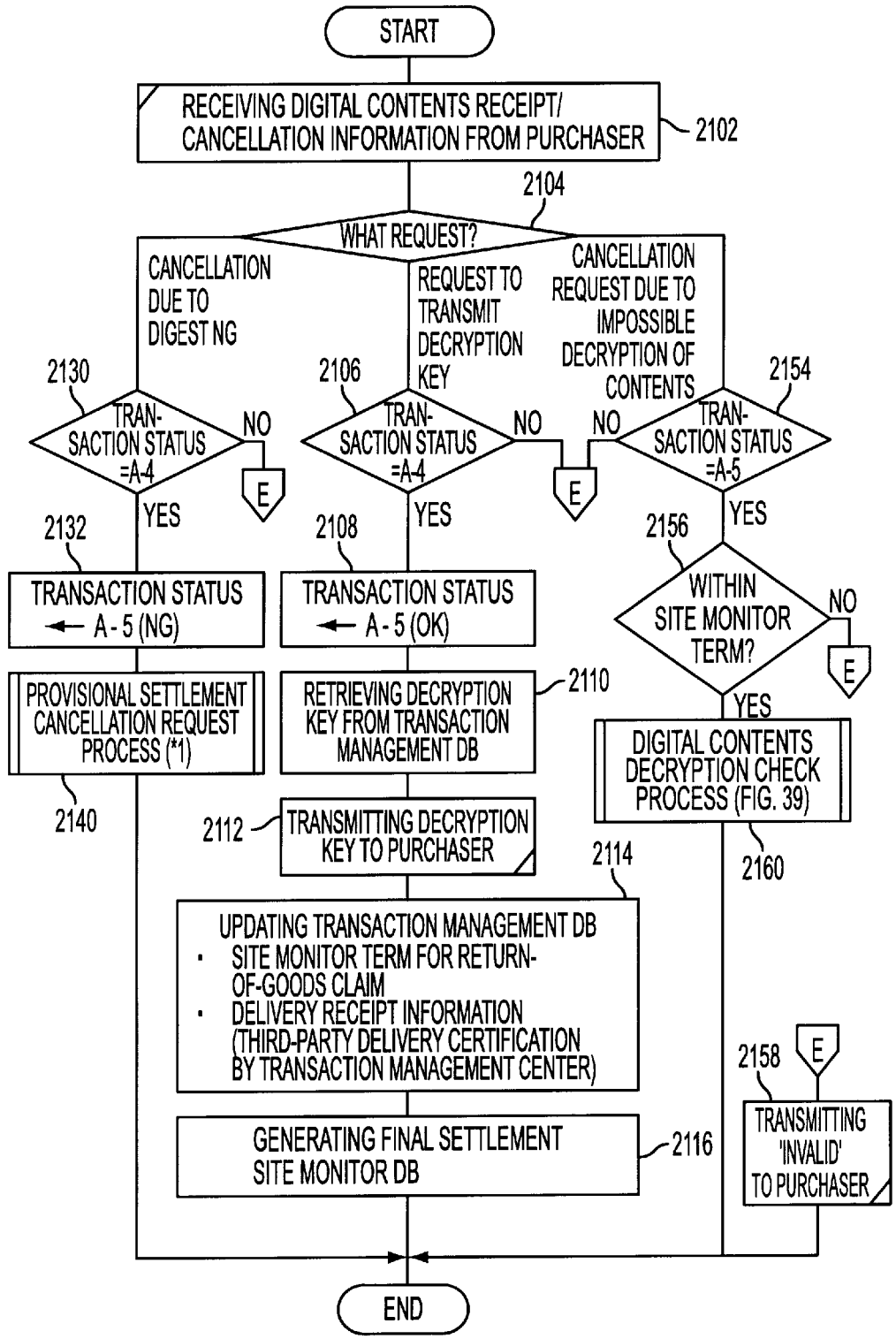
FIG. 37 is a flowchart showing the procedure of the digital contents receipt confirmation/cancellation process.

In processing digital contents as shown in FIG. 37, the final settlement site monitor term 1363 and the delivery receipt information 1365/1366/1367 (the third-party delivery certification by the transaction management device 5) in the delivery management information 1360 in the transaction management DB 55 can be set when a decryption key is transmitted to the purchaser's processing unit 1 in step 2112 in the digital contents receipt confirmation/cancellation process 2100 (the entire flow is described later), and a similar monitor can be realized by generating the final settlement site monitor DB 56.

Then, a final settlement admission request from a goods receiver is processed in the final settlement admission process 1960.

Figure 35:
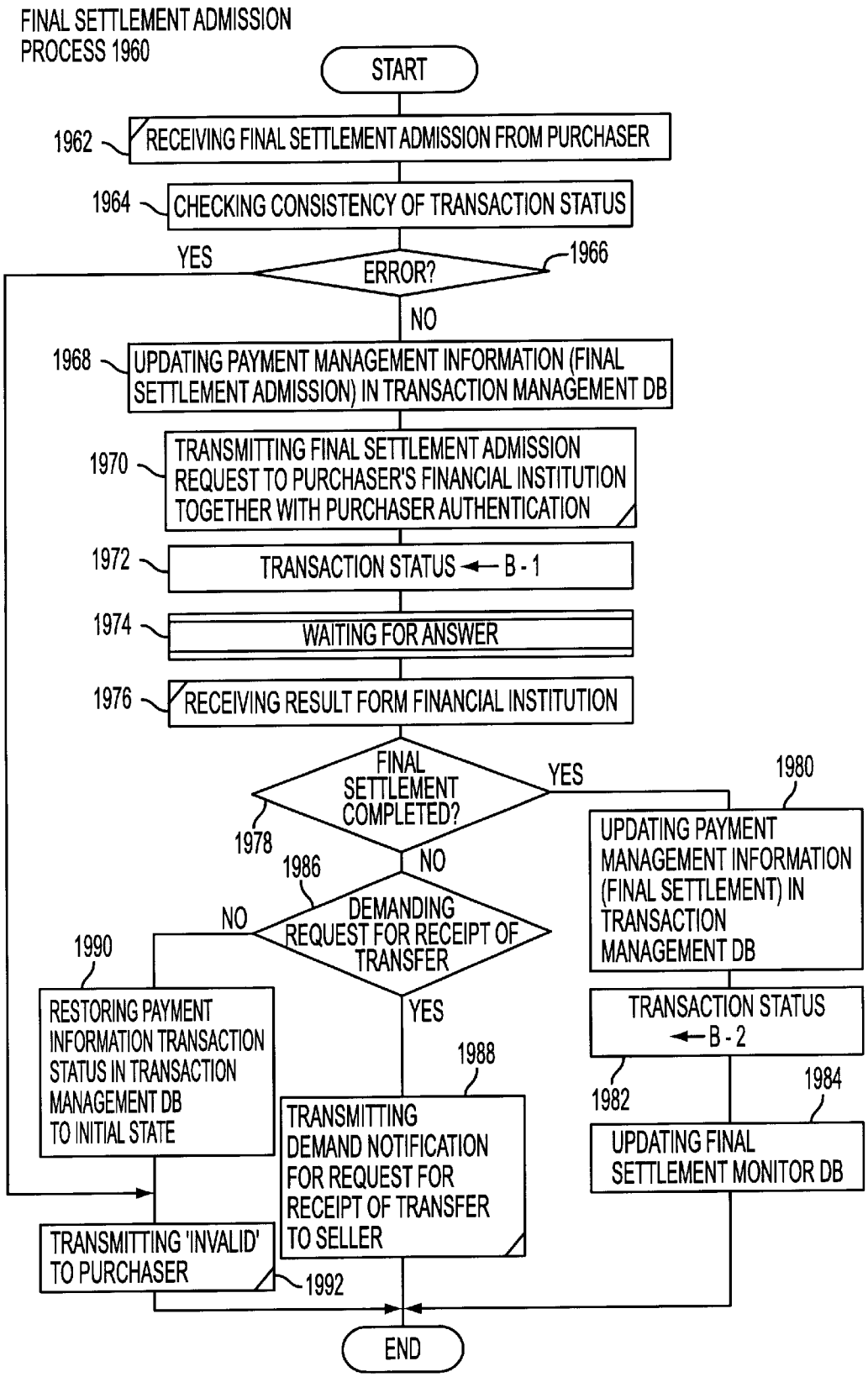
FIG. 35 is a flowchart showing the procedure of the final settlement admission request process.

As shown in FIG. 35, in the final settlement admission process 1960, the data of the final settlement admission 1349 of the payment management information 1340 in the transaction management DB 55 is set as 'admitted" in step 1968. Then, in step 1970, a final settlement admission request is transmitted together with the authentication of the receiver to the purchaser's financial institution, and the final settlement process is performed in the purchaser's financial institution. At this time, if the final settlement request (request for receipt of transfer which is described in detail later) has been issued, the final settlement process terminates. Therefore, in and after step 1980, the data of the final settlement 1350 in the payment management information 1340 in the transaction management DB 55 is updated into 'completed', and the transaction status 1320 is updated into 'B-2 (final settlement)'. Furthermore, the data of the final settlement 1403 of the final settlement site monitor DB 56 is set to 'completed', and the date and time are also set. If the seller has not issued a final settlement request (request for receipt of transfer), the purchaser's financial institution returns a demand for a request for receipt of transfer which is necessary to perform the final settlement process. Therefore, a notification of a demand for a request for receipt of transfer is transmitted to the seller (step 1988).

The final settlement request process 1900 is described below by referring to FIG. 34.

After the seller has delivered goods, the final settlement request process 1900 functions as an intermediate in the process of issuing a request to the purchaser's financial institution the final settlement (transfer) of the provisional settlement money received from the purchaser. The final settlement request process 1900 is processed in the processing unit of the purchaser's financial institution 3 when both the seller's final settlement request and the purchaser's final settlement admission request have been issued according to the present embodiment.

Figure 34:
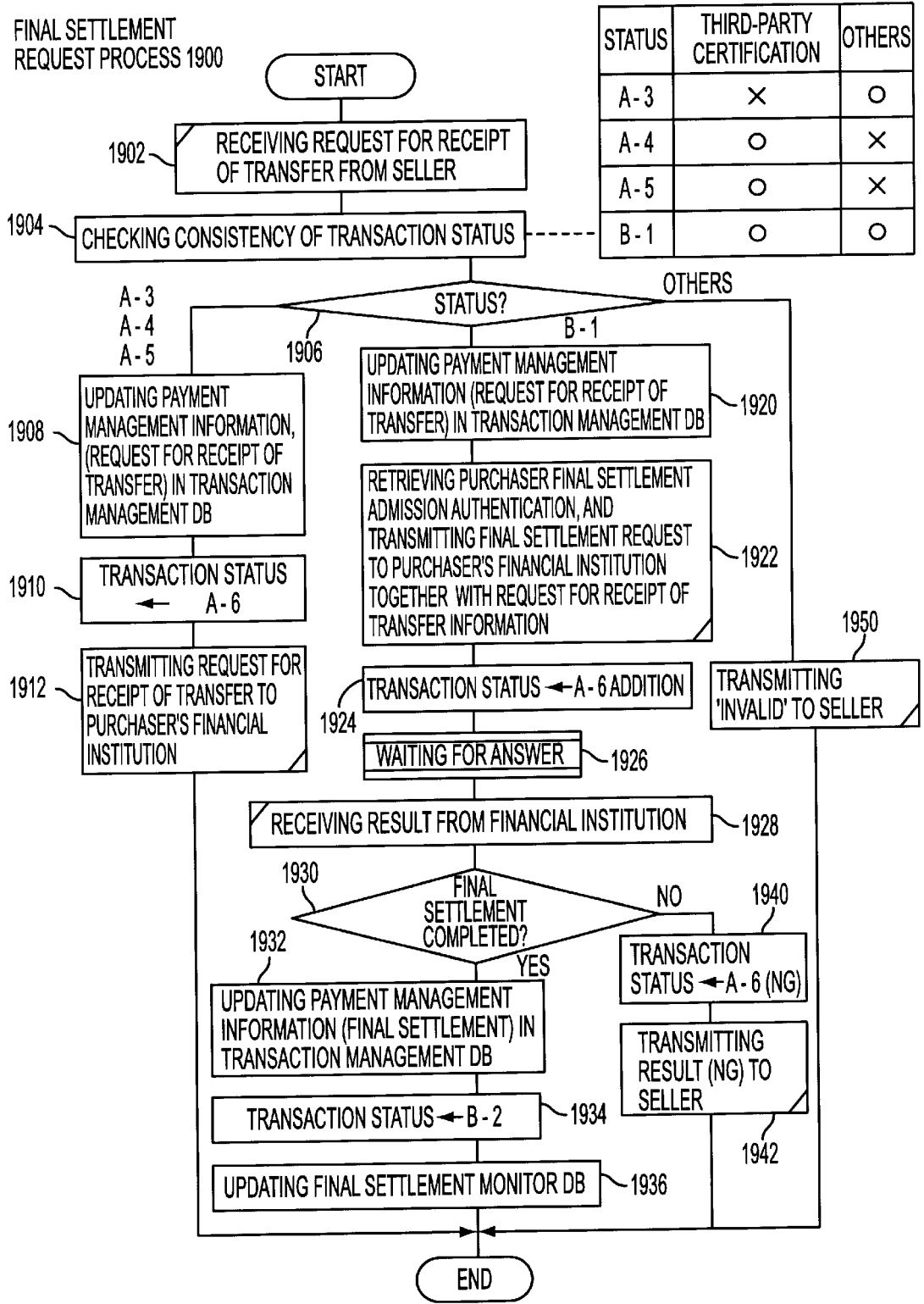
FIG. 34 is a flowchart showing the procedure of the final settlement request process.

In the process shown in FIG. 34, when a request for receipt of transfer is received from the seller in step 1902, a consistency check is made between a request for receipt of transfer and a transaction status in step 1904. To pass the consistency check, the transaction status 1320 of the transaction management DB 55 should be one of 'A-4 (accepting delivery)', 'A-5 (receiving delivery)', and 'B-1 (final settlement admission)' when the third-party witness such as a transaction management center in the sales of digital contents, a goods deliverer, etc. exists. When no third-party witness exists, the transaction status 1320 should be one of 'A-3 (provisional settlement)' and 'B-1 (final settlement admission)'

Since no final settlement admission request has been issued in 'A-3 (provisional settlement)', 'A-4 (accepting delivery)', and 'A-5 (receiving delivery), only the request for receipt of transfer is accepted (steps 1908 through 1912). On the other hand, since the final settlement admission request has been entered in 'B-1 (final settlement admission)', the final settlement process request is transmitted to the purchaser's financial institution, and the final settlement process is performed (steps 1920 through 1936).

A return-of-goods request for general goods is accepted in the returned goods delivery acceptance process 2200 for accepting and entering the delivery of return-of-goods from the deliverer's processing unit 7 as described later. At this time, the discrimination as to whether or not the final settlement site monitor is switched to a return-of-goods site monitor, and the date and time 1404 are set in the final settlement site monitor DB 56, and the return-of-goods site monitor DB 57 is generated. Afterwards, the monitor is performed in the return-of-goods site monitor process 2500.

Figure 38:
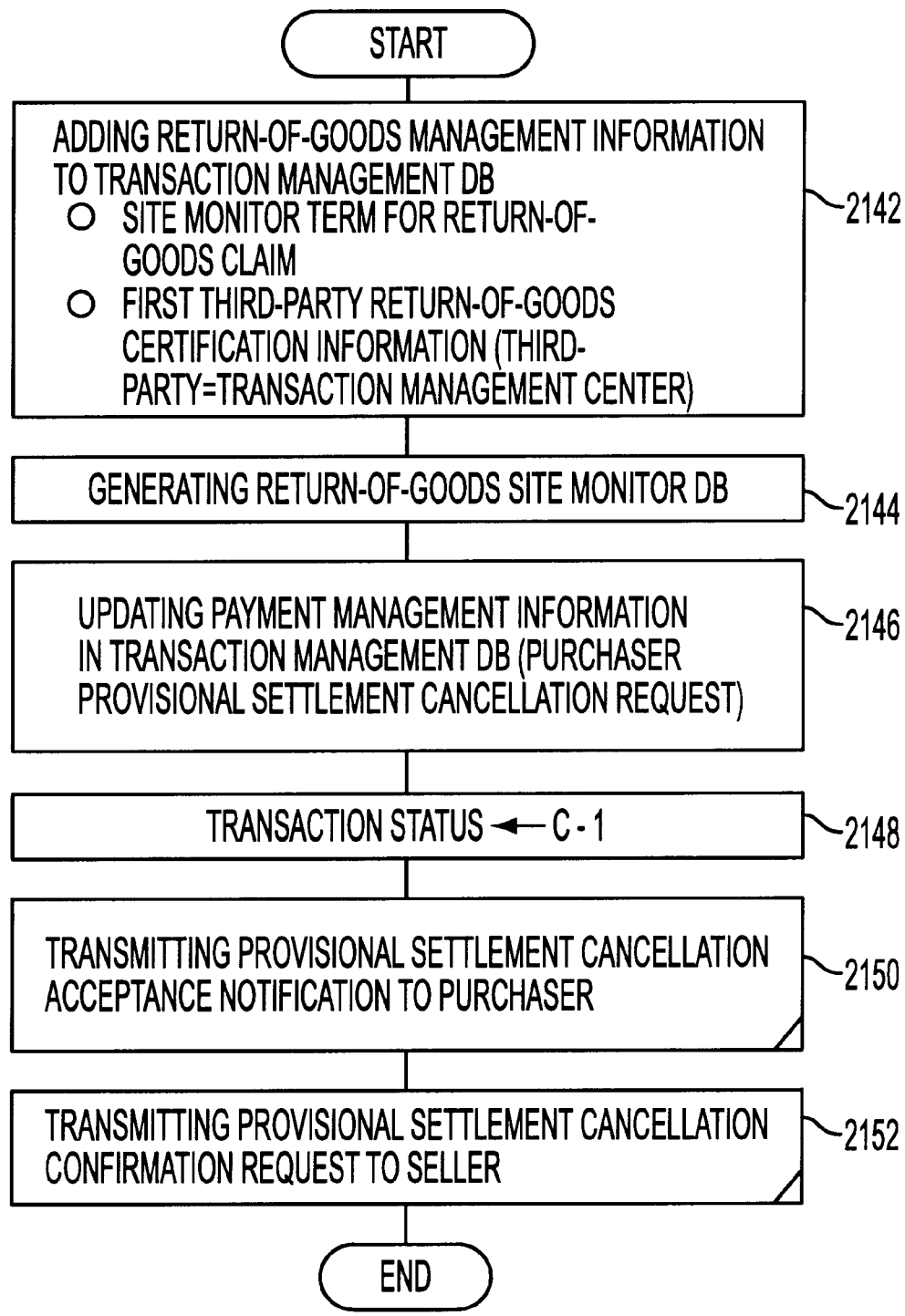
FIG. 38 is a flowchart showing the procedure of the provisional settlement cancellation request process.

The return of goods for digital contents is accepted in the digital contents receipt confirmation/cancellation process 2100. In the process 2100, a reply is received from the purchaser who receives digital contents (step 2102), and the contents of the request is determined (step 2104) as shown in FIG. 37. If the purchaser tries the digest of the contents and is not satisfied with them, a purchase cancellation request is issued and based on it the provisional settlement cancellation request process is performed in step 2140. In this process, as shown in FIG. 38, the discrimination as to whether or not a switch to a return-of-goods site monitor is performed, and the date and time are set in the final settlement site monitor DB 56, and the return-of-goods site monitor DB 57 is generated in step 2144. Afterwards, the monitor is performed in the return-of-goods site monitor process 2500. At this time, a cancellation request notification is transmitted to the seller (step 2152) to demand for a cancellation process through confirmation of return-of-goods by the seller.

Figure 44:
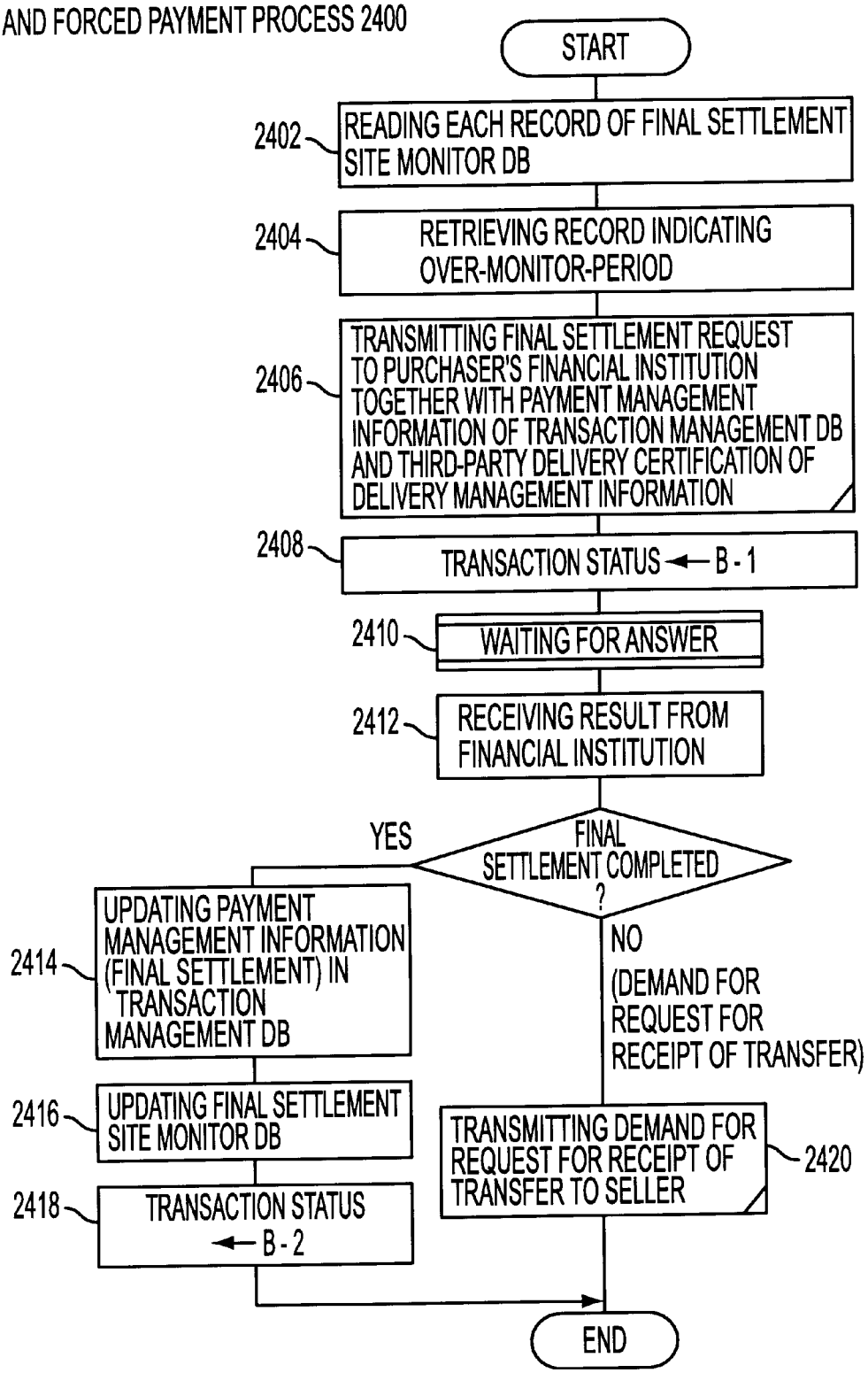
FIG. 44 is a flowchart showing the procedure of the final settlement site monitor process and the forced payment process.

The process of monitoring a final settlement admission request or a return-of-goods request is performed by the final settlement site monitor process 2400. As shown in FIG. 44, each record of the final settlement site monitor DB 56 is periodically read in steps 2402 and 2404. From the records, a record is extracted in which both the final settlement 1403 set as 'settled' and the settlement date and time, and the switch to the return-of-goods site monitor set as 'yes' and the switch date and time are not set, additionally, the final settlement admission 1349 of the corresponding payment management information 1340 in the transaction management DB 55 is not set, and the term set in the final settlement site monitor term 1402 expires. Since this record indicates a transaction for which a final settlement admission request or a return-of-goods request has not been issued within a predetermined term after receipt of goods, a final settlement admission request containing the purchaser information 1332, the purchaser's financial institution information 1342, and the amount of money 1344 of the transaction management DB 55 is transmitted together with the third-party delivery certification 1367 of the delivery management information 1360 to the purchaser's financial institution on behalf of the receiver in step 2406. Then, the financial institution performs the final settlement process. The transaction status 1320 is changed into 'B-1 (final settlement admission)'. If the seller has not issued a final settlement request (request for receipt of transfer) at this time point, the purchaser's financial institution returns a demand for a receipt of transfer to the seller because it is necessary in the final settlement process. Therefore, a request for the demand for receipt of transfer is transmitted to the seller (step 2420).

Then, it is monitored whether or not the seller issues a return-of-goods cancellation request. If a cancellation request is not issued within a predetermined period, a cancellation request containing the third-party return-of-goods certification information is issued by the transaction management device 5 as a substitute. This process is normally performed by the return-of-goods site monitor process 2500 as explained below.

The process of issuing a cancellation request as a substitute is performed based on the return-of-goods site monitor DB 57 and the first third-party return-of-goods certification 1375 and 1376 and the second third-party return-of-goods certification 1377 and 1378 stored in the return-of-goods management information 1370 in the transaction management DB 55. As described later, the return-of-goods site monitor DB 57 and the first third-party return-of-goods certification 1375 and 1376 and the second third-party return-of-goods certification 1377 and 1378 in the transaction management DB 55 are set by the returned goods delivery acceptance process 2200 and the returned goods delivery receipt process 2220 for physical goods, and set by the digital contents receipt confirmation/cancellation process 2100 for digital contents. However, only the first third-party return-of-goods certification is used for digital contents.

In any case, the return-of-goods site monitor term 1422 is set in the return-of-goods site monitor DB 57. Using the return-of-goods site monitor DB 57, it is monitored whether or not a cancellation request is issued through a return-of-goods admission from the seller within a predetermined period.

Figure 45:
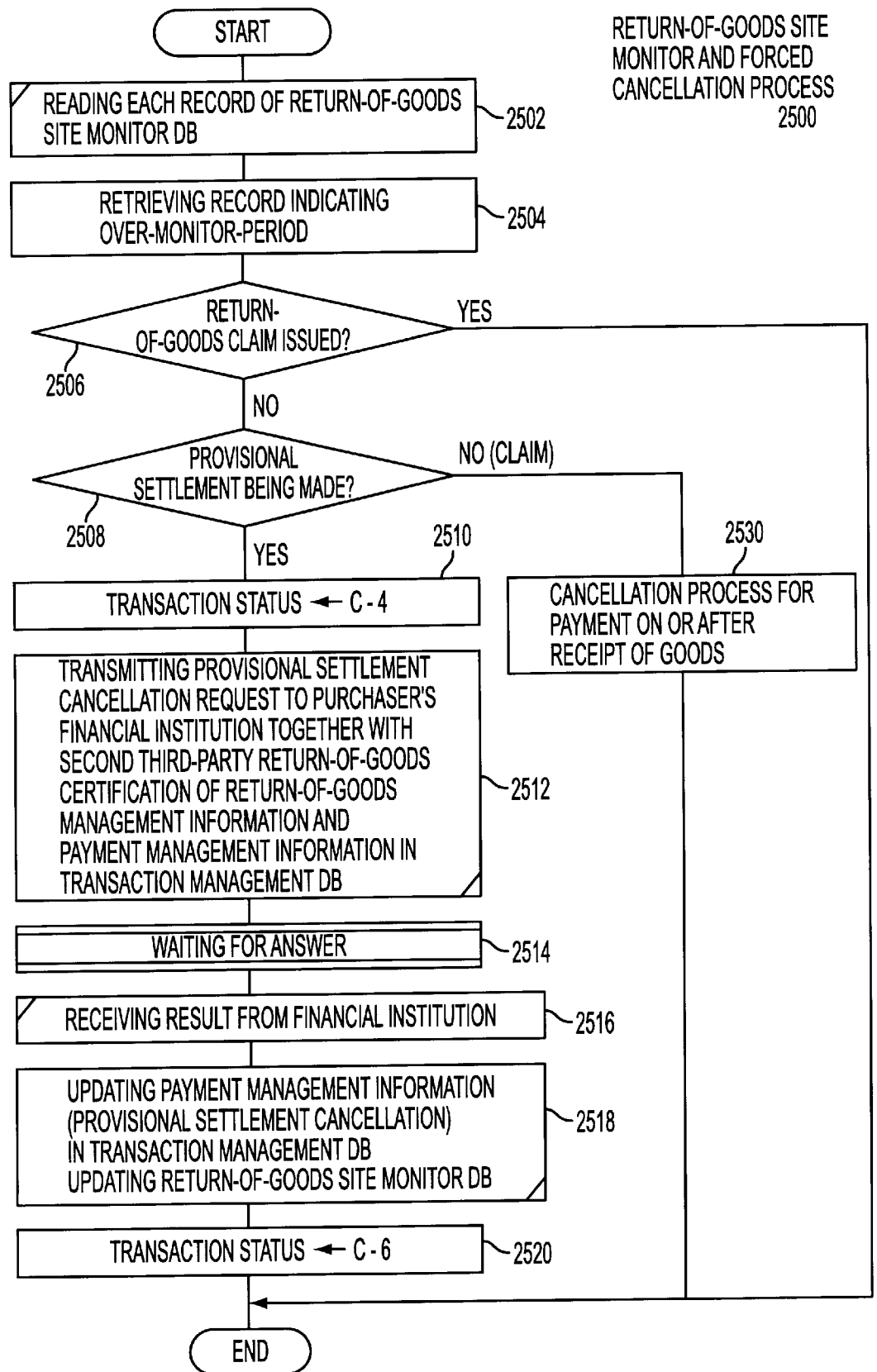
FIG. 45 is a flowchart showing the procedure of the return-of-goods site monitor process and the forced cancellation process.

The cancellation request through return of goods is monitored in the return-of-goods site monitor process 2500, and the process flow is shown in FIG. 45. In steps 2502 and 2504 of the process flow, each record in the return-of-goods site monitor DB 57 is periodically read. From the records, a record is extracted in which both the provisional settlement cancellation 1423 set as 'canceled' and the settlement date and time, and the return-of-goods confirmation 1379 of the corresponding return-of-goods management information 1370 in the transaction management DB 55 are not set, and the term set in the return-of-goods site monitor term 1422 expires. Since this record indicates a transaction for which a cancellation request through return-of-goods admission has not been issued from the seller within a predetermined term after goods have been returned. Furthermore, in step 2506, it is confirmed that no return-of-goods claim has been issued by selecting in step 2506 a record for which the return-of-goods claim 1380 in the return-of-goods management information 1370 in the transaction management DB 55 has not been set.

In this transaction, a cancellation request is transmitted to the purchaser's financial institution on behalf of the seller. Since a provisional settlement cancellation is made in a provisional payment electronic settlement system (step 2508), the transaction status 1320 in transaction management DB 55 is set as 'C-4 (return-of-goods confirmation)', and a final settlement stop instruction containing the second third-party return-of-goods certification 1378 in the return-of-goods management information 1370 (the first third-party return-of-goods certification 1376 for digital contents) added to the payment management information 1340 in the transaction management DB 55, and a provisional settlement cancellation request are transmitted to the processing unit of the purchaser's financial institution 3 on behalf of the seller in and after step 2510. Thus, the processing unit of the purchaser's financial institution 3 performs a cancellation process. After the completion of the cancellation process by the processing unit of the purchaser's financial institution 3, the termination of cancellation is set in the return-of-goods management information 1370 and the payment management information 1340 in the transaction management DB 55 in step 2518. In step 2520, the transaction status 1320 is also set as 'C-6 (payment cancellation)'.

The return-of-goods confirmation 1379 and the return-of-goods claim 1380 are set in the returned goods confirmation/claim acceptance process 2340. When a seller receives returned goods, which are physical goods, from a deliverer, or when the seller receives a cancellation request notification for digital contents from the transaction management device 5, the seller has to notify the transaction management device 5 of a claim against the cancellation or the return-of-goods through the confirmation of returned goods within a predetermined period.

Figure 43:
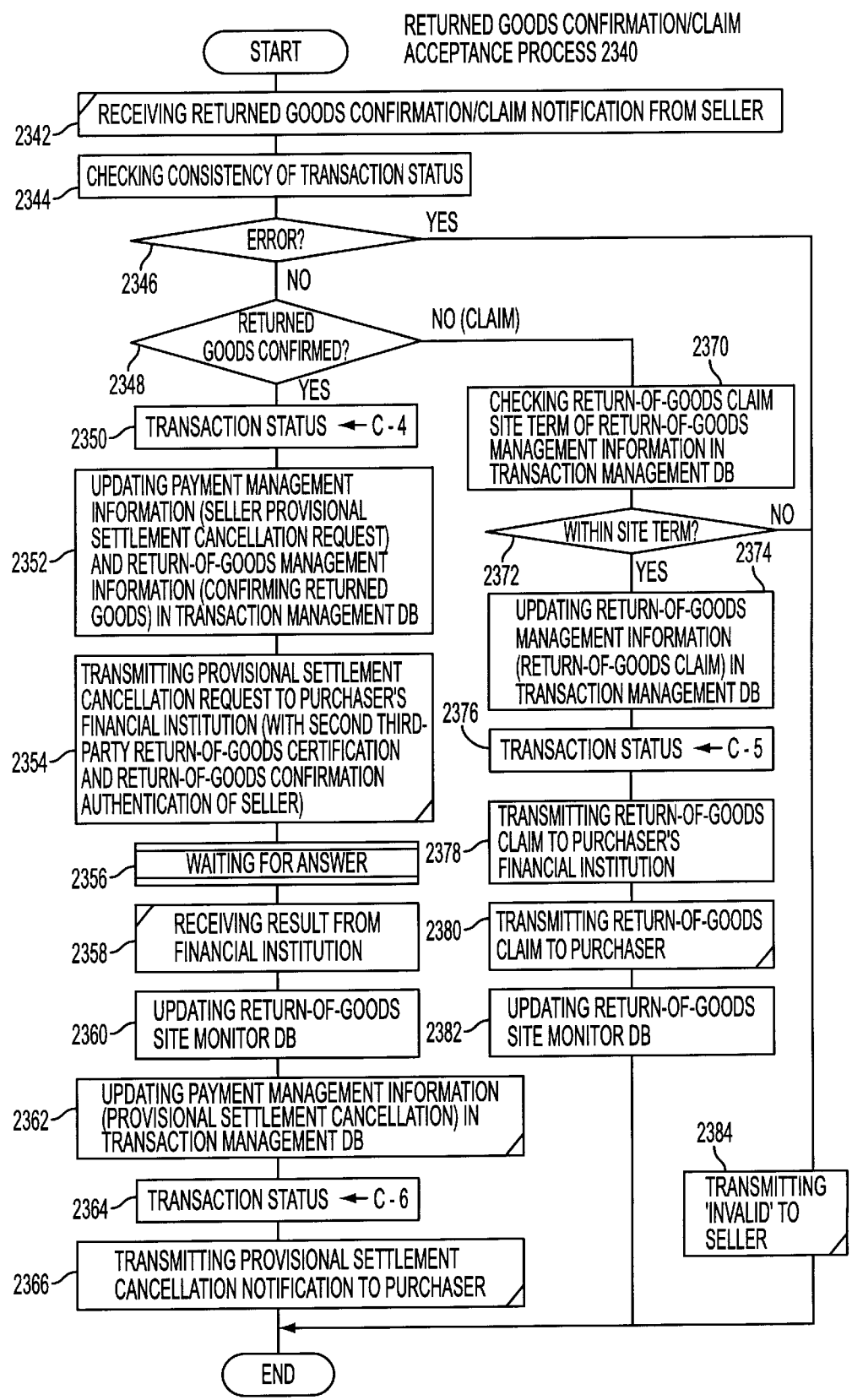
FIG. 43 is a flowchart showing the return-of-goods confirmation/claim acceptance process.

As shown in FIG. 43, after receipt of a return-of-goods confirmation or a return-of-goods claim in step 2342, cancellation is established, if a return-of-goods confirmation is received, by transmitting a final settlement stop instruction and a provisional settlement cancellation request to the purchaser's financial institution in and after step 2350. If a return-of-goods claim is received, it is confirmed that the process is in the site monitor term, and then the return-of-goods claim 1380 of the return-of-goods management information 1370 in the transaction management DB 55 is set, and the transaction status 1320 is set as 'C-5 (return-of-goods claim)', thereby suspending the prescription.

In the above described processes, the transaction management device 5 monitors whether or not the seller issues a cancellation request through return-of-goods. If the cancellation request is not issued within a predetermined period, the third-party return-of-goods certification information is added to the cancellation request, and the cancellation request is issued by the transaction management device 5 as a substitute.

Then, the digital contents key (decryption key for digital contents) acceptance process 2000, and the digital contents receipt confirmation/cancellation process 2100 are mainly described below as functions of managing the decryption key for the digital contents to be encrypted by a seller and transmitted to a purchaser, transmitting the decryption key to the purchaser, issuing certification information of a third-party witness, etc. in mediating the sales of digital contents.

Figure 36:
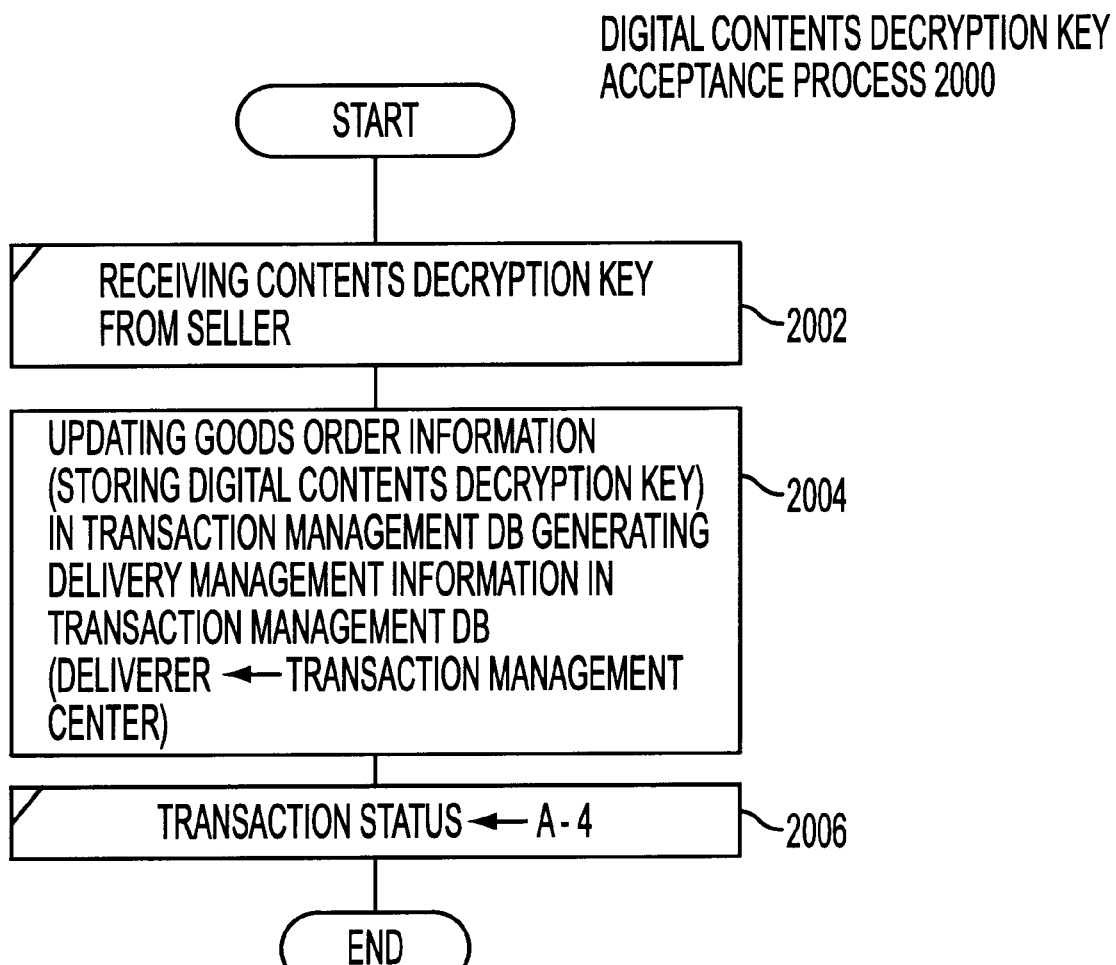
FIG. 36 is a flowchart showing the procedure of the digital contents decryption key acceptance process.

When a seller transmits encrypted digital contents to a purchaser, the seller simultaneously transmits a decryption key for use in decrypting the digital contents to the transaction management device 5. The digital contents key acceptance process 2000 receives and processes the decryption key (step 2002) as shown in FIG. 36. In step 2004, the decryption key is stored in the decryption key 1335 for digital contents in the goods order information 1330 in the transaction management DB 55, and the transaction management device 5 is set in the deliverer information 1361 of the delivery management information 1360. The transaction status 1320 is set as 'A-4 (accepting delivery) (step 2006). The stored decryption key 1335 is hereinafter managed by the transaction management device 5.

In the digital contents receipt confirmation/cancellation process 2100, the contents of a request from a purchaser about the transmitted digital contents (encrypted) are received and processed as shown in FIG. 37 (step 2102). If the purchaser returns a decryption key transmission request, then the purchaser intends to purchase the digital contents, and the decryption key 1335 for digital contents in the goods order information 1330 of the transaction management DB 55 stored in the digital contents key acceptance process 2000 is retrieved in step 2110 on condition that the transaction status 1320 is 'A-4 (accepting delivery)' (step 2106). The retrieved key is transmitted to the purchaser in step 2112. The transaction status 1320 is set as 'A-5 (receiving delivery)' (step 2108).

Then, the delivery receipt information 1365/1366/1367 (third-party delivery certification by the transaction management device 5) of the delivery management information 1360 in the transaction management DB 55 and the site monitor term 1373 of the return-of-goods management information 1370 are set (step 2114). Simultaneously, the final settlement site monitor DB 56 is generated (step 2116). The data obtained by copying the final settlement site monitor term 1363 of the delivery management information 1360 in the transaction management DB 55 is set as the final settlement site monitor term 1402 of the final settlement site monitor DB 56.

In mediating the sales of digital contents in the above described process, the transaction management device 5 manages the decryption key of the digital contents encrypted by the seller and transmitted to the purchaser, transmits the decryption key to the purchaser, and issues the certification information of the third-party witness.

In mediating the sales of digital contents, the transaction management device 5 determines whether or not the contents received by the purchaser are acceptable. If it determines that the contents are not acceptable, it is notified to the purchaser. If it is determined that the decryption key is defective, then the decryption key is re-transmitted to the purchaser. This is explained by referring to the digital contents receipt confirmation/cancellation process 2100. This process is performed when contents cannot be decrypted in the determination in step 2104 in the digital contents receipt confirmation/cancellation process 2100 shown in FIG. 37.

For example, assume that, in step 2112 shown in FIG. 37, a decryption key is transmitted to the purchaser's processing unit 1, but the purchaser cannot decrypt the digital contents. At this time, the purchaser may return a purchase cancellation request together with the un-decrypted digital contents. This corresponds to the case in which contents cannot be decrypted (impossible decryption of contents).

First, the condition for accepting the request is that the transaction status 1320 is 'A-5 (receiving delivery)', and the final settlement site monitor term 1402 of the final settlement site monitor DB 56 does not expire (determinations in step 2154 and 2156). In the decryption check process in step 2160, it is determined whether the contents (encrypted) received by the purchaser or the decryption key are defective.

Figure 39:
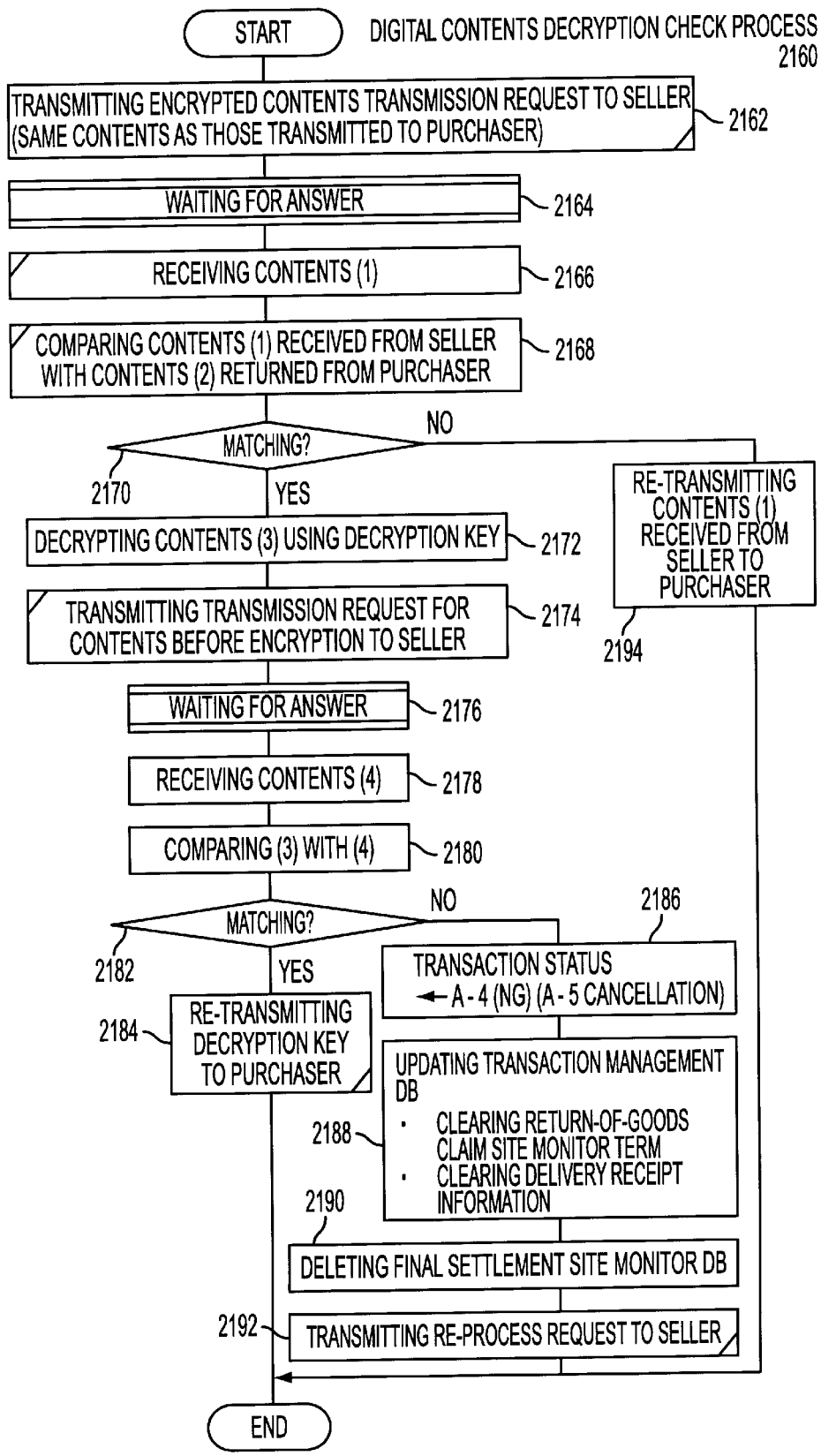
FIG. 39 is a flowchart showing the procedure of the digital contents decryption check process.

FIG. 39 shows the flow of the decryption check process. In step 2162 shown in FIG. 39, the seller is requested to transmit the contents which are the same as the contents (encrypted) transmitted to the purchaser. Then, it is confirmed in step 2168 that the contents transmitted from the seller match the contents (encrypted) transmitted from the purchaser. If they don't match, it is determined that the contents transmitted from the seller to the purchaser are defective, and that the contents newly transmitted from the seller to the transaction management device 5 are correct, and the correct contents are transmitted to the purchaser. If the above described contents match each other in steps 2168 and 2170, the contents are decrypted using the decryption key 1335 managed by the transaction management device 5. Furthermore, the seller is requested to transmit the non-encrypted digital contents after encrypting them using a seller's common key exclusive for transmission to the transaction management device (step 2174). In step 2180, the newly returned digital contents are decrypted, compared with the digital contents decrypted in step 2172 as in the state before encryption, and it is confirmed that they match each other. If they match each other, then it is determined that the decryption key used by the purchaser is defective, the decryption key 1335 managed by the transaction management device 5 is transmitted again to the purchaser in step 2184, and a decryption process is requested again.

If the above described contents do not match each other in step 2180, then it is determined that the digital contents (encrypted) first transmitted from the seller to the purchaser are defective, and a process of re-transmitting the contents is performed. In and after step 2186, the delivery reception information 1365/1366/1367 of the delivery management information 1360 in the transaction management DB 55 and the site monitor term 1373 of the return-of-goods management information 1370 are set in the state before transmission of the decryption key, and the final settlement site monitor DB 56 is deleted. In step 2192, since it is determined that the contents first transmitted from the seller to the purchaser are defective, it is informed to the seller that the transmission should start with the contents and digest for continuation of the transaction.

In the above described process, the transaction management device 5 determines whether or not the contents received by the purchaser are defective in mediating the sales of digital contents. If it is determined that the contents are defective, the purchaser is informed of it and the process of re-transmitting the decryption key to the purchaser is performed.

Furthermore, in mediating the deliverer's processing unit, the seller's processing unit, and the purchaser's or the receiver's processing unit, the functions of accepting the entry of the third-party delivery certification information of the deliverer's processing unit, accepting the entry of the first third-party return-of-goods certification information certifying that a return-of-goods request has been issued, and accepting the entry of the second third-party return-of-goods certification information certifying that the seller has received returned goods are explained by referring to the goods delivery receipt process 1820, the returned goods delivery acceptance process 2200, and the returned goods delivery receipt process 2220.

The third-party delivery certification is entered in the goods delivery receipt process 1820. The first third-party return-of-goods certification is entered in the returned goods delivery acceptance process 2200. The second third-party return-of-goods certification is entered in the returned goods delivery receipt process 2220.

Since the process of accepting an entry of the third-party delivery certification in the goods delivery receipt process 1820 has been described by referring to FIG. 33, the detailed description is omitted here.

Figure 40:
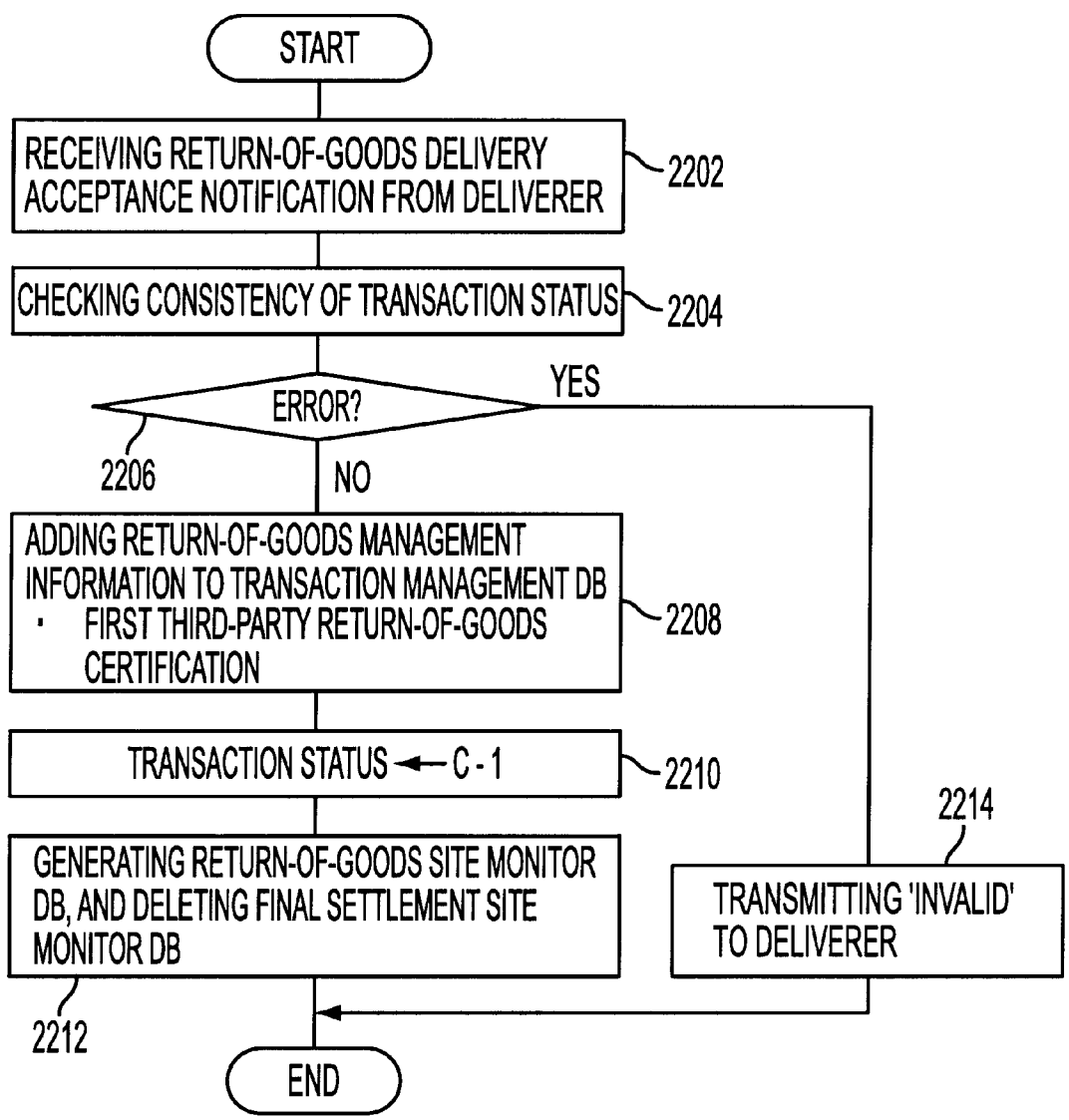
FIG. 40 is a flowchart showing the procedure of the returned goods delivery acceptance process.

Next, the returned goods delivery acceptance process 2200 is described below by referring to FIG. 40. In step 2202, a notification that the deliverer received from a goods receiver a request to deliver goods to be returned and the goods, is received. Then, after checking for consistency of the transaction status 1320 in step 2204, the deliverer's receipt certification contained in the received notification is stored in the first third-party return-of-goods certification 1375 and 1376 in the return-of-goods management information 1370 in the transaction management DB 55 in steps in and after step 2208. Then, the return-of-goods site monitor switch 1404 in the final settlement site monitor DB 56 is set as 'switched', and the date and time is set. The return-of-goods site monitor DB 57 is generated, and the transaction status 1320 is set as 'C-1 (accepting a return-of-goods request)'. The subsequent site monitor is performed in the return-of-goods site monitor process 2500. The return-of-goods site monitor term 1422 of the return-of-goods site monitor DB 57 is set based on the number X of days for adjustment in consideration of the delivery term.

Figure 41:
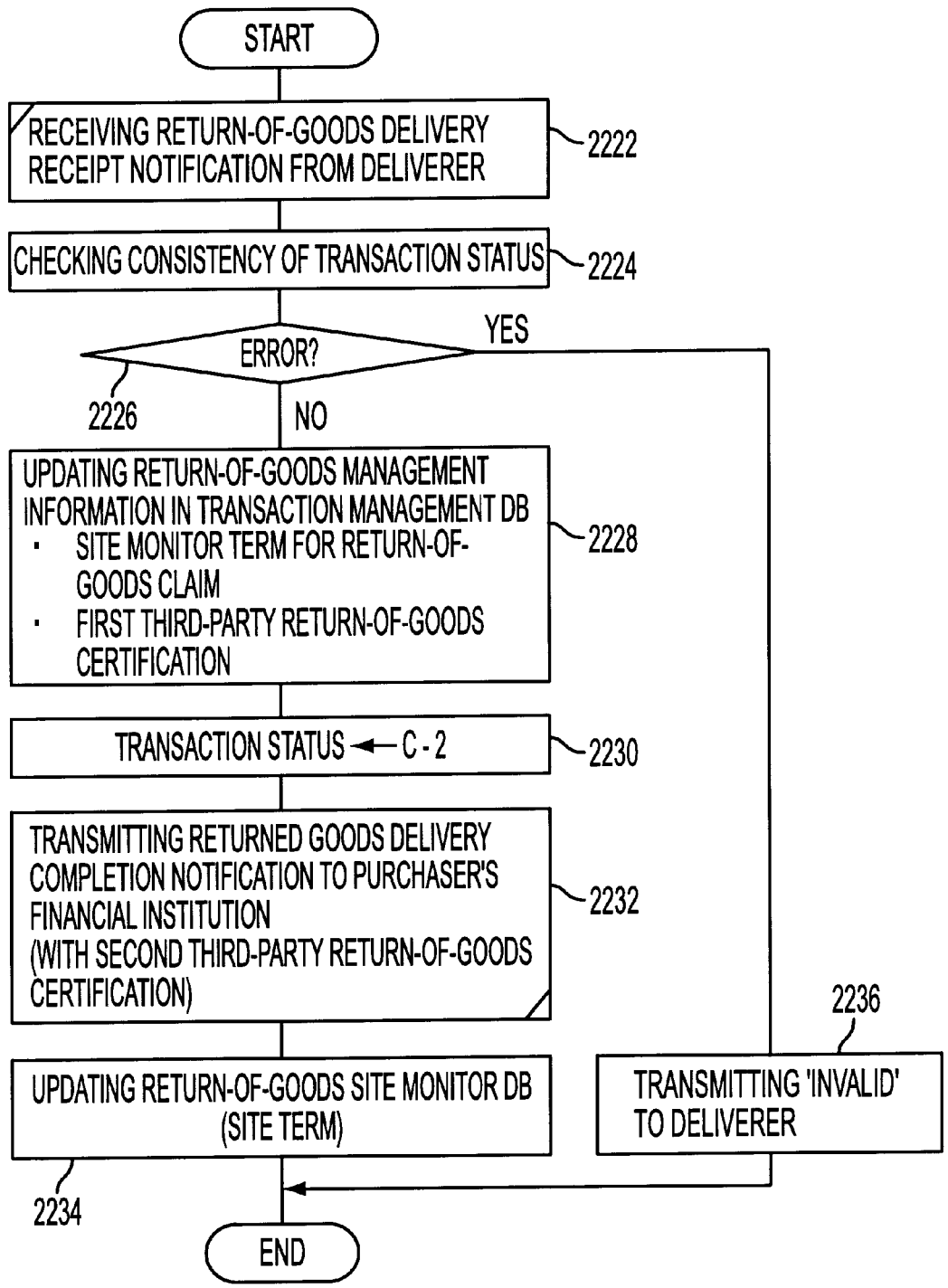
FIG. 41 is a flowchart showing the procedure of the returned goods delivery receipt process.

Furthermore, the returned goods delivery receipt process 2220 receives a notification that the seller has received returned goods from the deliverer together with the seller's receipt certification in step 2222 as shown in FIG. 41. After the consistency check of the transaction status 1320, a seller's certificate containing the seller's receipt certification is stored in the second third-party return-of-goods certification 1377 and 1378 in the return-of-goods management information 1370 of the transaction management DB 55, and the return-of-goods site monitor term 1422 of the return-of-goods site monitor DB 57 is set again based on the determined number Y of days for adjustment in and after step 2228. Afterwards, the return-of-goods site monitor process 2500 monitors the cancellation by return-of-goods using the site monitor term.

Figure 42:
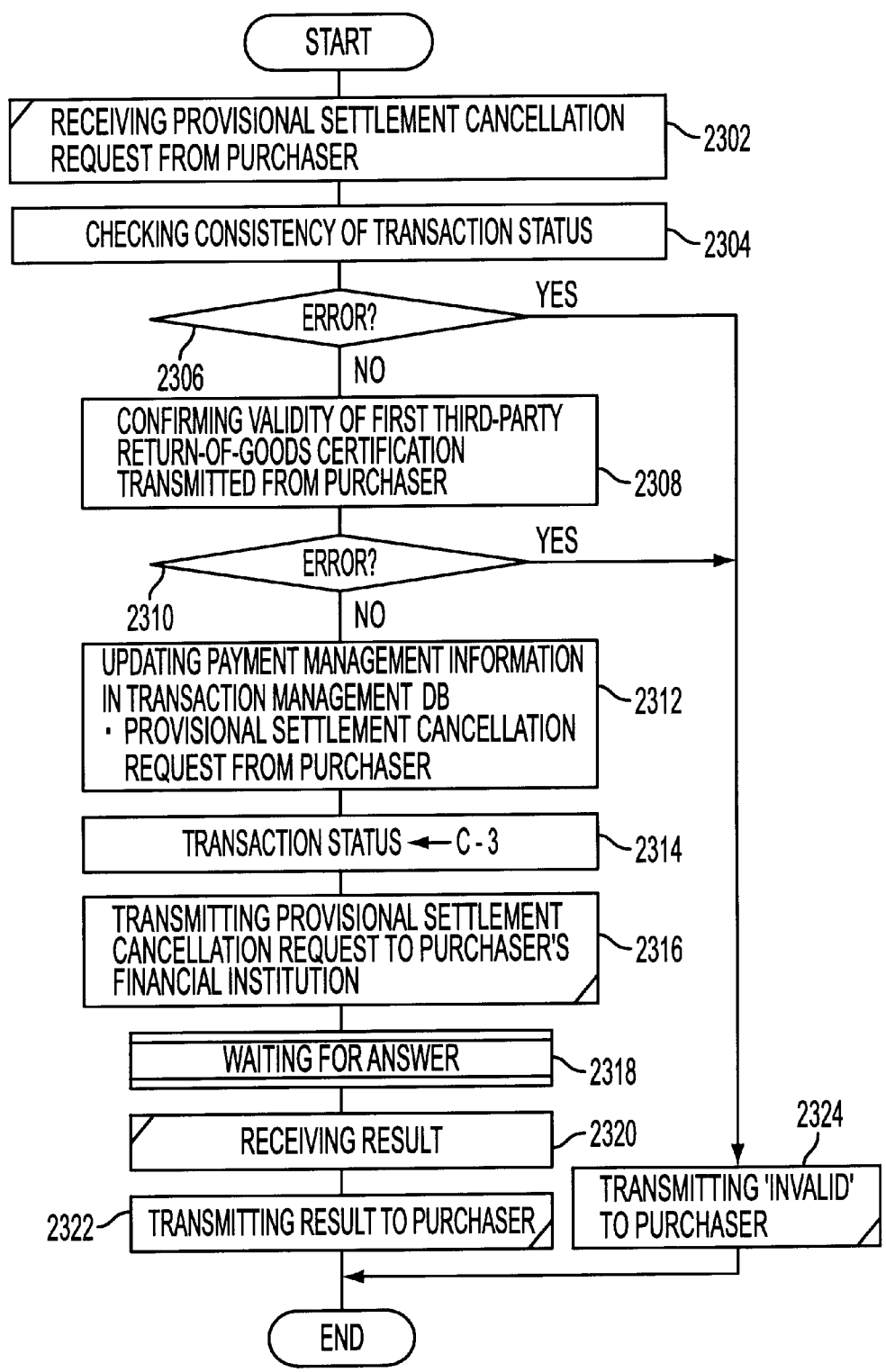
FIG. 42 is a flowchart showing the provisional settlement cancellation request acceptance process.

The provisional settlement cancellation request acceptance process 2300 receives a provisional settlement cancellation request from the purchaser in step 2302 as shown in FIG. 42, updates the payment management information in the transaction management DB 55 in step 2312, and transmits the provisional settlement cancellation request to the purchaser's financial institution in step 2316.

Thus, in mediating the deliverer's processing unit, the seller's processing unit, and the purchaser's or the receiver's processing unit, the transaction management device 5 accepts the entry of the third-party delivery certification information of the deliverer's processing unit, accepts the entry of the first third-party return-of-goods certification information certifying that a return-of-goods request has been issued, and accepts the entry of the second third-party return-of-goods certification information certifying that the seller has received returned goods.

Described below is the procedure of the transaction management device 5 not described yet above.

All these procedures should be included as preferred embodiments.

Figure 29:
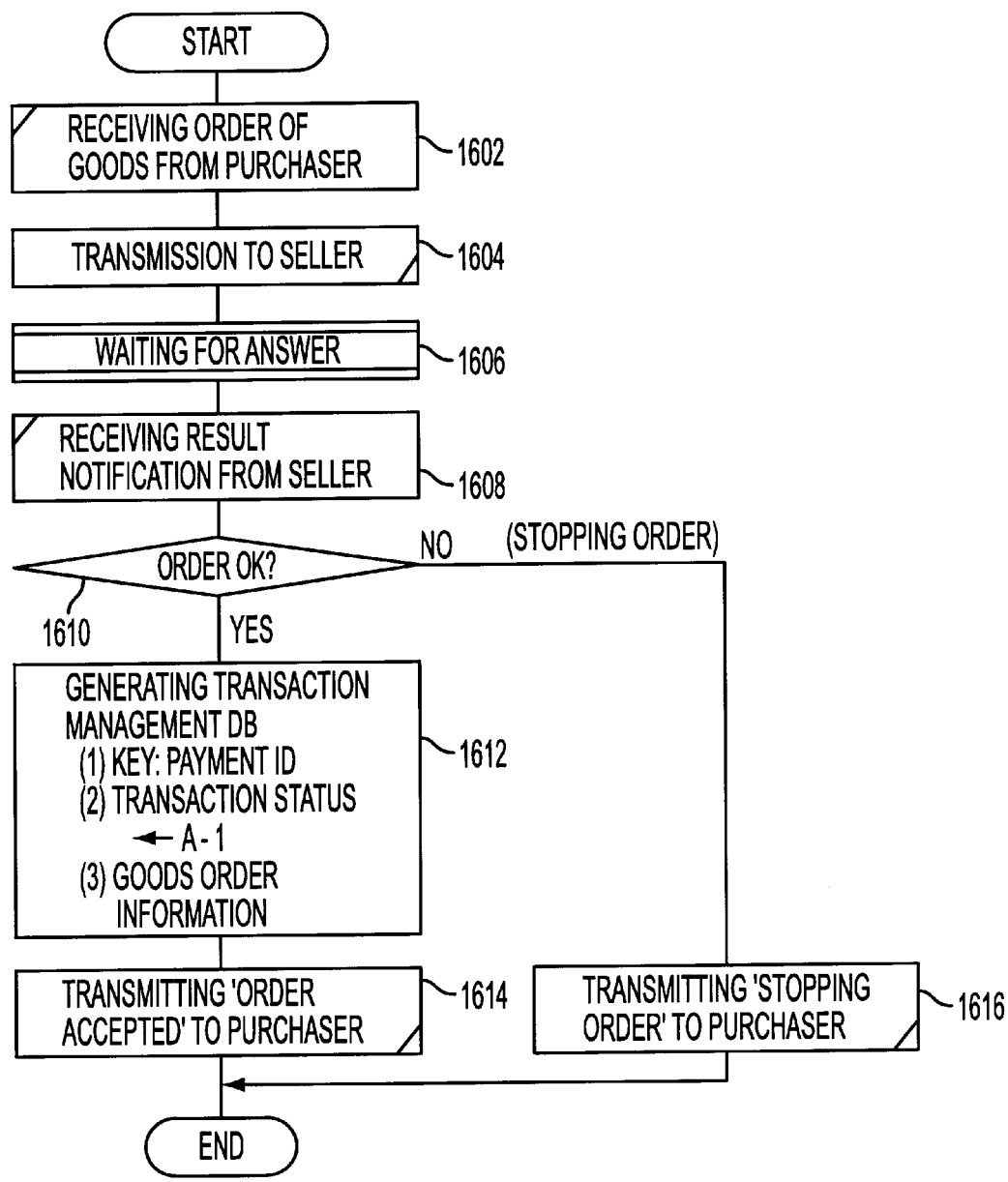
FIG. 29 is a flowchart showing the procedure of the goods order process.

The goods order process 1600 mediates the order of goods between the purchaser's processing unit 1 and the seller's processing unit 2 in the procedure shown in FIG. 29. When the order of goods is placed in the procedure in steps 1602 through 1608 in the goods order process 1600, the transaction management DB 55 is generated using the payment ID normally numbered by the seller as a key (step 1612). Afterwards, the proceedings of a transaction are managed through the key.

Figure 30:
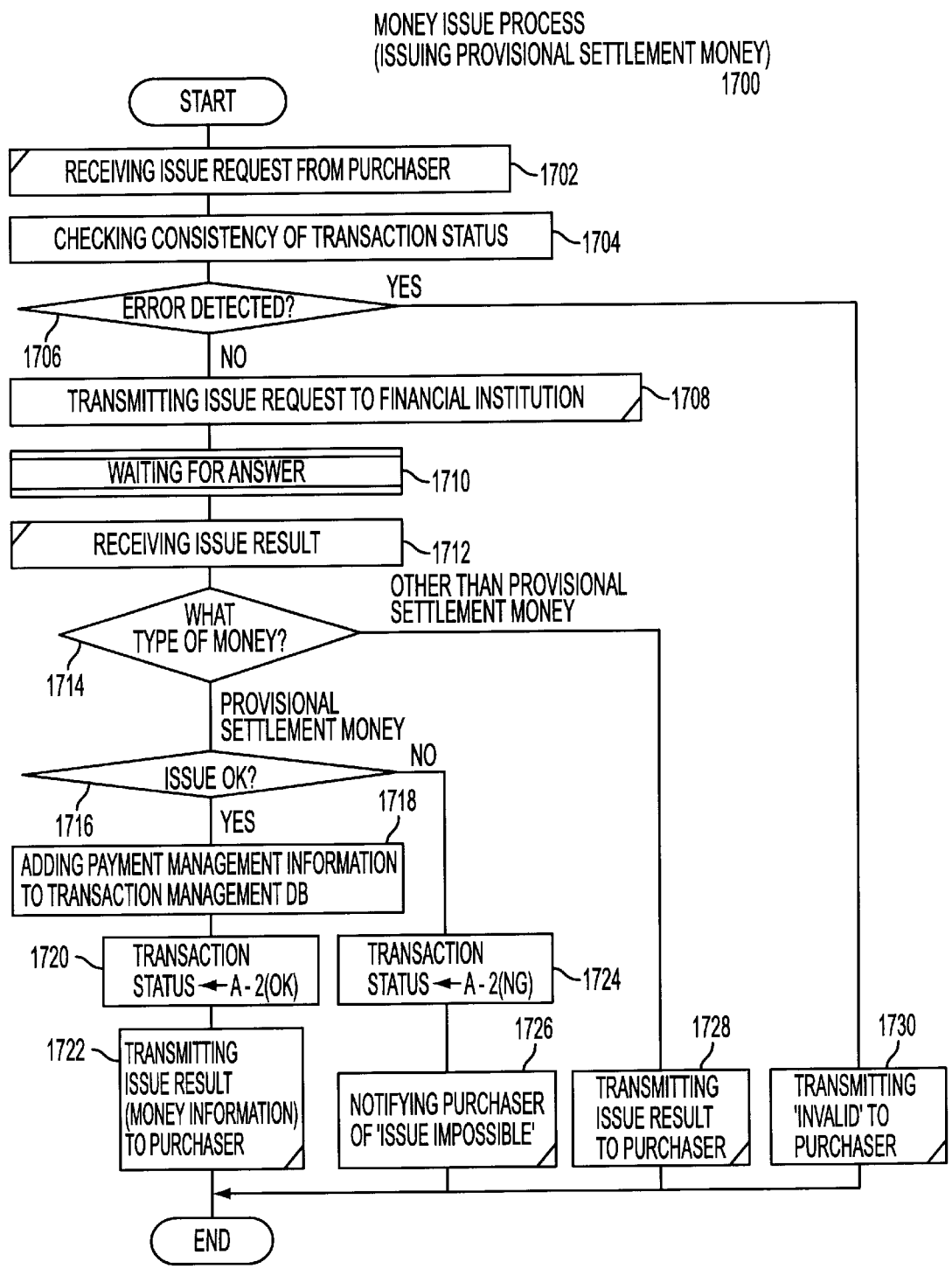
FIG. 30 is a flowchart showing the procedure of the money issue (issue of provisional settlement money) process.

When the purchaser places an order of goods, the purchaser requests the processing unit at the purchaser's financial institution 3 to issue provisional settlement money in the procedure shown in FIG. 30 in the money issue process 1700. If the issue of provisional settlement money is OK in step 1716, the contents of the provisional settlement money is written to the payment management information 1340 of the transaction management DB 55 in step 1718, and the subsequent settlement proceedings are managed.

Figure 31:
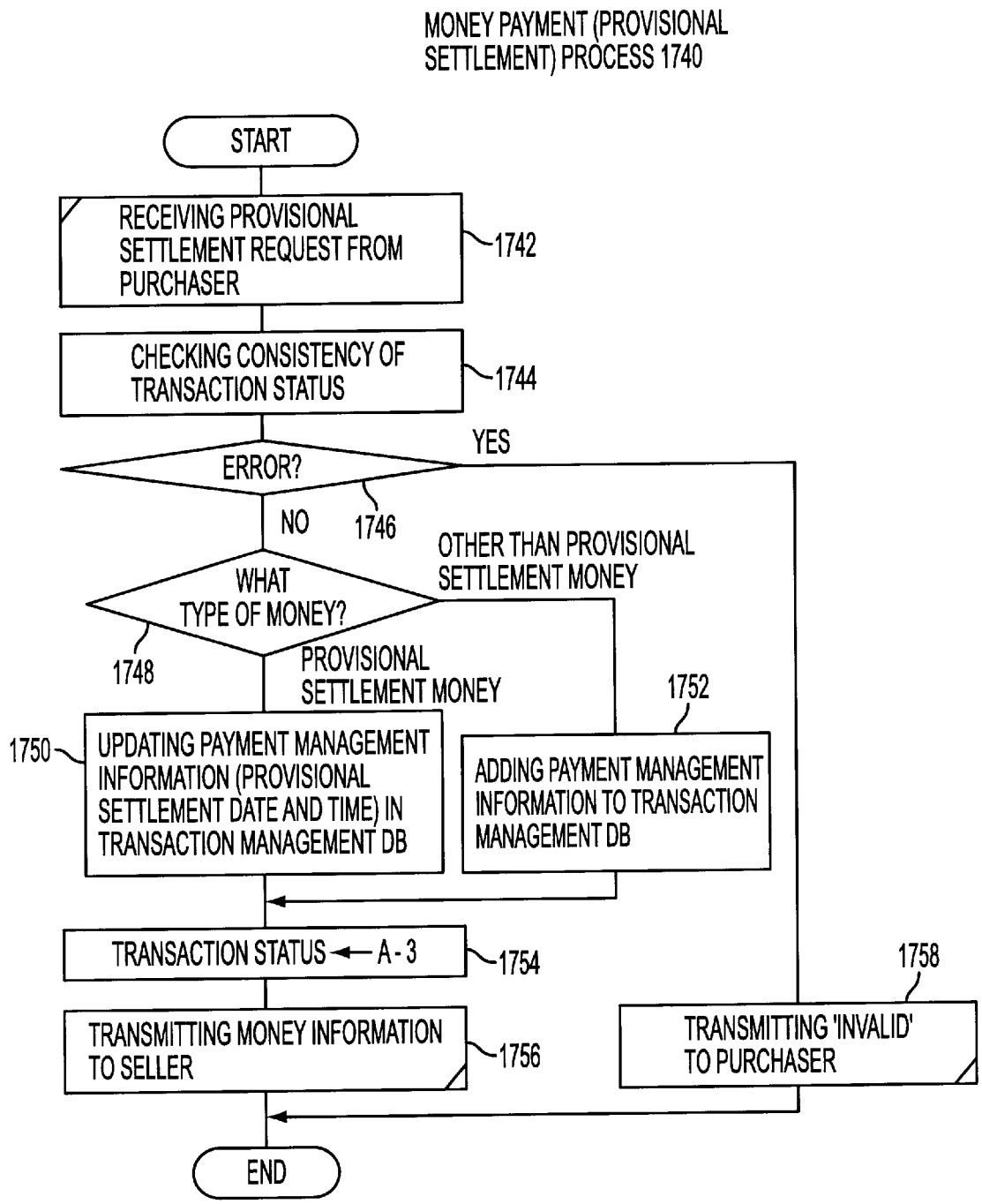
FIG. 31 is a flowchart showing the procedure of the money payment (provisional settlement) process.

When the process is performed in the procedure as shown in FIG. 31, an intermediate process is performed in the money payment process 1740 when the purchaser makes payment (provisional settlement) for the goods to the seller using provisional settlement money or settlement account money. In this procedure, the provisional settlement date and time 1346 is written to the payment management information 1340 of the transaction management DB 55 in step 1750, and the money information containing the provisional settlement information through the provisional settlement money or the settlement account money is transferred to the seller through the transaction management device 5 in step 1756.

Figure 32:
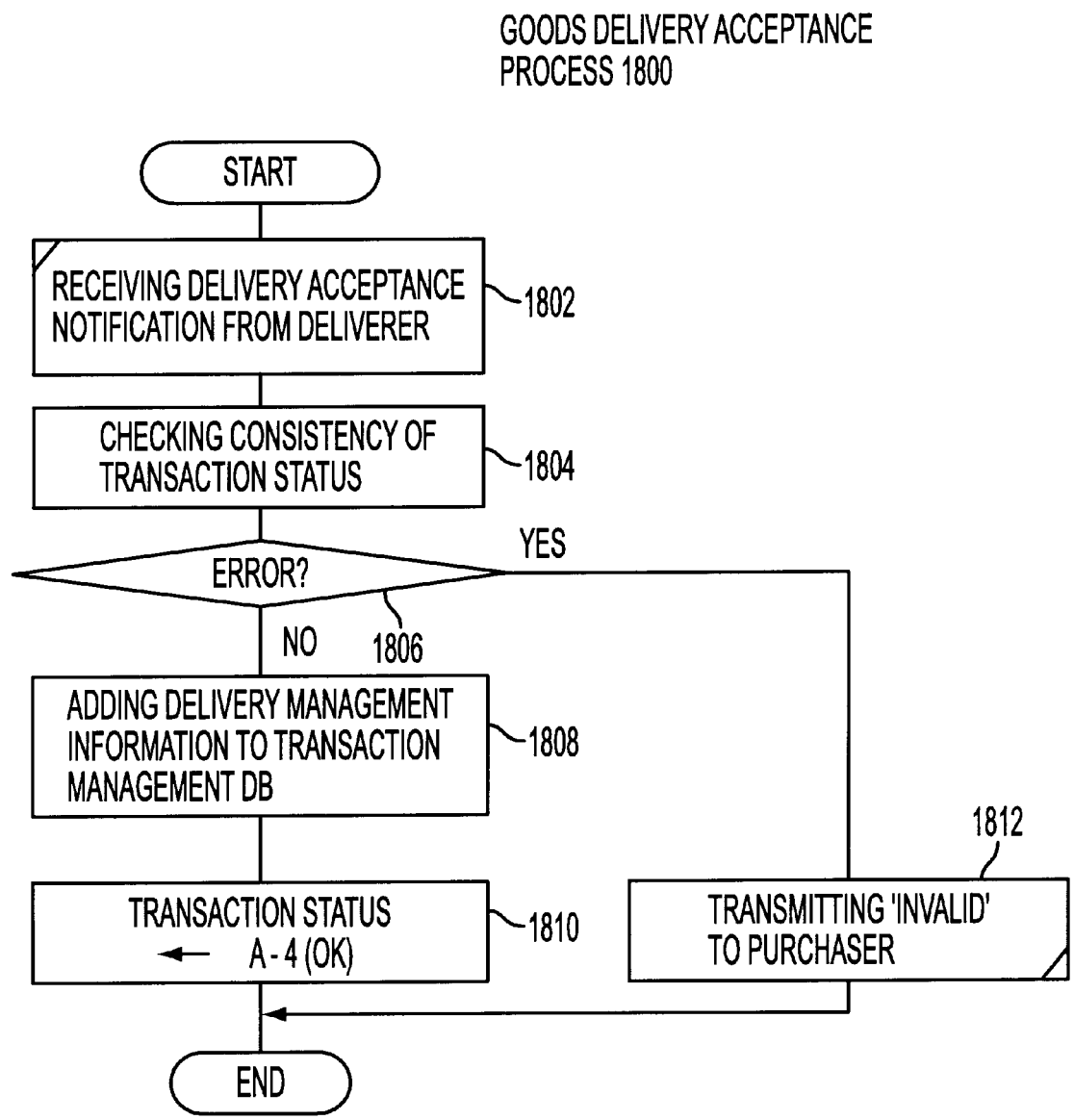
FIG. 32 is a flowchart showing the procedure of the goods delivery acceptance entry process.

The notification that the deliverer has accepted the delivery of goods from the seller is received from the deliverer's processing units 6 and 7 and is entered in the goods delivery acceptance process 1800 in a transaction of physical goods in the procedure shown in FIG. 32. As shown in FIG. 32, when a delivery acceptance notification is received from the deliverer in the goods delivery acceptance process 1800, the delivery management information 1360 of the transaction management DB 55 is generated (step 1808).

Described below are the terminal units 80 and 81 at the financial institution connected to the processing unit at the financial institution 3 and 4, and the portable storage media 82 and 83 issued and accepted by the above described terminal units as provisional settlement money cards or final settlement admission request cards.

According to the eighth embodiment of the present invention, the terminal unit 80 at the financial institution operated by a purchaser and the terminal unit 81 at the financial institution operated by a seller are referred to. In the following explanation, a terminal unit having the functions operated by both the seller and the purchaser are described as the terminal unit 80' at the financial institution.

The terminal unit 80' at the financial institution is operated by a purchaser and a seller, transmits and receives transaction information to and from the processing unit at the purchaser's financial institution 3 and 4, and have the following functions.

First, the terminal unit 80' has the function of issuing the provisional settlement money card 82 for use in a purchaser's issuing a provisional settlement request.

Second, it has the function of allowing the purchaser to perform a final settlement admission process based on provisional settlement.

Third, it has the function of processing a final settlement request from the seller who uses a received portable storage medium.

Figure 46:
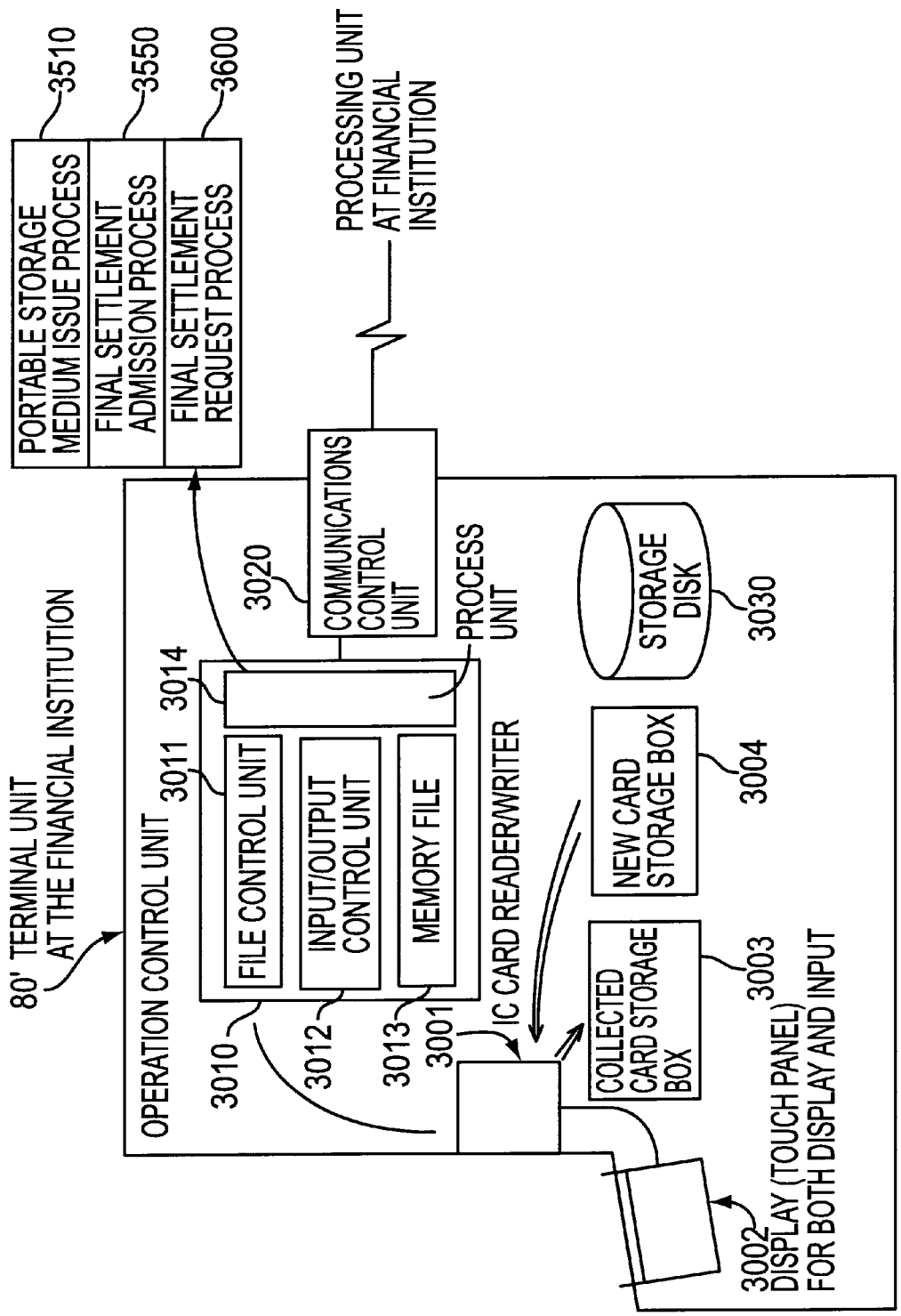
FIG. 46 shows the general configuration according to an embodiment of a terminal unit of a financial institution.

The terminal unit 80' at the financial institution is designed as shown in FIG. 46, and comprises an operation control unit 3010 for controlling the entire system; a communications control unit 3020 line-connected to the processing units at the purchaser's financial institution 3 and 4 to and from which data is transmitted and received; a storage disk 3030 for storing input information and transmission and receipt information to and from the financial institution; an IC card reader/writer 3001; a display (touch panel) 3002 for inputting information from a purchaser and a seller, and displaying receipt information from the processing units at the financial institution 3 and 4; a collected card storage box 3003 for collecting used cards; and a new card storage box 3004 for storing new cards. The storage disk 3030 can be an arbitrary DASD (direct access storage device).

The operation control unit 3010 comprises a file control unit 3011, an input/output control unit 3012, a memory file 3013; and a process unit 3014. The process unit 3014 comprises a portable storage medium issue process 3510, a final settlement admission process 3550, and a final settlement request process 3600.

Figure 47:
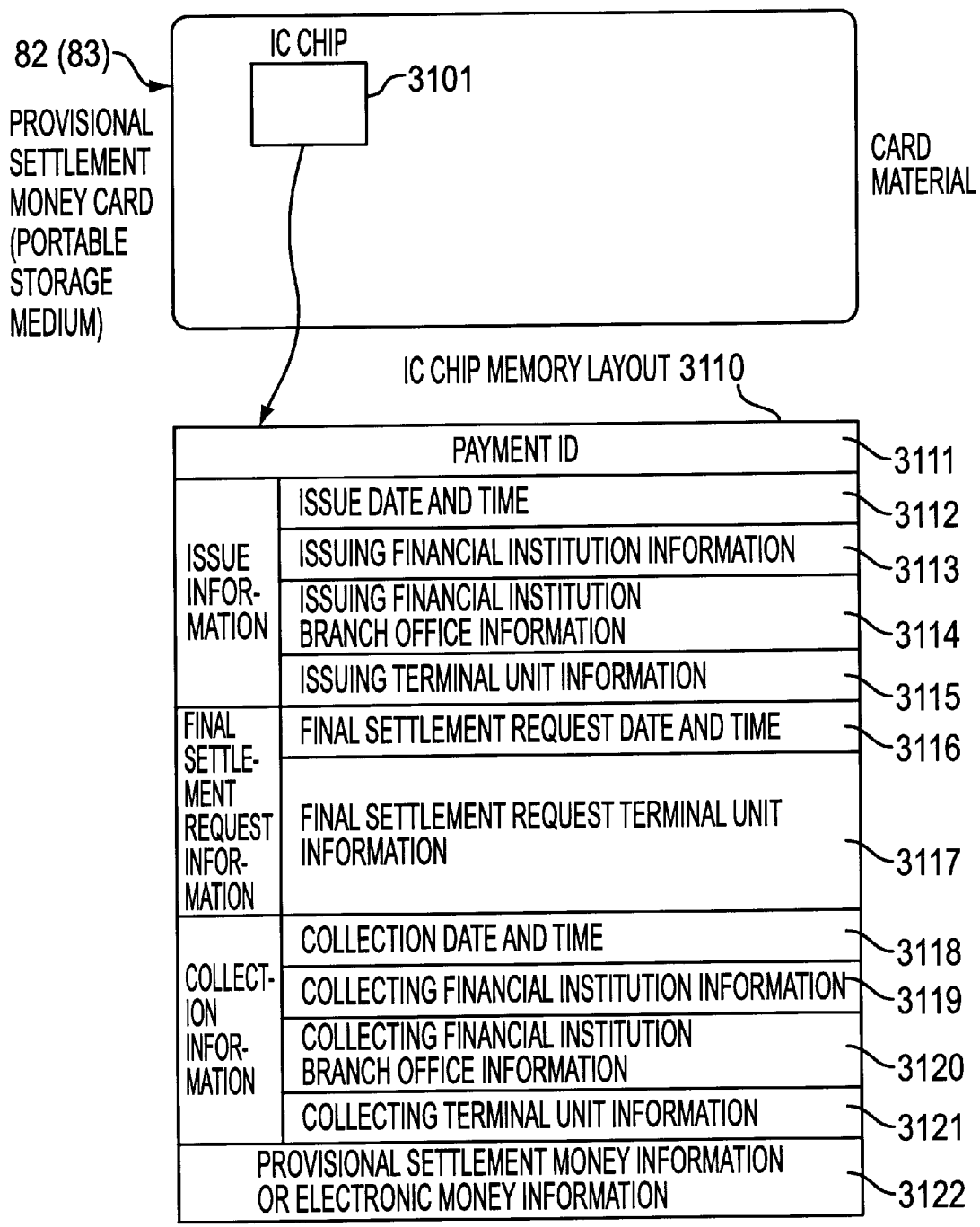
FIG. 47 shows the general configuration of a provisional settlement money card (portable storage medium) applied to a terminal unit of a financial institution and the memory layout of an IC chip.

The provisional settlement money card 82 (portable storage medium) is, for example, designed to have an IC chip 3101 on a plastic card material as shown in FIG. 47. The memory layout 3110 of the IC chip 3101 is designed as shown in FIG. 47, and corresponds to a provisional settlement money issue request from a purchaser, a final settlement admission request from a seller, or a collection process. Practically, it comprises a payment ID 3111, issue information, final settlement request information, collection information, provisional settlement money information or electronic money information 3122. Among the information, the issue information comprises an issue date and time 3112, issuing financial institution information 3113, issuing financial institution branch office information 3114, and issuing terminal unit information 3115. The final settlement request information comprises a final settlement request date and time 3116 based on a final settlement request from the seller, and final settlement request terminal unit information 3117. If the final settlement request information is written, the provisional settlement money card 82 is prohibited from being reused until it is collected. Then, the collection information comprises a collection date and time 3118, a collecting financial institution information 3119, a collecting financial institution branch office information 3120, and a collecting terminal unit information 3121.

Figure 48:
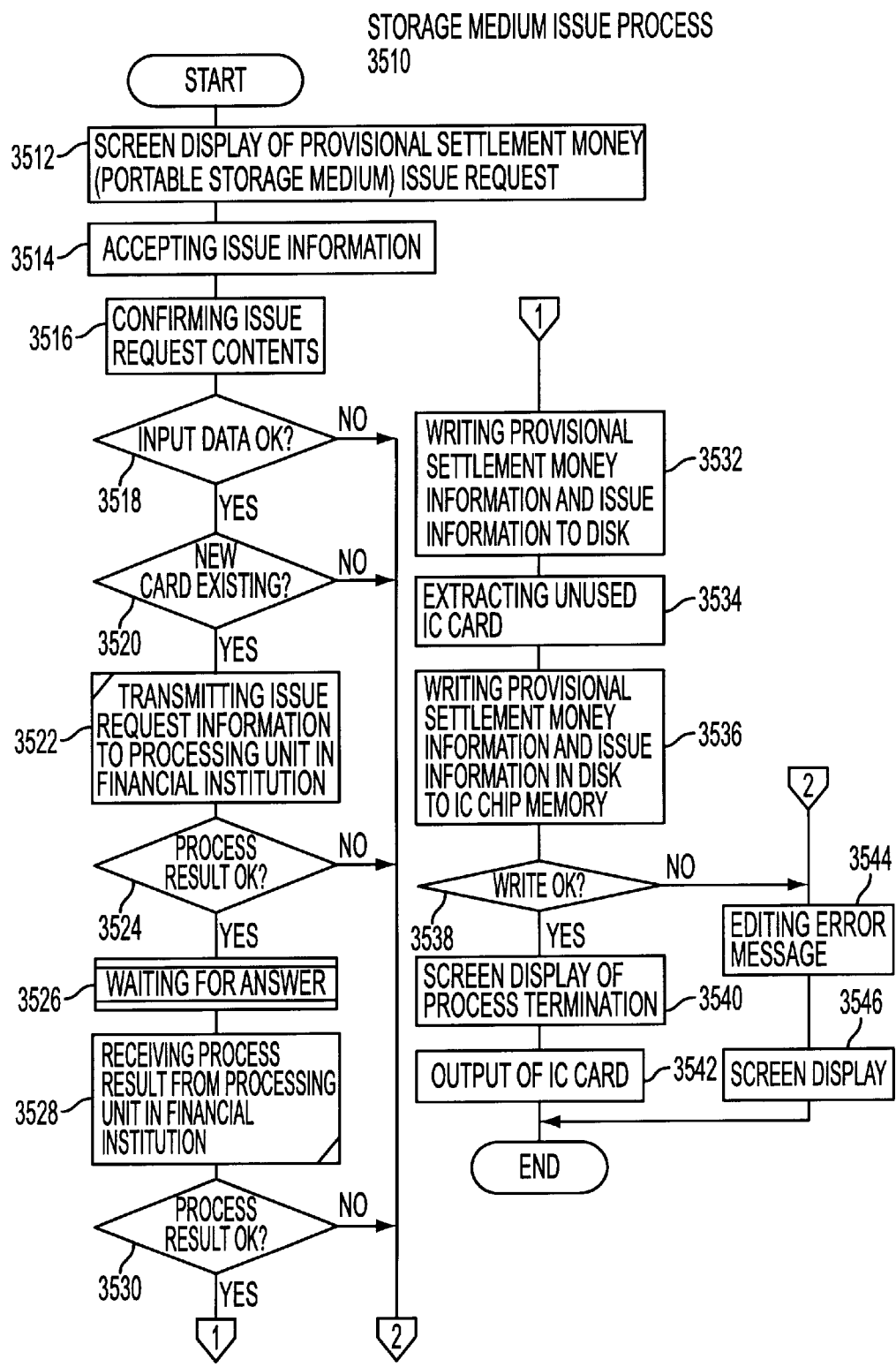
FIG. 48 is a flowchart showing the procedure of the storage medium issue process.

Each of the processes performed by the terminal unit 80' at the financial institution is described by referring to the process flow shown in and after FIG. 48.

First, the portable storage medium issue process 3510 is described as a portable storage medium issuing function.

The portable storage medium issue process 3510 issues a provisional settlement money card (IC card) as a portable storage medium storing money information containing provisional settlement information with goods purchase information through an operation of a terminal unit at financial institution by a purchaser as shown in FIG. 48.

In step 3512, a provisional settlement money (IC card type) issue request screen is displayed on the display 3002 to accept issue request information such as a payment ID, purchaser information, issuing financial institution, etc. (step 3514). Then, the contents of the issue request information input in step 3516 is confirmed. If the contents are normal in step 3518, and if a new IC card exists in the new card storage box 3004 in step 3520, then issue request information is transmitted to the processing unit of the purchaser's financial institution 3 in step 3522.

Then, it is confirmed in step 3524 that the information has been successfully transmitted. A process result is received from the processing unit of the purchaser's financial institution 3 in step 3528. If the process result from the processing unit of the purchaser's financial institution 3 is normal in step 3530, the provisional settlement money information containing the goods purchase information is written together with issue information to the storage disk 3030. A new IC card is extracted from the new card storage box 3004 in step 3534, and the provisional settlement money information and issue information written to the storage disk 3030 are written to the provisional settlement money information 3122 and the issue information (issue date and time 3112, issuing financial institution information 3113, issuing financial institution branch office information 3114, and issuing terminal unit information 3115) of the IC chip memory 3110 of the new IC card using the IC card reader/writer 3001.

If it is confirmed that a write to the IC chip has been normally performed in step 3538, then a process termination indication is displayed on the display 3002 in step 3540, and the card 82 is output in step 3542. If input contents are not correct in step 3518, if new cards are running short in step 3520, if the transmission process is not normally performed in step 3524, if the process result is not correct in step 3530, or if a write to the IC chip is not normally performed in step 3538, then an error message is edited in step 3544, and the message is displayed on the display 3002 in step 3546.

The final settlement admission process 3550 is described below as a function of transmitting a final settlement admission request to financial institution based on a portable storage medium.

Figure 49:
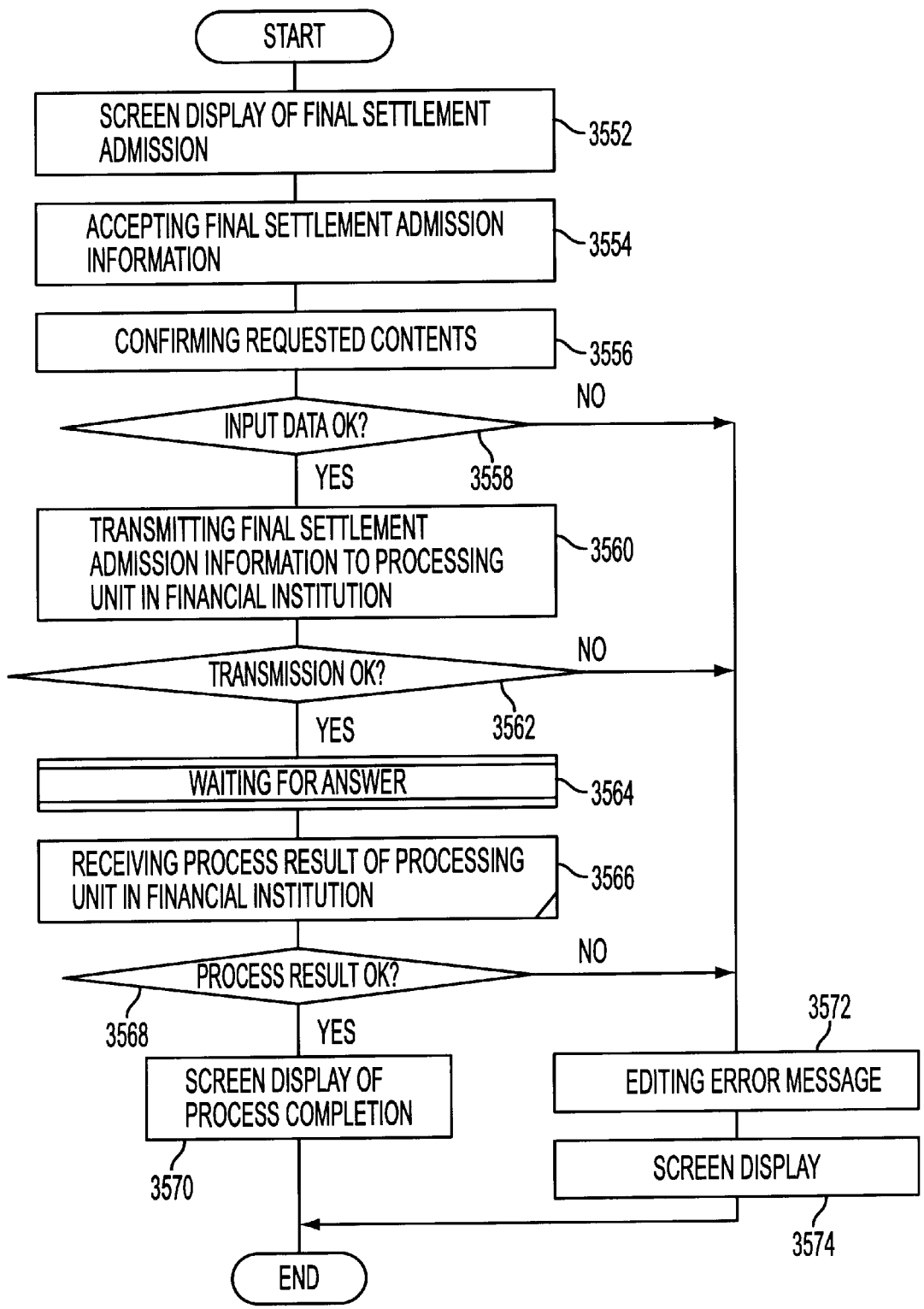
FIG. 49 is a flowchart showing the procedure of the final settlement admission process.

The final settlement admission process 3550 is performed as shown in FIG. 49 to accept a final settlement admission request by the purchaser's operating the terminal unit 80' at financial institution.

In FIG. 49, the final settlement admission acceptance screen is displayed on the display 3002 in step 3552 to accept final settlement admission information such as a purchaser-input payment ID, purchaser information, issuing financial institution information, etc. If the contents of the final settlement admission information input in step 3554 are confirmed and the contents are correct in step 3558, then the final settlement admission information is transmitted to the processing unit of the purchaser's financial institution 3 in step 3560.

It is confirmed in step 3562 that the information has been successfully transmitted. A process result is received from the processing unit of the purchaser's financial institution 3 in step 3566. If the process result from the processing unit of the purchaser's financial institution 3 is normal in step 3568, the process termination screen (final settlement admission acceptance indication) is displayed on the display 3002 in step 3570. If the input contents are not correct in step 3558, if the transmission process is not normally performed in step 3562, and if the process result is not correct in step 3568, then an error message is edited in step 3572, and the message is displayed on the display 3002 in step 3574.

Described below is the final settlement request process 3600 as a function of automatically collecting portable storage medium.

Figure 50:
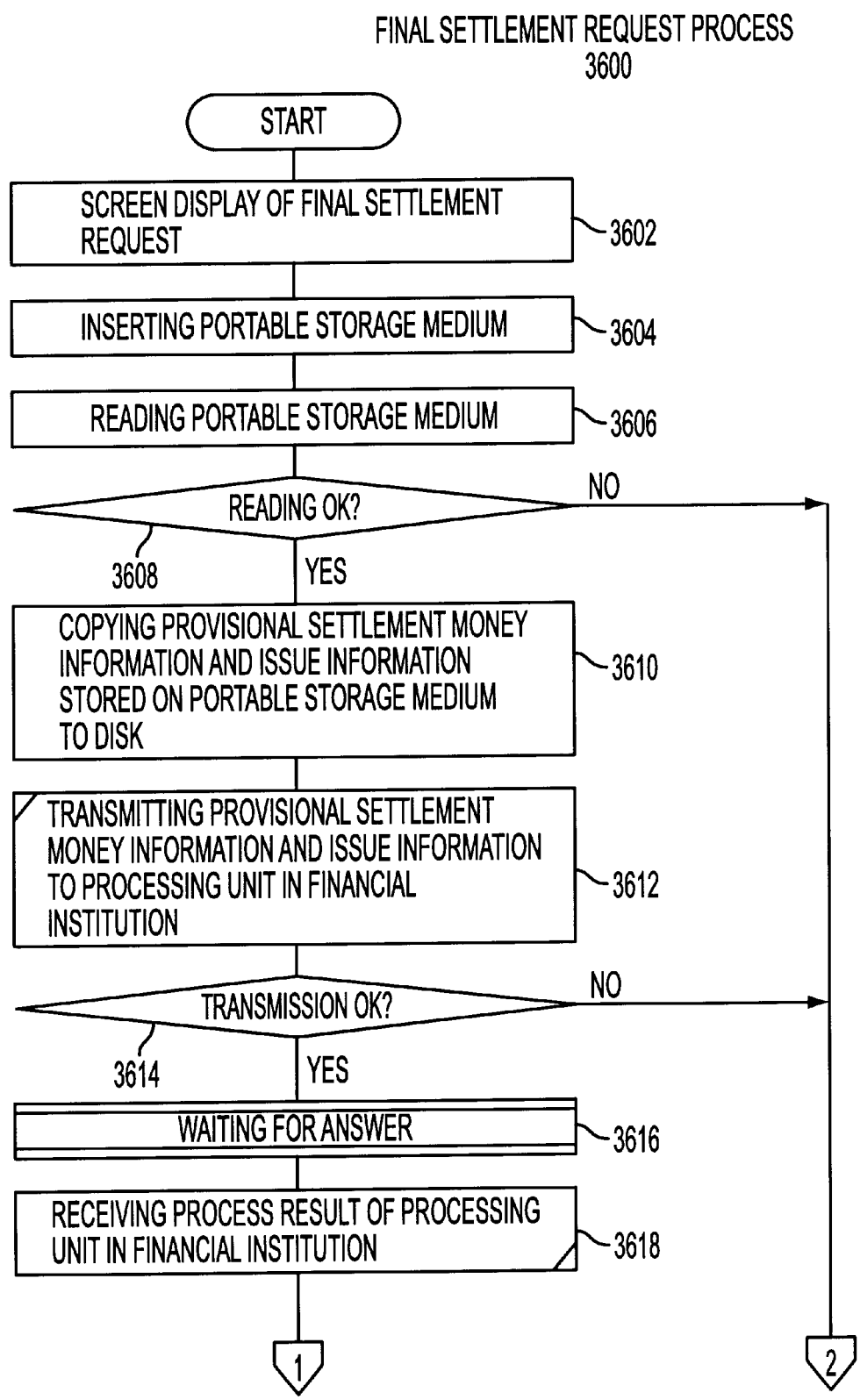
FIG. 50 is a flowchart (1) showing the procedure of the final settlement request process.
Figure 51:
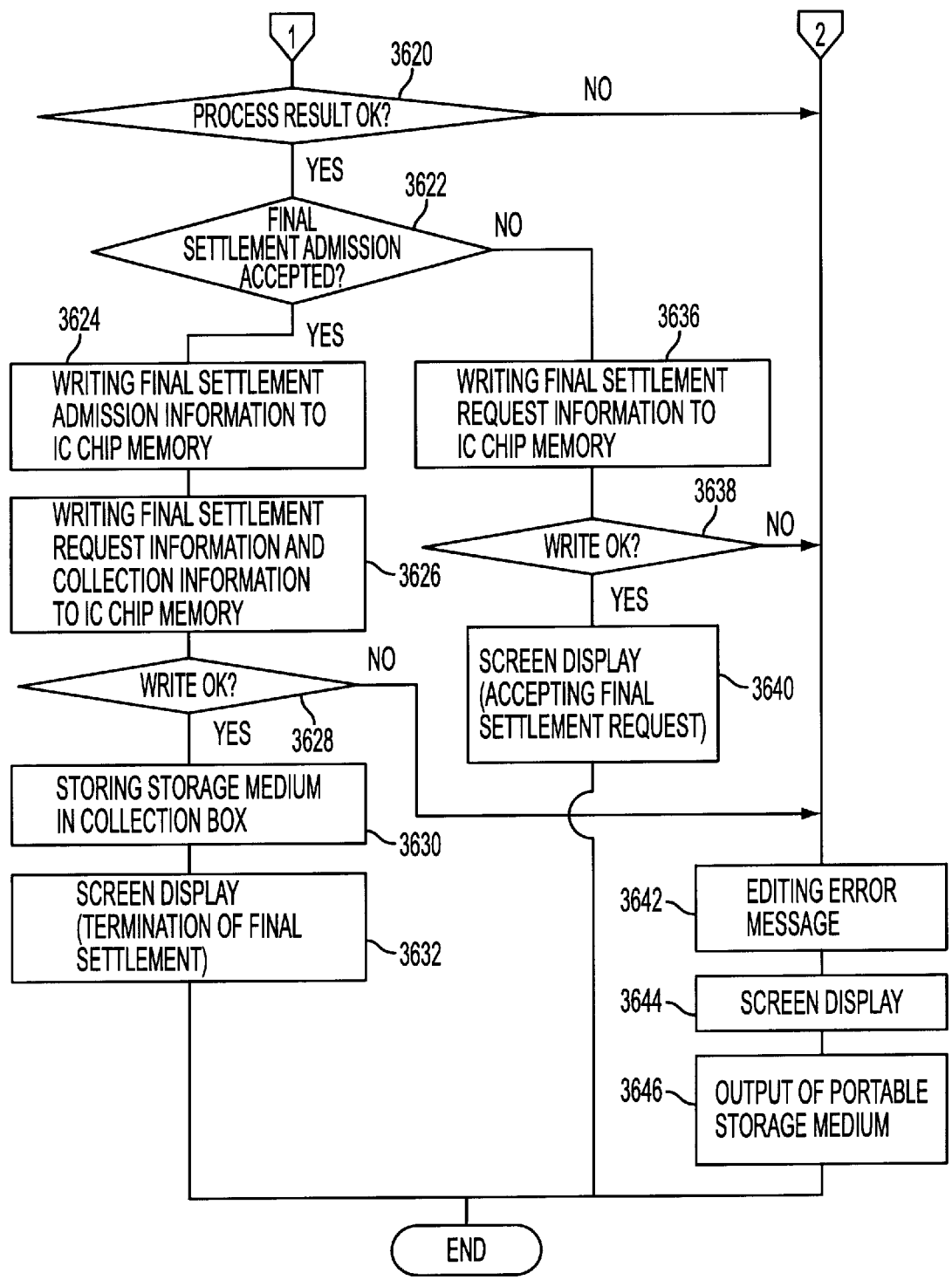
FIG. 51 is a flowchart (2) showing the procedure of the final settlement request process.

The final settlement request process 3600 is a process of accepting a final settlement request through a seller's operation of terminal units of financial institution and the provisional settlement money card 82 (IC card) received from the purchaser as shown in FIG. 50 and 51.

First, in step 3602, a final settlement request screen is displayed on the display 3002. In step 3604, the provisional settlement money card 82 inserted by the seller is accepted. In step 3606, information stored on the IC chip is read using the IC card reader/writer 3001.

If the information is correctly read in step 3608, then a payment ID, issue information, final settlement request information, and provisional settlement money information are written to the storage disk 3030 of the terminal unit 80' in step 3610. Then, in step 3612, the payment ID, issue information, final settlement request information, and provisional settlement money information are transmitted to the processing unit of the purchaser's financial institution 3 or the processing unit of the seller's financial institution 4. If it is confirmed that the transmission is normally performed in step 3614, then a process result is received from the processing unit of the information receiver's financial institution 3 or 4 in step 3618.

If the process result of the processing unit of the financial institution 3 or 4 is normal in step 3620, it is determined whether or not the corresponding provisional settlement money has accepted the final settlement admission in step 3622. If it is accepted, then the final settlement admission information is written to the storage disk 3030 in step 3624, and then written to the IC chip memory 3110 of the provisional settlement money card 82 using the IC card reader/writer 3001. After the final settlement request information and collection information are written to the storage disk 3030 in step 3626, they are written to the final settlement request information (final settlement request date and time 3116, final settlement request terminal unit information 3117) and the collection information (collection date and time 3118, collecting financial institution information 3119, collecting financial institution branch office information 3120, collecting terminal unit information 3121) in the IC chip memory 3110 using the IC card reader/writer 3001. If it is confirmed that a write to the IC chip has been normally performed in step 3628, then the received IC card is collected in the collected card storage box 3003 in step 3630, and the final settlement termination indication is displayed on the display 3002 in step 3632.

If the corresponding provisional settlement money has not accepted the final settlement admission in step 3622, then the final settlement request information is written to the storage disk 3030 in step 3636, and then it is written to the final settlement request information (final settlement request date and time 3116, final settlement request terminal unit information 3117) in the IC chip memory 3110 of the IC card using the IC card reader/writer 3001. If it is confirmed in step 3638 that a write to the IC chip has been normally performed, then a final settlement request acceptance message is displayed on the display 3002 in step 3640.

If a read from the IC chip is not normally performed in step 3608, if the transmission process is not normally performed in step 3614, if the process result is not correct in step 3620, and if a write to the IC chip is not normally performed in steps 3628 and 3638, then an error message is edited in step 3642, the message is displayed on the display 3002 in step 3644, and a provisional settlement money card is output in step 3646.

The deliverer's processing units (delivery management device) 6 and 7 are described below by referring to FIG. 52 and the subsequent figures. The above described fourth embodiment of the present invention includes the deliverer's processing unit 6 for delivering normal goods and the deliverer's processing unit 7 for delivering returned goods. Since these units can be designed to have the same configuration, the device having the function of both units is hereinafter referred to as a deliverer's processing unit 6'. The delivery management DB 60' of the deliverer's processing unit 6' has the functions of the delivery management DB 60 and the delivery management DB 70 to manage the normal delivery and the return of goods.

The deliverer's processing unit 6' has the following functions.

First, based on a goods delivery request from a seller (seller's processing unit 2), the deliverer's processing unit 6' stores goods delivery information. When goods are delivered to a receiver, the deliverer's processing unit 6' generates the third-party delivery certification information containing the receipt signature of a receiver or the substitute signature and a payment ID related to the goods purchase.

Second, based on the receiver's returned goods delivery request, the returned goods delivery information is stored and the first third-party return-of-goods certification information containing the receipt signature of the receiver who requests the return of goods or the signature of a substitute and a payment ID related to the goods purchase is generated.

Third, when returned goods are delivered to the seller, the second third-party return-of-goods certification information containing the receipt signature of the seller and a payment ID related to the goods purchase is generated.

Fourth, returned goods delivery acceptance receipt certification containing a payment ID related to the goods purchase is issued to the receiver.

Fifth, the third-party delivery certification information containing the receipt signature of a receiver and a payment ID related to the goods purchase is notified after delivery of goods to the seller.

Sixth, when the transaction management device 5 mediates, the above described third-party delivery certification information, the first and second third-party return-of-goods certification information are entered in the transaction management device 5.

Figure 52:
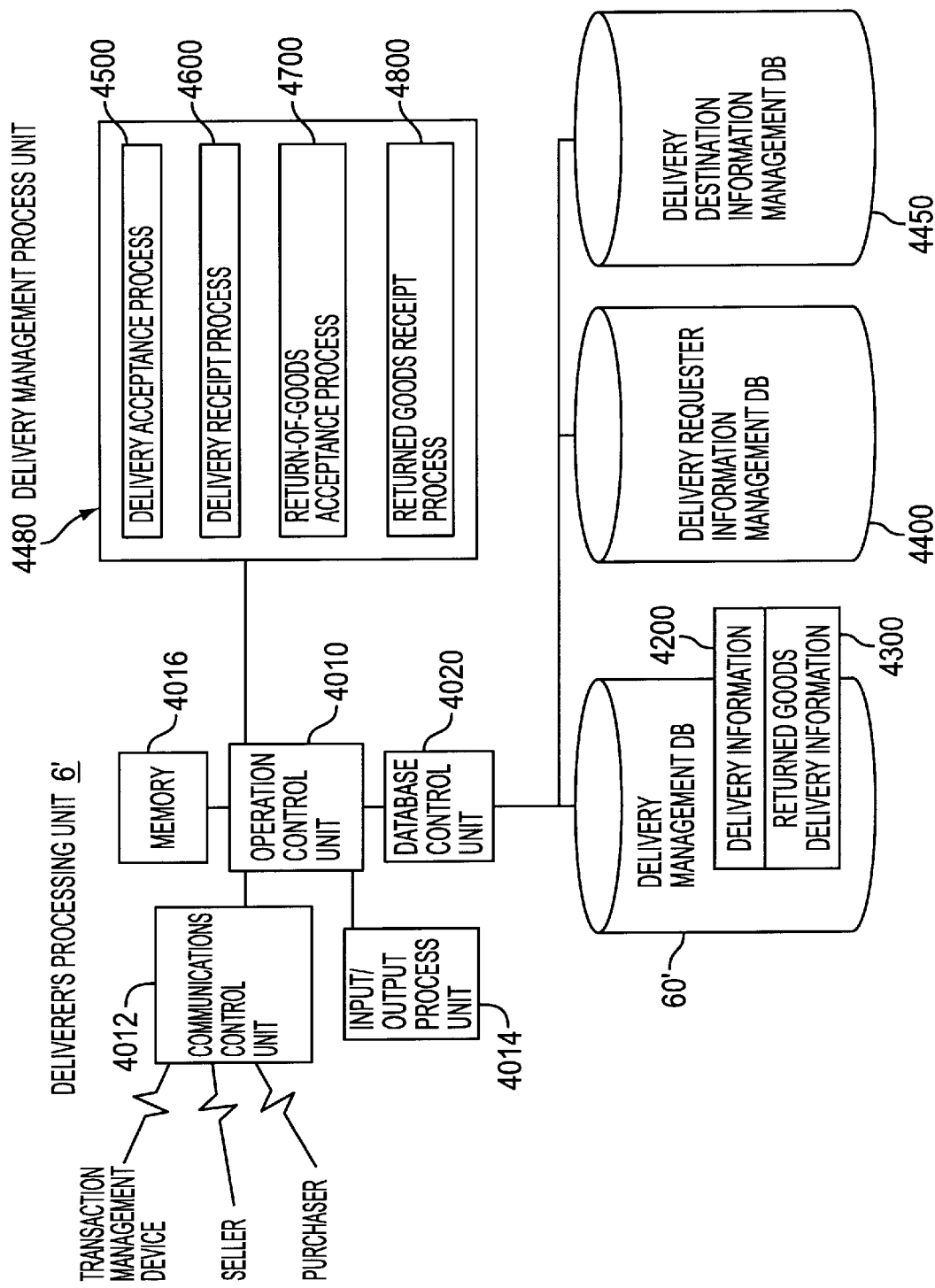
FIG. 52 shows the general configuration according to an embodiment of the deliverer process unit.

To attain the above described functions, the deliverer's processing unit 6' comprises an operation control unit 4010 for controlling the entire system; a communications control unit 4012 for line-connection to each of the units 1, 2, 3, 4, and 5; a database control unit 4020 for controlling each database; a delivery management process unit 4480; an input/output process unit 4014; and memory 4016 as shown in FIG. 52.

The database control unit 4020 manages the delivery management DB 60' containing delivery information 4200 and returned goods delivery information 4300, a delivery requester information management DB 4400, and a delivery destination information management DB 4450.

A delivery management process unit 4480 comprises a delivery acceptance process 4500, a delivery receipt process 4600, a return-of-goods acceptance process 4700, and a returned goods receipt process 4800.

Next, each database managed by the database control unit 4020 is described below by referring to FIGS. 53A and 53B.

As shown in FIG. 52, the delivery management DB 60 comprises the delivery information 4200 and the returned goods delivery information 4300. The delivery information 4200 contains, as shown in FIG. 53A, a delivery ID 4210 which is basic information for use in managing the delivery by a deliverer; delivery details 4211; a payment ID 4220 which is a key to the purchase of goods through the communications among persons such as a seller, a purchaser, etc. involved in the purchase of goods; delivery requester information 4230 and authentication of the requester 4231; delivery destination receipt information 4240 and authentication of the destination 4241; deliverer authentication 4250; a site monitor term 4260 for goods receipt confirmation; a discrimination as to whether or not a notification that goods have been delivered to a receiver has been given to a delivery requester upon delivery of the goods to the receiver, and a notification date and time 4270; and a discrimination as to whether or not an entry has been made in the transaction management device 5, and an entry date and time 4280. The core information of the third-party delivery certification corresponds to the delivery destination receipt information 4240 and authentication of the destination 4241, and the deliverer authentication 4250.

Figure 53A:
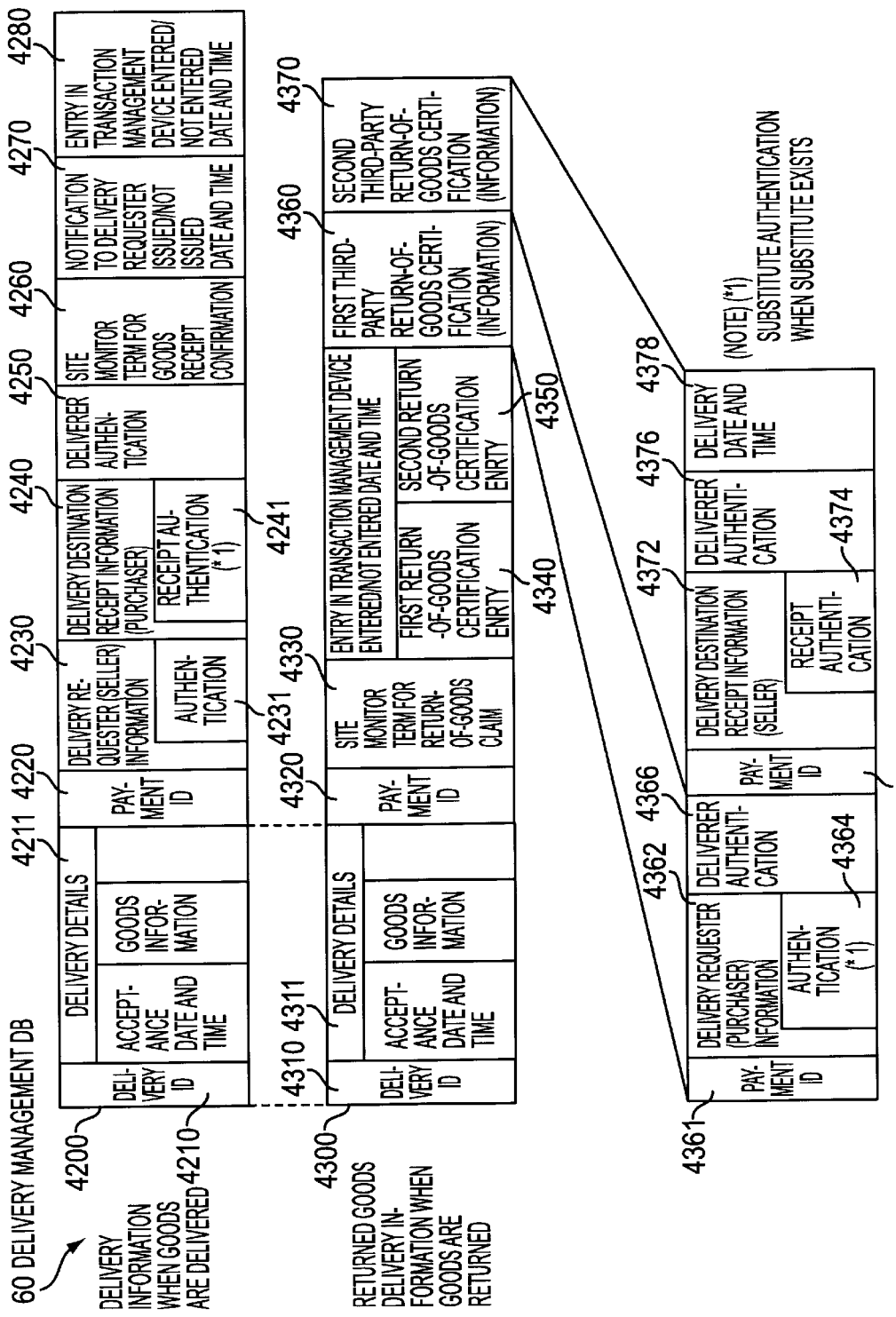
FIG. 53A shows the configuration of the delivery management database.

The returned goods delivery information 4300 contains information 4310, 4311, and 4320 similar to the delivery information 4200; a site monitor term 4330 for a return-of-goods claim; a discrimination as to whether or not an entry has been made in the transaction management device 5 and an entry date and time 4340 and 4350; and first and second return-of-goods certification information 4360 and 4370 as shown in FIG. 53A.

The discrimination as to whether or not an entry has been made in the transaction management device 5 and the date and time information are represented by two types of information, that is, the first return-of-goods certification entry 4340 and the second return-of-goods certification entry 4350. The first return-of-goods certification entry 4340 indicates whether or not the first return-of-goods certification information 4360 has been entered in the transaction management device 5, and the second return-of-goods certification entry 4350 indicates whether or not the second return-of-goods certification information 4370 has been entered in the transaction management device 5. The first return-of-goods certification information 4360 contains a payment ID 4361, delivery requester information 4362 and authentication of the requester 4364, and deliverer authentication 4366. The second return-of-goods certification information 4370 contains a payment ID 4371, delivery destination receipt information 4372 and authentication of the destination 4374, deliverer authentication 4376, and a delivery date and time 4378.

The authentication 4241 in the delivery information 4200 and the authentication 4364 in the returned goods delivery information 4300 can be authentication of a substitute.

Figure 53B:
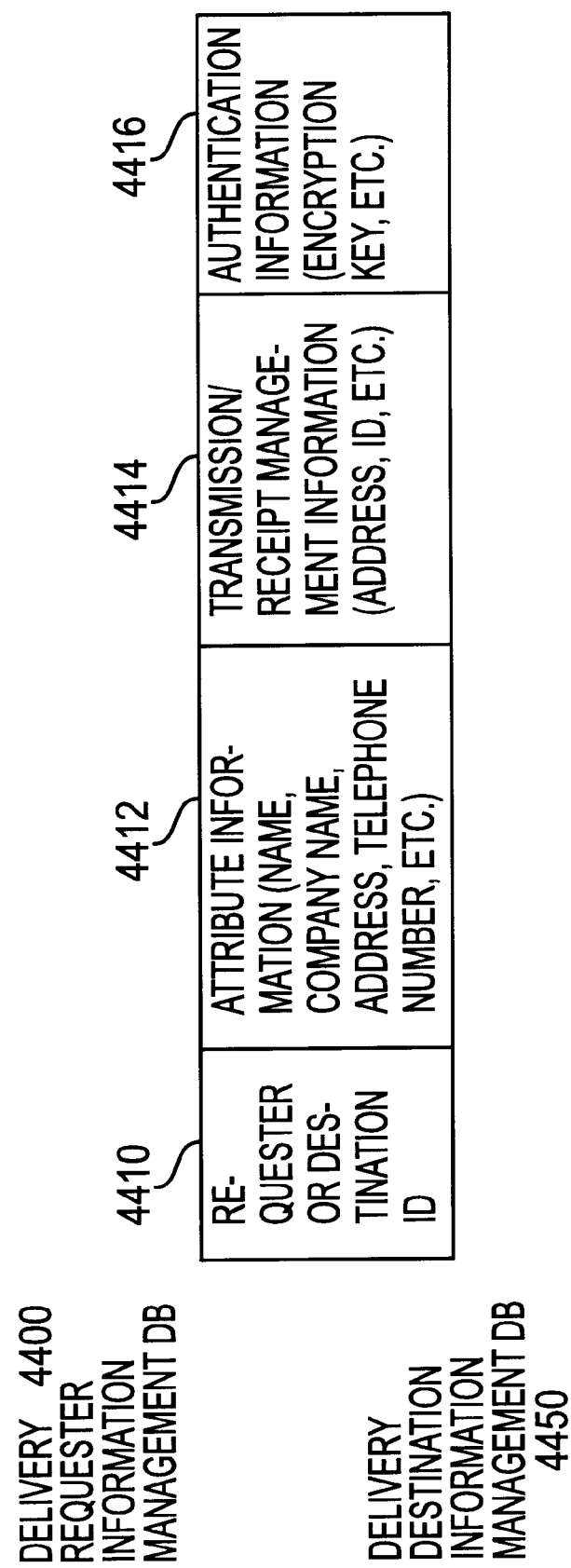
FIG. 53B shows the configuration of the delivery requester information management database and the delivery destination information management database.

As shown in FIG. 53B, the contents of the delivery requester information management DB 4400 are almost the same as the contents of the delivery destination information management DB 4450, and contain the requester or destination ID 4410, attribute information (name, address, telephone number, etc.) 4412, transmission/receipt management information (address, ID, etc.) 4414, and authentication information (encryption key, etc.) 4416.

Each of the processes of the delivery management process unit 4480 is described below by referring to FIG. 54 and the subsequent figures.

Figure 54:
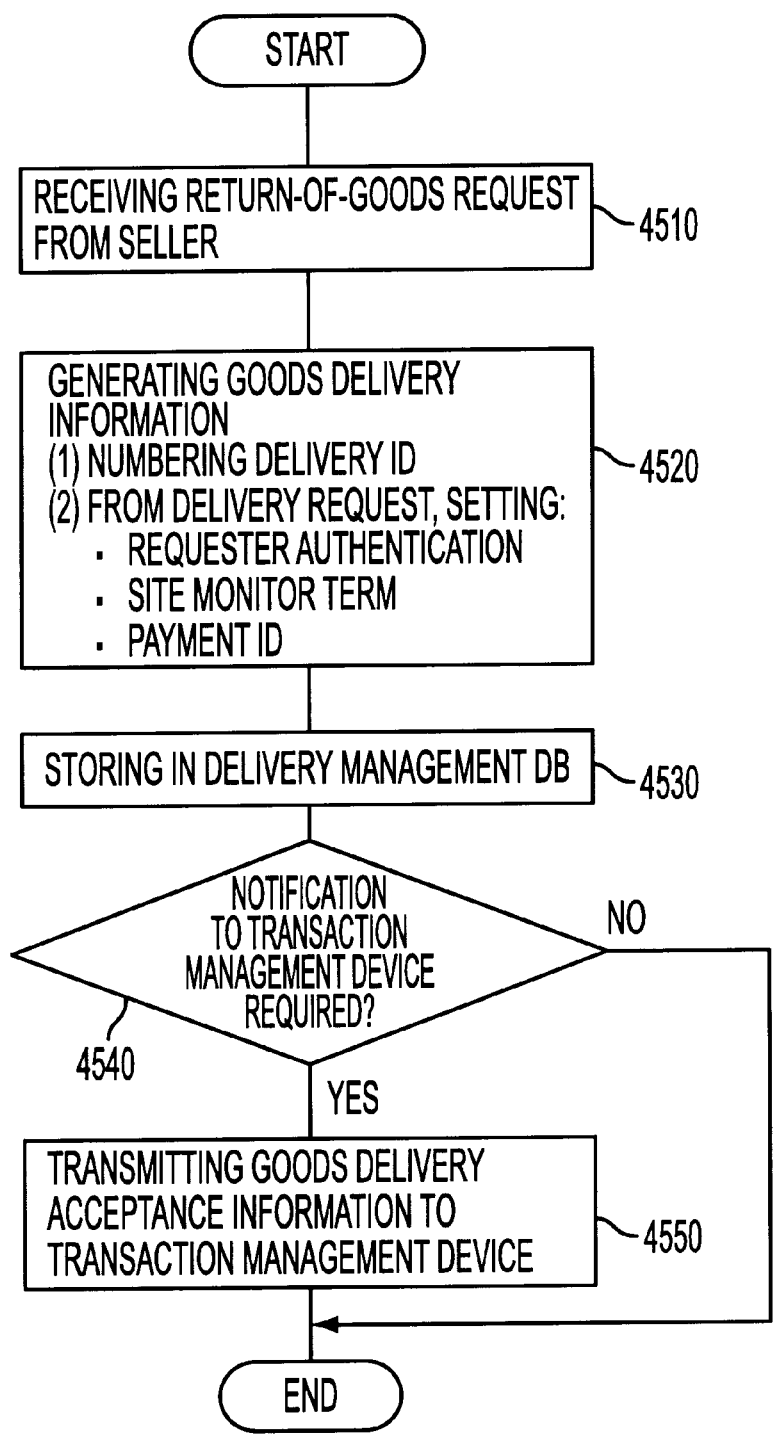
FIG. 54 is a flowchart showing the procedure of the delivery acceptance process.

FIG. 54 shows the process flow of the delivery acceptance process 4500. The delivery acceptance process 4500 accepts a delivery request from a seller in step 4510, generates delivery information 4200 in steps 4520 and 4530, and stores it in the delivery management DB 60'. The stored contents include the payment ID 4220 received from the seller, the delivery requester (that is, a seller) information 4230 and authentication of the requester 4231, and the site monitor term 4260 for goods receipt confirmation. If the transaction management device 5 mediates, it is notified of the information (step 4550).

Figure 55:
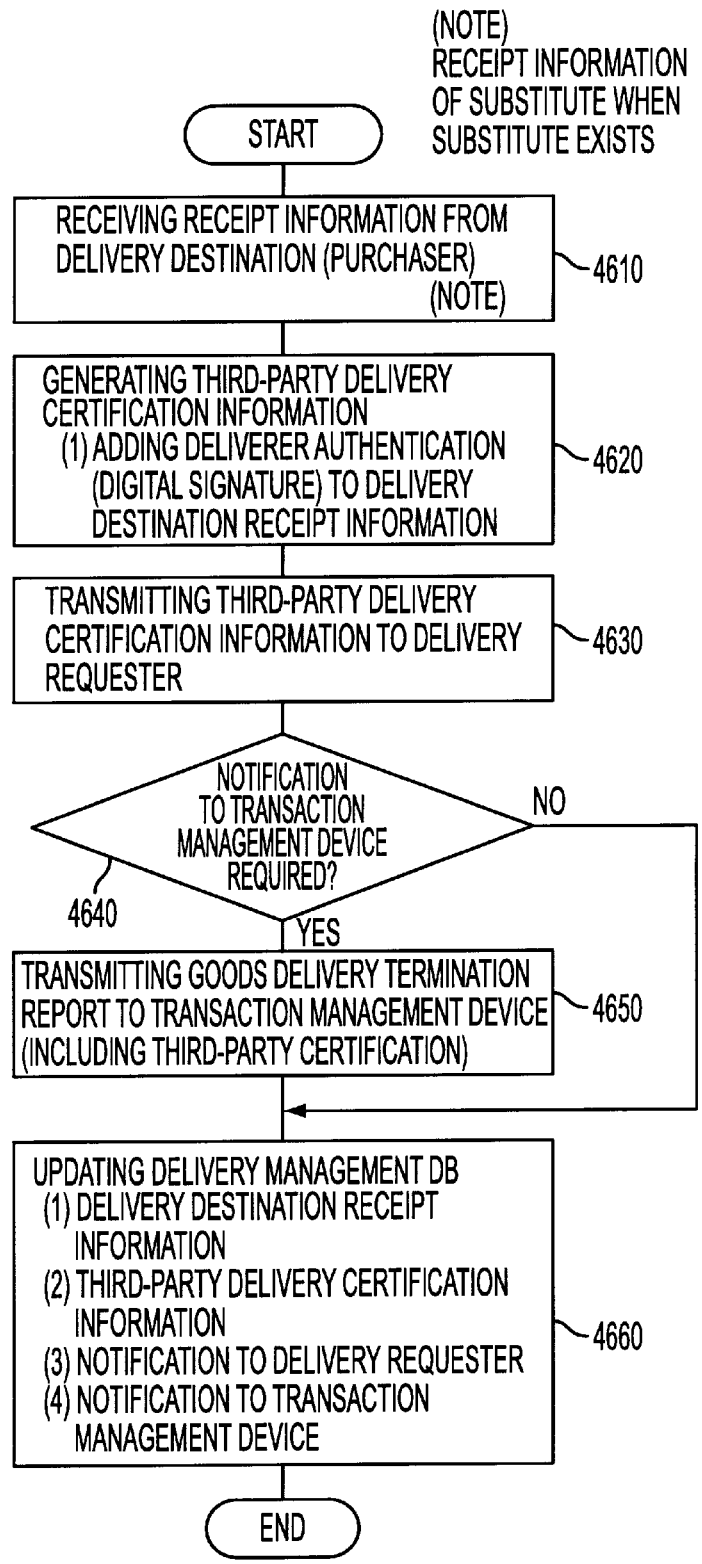
FIG. 55 is a flowchart showing the procedure of the delivery receipt process.

FIG. 55 shows the process flow of the delivery receipt process 4600. First, the goods receipt certification information is received from the delivery destination in step 4610. If the receiver is absent, the authentication of a substitute (member of the family, etc.) can be accepted if the substitute can show his or her identity. Then, in step 4620, third-party delivery certification information is generated. The third-party delivery certification information is obtained by adding the deliverer authentication 4250 to the delivery destination receipt information 4240 and authentication 4241 stored in the delivery information 4200 in the delivery management DB 60'. In step 4630, the third-party delivery certification information is given to the delivery requester. If the transaction management device 5 mediates, the transaction management device 5 is notified of this information (step 4650). Then, the delivery destination receipt information 4240 and authentication 4241 in the delivery information 4200 in the delivery management DB 60', the deliverer authentication 4250, the discrimination as to whether or not the notification to the delivery requester has been made and the notification date and time 4270, and the discrimination as to whether or not an entry has been made in the transaction management device 5, and the entry date and time 4280 are updated (step 4660).

The above described process has the following functions. That is, in response to the goods delivery request from the seller, goods delivery information is stored. When the goods are delivered to a receiver, the third-party delivery certification information containing the receiver's reception signature or a substitute's signature, and a payment ID related to the goods purchase is generated. The third-party delivery certification information containing the payment ID related to the goods purchase is entered in the transaction management device. Furthermore, the seller is informed of the third-party delivery certification information containing the receiver's receipt signature and the payment ID related to the goods purchase after the delivery of the goods.

Figure 56:
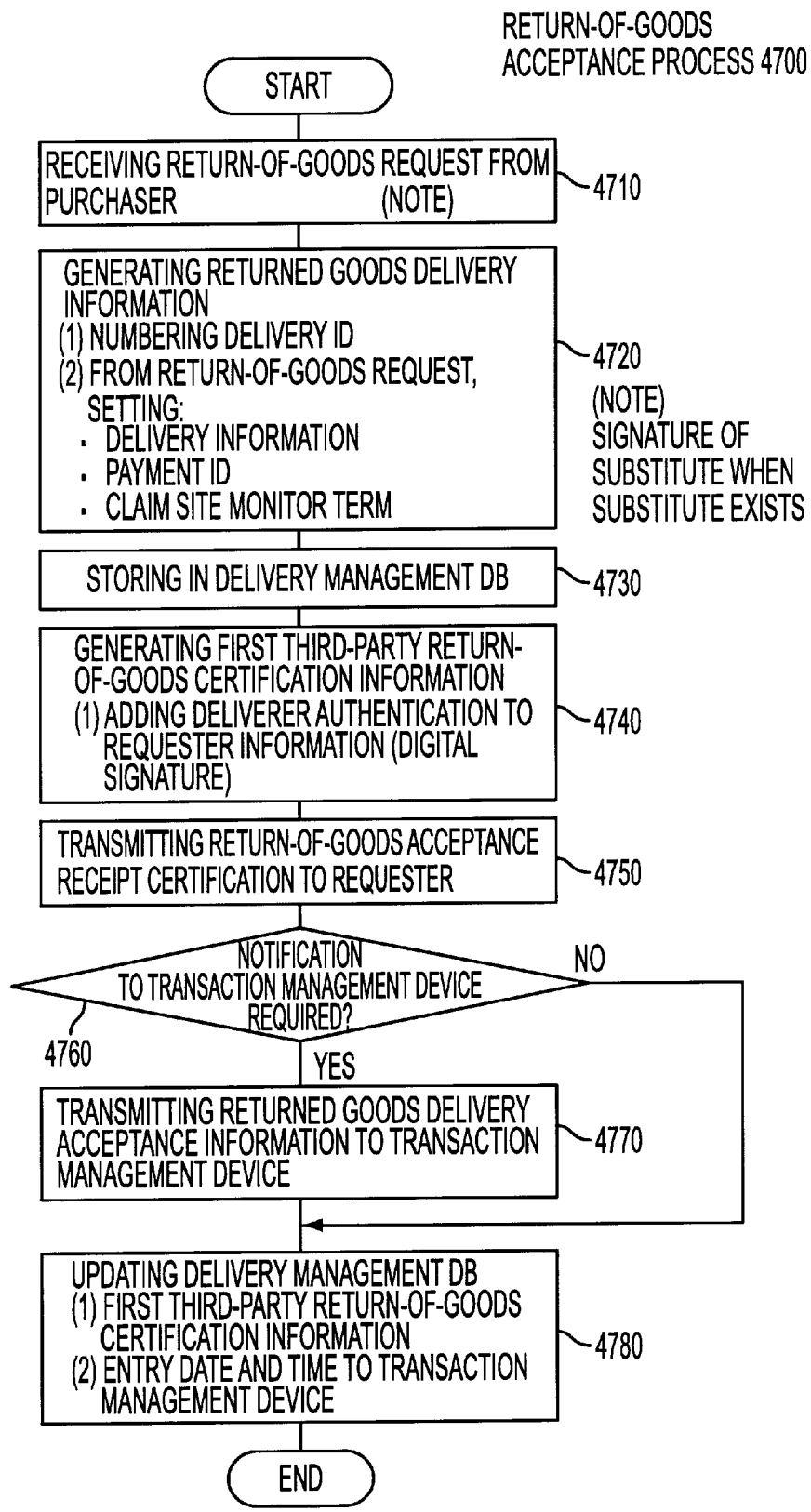
FIG. 56 is a flowchart showing the procedure of the return-of-goods acceptance process.

Then, the return-of-goods acceptance process 4700 is described by referring to the process flow shown in FIG. 56.

The return-of-goods acceptance process 4700 starts when a request is received from a goods receiver (purchaser or a person specified by the purchaser) or a substitute for the goods receiver. However, if the substitute issues a request, the substitute has to show his or her identity. First in the return-of-goods acceptance process 4700, a returned goods delivery request is received in step 4710. The returned goods delivery information 4300 is generated in step 4720, and stored in the delivery management DB 60' in step 4730. The stored contents are the payment ID 4320 received from the receiver, the delivery requester information 4362 and authentication of the requester 4364, and the site monitor term 4330 for a return-of-goods claim. Then, in step 4740, the first third-party return-of-goods certification information is generated. This information is obtained by adding the deliverer authentication 4366 to the delivery requester information 4362 and authentication 4364. It is issued to a delivery requester as a receipt certification from the deliverer (step 4750). If the transaction management device 5 mediates, the transaction management device 5 is notified of this information (step 4770). Then, in step 4780, the first return-of-goods certification information 4360 and the first return-of-goods certification entry 4340 in the returned goods delivery information 4300 in the delivery management DB 60' are updated.

The above described process has the following functions. That is, the returned goods delivery information is stored at a returned goods delivery request from a goods receiver, and the first third-party return-of-goods certification information containing the signature of a receiver who issues a return-of-goods request or the signature of a substitute, and a payment ID related to the purchase of goods is generated. The third-party return-of-goods certification information containing the payment ID related to the purchase of goods is entered in the transaction management device. Furthermore, returned goods delivery acceptance receipt certification containing the payment ID related to the purchase of goods is issued to the receiver.

Figure 57:
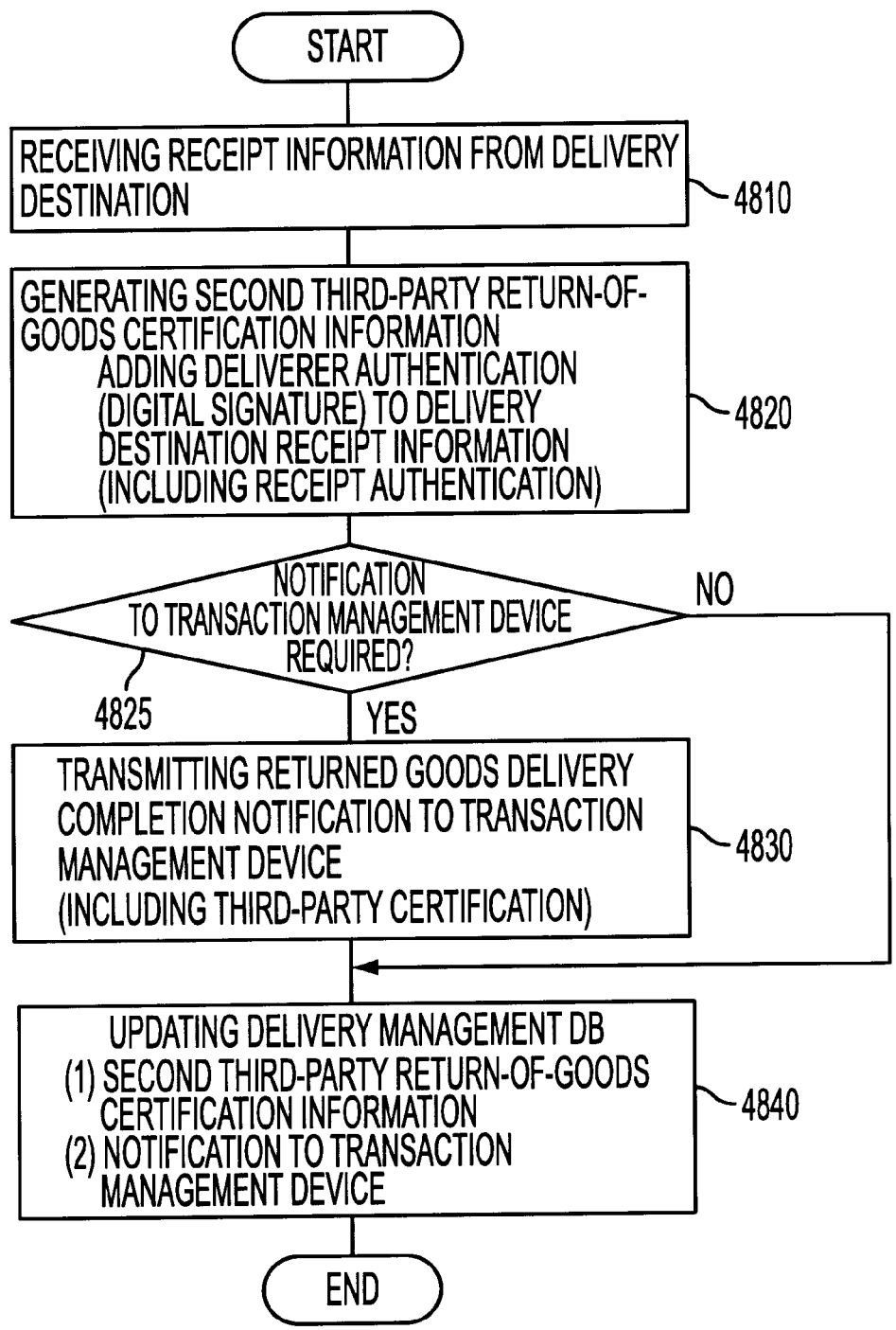
FIG. 57 is a flowchart showing the procedure of the returned goods receipt process.

Next, the returned goods receipt process 4800 is described by referring to the process flow shown in FIG. 57.

When a deliverer is requested by a purchaser to deliver returned good, the deliverer delivers goods to be returned to the delivery destination, that is, the seller of the goods. In the returned-goods receipt process 4800, in step 4810, returned goods acceptance certification is received from the seller. In response to the certification, the second return-of-goods certification information is generated in step 4820. This information is obtained by adding the deliverer authentication 4376 and the delivery date and time 4378 to the delivery destination receipt information 4372 in the returned goods delivery information 4300 in the delivery management DB 60' and authentication 4374. If the transaction management device 5 mediates, the transaction management device 5 is notified of this information (step 4830). Then, in step 4840, the second third-party return-of-goods certification 4370, the second return-of-goods certification entry 4350, and the site monitor term 4330 for the return-of-goods claim in the returned goods delivery information 4300 in the delivery management DB 60' are updated. The site monitor term 4330 is determined at arrival of returned goods.

The above described process has the following functions. That is, when returned goods are delivered to a seller, the second third-party return-of-goods certification information containing the receipt signature of the seller and a payment ID related to the purchase of goods is generated, and the second third-party return-of-goods certification information containing the payment ID related to the purchase of goods is entered in the transaction management device.

Next, the processing unit at the purchaser's or the seller's financial institution 3 and 4 are described below. The processing unit at the financial institution 3' corresponds to the processing unit at the purchaser's financial institution 3 or the processing unit at the seller's financial institution 4.

The processing unit at the financial institution 3' is provided in a financial institution for issuing provisional settlement money to a purchaser, admitting final settlement, canceling provisional settlement, issuing final settlement request from a seller, making payment based on the contents of a request for receipt of transfer, canceling transfer provisional settlement, monitoring provisional settlement cancellation site according to return-of-goods, etc., and has the following functions.

First, a provisional settlement money issue request is accepted from the purchaser and provisional settlement money is issued.

Second, a final settlement request is accepted from the seller after receipt of the provisional settlement money.

Third, a final settlement admission request is accepted from the purchaser after receipt of the goods. A payment process is performed for the seller according to request information for receipt of transfer included in the final settlement request. If the final settlement request is not accepted from the seller, then the final settlement request is demanded.

Fourth, a provisional settlement cancellation request according to returned goods can be accepted from the purchaser.

Fifth, when the purchaser requests return-of-goods to a deliverer, the first third-party return-of-goods certification can be accepted from the deliverer.

Sixth, when the deliverer transmits returned goods to the seller, the second third-party return-of-goods certification is accepted from the transaction management device 5.

Seventh, when the returned goods are somewhat defective, then a return-of-goods claim can be accepted from a seller.

Eighth, when goods are successfully returned, a returned goods receipt notification is accepted from the seller.

Ninth, when the purchaser performs a return-of-goods process, the provisional settlement cancellation site is monitored.

Figure 58:
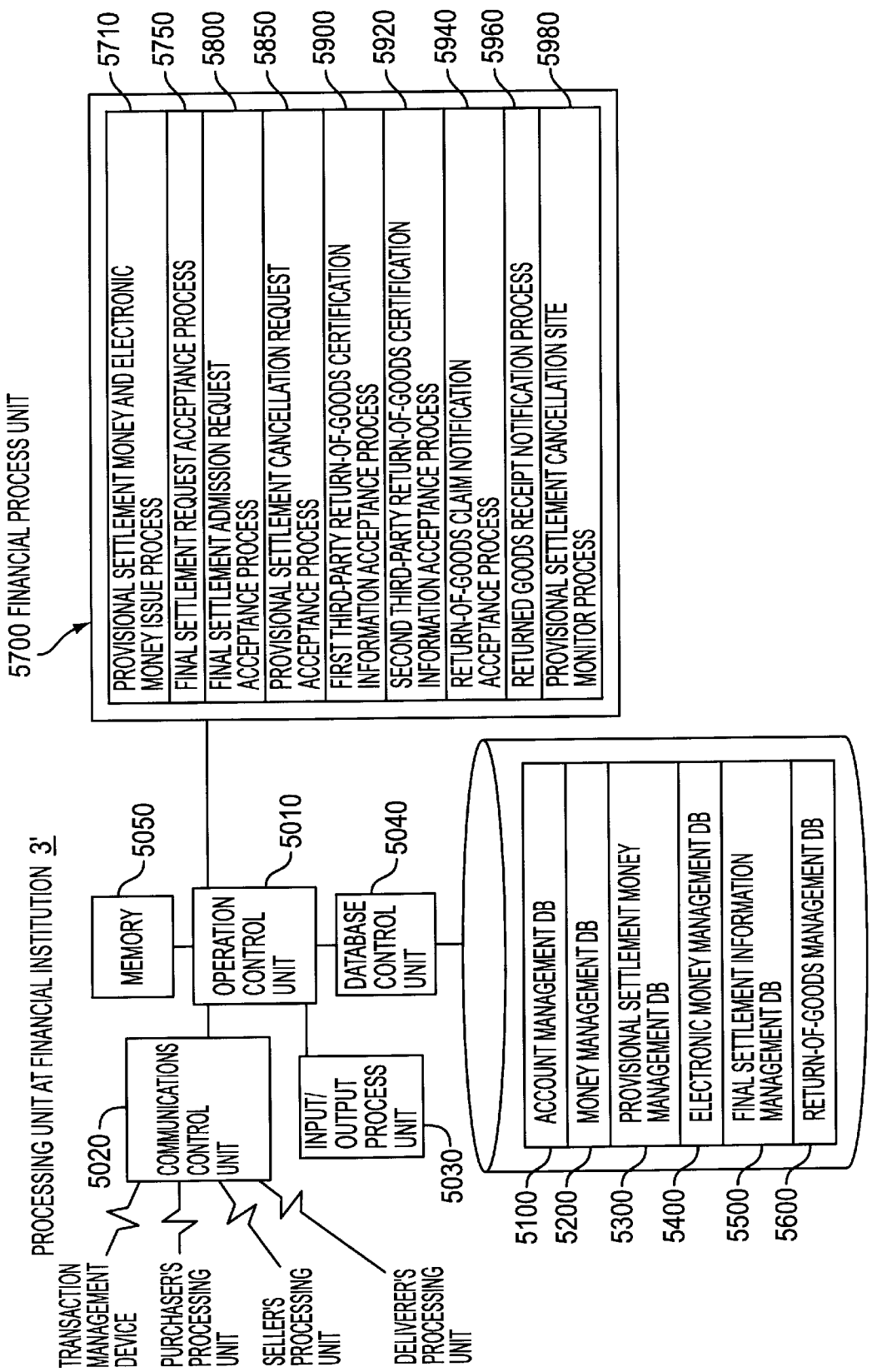
FIG. 58 shows the general configuration according to an embodiment of the financial institution processing unit.

To attain the above described functions, the processing unit at the financial institution 3' is designed as shown in FIG. 58. That is, the processing unit at the financial institution 3' comprises an operation control unit 5010 for controlling the entire system; a communications control unit 5020 for line-connection to each of the units 1, 2, 5, 6, and 7 to or from which information is transmitted or received; a database control unit 5040 for controlling each database; a financial process unit 5700 for performing each of the functions of the processing unit at the financial institution 3'; an input/output process unit 5030; and memory 5050.

The database control unit 5040 comprises an account management DB 5100, a money management DB 5200, a provisional settlement money management DB 5300, an electronic money management DB 5400, a final settlement information management DB 5500, and return-of-goods management DB 5600 as shown in FIG. 58.

The financial process unit 5700 comprises a provisional settlement money and electronic money issue process 5710, a final settlement request acceptance process 5750, a final settlement admission request acceptance process 5800, a provisional settlement cancellation request acceptance process 5850, a first third-party return-of-goods certification information acceptance process 5900, a second third-party return-of-goods certification information acceptance process 5920, a return-of-goods claim notification acceptance process 5940, a returned goods receipt notification acceptance process 5960, and a provisional settlement cancellation site monitor process 5980.

Figure 59:
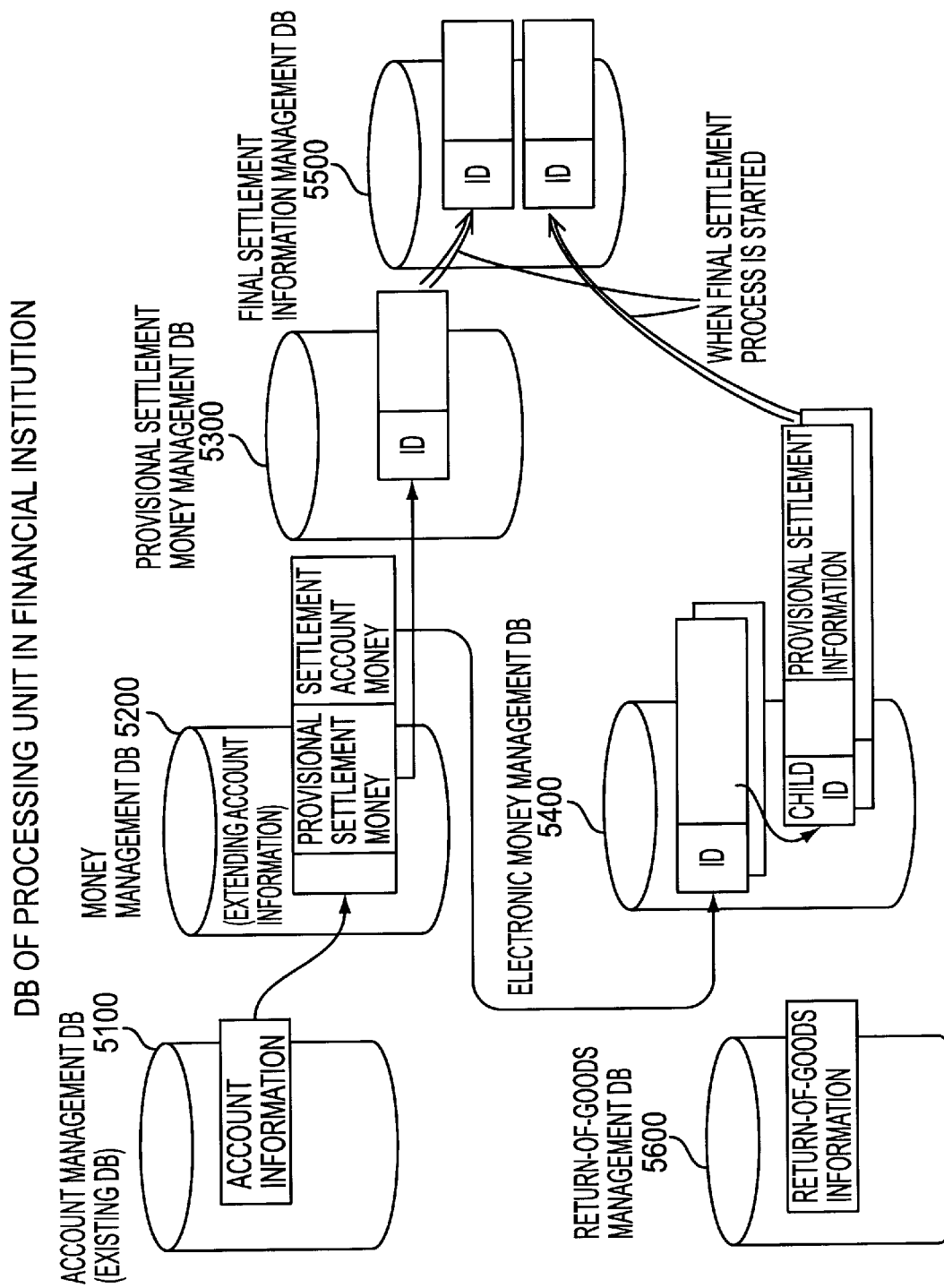
FIG. 59 shows the configuration of the databases of the financial institution processing unit.

FIG. 59 shows the concept of the configuration of each database managed by the database control unit 5040.

As shown in FIG. 59, the account information of a purchaser is managed in the account management DB 5100. The account information is linked to the money management DB 5200, and the issue state of the provisional settlement money and the settlement account money is managed in the money management DB 5200. The provisional settlement money and electronic money referred to through the information in DB 5200 are stored in the provisional settlement money management DB 5300 and the electronic money management DB 5400. The final settlement state of the provisional settlement money or electronic money stored in the DBs 5300 and 5400 is managed and stored in the final settlement information management DB 5500. The purchaser's return-of-goods state is managed in the return-of-goods management DB 5600.

Each of the databases is described in detail by referring to FIGS. 60A, 60B, 60C, 60D, 60E, and 61.

Figure 60A:
FIG. 60A shows the configuration of the account management database.

As shown in FIG. 60A, the account management DB 5100 is used for management of the purchasers' existing account information, and generated using an account number 5101 as a key. An account information 5102 contains personal information 5103 including the address, name, and phone number, etc. of a purchaser and is used to confirm the purchaser. An account balance 5104 represents the balance of the account+balance of creditable amount−balance of used credit.

Figure 60B:
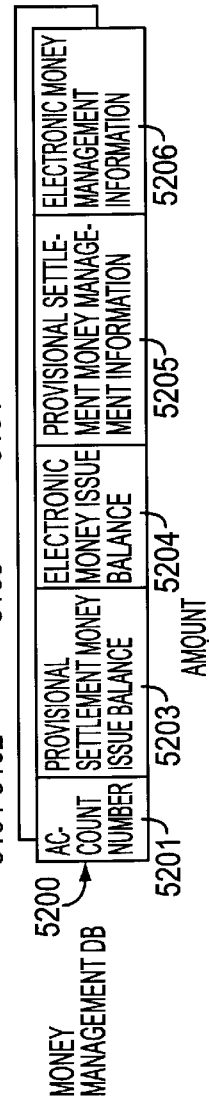
FIG. 60B shows the configuration of the money management database.

The money management DB 5200 is generated using an account number 5201 as a key as shown in FIG. 60B, and is linked to the account management DB 5100. Each time a purchaser issues provisional settlement money and electronic money (after adding goods purchase information), a provisional settlement money issue balance 5203 and electronic money issue balance 5204 are updated to manage the issuable limit amount. Assuming that the account balance 5104 is a, the provisional settlement money issue balance 5203 is b, and the electronic money issue balance 5204 is c, $a \geq b+c$ holds. Provisional settlement money management information 5205 contains the link information to the provisional settlement money management DB 5300, and electronic money management information 5206 contains the link information to the electronic money management DB 5400.

Figure 60C:
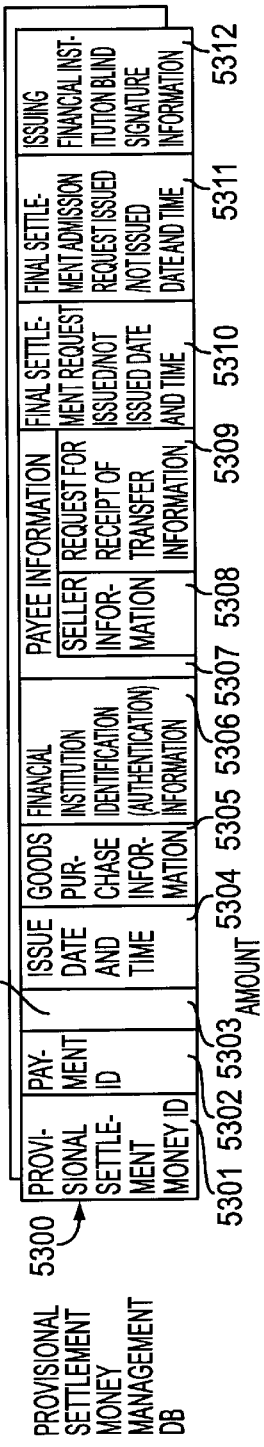
FIG. 60C shows the configuration of the provisional settlement money management database.

FIG. 60C shows the provisional settlement money management DB 5300. The provisional settlement money management DB 5300 stores the provisional settlement money issued to a purchaser. That is, as shown in FIG. 60C, the provisional settlement money contains a provisional settlement money ID 5301, a payment ID 5302, an amount 5303, an issue date and time 5304, a goods purchase information 5305, financial institution identification (authentication) information 5306, payee information 5307, a discrimination as to whether or not a final settlement request has been issued by a seller and its date and time 5310, a discrimination as to whether or not a final settlement admission request has been issued by a purchaser and its date and time 5311, and issuing financial institution blind signature information 5312. In the provisional settlement money, the goods purchase information 5305 contains purchase goods information, number X of days for adjustment (X=average number of days for delivery+number of days for return-of-goods claim acceptance+number of additional days for allowance), and number Y of days for adjustment (Y=number of days for return-of-goods claim acceptance). The payee information 5307 contains seller information 5308 including the address, name, phone number, etc. of the seller, and request for receipt of transfer information 5309 such as a payee (seller), payment method, etc.

Figure 60D:
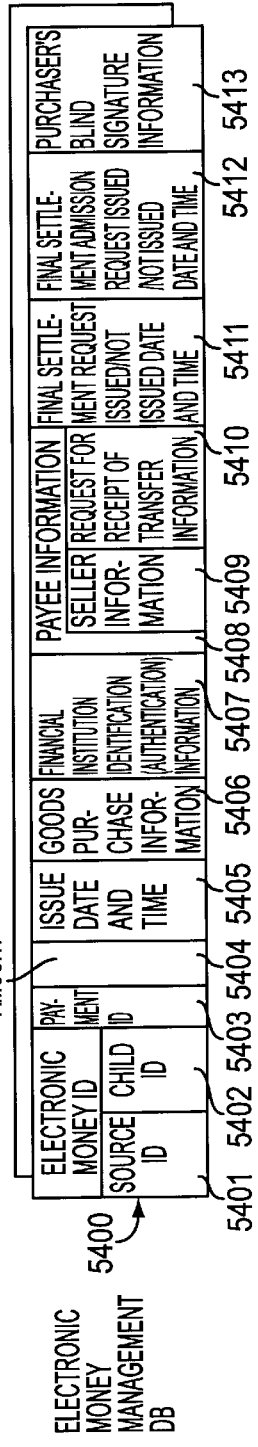
FIG. 60D shows the configuration of the electronic money management database.

FIG. 60D shows the electronic money management DB 5400. The electronic money stored in the electronic money management DB 5400 is preliminarily issued to a purchaser so that the purchaser can add goods purchase information to it. After it is paid to the seller, the seller issues a final settlement request. Most of the items in the electronic money management DB 5400, that is, items 5403, 5404, 5405, 5406, 5407, 5408, 5409, 5410, 5411, and 5412 are based on the money management DB 5200. However, it is different from the money management DB 5200 in that the electronic money ID can be a source ID 5401 and an additional child ID 5402, and contains blind signature information 5413.

Figure 60E:
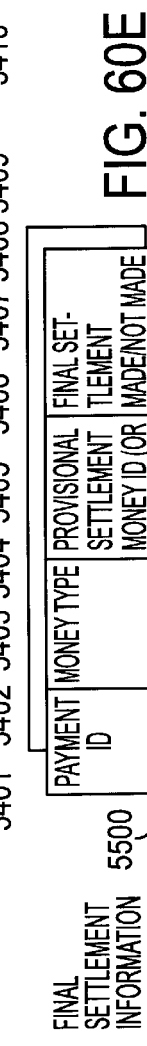
FIG. 60E shows the configuration of the final settlement information management database.

FIG. 60E shows the final settlement information management DB 5500. The record stored in the final settlement information management DB 5500 is generated when a final settlement admission from a purchaser or a final settlement request from a seller is received, and the final settlement request for the money information containing the provisional settlement information is issued to a financial institution. The generated record is used in the subsequent management. The final settlement information management DB 5500 is generated using a payment ID 5501 as a key, and contains a money type 5502 indicating either the settlement account money or the provisional settlement money; a provisional settlement money ID or an electronic money ID 5503; and a discrimination as to whether or not a final settlement has been made and its date and time 5504.

Next, the return-of-goods management DB 5600 is described below by referring to FIG. 61. The return-of-goods management DB 5600 is generated when a provisional settlement cancellation request with the first third-party return-of-goods certification is received from a purchaser of goods, and the generated database is used in the subsequent management. The return-of-goods management DB 5600 is generated using a payment ID 5601 as a key, and comprises a return-of-goods management information 5602 for use in managing the information about a deliverer who receives a return-of-goods request from the purchaser, a return-of-goods request date and time, etc.; a money type 5603 (either settlement account money or provisional settlement money); a provisional settlement money ID or a electronic money ID 5604; a provisional settlement cancellation request date and time and authentication 5605; a provisional settlement cancellation request date and time and authentication 5605; a delivery ID 5606; a number of days for adjustment 5607 required for site monitor of final settlement after delivery of goods to a purchaser and provisional settlement cancellation in a return-of-goods process; a return-of-goods claim information date and time and authentication 5608; a returned goods delivery completion notification date and time and authentication 5609; and a return-of-goods admission notification date and time and authentication 5610.

Next, each of the processes 5710 through 5980 contained in the banking process unit 5700 are described below by referring to FIGS. 62 through 70.

Figure 62:
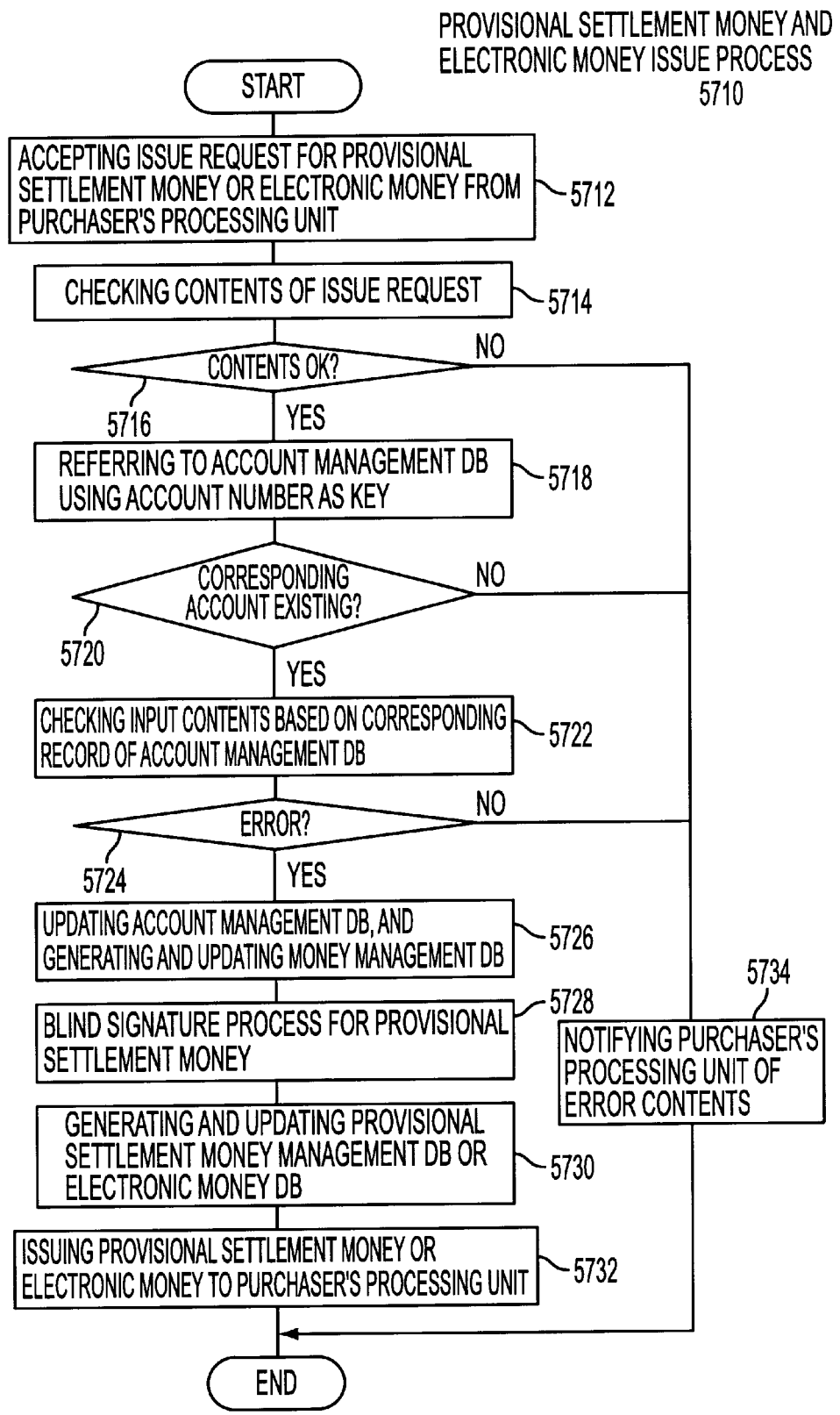
FIG. 62 is a flowchart showing the procedure of the provisional settlement money/electronic money issue process.

FIG. 62 is a flowchart showing the provisional settlement money and electronic money issue process 5710. First, in the provisional settlement money and electronic money issue process 5710, a provisional settlement money or electronic money issue request is received from the purchaser's processing unit 1 (step 5712). Then, based on the protocol of a provisional settlement money and electronic money issue request, the format is checked, the number of digits and the item type of each item are checked for attribute, whether or not the personal identity confirmation information is input is checked, and the financial institution identifier is checked for validity (steps 5714 and 5716). If the check result is NG, the purchaser's processing unit 1 is informed of an error (step 5734). If it is normal, the account management DB 5100 is continuously accessed based on the account number contained in the request (steps 5718 and 5720).

If there are no account records as a result of the access to the account management DB 5100, then the purchaser's processing unit 1 is informed of the error (step 5734). If there is an account record, then the confirmation information of the contents of the provisional settlement money or the electronic money issue request is compared with the personal information in the account information entered in the record so that the validity of the purchaser is checked.

Furthermore, the issue amount of the provisional settlement money or electronic money issue request is compared with the balance in the record and credit information, and it is checked whether the balance+creditable amount−used credit amount is larger or smaller than the issue amount (steps 5722 and 5724). If an error occurs in the check process, the purchaser's processing unit 1 is notified of the contents of the error (step 5734). If the result of a check is normal, then the issue amount is subtracted from the balance of the account record, the balance (including the amount of used credit amount) is updated, and the corresponding account record in the account management DB 5100 is overwritten.

Furthermore, the money management DB 5200 is accessed using the account number. If the issued money type is the provisional settlement money, then the issue amount is added to the provisional settlement money issue balance, the number of issued pieces as the provisional settlement money management information is updated, and the provisional settlement money IDs for the number of issue requests are newly numbered and stored additionally. If the money type is the settlement account money, then the issue amount is added to the electronic money issue balance, the number of issued pieces is updated as electronic money management information, and the electronic money IDs for the number of issue requests are newly numbered and stored additionally. If there is no money management DB 5200, then the DB is generated (STORE). If the money management DB 5200 exists, it is rewritten (step 5726).

If the type of issued money is provisional settlement money, then the provisional settlement money management DB 5300 is generated by storing a provisional settlement money ID, an issue amount, an issue date and time, issuing financial institution identification (authentication) information, etc. in a record for each of the newly numbered provisional settlement money IDs. If the provisional settlement money requires the use management, then goods purchase information and payee information are added to the record and stored therein. A blind signature is generated for important items in the goods purchase information and payee information and stored therein (step 5728). If the type of money is settlement account money, a record containing necessary information is generated similarly.

Then, the generated contents are stored as the provisional settlement money management DB 5300 or the electronic money management DB 5400 (step 5730).

Finally, the provisional settlement money or electronic money is generated based on the record generated in the money management DB 5200 and the provisional settlement money management DB 5300 or the electronic money management DB 5400, and is then transmitted to the purchaser's processing unit 1 (step 5732).

Figure 63:
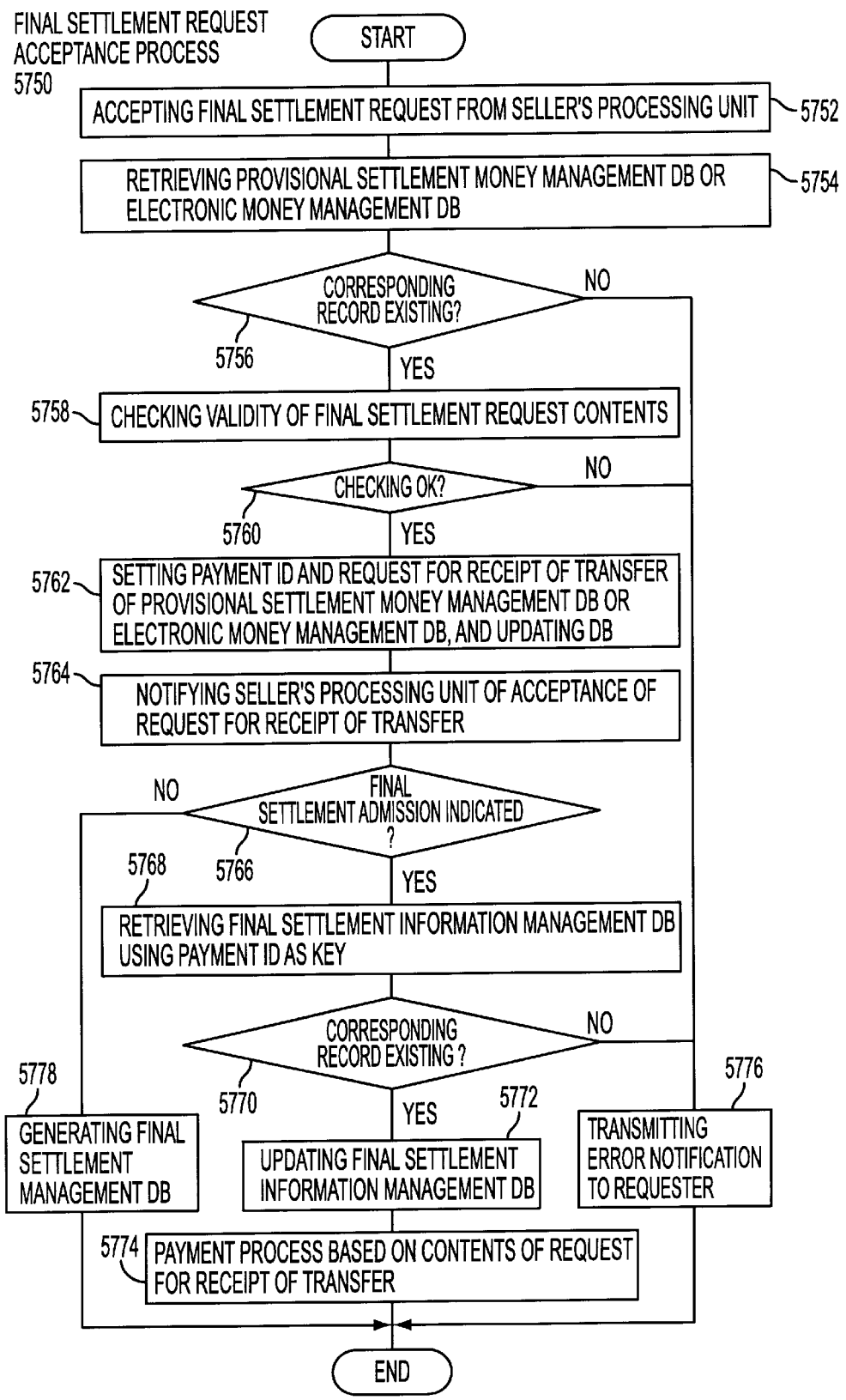
FIG. 63 is a flowchart showing the procedure of the final settlement request acceptance process.

FIG. 63 is a flowchart showing the process of the final settlement request acceptance process 5750. First, in step 5752, the final settlement request acceptance process 5750 accepts a final settlement request from the seller's processing unit 2.

Next, in the processes in steps 5754 through 5778, the contents of a final settlement request is checked for validity, and the request for receipt of transfer information contained in the final settlement request is set in the provisional settlement money management DB 5300 or the electronic money management DB 5400. If no payment ID is set, the payment ID in the final settlement request is set and the DB is updated.

If a final settlement admission request has been accepted already, the correlation check is made in the final settlement information management DB 5500. If the check result is normal, the final settlement information management DB 5500 is updated and a payment process is performed based on the contents of the request for receipt of transfer in the provisional settlement money management DB 5300 or the electronic money management DB 5400. If a final settlement admission request has not been issued, the final settlement information is set as 'not made' and the final settlement information management DB 5500 is generated.

Figure 64:
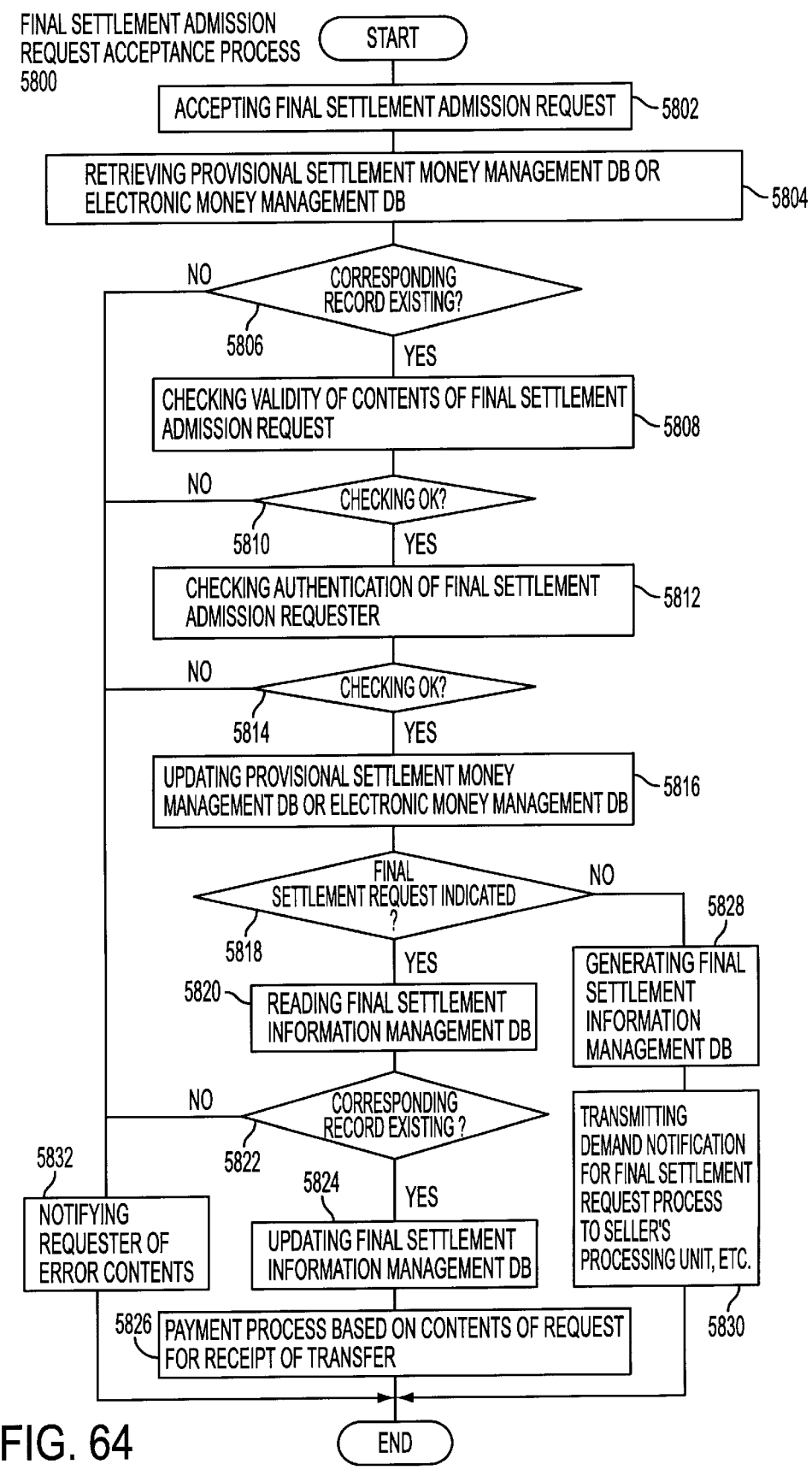
FIG. 64 is a flowchart showing the procedure of the final settlement admission request acceptance process.

FIG. 64 is a flowchart showing the final settlement admission request acceptance process 5800. The final settlement admission request acceptance process 5800 accepts a final settlement admission request from the purchaser's processing unit 1 and the transaction management device 5 in step 5802.

Next, in the processes in steps 5804 through 5832, the accepted final settlement admission request is checked for validity, and the final settlement admission requester is checked for authorization. If the check results are normal, the final settlement admission request information is set in the provisional settlement money management DB 5300 or the electronic money management DB 5400. If the payment ID of the DB is not set, then the payment ID in the final settlement admission request is set and the DB is updated.

If a final settlement request has been received, the correlation check is made in a final settlement information management DB. If the check result is normal, a payment process is performed based on the contents of the request for receipt of transfer in the provisional settlement money management DB 5300 or the electronic money management DB 5400. If a final settlement request has not been issued, the final settlement information is set as 'not made' and the final settlement information management DB 5500 is generated. Furthermore, a demand notification for the final settlement request is issued to the seller's processing unit 2 or the transaction management device 5.

Figure 65:
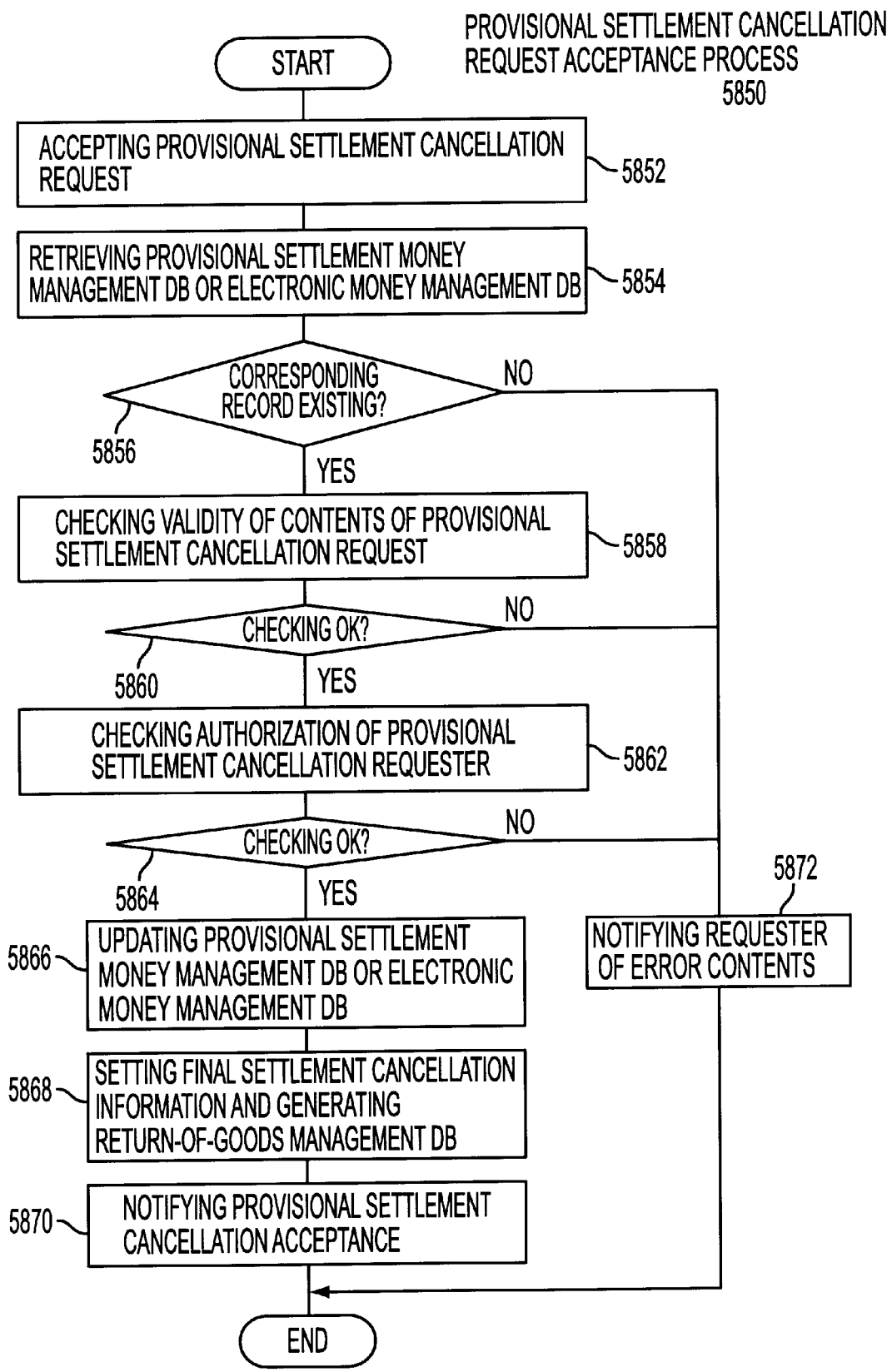
FIG. 65 is a flowchart showing the procedure of the provisional settlement cancellation request acceptance process.

FIG. 65 is a flowchart showing the provisional settlement cancellation request acceptance process 5850. The provisional settlement cancellation request acceptance process 5850 accepts a provisional settlement cancellation request from the seller's processing unit 2 or the transaction management device 5 in step 5852. Then, in the processes in steps 5854 through 5872, the validity of the contents of the accepted provisional settlement cancellation and the authorization of the provisional settlement cancellation requester are checked. If the check results are normal, a flag indicating that provisional settlement cancellation has occurred is set in the provisional settlement money management DB 5300 or the electronic money management DB 5400, and the provisional settlement money management DB 5300 or the electronic money management DB 5400 are updated.

Furthermore, provisional settlement cancellation request information (acceptance date and time, requester information, etc.) in the return-of-goods management DB 5600 is set to generate the return-of-goods management DB 5600. A provisional settlement cancellation acceptance notification is issued to a provisional settlement cancellation requester.

Figure 66:
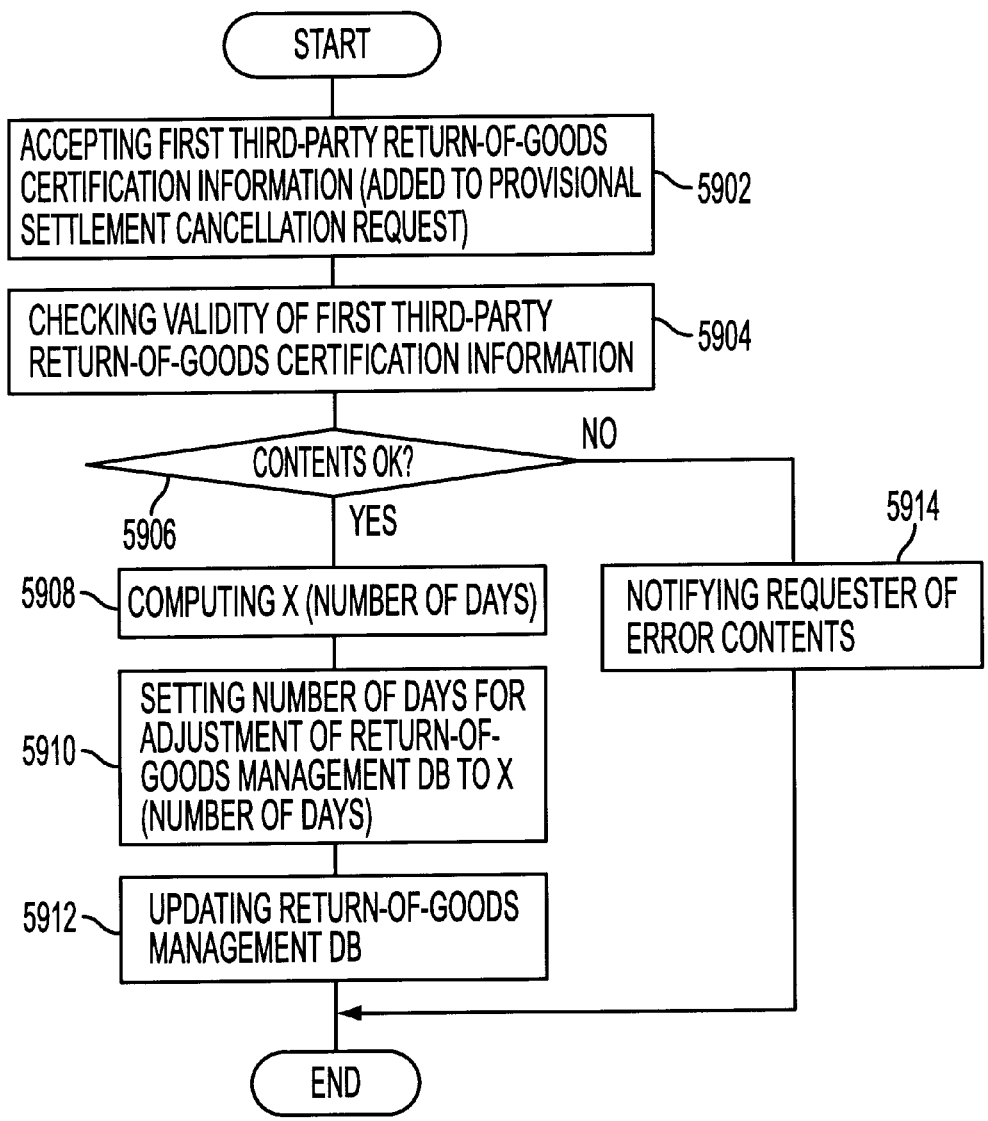
FIG. 66 is a flowchart showing the procedure of the first third-party return-of-goods certification information acceptance process.

FIG. 66 is a flowchart showing the first third-party return-of-goods certification information acceptance process 5900. First, in step 5902, the first third-party return-of-goods certification information acceptance process 5900 accepts the first third-party return-of-goods certification information from the purchaser's processing unit 1 or the transaction management device 5.

Then, in the processes in steps 5904 through 5914, the validity of the accepted first third-party return-of-goods certification information, and the authorization of the requester of the first third-party return-of-goods certification information requester are checked. If the check results are normal, then the number X of days for adjustment is obtained to monitor the number of days for adjustment. The number X of days for adjustment is computed by the equation X=number of days for delivery in goods purchase information+number of days for acceptance of return-of-goods claim in goods purchase information+predetermined number of additional days for allowance–(first third-party return-of-goods certification information acceptance date–return-of-goods request acceptance date in first third-party return-of-goods certification information). The obtained number X of days for adjustment is set in the return-of-goods management DB 5600, and the return-of-goods management DB 5600 is updated.

Figure 67:
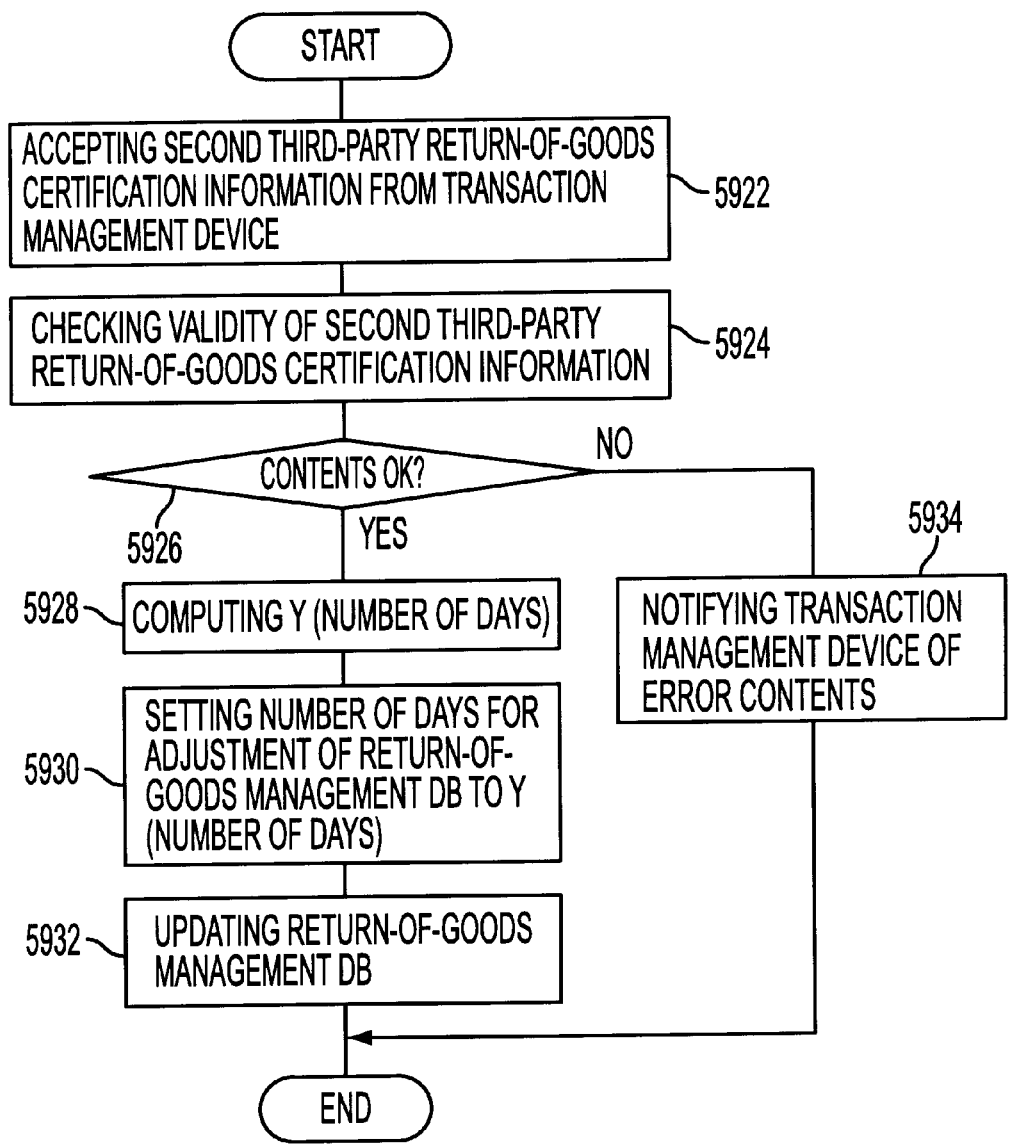
FIG. 67 is a flowchart showing the procedure of the second third-party return-of-goods certification information acceptance process.

FIG. 67 is a flowchart showing the second third-party return-of-goods certification information acceptance process 5920. In step 5922, the second third-party return-of-goods certification information acceptance process 5920 accepts the second third-party return-of-goods certification information from the transaction management device 5. Then, in the processes in steps 5924 through 5934, the validity of the contents of the second third-party return-of-goods certification information, and the authorization are checked. If the check results are normal, the number Y of days for adjustment is obtained to monitor the number of days for adjustment. The number Y of days for adjustment is computed by the equation Y=number of days for acceptance of return-of-goods in goods purchase information–(second third-party return-of-goods certification information acceptance date–seller receipt date in second third-party return-of-goods certification information). The obtained number Y of days for adjustment is set in the return-of-goods management DB 5600, and the return-of-goods management DB 5600 is updated.

Figure 68:
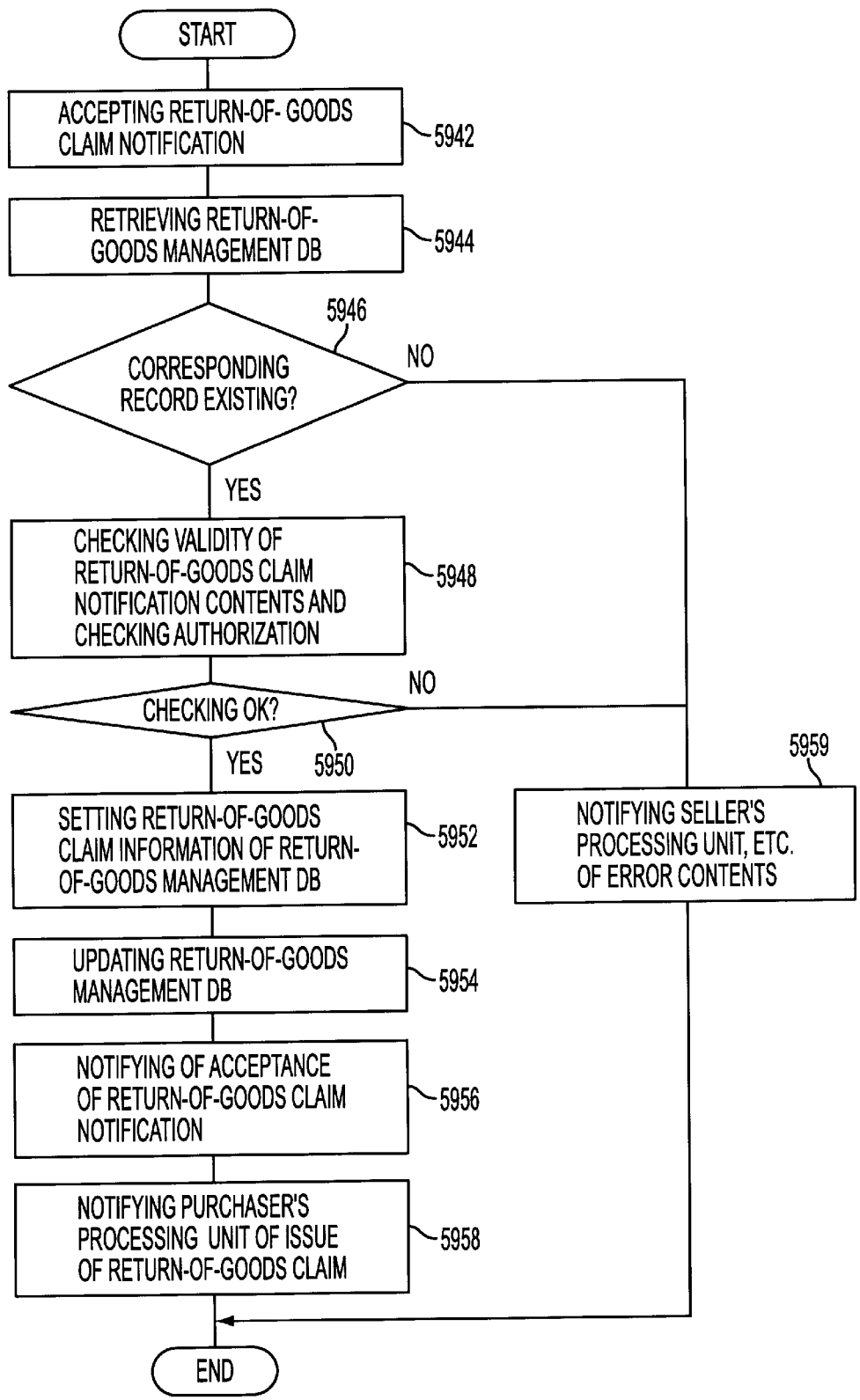
FIG. 68 is a flowchart showing the procedure of the return-of-goods claim notification acceptance process.

FIG. 68 is a flowchart showing the return-of-goods claim notification acceptance process 5940. First, in step 5942, the return-of-goods claim notification acceptance process 5940 accepts a return-of-goods claim from the seller's processing unit 2 or the transaction management device 5. Then, the processes in steps 5044 through 5958 are performed, and the validity of the contents of the accepted return-of-goods claim notification and the authorization of the return-of-goods claim notification requester are checked. If the check results are normal, then the return-of-goods claim acceptance date and time and the return-of-goods claim notification requester information are set in the return-of-goods claim information 5608 of the return-of-goods management DB 5600, and the return-of-goods management DB 5600 is updated. The return-of-goods claim notification requester is notified that a return-of-goods claim notification has been accepted, and the purchaser's processing unit 1 is notified that a return-of-goods claim has been issued.

Figure 69:
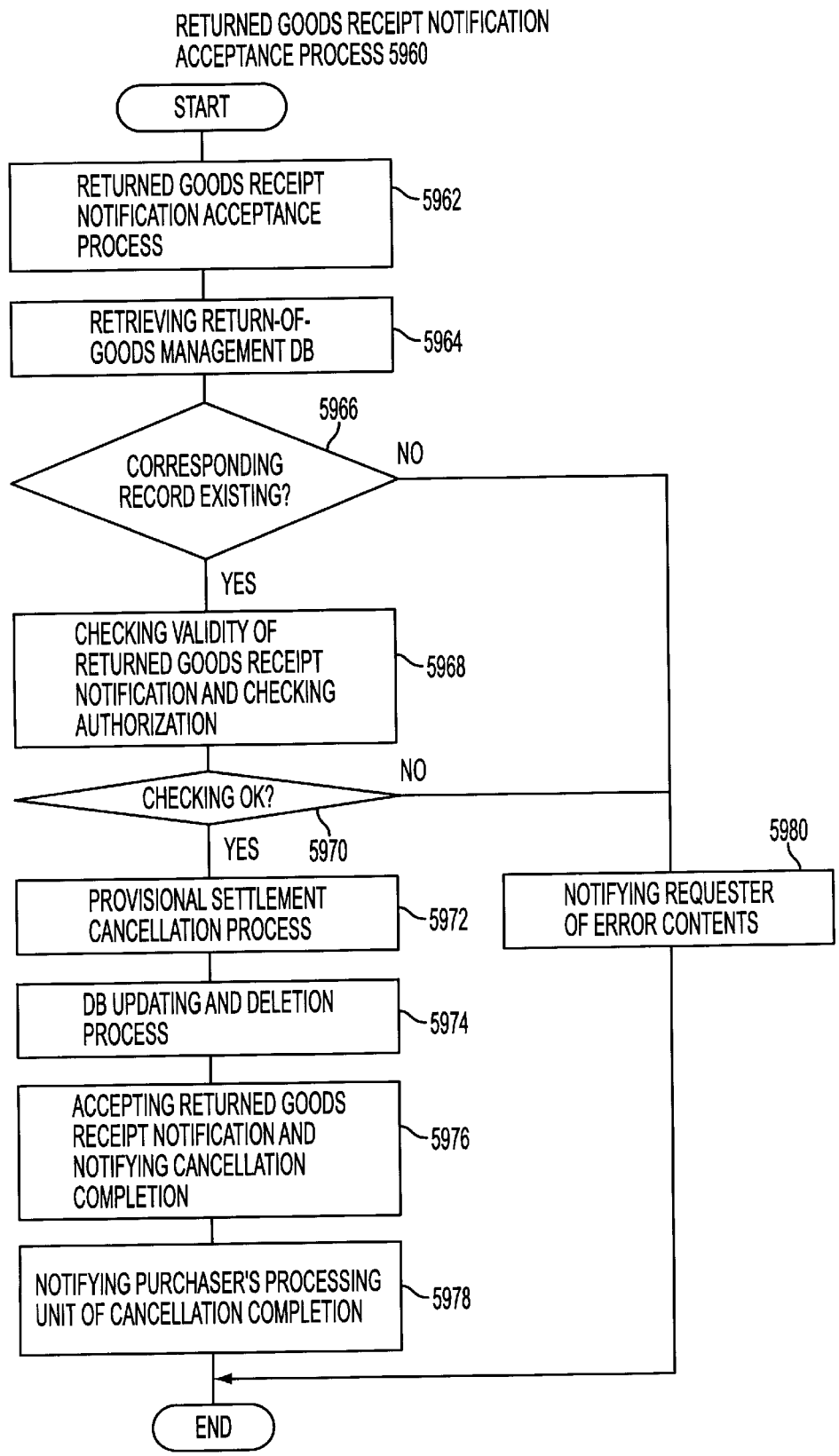
FIG. 69 is a flowchart showing the procedure of the returned goods receipt notification acceptance process.

FIG. 69 is a flowchart showing the returned goods receipt notification acceptance process 5960. The returned goods receipt notification acceptance process 5960 accepts a return-of-goods receipt notification from the seller's processing unit 2 or the transaction management device 5 (step 5962). Then, the processes in steps 5964 through 5980 are performed, and the validity of the contents of the accepted return-of-goods receipt notification and the authorization are checked. If the check results are normal, the returned goods receipt notification acceptance date and time, and the requester information of the returned goods receipt notification are set in the return-of-goods admission notification 5610 in the return-of-goods management DB 5600, the number of days for adjustment 5607 are cleared to 0, and the return-of-goods management DB 5600 is updated. Furthermore, if return-of-goods claim information is set, then an invalid flag for return-of-goods claim information is set.

If the final settlement information management DB 5500 exists, it is deleted and the amount of the provisional settlement money management DB 5300 or the electronic money management DB 5400 is subtracted from the balance of the provisional settlement money issue balance or the balance of the electronic money issue balance in the money management DB 5200, and the money management DB 5200 is updated.

The amount to be canceled is added to the account balance in the account management DB 5100, and the account management DB 5100 is updated. The provisional settlement money management DB 5300 or the electronic money management DB 5400 which has become unnecessary through the cancellation is deleted after a predetermined allowance period in order to avoid possible trouble. A cancellation completion notification is transmitted to a returned goods receipt notification requester and the purchaser's processing unit 1.

Figure 70:
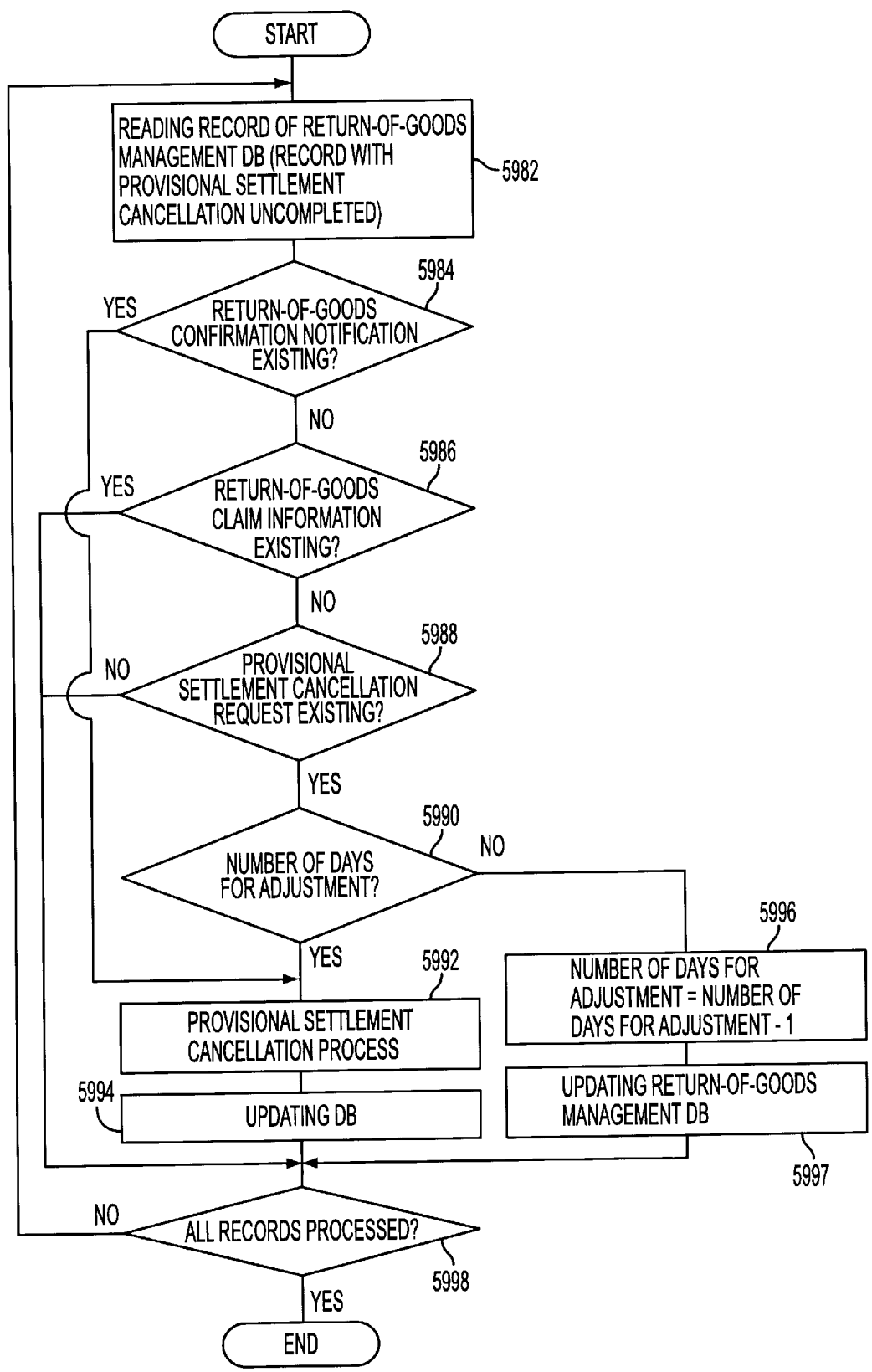
FIG. 70 is a flowchart showing the procedure of the provisional settlement cancellation site monitor process.

FIG. 70 is a flowchart showing the provisional settlement cancellation site monitor process 5980. The provisional settlement cancellation site monitor process 5980 performs the processes in steps 5982 through 5998 once a day, and checks the contents of the return-of-goods management DB 5600. If the information about the return-of-goods admission notification 5610 exists in the return-of-goods management DB 5600, the process similar to the provisional settlement cancellation process shown in FIG. 69 is performed.

If the return-of-goods claim information 5608 exists, the process terminates without changing the number of days for adjustment 5607. If neither the return-of-goods admission notification 5610 nor the return-of-goods claim information 5608 exists, then it is checked whether or not the information of the provisional settlement cancellation request 5605 exists. If the provisional settlement cancellation request 5605 exists, the number of days for adjustment 5607 is checked. If the number of days for adjustment is zero, the process similar to the provisional settlement cancellation process in FIG. 69 is performed. If the number of days for adjustment is not zero, then 1 is subtracted from the number, and the return-of-goods management DB 5600 is updated.

Figure 71:
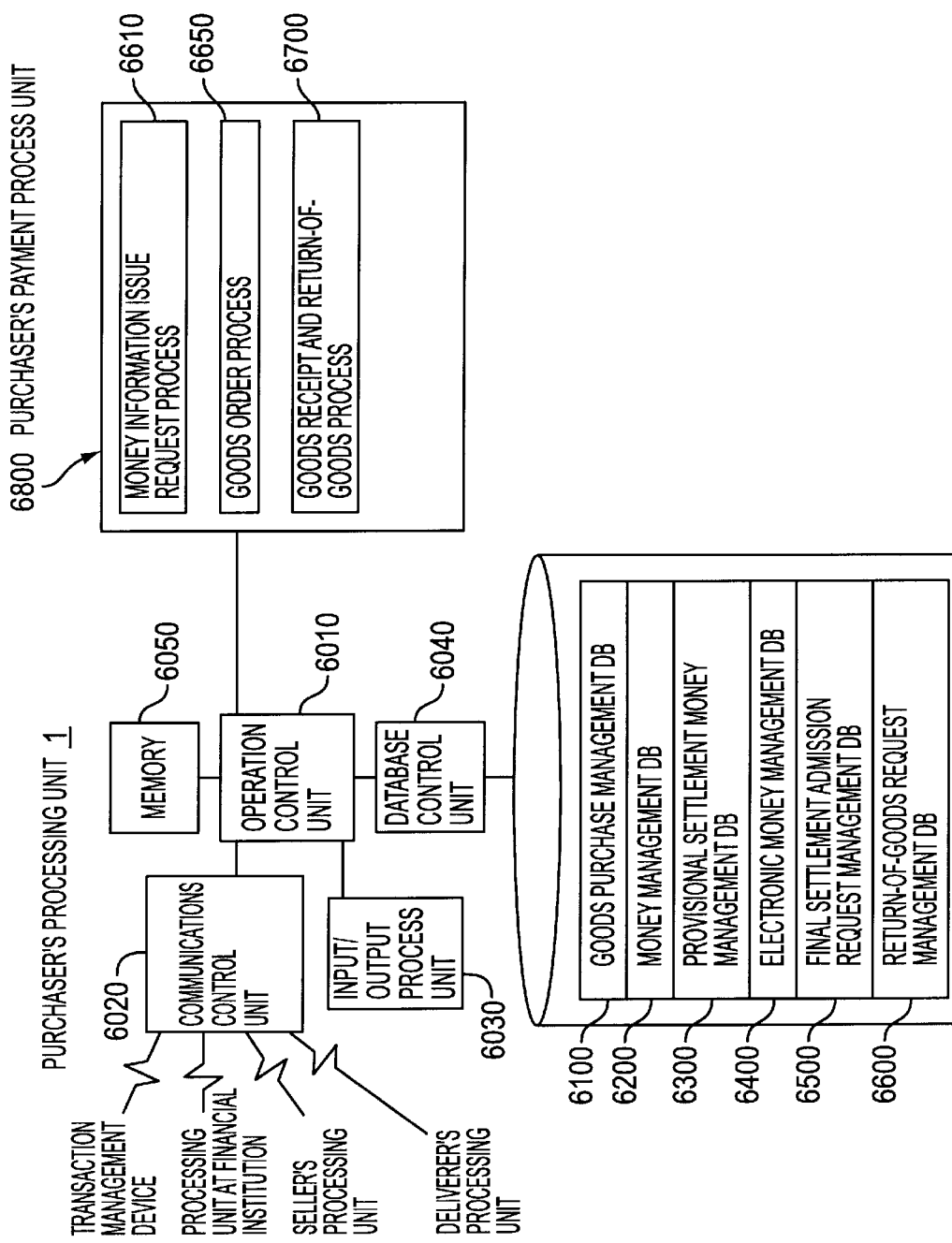
FIG. 71 shows the general configuration according to an embodiment of a purchaser's processing unit.

Next, the practical configuration of the purchaser's processing unit 1 is described by referring to FIG. 71 and subsequent figures.

The purchaser's processing unit 1 is provided for a purchaser to perform operations from order to settlement in purchasing goods, and to issue a return-of-goods request. The purchaser's processing unit 1 has the following functions.

First, an issue request for money information containing provisional settlement information which is finally settled based on the confirmation of the contents of the goods received from a seller after transferring to the seller is made.

Second, an entry request for goods purchase information is issued for the money information containing the provisional settlement information.

Third, a goods order request is issued to a seller, money information containing provisional settlement information is transferred to a seller, and purchaser's personal identity confirmation information is transmitted.

Fourth, based on the confirmation of the contents of the received goods, a final settlement admission request is issued when the goods are normal, a return-of-goods request is issued when goods are not normal, a first third-party return-of-goods certification information certifying that a return-of-goods request has been received is accepted, and a provisional settlement cancellation request is issued.

To attain this, the purchaser's processing unit 1 is designed as shown in FIG. 71. In FIG. 71, the purchaser's processing unit 1 comprises an operation control unit 6010 for controlling the entire system; a communications control unit 6020 for line-connection to each of the seller's processing unit 2, the processing unit of the purchaser's financial institution 3, the transaction management device 5, the deliverer's processing units 6 and 7; a database control unit 6040 for controlling each database; a payment process unit 6600 for performing each process of the purchaser's processing unit 1; an input device 6030; and a memory 6050.

As shown in FIG. 71, the database control unit 6040 manages a goods purchase management DB 6100, a money management DB 6200, a provisional settlement money management DB 6300, an electronic money management DB 6400; a final settlement admission request management DB 6500; and a return-of-goods request management DB 6600.

The payment process unit 6800 includes and performs the money information issue request process 6610, the goods order process 6650, and the goods receipt and return-of-goods process 6700 as shown in FIG. 71.

Each of the databases managed by the database control unit 6040 is described below by referring to FIGS. 72A, 72B, 72C, 72D, and 73.

Figure 72:
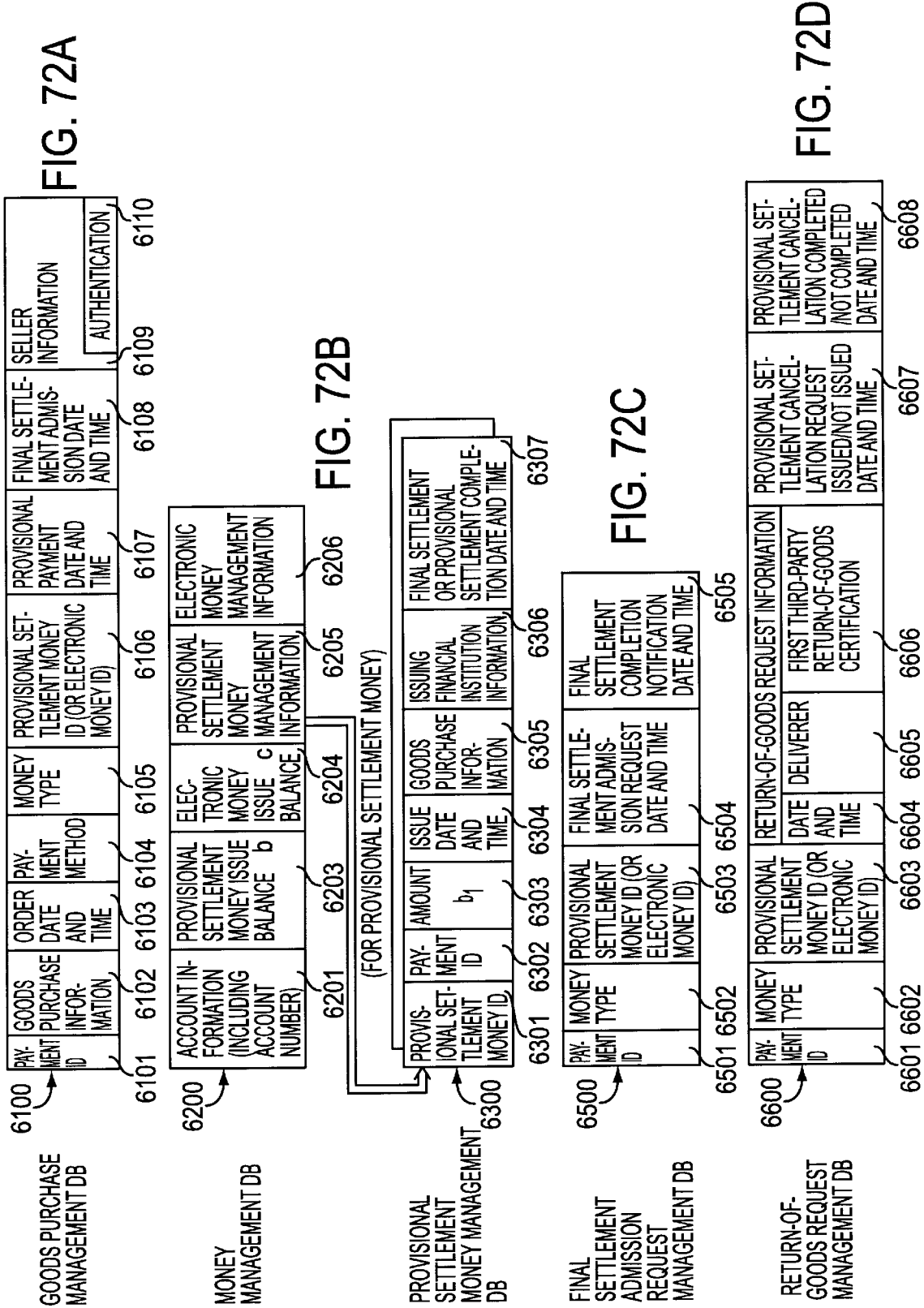
FIG. 72A shows the configuration of the goods purchase management database.
FIG. 72B shows the configuration of the money management database and the provisional settlement money management database.
FIG. 72C shows the configuration of the final settlement admission request management database.
FIG. 72D shows the configuration of the return-of-goods request management database.

The configuration of the goods purchase management DB 6100 is shown in FIG. 72A. A payment ID 6101 is a key ID for management of money information, final settlement, and return of goods. Goods purchase information 6102 is goods purchase detailed information containing the information about a seller. An order date and time 6103 indicates the date and time of a goods purchase order. A payment method 6104 is a payment method (for example, prepayment, provisional settlement, payment after receipt of goods, etc.) specified when a purchaser places an order. A money type 6105 indicates the type of money (settlement account money/ provisional settlement money, etc.) for the payment. A money ID 6106 is an ID of paid electronic money or provisional settlement money. A provisional payment date and time 6107 is a date and time of the provisional settlement. A final settlement admission date and time 6108 is a date and time of the purchaser's final settlement admission. A seller information 6109 includes the name, address, office, bank information, electronic money payment destination, etc. and contains authentication 6110. The authentication 6110 is an authentication of the seller for the seller information 6109.

The money management DB 6200 stores, as shown in FIG. 72B, account information 6201 containing the information about a settlement account (financial institution, account number); a provisional settlement money issue balance 6203; an electronic money issue balance 6204; provisional settlement money management information 6205; and electronic money management information 6206. The provisional settlement money management information 6205 is pointer information (link information) to the provisional settlement money management DB 6300, and the electronic money management 6206 is pointer information to the electronic money management DB 6400.

The contents of the provisional settlement money management DB 6300 include a provisional settlement money ID 6301, a payment ID 6302, an amount 6303, an issue date and time 6304, goods purchase information 6305 linked to money, issuing financial institution information 6306, and a final settlement or provisional settlement cancellation completion date and time 6307. Among them, the provisional settlement money ID 6301 is a money ID numbered by a financial institution when it is issued, and relates to a payment ID. The final settlement or provisional settlement cancellation completion date and time 6307 indicates the date and time when the life cycle of the provisional settlement money has been terminated through the completion of the final settlement or provisional settlement cancellation.

The configuration of the final settlement admission request management DB 6500 is shown in FIG. 72C. In FIG. 72C, a payment ID 6501, a money type 6502, and a money ID 6503 correspond to the same items in the goods purchase management DB 6100. The final settlement admission request date and time 6504 corresponds to the final settlement admission date and time 6108 of the goods purchase management DB 6100. A final settlement completion notification date and time 6505 is a date and time on which the completion of the final settlement has been received from the financial institution after a final settlement admission request is issued.

The return-of-goods request management DB 6600 is generated when return of goods arises. The configuration is shown in FIG. 72D. The contents of the DB 6600 include items 6601, 6602, and 6603 based on the final settlement admission request management DB 6500, and a date and time 6604, a deliverer 6605, and a first third-party return-of-goods certification 6606 as receipt information (return-of-goods request information) when a return-of-goods request is issued to the third-party witness such as the deliverer's processing unit. It further includes a discrimination as to whether or not a provisional settlement cancellation request has been issued and its date and time 6607 when a provisional settlement cancellation request through return-of-goods is notified for financial institution; and a discrimination as to whether or not the provisional settlement cancellation has been completed and its date and time 6608.

Figure 73:
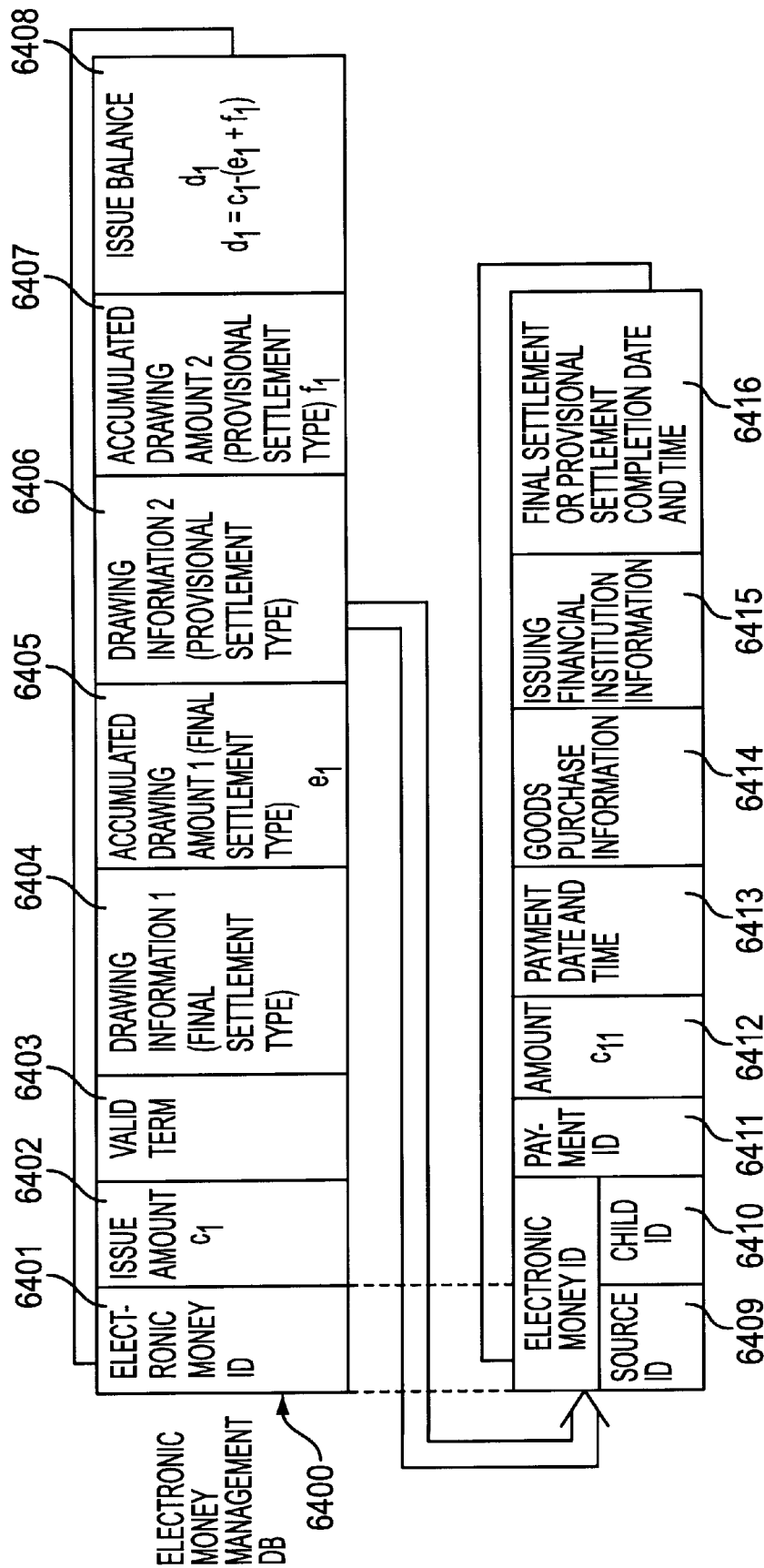
FIG. 73 shows the configuration of the electronic money management database.

The electronic money management DB 6400 manages the information shown in FIG. 73. The electronic money managed in the electronic money management DB 6400 is, unlike the provisional settlement money, issued by a financial institution without first specifying its use. That is, this electronic money is referred to as settlement account money. In FIG. 73, the upper portion corresponds to the management information of the electronic money (settlement account money) issued by a financial institution, and the lower portion corresponds to the electronic money information containing the provisional settlement information indicating that the purchaser has paid to the seller a part of the electronic money to purchase specific goods.

The management information shown in the upper portion contains an electronic money ID 6401 of issued money, an issue amount 6402 for the time being, a valid term 6403, a final settlement type (final payment type) drawing information 6404 and its accumulated amount 6405, a provisional settlement type (provisional payment type) drawing information 6406 and its accumulated amount 6407, and an issue balance 6408.

The money information containing the provisional settlement information in the lower portion indicates a part of the issue amount 6402 drawn as a provisional settlement type. Therefore, the money ID is specified by adding a child ID 6410 to a source ID 6409 (same as the ID 6401 in the upper portion). Other items 6411, 6412, 6413, 6414, 6415, and 6416 are all based on the provisional settlement money management DB 6300. However, the settlement account money is provided with a blind signature by a purchaser when it is drawn, and is different from the provisional settlement money to be provided with a blind signature by a financial institution.

The process procedure of each process in the purchaser's processing unit 1 is described below by referring to FIG. 74 and subsequent figures.

Figure 74:
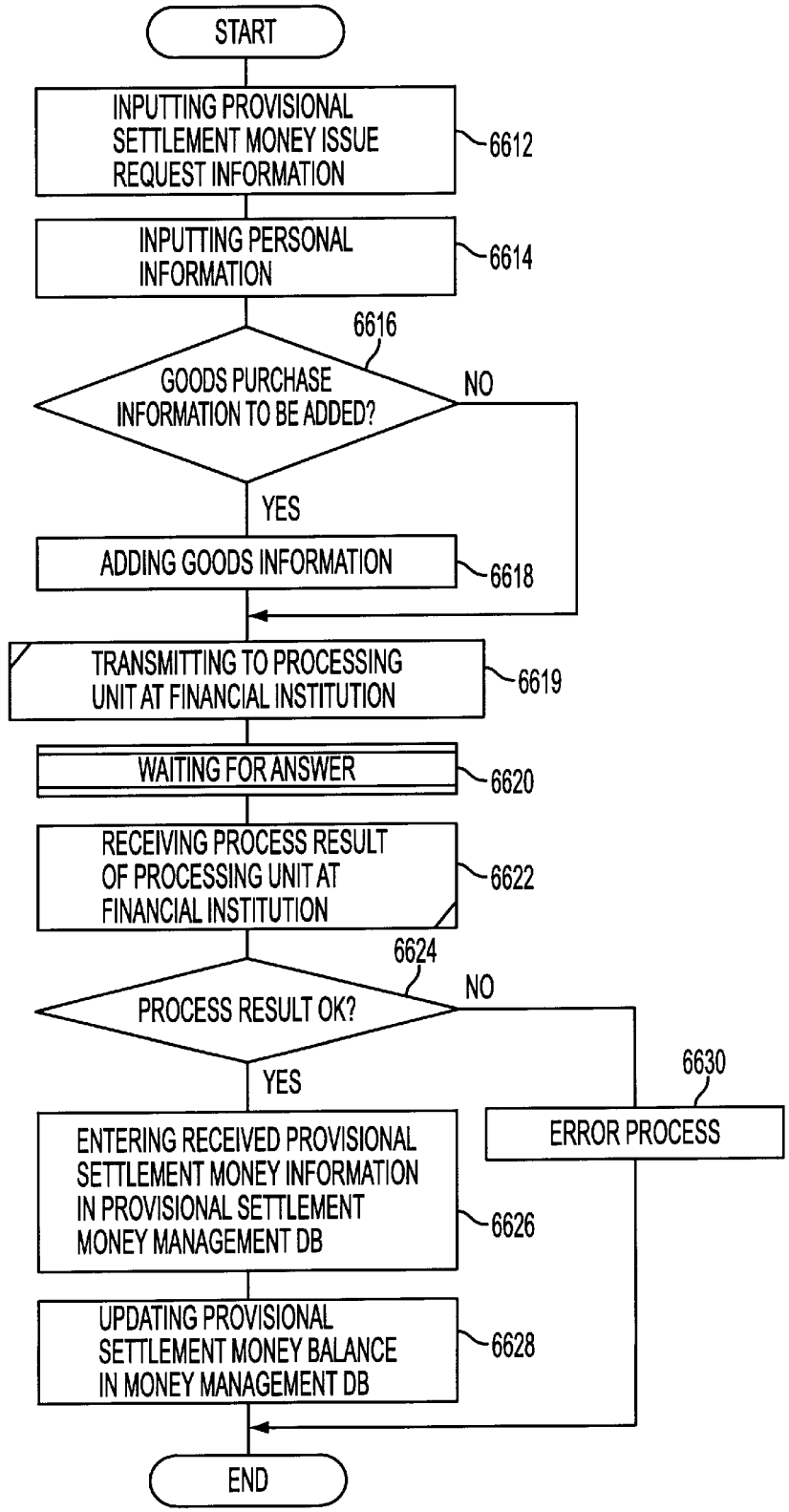
FIG. 74 is a flowchart showing the procedure of the money information (provisional settlement money) issue request process.

By referring to FIG. 74, the procedure of a money information issue request process 6610 is described as a function of issuing provisional settlement money.

As shown in FIG. 74, information about a financial institution to which an issue of provisional settlement money is requested, and information relating to the issue request such as an amount, etc. are input in step 6612 in the money information issue request process 6610. The amount (b1) is determined within a range of the account balance 5104 of the account management DB 5100 shown in FIG. 61A. Then, in step 6614, information such as an account number is input. It is determined in step 6616 whether or not it is necessary to add goods purchase information. If yes, the goods purchase information is added in step 6618. In step 6619, the generated issue request is transmitted to the processing unit of the purchaser's financial institution 3.

Then, in step 6622, a process result is received from the processing unit of the purchaser's financial institution 3, and the process result is checked in step 6624. If the process result is normal, then the provisional settlement money information received from the processing unit of the purchaser's financial institution 3 is stored in the provisional settlement money management DB 6300 using the provisional settlement money ID 6301 as a key in step 6626. In step 6628, the provisional settlement money issue balance 6203 in the money management DB 6200 is updated (b=b+b1). If the process result is not normal in step 6624, an error process is performed in step 6630.

Figure 75:
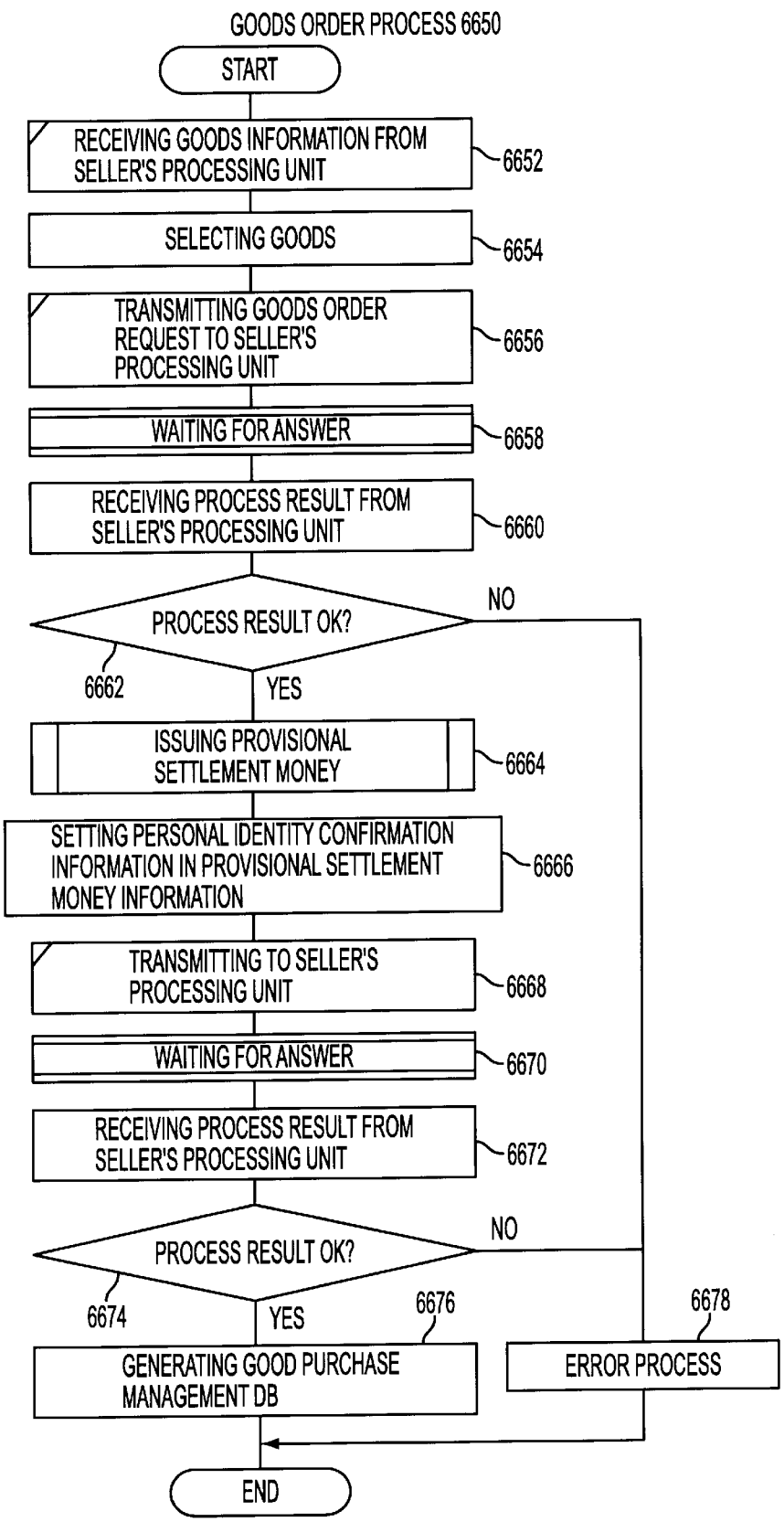
FIG. 75 is a flowchart showing the procedure of the goods order process.

Next, a goods order process 6650 in which a goods order is placed and provisional settlement money is transferred to a seller is described by referring to FIG. 75.

After receiving goods information from the seller's processing unit 2 in step 6652 in the goods order process 6650, goods are selected in step 6654. In step 6656, a goods order request containing the number of goods, the amount of the orders, a payment method, personal information, etc. added to goods information is transmitted to the seller's processing unit 2.

Then, the process result (detail of purchase) is received from the seller's processing unit 2 in step 6660. The process result is checked in step 6662. If the result is normal, the provisional settlement money issue process is performed in step 6664. The personal identity confirmation information is set in the provisional settlement money information in step 6666, and the provisional settlement money is transmitted to the seller's processing unit 2 in step 6668.

The process result is received from the seller's processing unit 2 in step 6672. The process result is checked in step 6674. If the result is normal, a goods purchase record is generated in the goods purchase management DB 6100 using the payment ID 6101 as a key in step 6676. In steps 6662 and 6674, if the process result is not normal, an error process is performed in step 6678.

Figure 76:
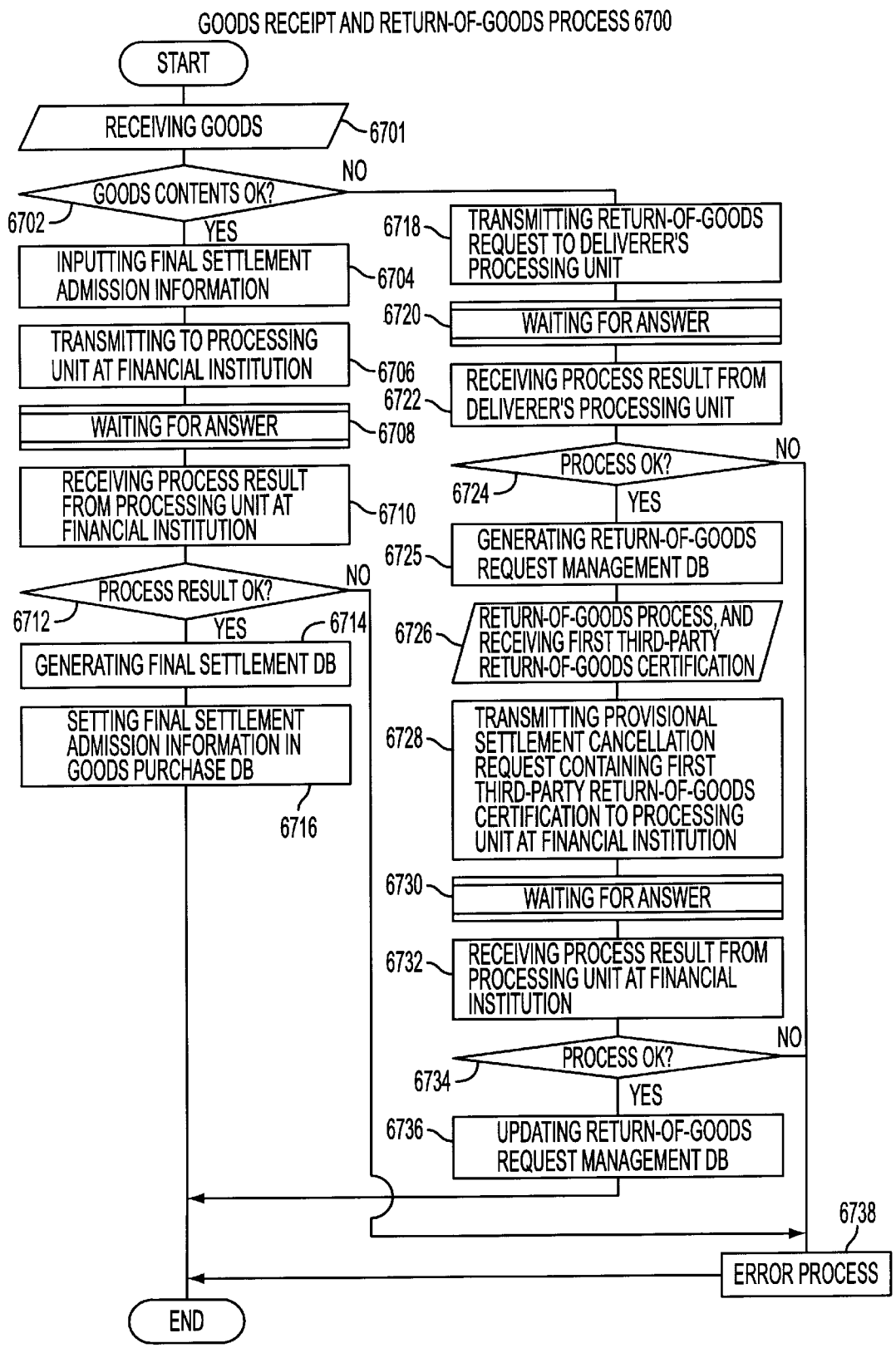
FIG. 76 is a flowchart showing the procedures of the goods receipt and return-of-goods process.

Next, a goods receipt and return-of-goods process 6700 is described by referring to FIG. 76 as a function of issuing a final settlement admission request based on the confirmation of goods.

In the goods receipt and return-of-goods process 6700, goods are received in step 6701, and the contents of the goods are confirmed in step 6702. If the goods are correctly delivered according to the order, final settlement admission information is input in step 6704, and is transmitted to the processing unit at the purchaser's financial institution 3 in step 6706.

Then, the process result is received from the processing unit at the purchaser's financial institution 3 in step 6710. The process result is checked in step 6712. If it is normal, then a final settlement admission record is generated in the final settlement admission request management DB 6500 using the payment ID 6101 as a key, and final settlement admission information such as the final settlement admission request date and time 6504, etc. is set in step 6716.

On the other hand, if the goods are defective, then a return-of-goods request is transmitted to the deliverer's processing unit 7 in step 6718. In step 6722, a process result is received from the deliverer's processing unit 7, and the process result is checked in step 6724. If the result is normal, then a return-of-goods request record is generated in the return-of-goods request management DB 6600 using the payment ID 6101 as a key in step 6725. In step 6724, the first third-party return-of-goods certification indicating that the return-of-goods process has been successfully performed when the goods are passed to the deliverer is received.

Then, in step 6728, the first third-party return-of-goods certification is set in the first third-party return-of-goods certification 6606 in the return-of-goods request management DB 6600, and a provisional settlement cancellation request provided with the first third-party return-of-goods certification is transmitted to the processing unit at the purchaser's financial institution 3. The process result is received from the processing unit at the purchaser's financial institution 3 in step 6732, and the process result is checked in step 6734. If the result is normal, then the provisional settlement cancellation request 6607 in the return-of-goods request management DB 6600 is set as 'issued' in step 6736, and its date and time is set. If the process results are not normal in steps 6712, 6724, and 6734, an error process is performed in step 6738.

Next, the seller's processing unit 2 is described below by referring to FIG. 77 and subsequent figures.

The seller's processing unit 2 is provided for performing operations from order acceptance to settlement and managing return-of-goods when a seller sells goods. This unit has the following functions.

First, an order from a purchaser of goods is accepted, money information containing the provisional settlement information from the purchaser is accepted, and a request is issued to make final settlement after the goods are transmitted to a goods receiver.

Second, after a receiver has received goods, it is monitored whether or not a final settlement admission request or a return-of-goods request has been issued. If a final settlement admission request or a return-of-goods request is not issued within a predetermined period, a third-party delivery certification information indicating that the receiver has received the goods is added as authentication information, thereby issuing as a substitute a final settlement admission request.

Third, a cancellation request notification relating to return of goods is accepted, a provisional settlement cancellation request is issued in response to the cancellation request notification, and a return-of-goods claim request is issued based on a confirmation of the contents of returned goods when the returned goods are not normal.

Figure 77:
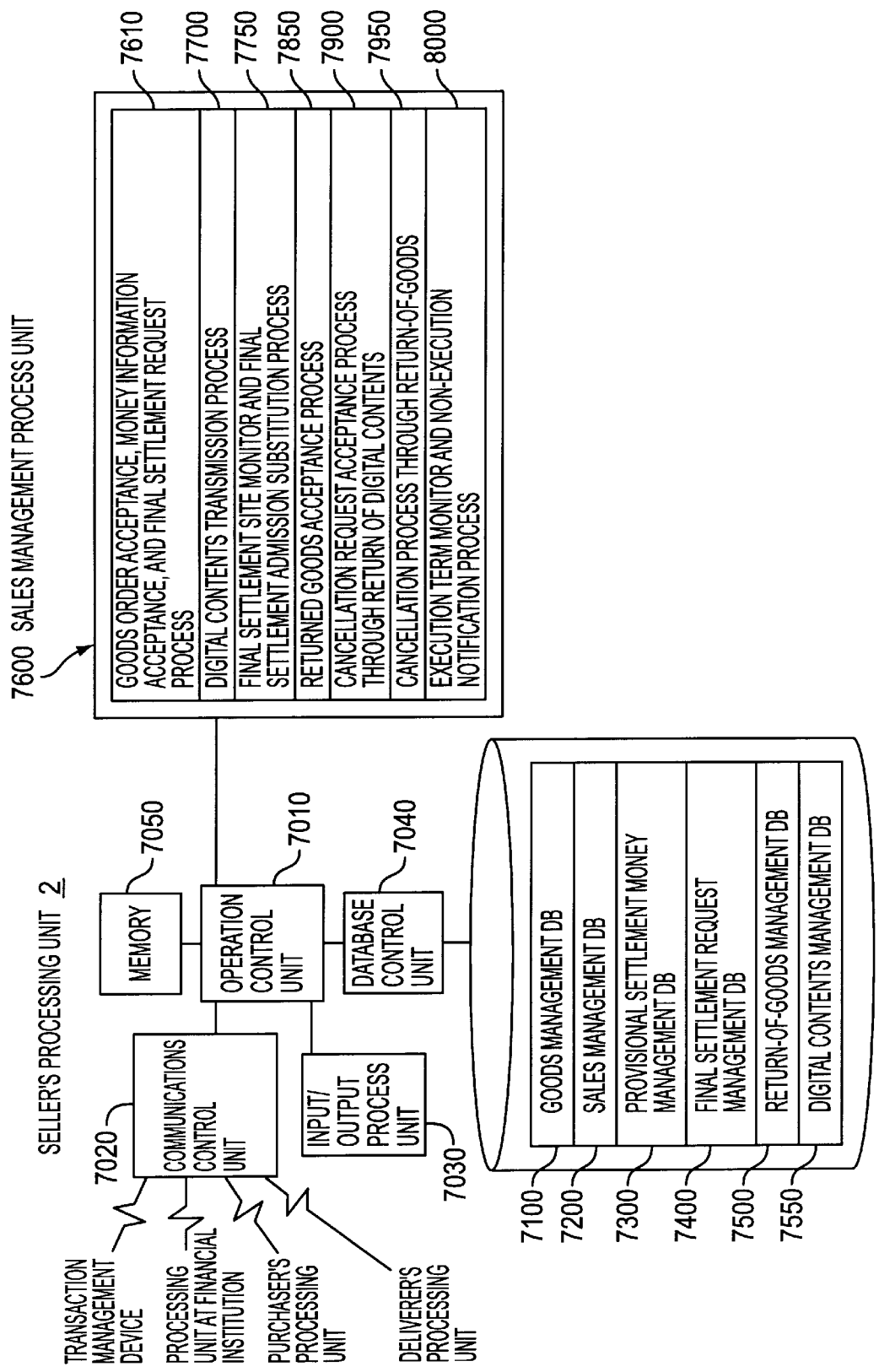
FIG. 77 shows a general configuration according to an embodiment of a seller's processing unit.

To attain the above described functions, the seller's processing unit 2 is designed as shown in FIG. 77. The seller's processing unit 2 comprises an operation control unit 7010 for controlling the entire system; a communications control unit 7020 for line-connection to each of the purchaser's processing unit 1, the processing units at the purchaser's financial institution 3 and 4, the transaction management device 5, the deliverer's processing units 6 and 7; a database control unit 7040 for controlling each database; a sales management process unit 7600 for performing each process of the seller's processing unit 2; an input/output device 7030; and memory 7050.

The database control unit 7040 controls and manages a goods management DB 7100, a sales management DB 7200, a provisional settlement money management DB 7300, a final settlement request management DB 7400, a return-of-goods management DB 7500, and a digital contents management DB 7550 as shown in FIG. 77.

A sales management process unit 7600 comprises and performs the processes of a goods order acceptance, money information acceptance, and final settlement request process 7610; a digital contents transmission process 7700; a final settlement site monitor and final settlement admission substitution process 7750; a returned goods acceptance process 7850, a cancellation request acceptance process through return of digital contents 7900; a cancellation process through return of goods 7950; and an execution term monitor and non-execution notification process 8000 as shown in FIG. 77.

Figure 78:
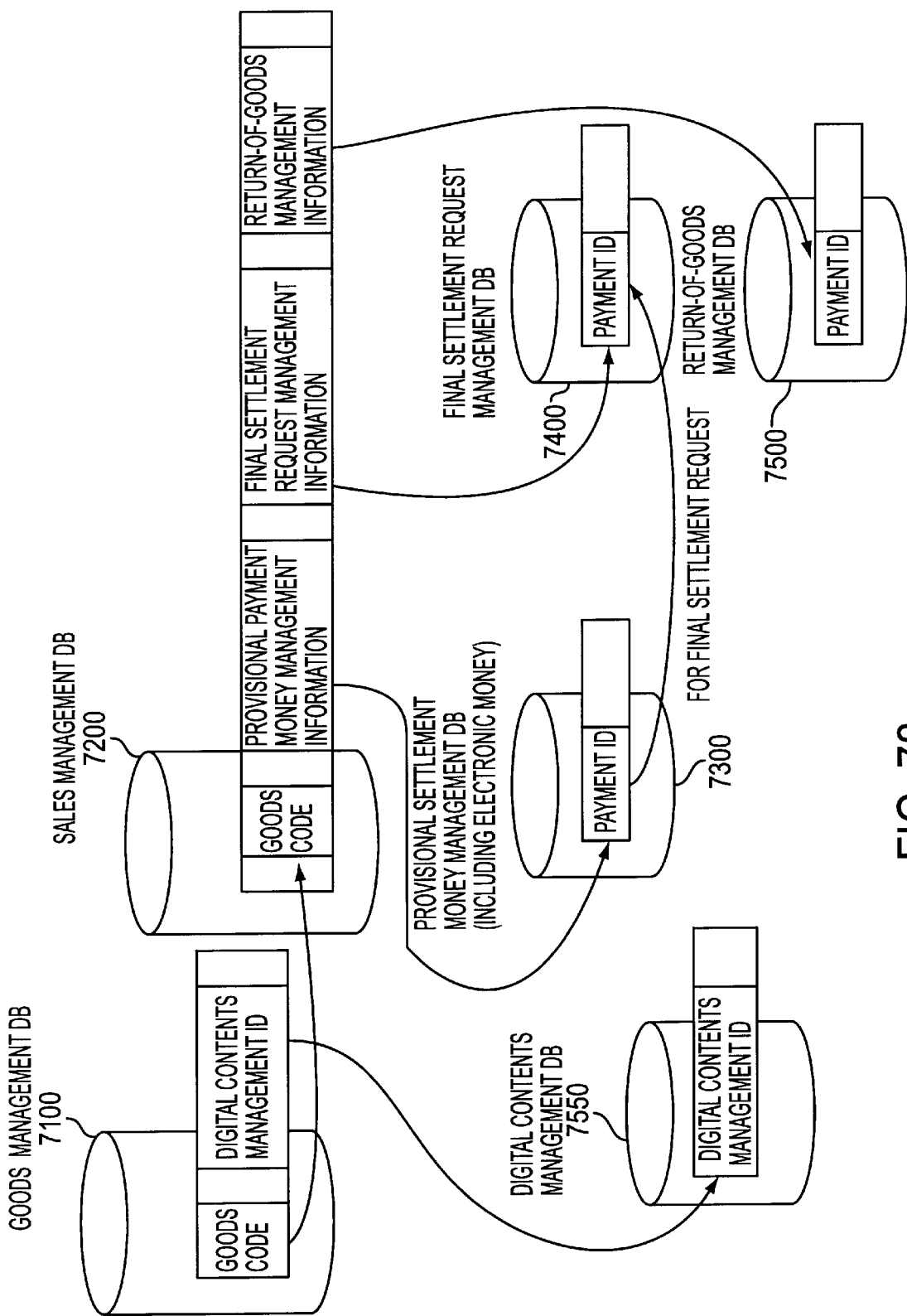
FIG. 78 shows the configuration of the database of a seller's processing unit.
Figure 79:
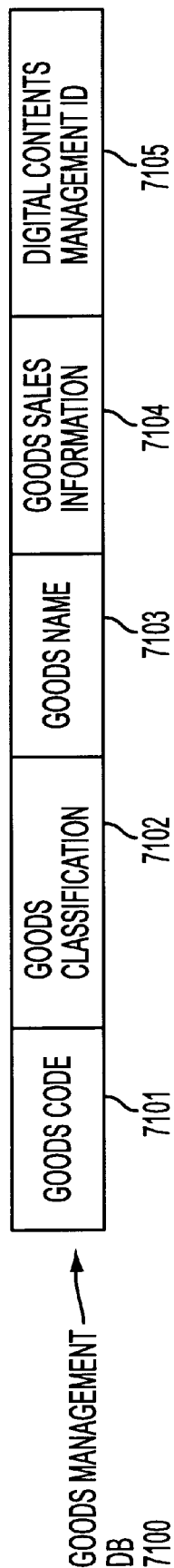
FIG. 79 shows the configuration of the goods management database.

FIG. 78 shows the concept indicating the correlation between databases managed by the database control unit 7040.

The goods management DB 7100 contains the information for management of the goods to be sold among which digital contents are managed by the digital contents management DB 7550.

The ordered goods are managed by the goods code of the goods management DB 7100. The order information is managed by the sales management DB 7200. The sales management DB 7200 contains provisional settlement money management information, final settlement request management information, and return-of-goods management information for use in money information management, final settlement management, and return-of-goods management required for sales management. The provisional settlement money management information is pointer information to the provisional settlement money management DB 7300. The final settlement request management information is pointer information to the final settlement request management DB 7400. The return-of-goods management information is pointer information to the return-of-goods management DB 7500.

Each database is described in detail.

The goods management DB 7100 stores a goods code 7101 as a key; a goods classification 7102 for identifying goods, digital contents, etc.; a goods name 7103; goods sales information 7104; and a digital contents management ID 7105. The goods sales information 7104 contains the number of goods stocks, the sales price, the site monitor term for goods receipt confirmation, the site monitor term for a return-of-goods claim, an average number of days for delivery, and the number of days for return-of-goods claim acceptance, and is inherited by the goods purchase information 5305 and 5406 of the purchaser's processing unit 1. The digital contents management ID 7105 is link information to the digital contents management DB 7550.

Figure 80:
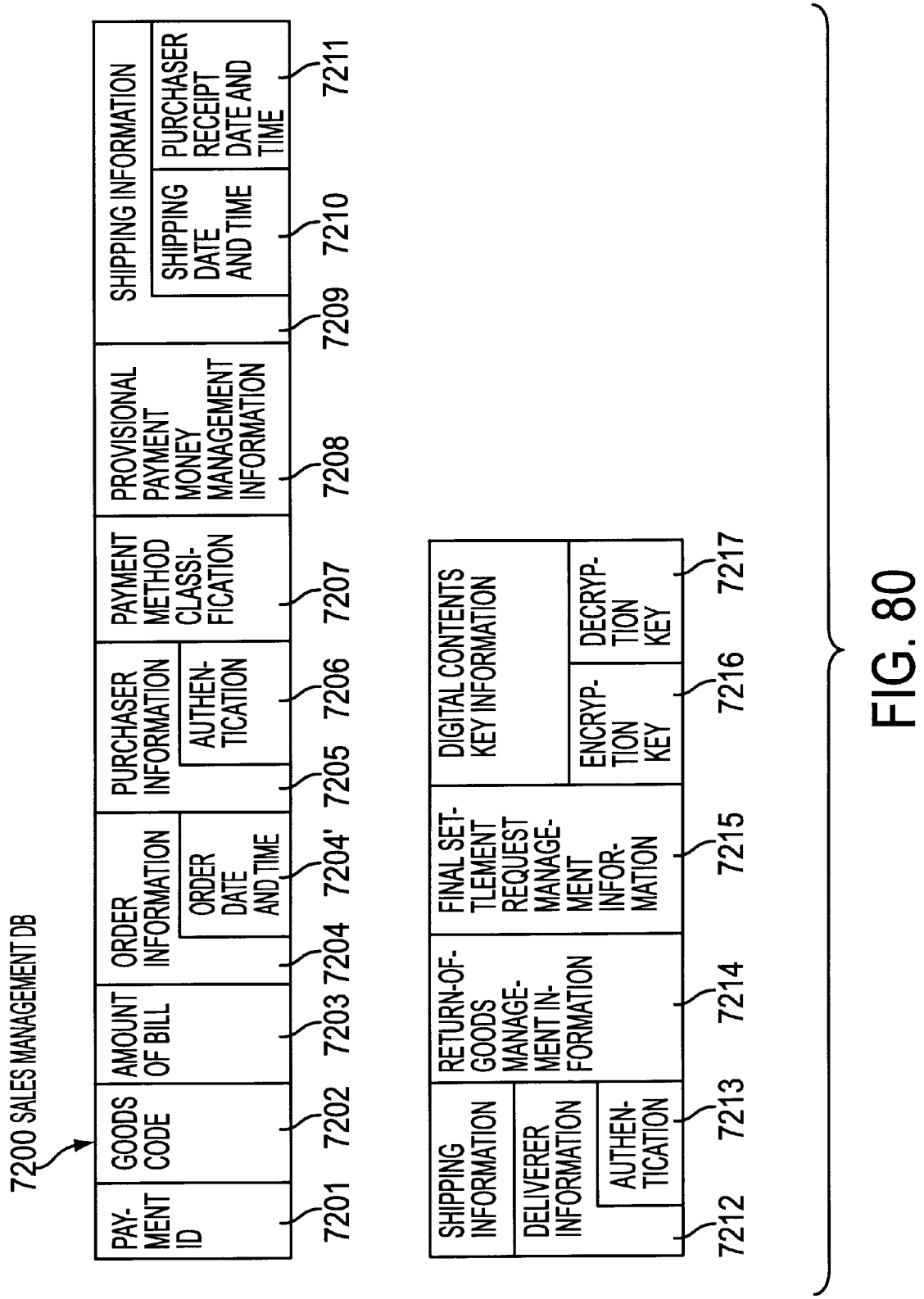
FIG. 80 shows the configuration of the sales management database.

FIG. 80 shows the sales management DB 7200. A payment ID 7201 is key data to money information management, final settlement management, and return-of-goods management. A goods code 7202, an amount of bill 7203, order information 7204, an order date and time 7204', purchaser information 7205, and authentication 7206 are general goods order data. A payment method classification 7207 is a payment method specified by a purchaser when he or she places an order (for example, settlement account money, provisional settlement money, etc.).

Provisional settlement money management information 7208 is pointer information for use in management of payment money information based on the payment method classification 7207, and points to a record of the provisional settlement money management DB 7300. A shipping date and time 7210, a purchaser receipt date and time 7211, deliverer information 7212, and authentication 7213 contained in shipping information 7209 are information relating to the delivery of goods, and provided by a deliverer. Return-of-goods management information 7214 is pointer information generated when return-of-goods arises, and points to a record of the return-of-goods management DB 7500. Final settlement request management information 7215 is pointer information for management of a final settlement request, and points to a record of the final settlement request management DB 7400. An encryption key 7216 and a decryption key 7217 of digital contents key information are information used when digital contents are sold.

FIGS. 81A and 81B show the provisional settlement money management DB 7300 and the final settlement request management DB 7400 respectively.

First, the provisional settlement money management DB 7300 is a database for storing money information received from the purchaser when goods are ordered. The database stores a payment ID 7301, a money type 7302 (either settlement account money or provisional settlement money), a receipt date and time 7303, and payment money information 7304. In the information, the payment money information 7304 depends on whether it is provisional settlement money or settlement account money as shown in the second and third rows shown in FIG. 81A.

The second row shows the provisional settlement money, and contains a provisional settlement money ID 7311, a payment ID 7312 (the same as 7301), an amount 7313, an issue date and time 7314, goods purchase information 7315, and issuing financial institution information 7316. The entire provisional settlement money has a blind signature by issuing financial institution (purchaser's financial institution). The third row shows the settlement account money (electronic money). Most of the items, that is, 7333, 7334, 7335, 7336, and 7337 are based on the provisional settlement money, but the settlement account money is different from the provisional settlement money in that the money ID contains a source ID 7331 and a child ID 7332 (additional ID), and that the entire blind signature is executed by the purchaser.

The final settlement request management DB 7400 is a database generated when a money information final settlement request including received provisional settlement information is issued to the financial institution. As shown in FIG. 81B, a payment ID 7401 is a key as in other databases. The final settlement financial institution information is required when a final settlement request is issued. When a request for receipt of transfer is issued to a purchaser's financial institution, the information about the financial institution and payee information (seller's financial institution and account information) is set in receipt-of-transfer requesting financial institution information 7402. When a collection execution request is issued to the seller's financial institution, the information about the purchaser's financial institution of a collection destination, the information about the seller's financial institution, and the information about the account to which money is transferred are set in execution requesting financial institution information 7403. A date and time corresponding to each process is set in each of a final settlement request date and time 7404 and a final settlement completion date and time 7405.

On the other hand, if goods are returned, a provisional settlement or final settlement cancellation process is performed. To manage the process, provisional settlement cancellation information 7406, a provisional settlement cancellation request date and time 7407, final settlement cancellation information 7408, and a final settlement cancellation request date and time 7409 are stored.

Figure 82:
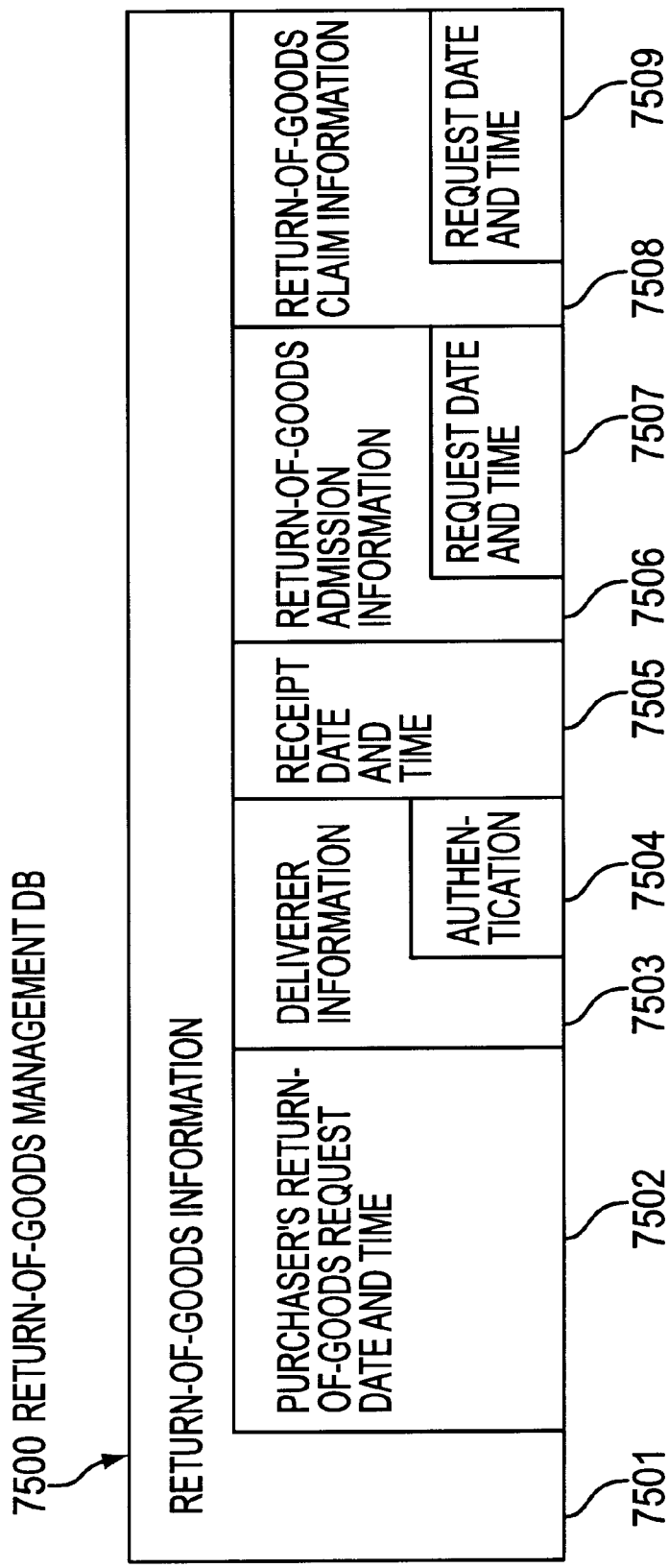
FIG. 82 shows the configuration of the return-of-goods management database.

The return-of-goods management DB 7500 is described below by referring to FIG. 82.

The return-of-goods management DB 7500 is generated when returned goods are delivered to a seller through a return-of-goods request from a goods receiver to a deliverer, and used for management in the future. Return-of-goods information 7501, a purchaser's (or receiver's) return-of-goods request date and time 7502, deliverer information 7503 and authentication of the deliverer 7504, and seller's returned goods receipt date and time 7505 contained in the database are basic information of the second third-party return-of-goods certification issued by a deliverer. The seller receives returned goods, confirms the contents of the returned goods, and should notify the processing unit at the purchaser's financial institution 3 of a return-of-goods admission or a return-of-goods claim.

Each of the contents of the corresponding notifications and their dates and times are set in return-of-goods admission information 7506 and its request date and time 7507, and return-of-goods claim information 7508 and its request date and time 7509. If the seller admits the return-of-goods, then the processing unit at the purchaser's financial institution 3 performs a provisional settlement cancellation process under a provisional settlement state. If a final settlement has been completed, then a final settlement cancellation process is performed.

The process result is set in the provisional settlement cancellation information 7406 and its request date and time 7407 or the final settlement cancellation information 7408 and its request date and time 7409 in the final settlement request management DB 7400 shown in FIG. 81B.

Figure 83:
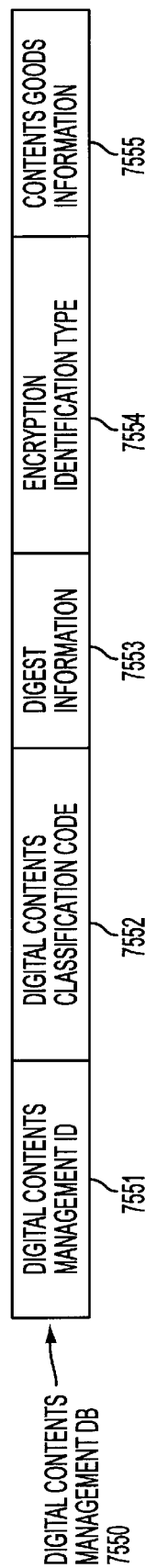
FIG. 83 shows the configuration of the digital contents management database.

FIG. 83 shows the digital contents management DB 7550. In the information in the goods management DB 7100, information relating to the digital contents is managed in the digital contents management DB 7550.

The digital contents management DB 7550 contains a digital contents management ID 7551 for linking to the goods management DB 7100, a digital contents classification code 7552, digest information 7553, encryption identification type 7554, and contents goods information 7555. The encryption identification type 7554 specifies an encryption/decryption system of digital contents. The digital contents are encrypted by the system specified by the encryption identification type 7554 and transmitted to the purchaser. Then, after a purchase is determined, the purchaser decrypts it using a decryption key transmitted from the seller.

Next, the procedure of the processes 7610 through 8000 performed by the sales management process unit 7600 is described below by referring to the process flow shown in and after FIG. 84.

First, the goods order acceptance, money information acceptance, and final settlement request process 7610 is described below as a function of accepting a goods order and money and issuing a final settlement request.

Figure 84:
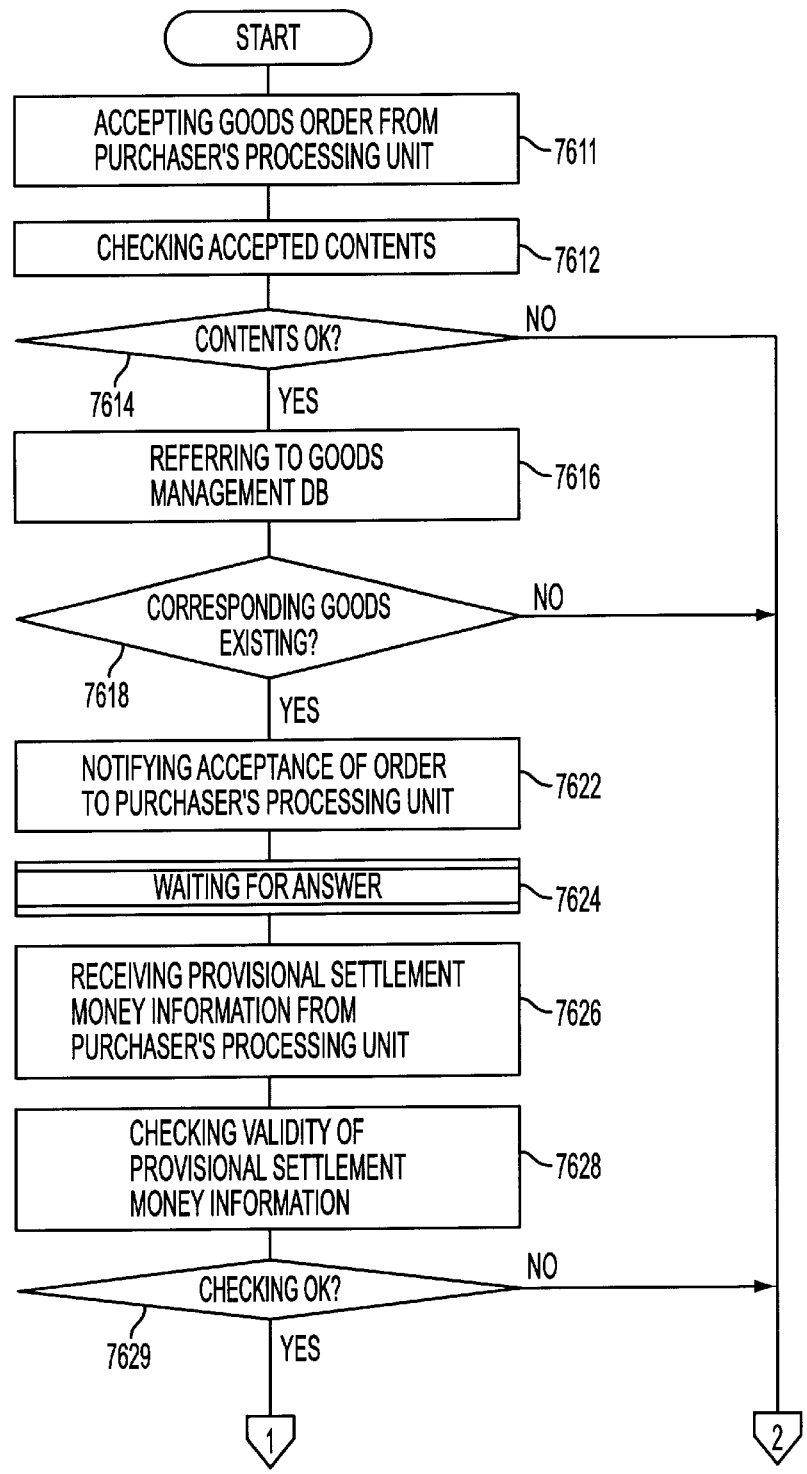
FIG. 84 is a flowchart (1) showing the procedure of the goods order acceptance, money information acceptance, and final settlement request process.
Figure 85:
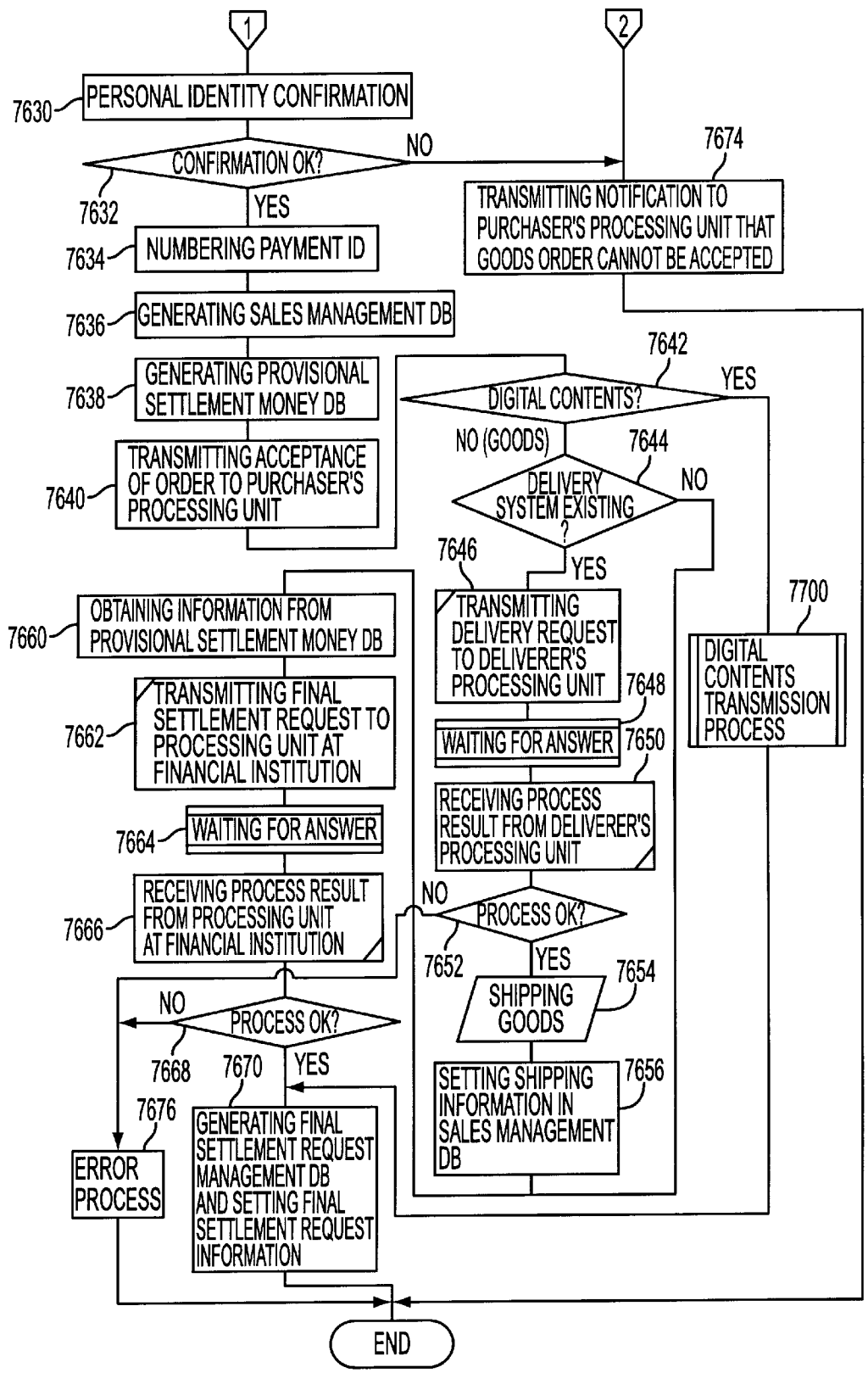
FIG. 85 is a flowchart (2) showing the procedure of the goods order acceptance, money information acceptance, and final settlement request process.

The procedure of the process 7610 is shown in FIGS. 84 and 85. In the process 7610, a goods order is first accepted from the purchaser's processing unit 1 in step 7611, and the contents received are confirmed in step 7612. If the contents of the goods order is correct in step 7614, the goods management DB 7100 is referred to through the goods code 7101 of ordered goods in step 7616. If there is a stock of corresponding goods in step 7618, an order acceptance notification is transmitted to the purchaser's processing unit 1 in step 7622.

Then, provisional settlement money information is received from the purchaser's processing unit 1 in step 7626, and the amount of the provisional settlement money and the validity of goods purchase information received are checked in step 7628. If it is determined in step 7629 that the check result is correct, then the purchaser is confirmed in step 7630. If the confirmation result is correct in step 7632, then a payment ID is numbered in step 7634, a sales management record is generated in the sales management DB 7200 using the payment ID 7201 as a key in step 7636, and a provisional settlement money record is generated in the provisional settlement money management DB 7300 using the payment ID 7301 as a key in step 7538. Then, order acceptance information is transmitted to the purchaser's processing unit 1 in step 7640.

Then, it is determined in step 7642 whether or not ordered goods are digital contents. If they are physical goods, it is determined in step 7644 whether or not a delivery system exists. If yes, a goods delivery request is transmitted to the deliverer's processing unit 6 in step 7646. If a process result is OK in step 7652 after the process result is received from the deliverer's processing unit 6 in step 7650, then the deliverer is requested to deliver the goods in step 7654 and receives third-party delivery certification. In step 7656, shipping information such as date and time, etc. is set in the shipping date and time 7210 of the sales management DB 7200. If the ordered goods are digital contents in 7642, then a digital contents transmission process is performed in step 7700.

Furthermore, in step 7660, provisional settlement money information is obtained from the provisional settlement money management DB 7300, and a final settlement request is transmitted to the processing unit of the purchaser's financial institution 3 in step 7662. A process result is received from the processing unit of the purchaser's financial institution 3 in step 7666, and the process result is checked in step 7668. If the process result is OK, then a record is generated in the final settlement request management DB 7400 using the payment ID 7401 as a key in step 7670, and final settlement request information such as the final settlement request date and time 7404, etc. is set.

If the contents are not correct in step 7614, if goods corresponding to the order are not found in step 7618, if a check result is not correct in step 7629, and if a confirmation result is not correct in step 7632, then a notification that a goods order cannot be accepted is transmitted to the purchaser's processing unit 1 in step 7674. If the process results are NG in steps 7652 and 7668, then an error process is performed in step 7676.

Figure 86:
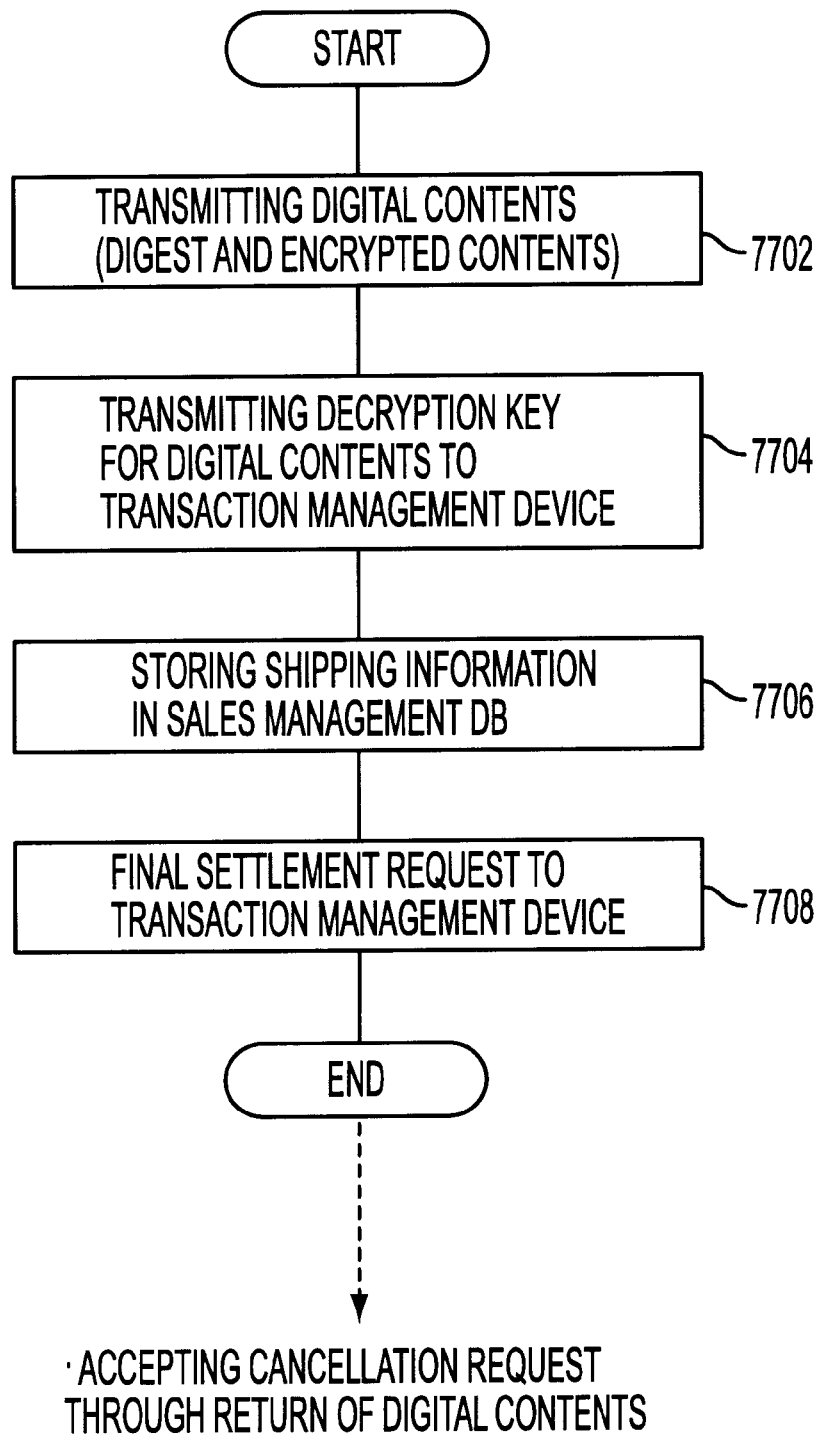
FIG. 86 is a flowchart showing the procedure of the digital contents transmission process.

The procedure of the digital contents transmission process 7700 is described below by referring to FIG. 86. In step 7702, the digital contents transmission process 7700 transmits the digest information about digital contents and encrypted digital contents.

The digital contents transmission process 7700 refers to the digital contents management DB 7550 using the digital contents management ID 7105 of the goods management DB 7100 as a key, and retrieves the digest information 7553 of the corresponding digital contents record. Furthermore, the contents goods information 7555 is encrypted using the encryption key 7216 of the digital contents key information of the sales management DB 7200. These data are transmitted to the purchaser's processing unit 1 through the transaction management device 5.

Then, in step 7704, the decryption key 7217 of the digital contents key information in the sales management DB 7200 is transmitted to the transaction management device 5. Then, in step 7706, the shipping information 7209 is stored in the sales management DB 7200, provisional settlement money information is obtained from the provisional settlement money management DB 7300 in step 7708, and a final settlement request is transmitted to the transaction management device 5.

Figure 87:
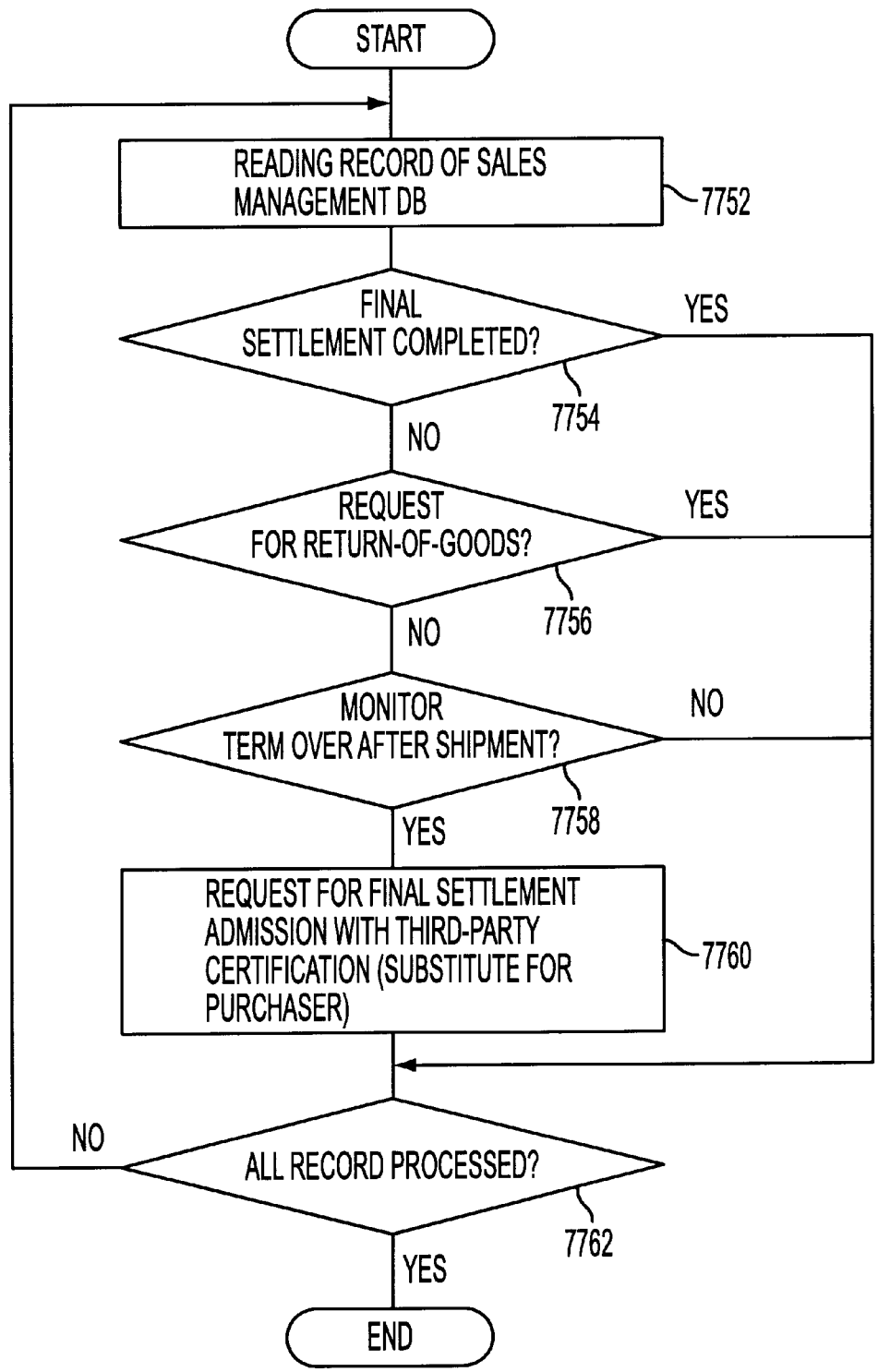
FIG. 87 is a flowchart showing the procedure of the final settlement site monitor process.

Next, a return-of-goods request is monitored, and a final settlement admission request is issued on behalf of a purchaser if the return-of-goods request is not issued within a predetermined period. The final settlement site monitor and final settlement admission substitution process 7750 is described below by referring to FIG. 87 as the above described function.

In the final settlement site monitor and final settlement admission substitution process 7750, a sales management record in the sales management DB 7200 is read once a day in step 7752, and the processes in and after step 7754 are performed. If the conditions of a final settlement are determined in step 7754, and if the final settlement has not been completed yet, then the conditions of a return-of-goods request is determined in step 7756. If there is not return-of-goods request, it is determined in step 7758 whether or not the monitor term (X days) has passed after shipment. If the monitor term has already passed, then the final settlement admission request (as substitution) is issued to the processing unit of the purchaser's financial institution 3 with the third-party delivery certification received from a deliverer in step 7760.

Figure 88:
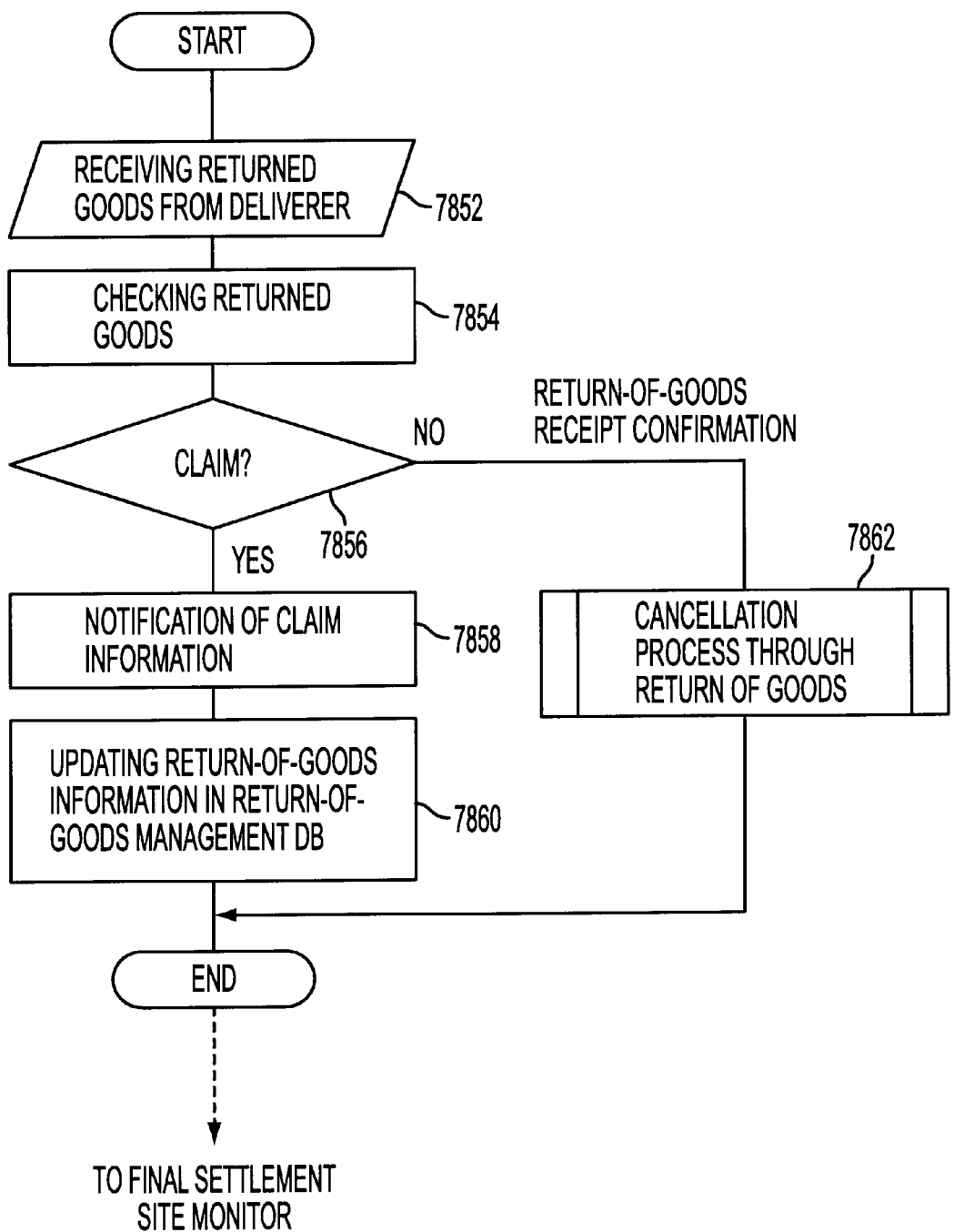
FIG. 88 is a flowchart showing the procedure of the return-of-goods acceptance process.

The returned goods acceptance process 7850 is described below by referring to FIG. 88.

In the returned goods acceptance process 7850, returned goods are first received from the deliverer in step 7852. The contents of the goods are confirmed, and a return-of-goods management record is generated in the return-of-goods management DB 7500 in step 7854. If the goods returned is defective in step 7856, then claim information is transmitted to the processing unit of the purchaser's financial institution 3 in step 7858, and the return-of-goods claim information 7508 such as the claim request date and time 7509, etc. is set in the return-of-goods management DB 7500 in step 7860. If the validity of goods is confirmed in step 7856, then the cancellation process through return of goods 7950 is performed in step 7862.

Figure 90:
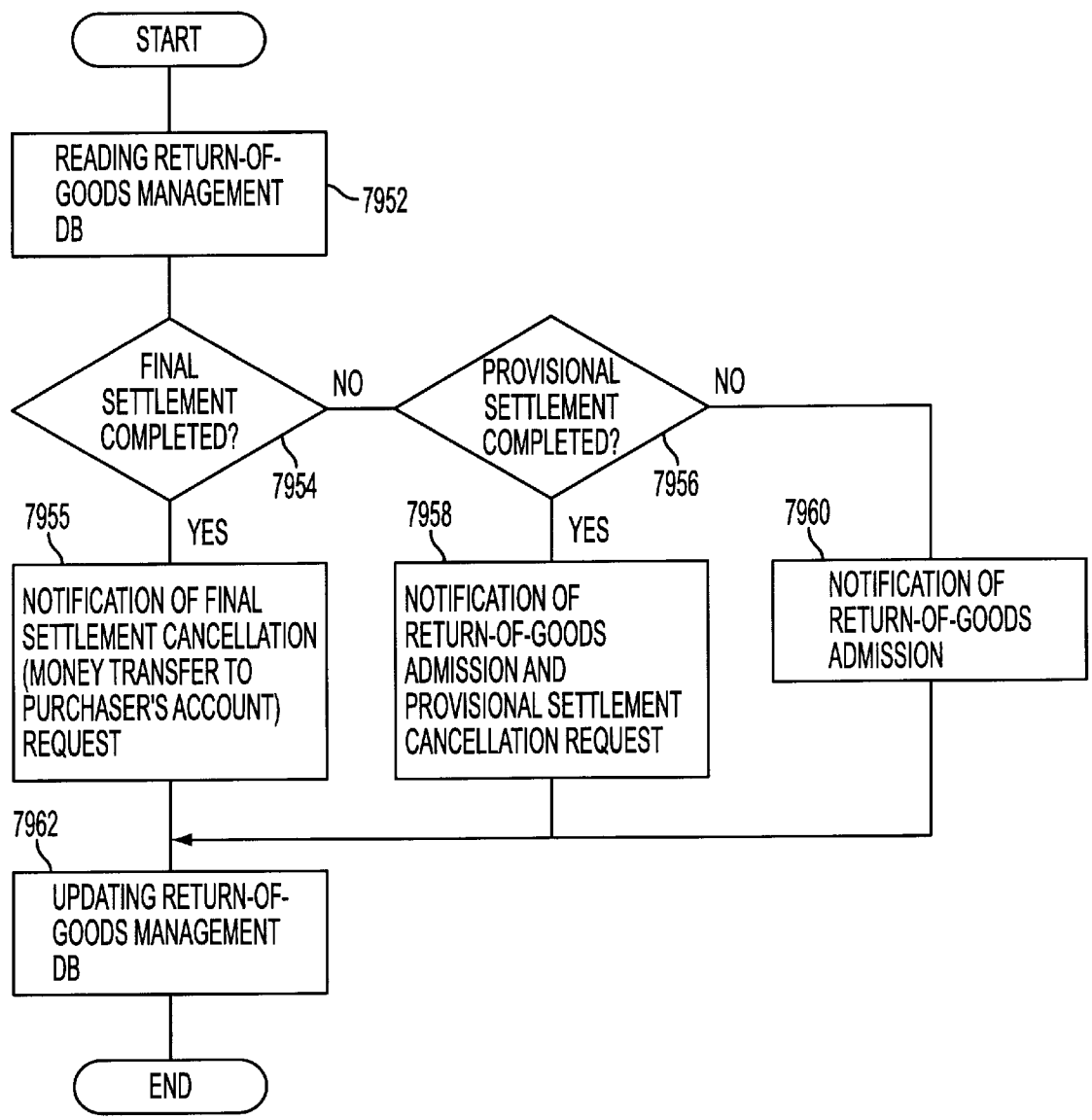
FIG. 90 is a flowchart showing the procedure of the cancellation process after return of goods.

The cancellation process through return of goods 7950 is described below by referring to FIG. 90.

In the cancellation process through return of goods 7950, a record in the return-of-goods management DB 7500 is first read in step 7952, the final settlement request management information 7215 in the sales management DB 7200 is referred to in step 7954, and the final settlement request management DB 7400 is referred to using the payment ID 7401 as a key, thereby confirming the conditions of the final settlement. If the final settlement completion date and time 7405 is set, then a final settlement cancellation (transfer of money to a purchaser's account) request is transmitted to the processing unit of the purchaser's financial institution 3 in step 7955. If the final settlement completion date and time 7405 is not set, then the provisional settlement money management DB 7300 is referred to and it is determined whether or not there is a record of provisional settlement money corresponding to the payment ID. If there is a record of provisional settlement money, then a return-of-goods admission and a provisional settlement cancellation request are transmitted to the processing unit of the purchaser's financial institution 3 in step 7958. If there is no record of the provisional settlement money, then a return-of-goods admission is transmitted to the processing unit of the purchaser's financial institution 3 in step 7960. In step 7962, the record in the return-of-goods management DB 7500 is updated.

The description of the procedure of the seller's processing unit 2 not described yet is added. The following procedure of the unit should be provided as a preferred embodiment of the present invention.

Figure 89:
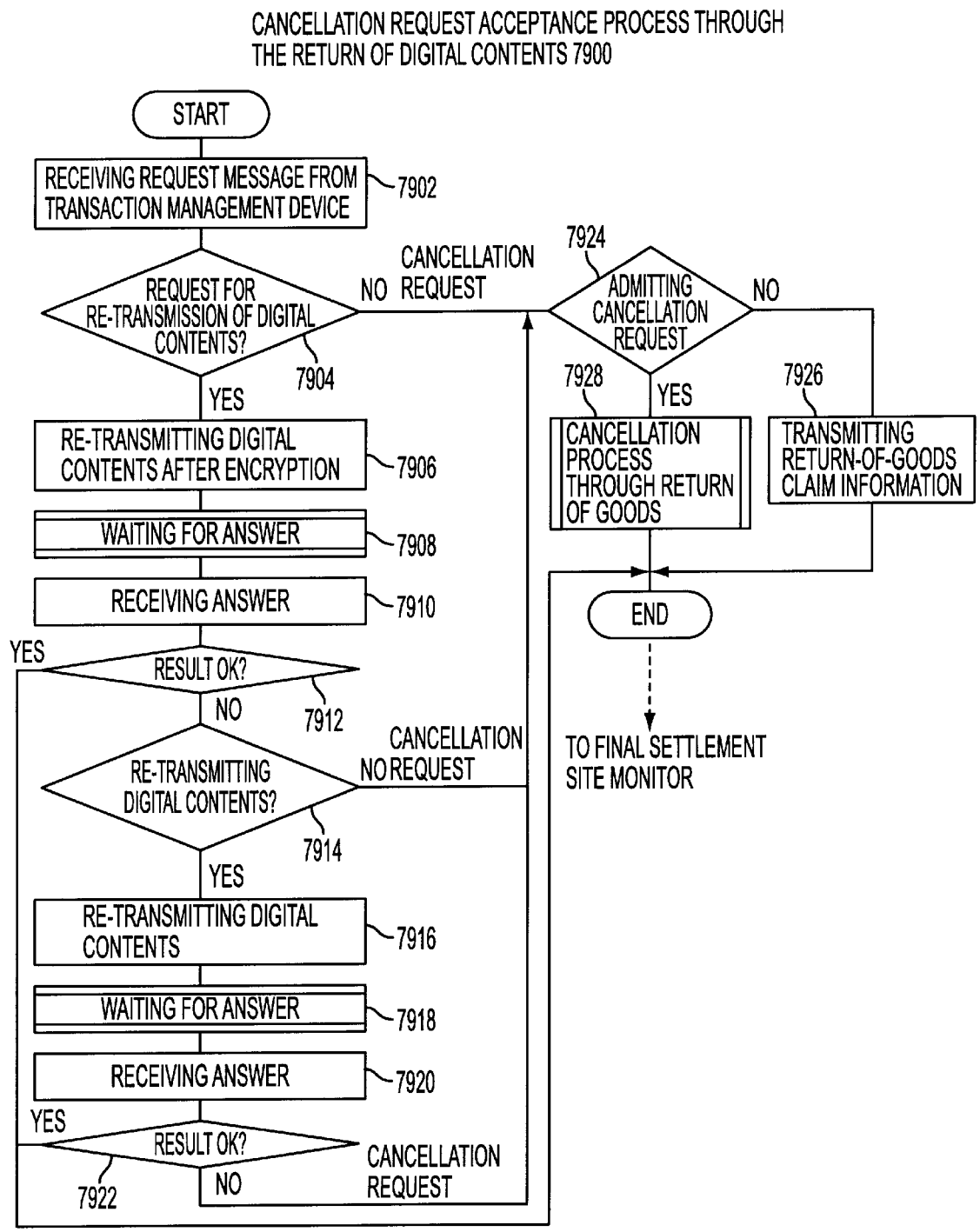
FIG. 89 is a flowchart showing the process of cancellation request acceptance process after return of goods of digital contents.

FIG. 89 shows the procedure of the cancellation request acceptance process 7900 through the return of digital contents. In the cancellation request acceptance process 7900, a request message about the digital contents is received from the transaction management device 5 in step 7902, and a return-of-goods management record is generated in the return-of-goods management DB 7500. Then, the contents of the request is determined in step 7904. If it is a digital contents re-transmission request, then the encrypted digital contents transmitted to the purchaser's processing unit 1 are re-transmitted to the transaction management device 5. A decryption process result of digital contents is received from the transaction management device 5 in step 7910, and is confirmed in step 7912. If a decryption process is not correctly performed in the transaction management device 5, and a non-encrypted digital contents re-transmission request is issued in step 7914, then non-encrypted digital contents are re-transmitted after encrypting them using an encryption key between the seller's processing unit 2 and the transaction management device 5 in step 7916. If a confirmation process result of the digital contents by the transaction management device 5 is received in step 7920 and the result is OK in step 7922, then the process terminates. If the cancellation request is received in steps 7904 and 7914, and if the process result is NG in step 7922, then it is determined in step 7924 whether or not the provisional settlement cancellation request can be admitted. If yes, the cancellation process through return-of-goods 7950 is performed in step 7928. If not, the return-of-goods claim information is transmitted to the transaction management device 5 in step 7926, and the claim request date and time 7509 of the return-of-goods management DB 7500 is set.

Finally, the configuration in which it is determined whether or not goods have been shipped is described below by referring to the process flow shown in and after FIG. 91.

First, the goods shipment execution term, that is, payment condition information, is monitored. If goods are not shipped within an execution term, then the payment condition information is transmitted as authentication information to issue a transaction cancellation request. The procedure of the execution term monitor process 7970 is described as the above described function. The execution term monitor process 7970 is performed in the purchaser's processing unit 1 or in a processing unit provided at a goods receiver.

Figure 91:
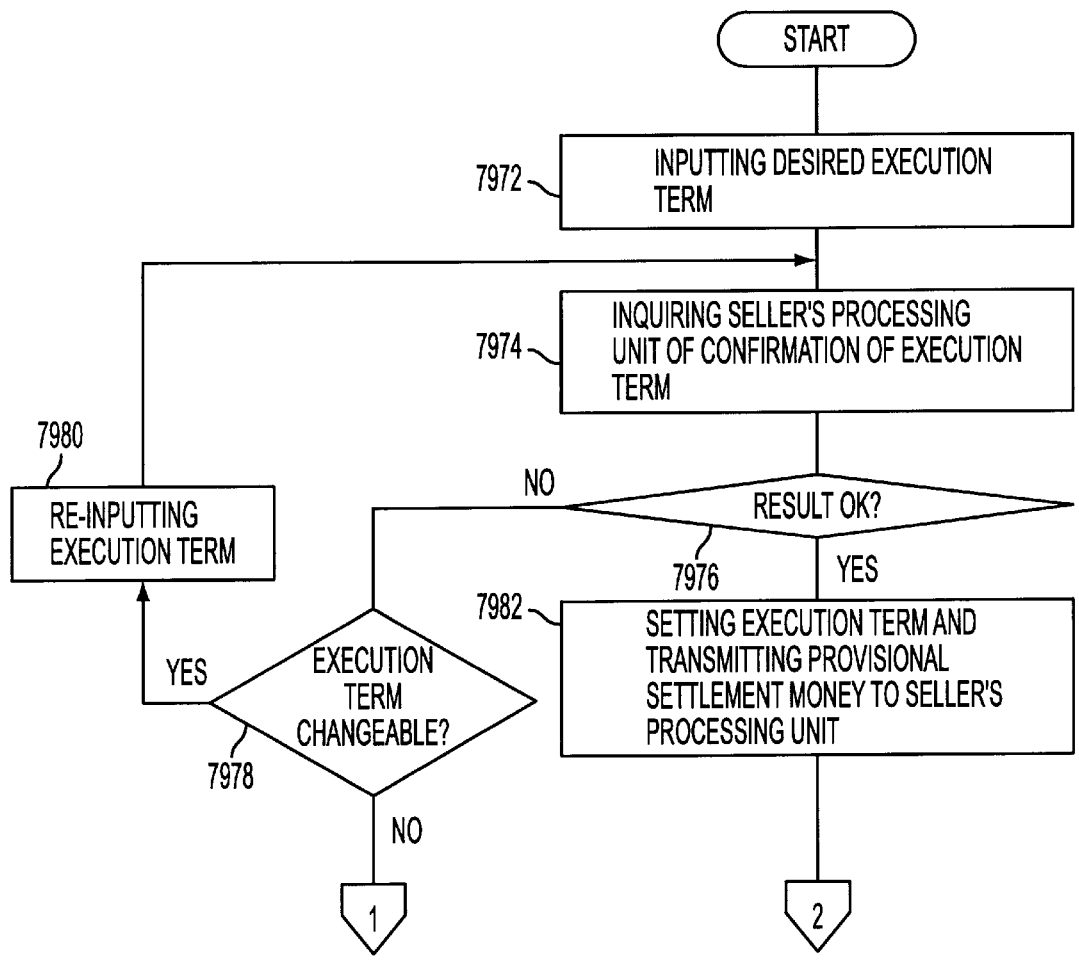
FIG. 91 is a flowchart (1) showing the procedure of the execution term monitor process.
Figure 92:
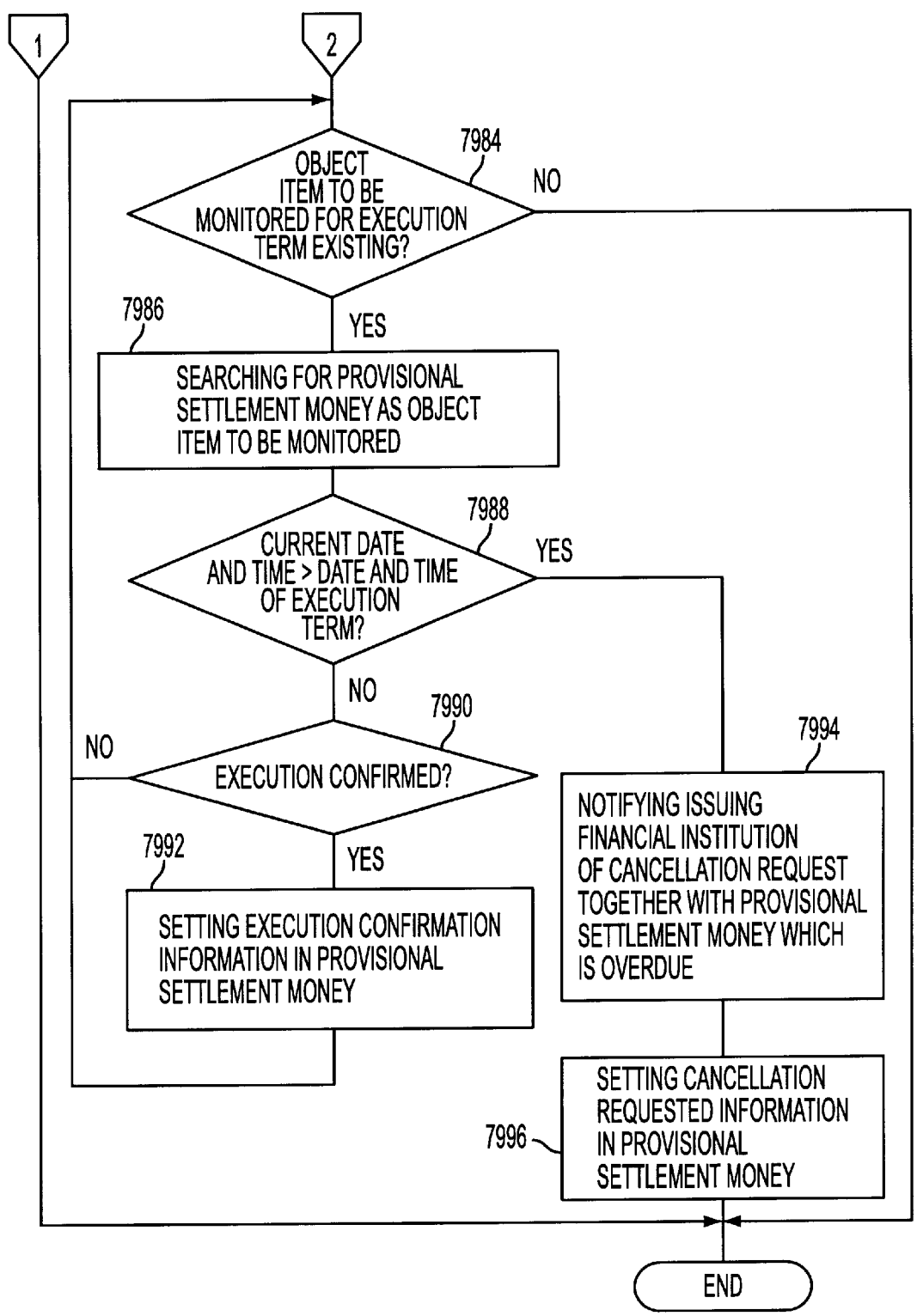
FIG. 92 is a flowchart (2) showing the procedure of the execution term monitor process.

FIGS. 91 and 92 are flowcharts showing the execution term monitor process 7970. In this execution term monitor process 7970, an input of the execution term requested by the purchaser is first accepted in step 7972, and the seller's processing unit 2 is inquired in step 7974 whether or not the execution term can be followed. If the inquiry result is NG in step 7976, then the purchaser is inquired in step 7978 whether or not the execution term can be changed. If the term can be changed, then a re-entry of the execution term is accepted in step 7980, and the processes in and after 7974 are repeated. If the change is not accepted, the process terminates.

If the inquiry result is OK in step 7976, then the execution term is set in the provisional settlement money in step 7982, and it is transmitted to the seller's processing unit 2. Then, it is determined in step 7984 whether or not an object for which the execution term is to be monitored exists. If yes, then the provisional settlement money corresponding to the object is searched in step 7986, and the date and time of the execution term set for the provisional settlement money is compared with the current date and time in step 7988. If the current date and time has not passed the date and time of the execution term, then it is checked in step 7990 whether or not there is an input for confirmation of the execution.

If yes, confirmation information such as the confirmation date and time, the name of the confirmor etc. is set in the provisional settlement money in step 7992, and the processes in and after step 7984 are repeated. If there is no input for confirmation, then the processes in and after step 7984 are repeated. When no monitor objects exist in step 7984, the process terminates.

If the current date and time has passed the date and time of the execution term in step 7988, then the issuing financial institution is informed of the provisional settlement cancellation request together with the provisional settlement money for which the execution term has passed in step 7994. Then, in step 7996, the cancellation requested information containing a request date and time, etc. is set in the provisional settlement money in step 7996, thereby terminating the process.

Then, a goods order is accepted from a purchaser, provisional settlement money settled through confirmation notification that the goods have been delivered is accepted, the execution term of the goods delivery, that is, payment condition information, is monitored. If the goods are not delivered within an execution term, it is notified to a purchaser or a goods receiver. The procedure of the execution term monitor and non-execution notification process 8000 shown in FIG. 77 performed by the seller's processing unit 2 is described below as the above described function.

Figure 93:
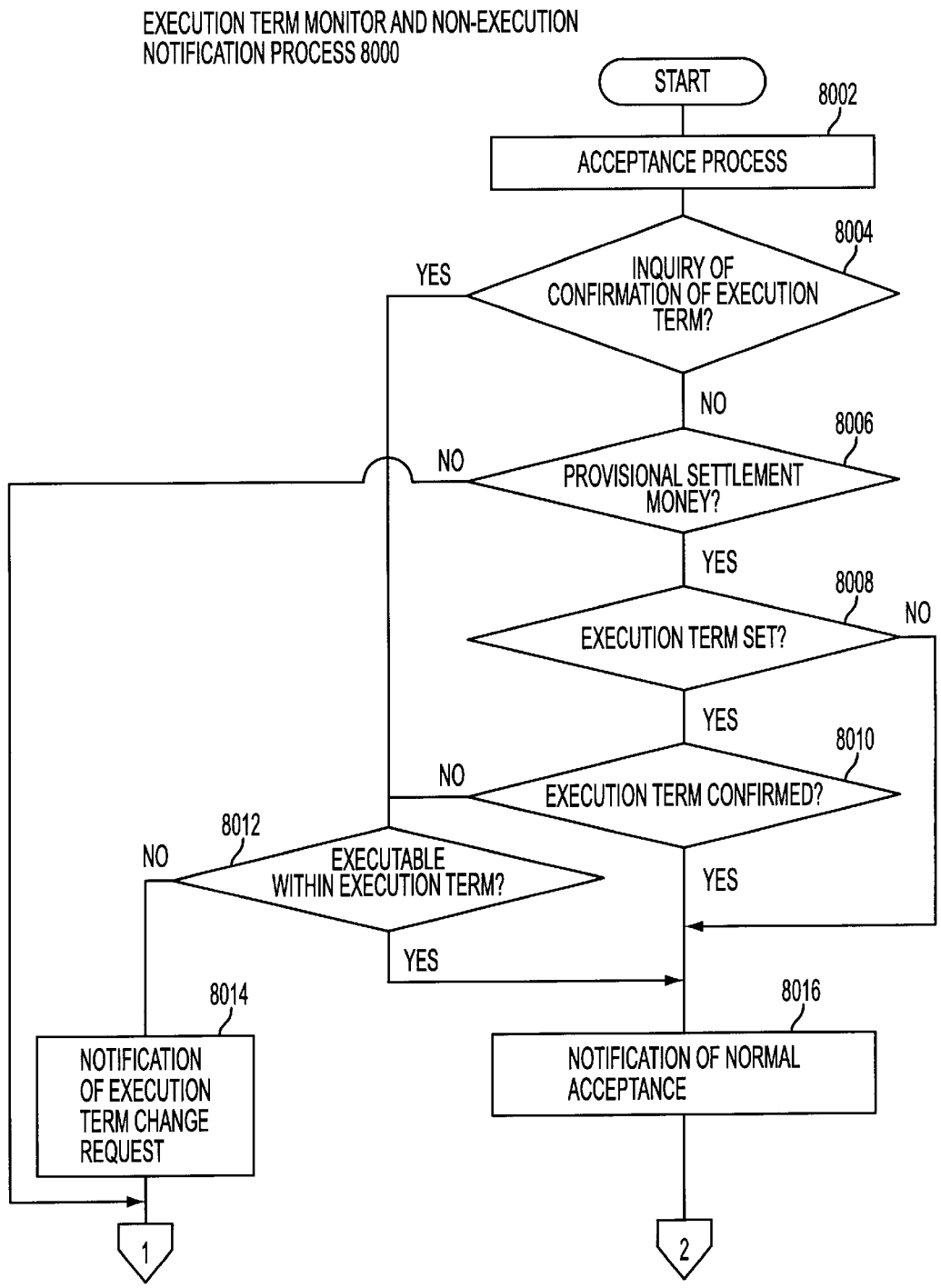
FIG. 93 is a flowchart (1) showing the procedures of the execution term monitor and non-execution notification process.
Figure 94:
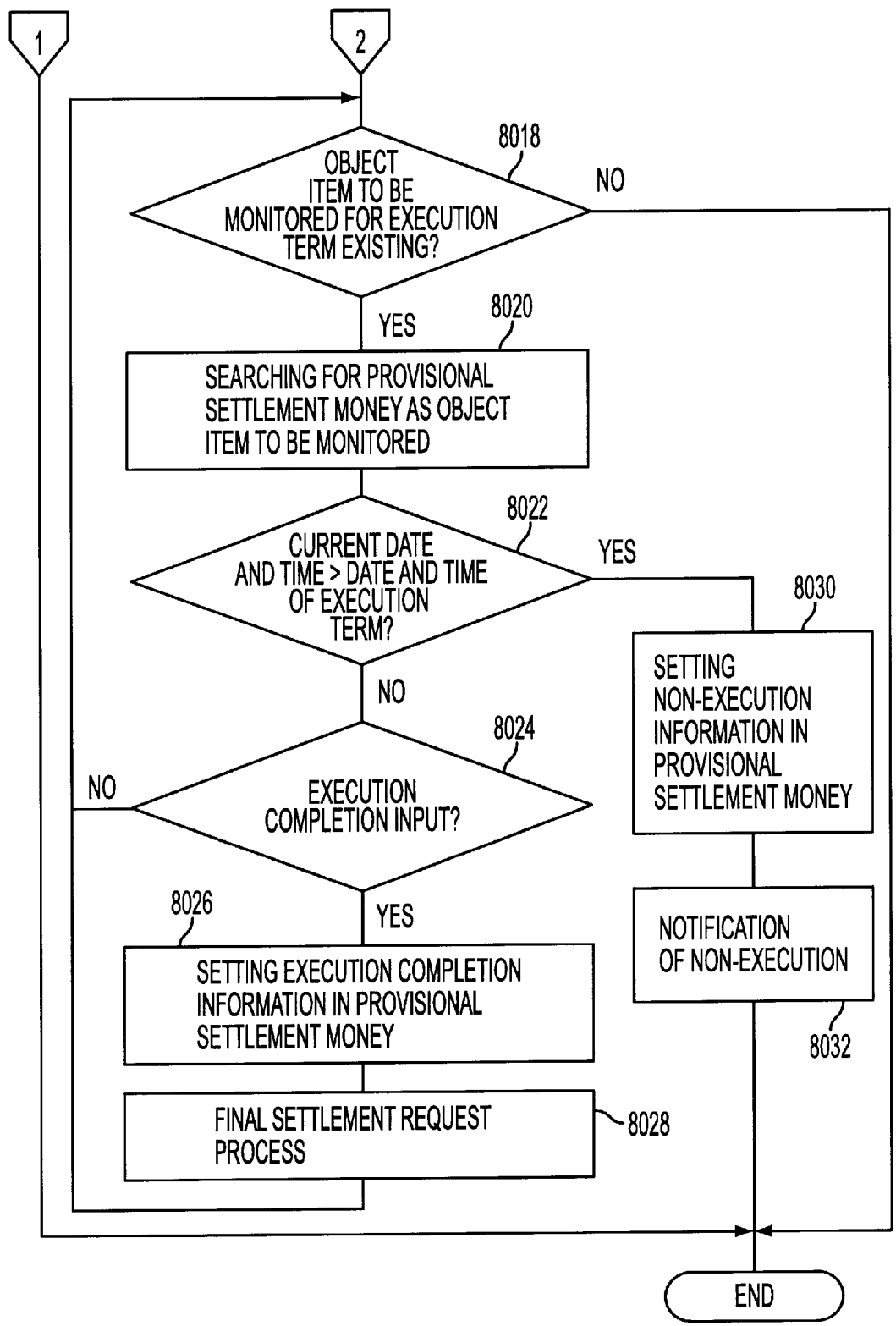
FIG. 94 is a flowchart (2) showing the procedures of the execution term monitor and non-execution notification process.

FIGS. 93 and 94 are flowcharts showing the execution term monitor and non-execution notification process 8000. In the process 8000, transmission information is first accepted from a purchaser or a goods receiver in step 8002, and a seller is inquired in step 8012 whether or not goods can be shipped within the execution term if the transmitted information refers to an inquiry about the confirmation of the execution term in step 8004. If the goods can be shipped, the processes in and after step 8016 are performed. If they cannot be shipped, then the execution term change request is issued to the information transmitter, thereby terminating the process.

If the transmission information is not an inquiry about the confirmation of the execution term in step 8004, but is provisional settlement money in step 8006, then it is checked whether or not the execution term is set in step 8008. If the execution term is set, then it is checked in step 8010 whether or not there is confirmation information about the execution term. If there is confirmation information, then the processes in and after step 8016 are performed.

If the execution term is not set in step 8008, the processes in and after step 8016 are performed. If there is no confirmation information in step 8010, then the processes in and after step 8012 are performed. If the transmission information is not provisional settlement money in step 8006, then the process terminates.

In step 8016, the transmitter is informed that the transmitted information has been correctly received. Then, in step 8018, it is determined whether or not there is an execution term monitor object. If yes, the provisional settlement money corresponding to the object is searched in step 8020, and the execution term date and time set for the provisional settlement money is compared with the current date and time in step 8022. If the current date and time has not passed the date and time of the execution term, then it is checked in step 8024 whether or not there is an input indicating that the goods shipment has been executed.

If there is a corresponding input, then the execution completion information such as an execution date and time, the name of an execution confirmor, etc. is set in the provisional settlement money in step 8026, a corresponding final settlement request process is performed in step 8028, and the processes in and after step 8018 are repeated. If there is no corresponding input, then the processes in and after step 8018 are repeated. If there is no monitor object in step 8018, then the process terminates.

If the current date and time has passed the date and time of the execution term in step 8022, then the non-execution information such as the non-execution confirmation date and time, the reason for non-execution, the name of a non-execution confirmor, etc. is set in provisional settlement money in step 8030, and the transmitter is informed that goods have not been shipped in step 8032, thereby terminating the process.

In the above described embodiment of the present invention, the payment is made for the sales of products such as physical goods and digital contents, etc. However, similar systems can be applicable when payment is made for services. In this case, a service is an object item for which payment is to be made.

Figure 95:
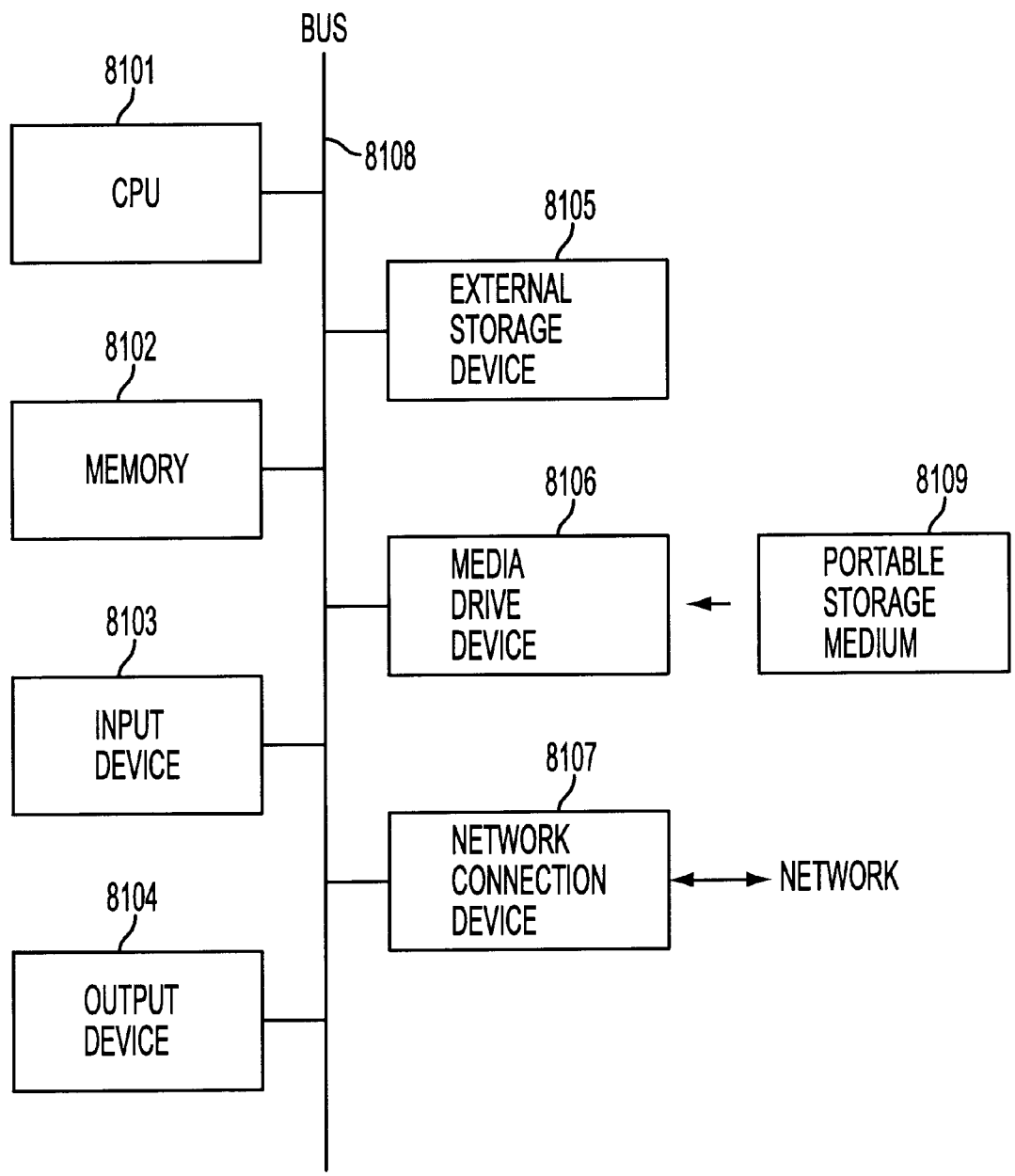
FIG. 95 shows the configuration of an information processing device.

Each device or unit according to the present embodiment can be designed using the information processing unit (computer) as shown in FIG. 95. The information processing device shown in FIG. 95 comprises a CPU (central processing unit) 8101, memory 8102, an input device 8103, an output device 8104, an external storage device 8105, a media drive device 8106, and a network connection device 8107. These components are interconnected through a bus 8108.

The memory 8102 stores a program and data used for a process. The memory 8102 can be, for example, ROM (read only memory), RAM (random access memory), etc. The CPU 8101 performs a necessary process by executing the program using the memory 8102.

The input device 8103 is, for example, a keyboard, a pointing device, a touch panel, etc., and can be used when inputting an instruction and information from a user. The output device 8104 is, for example, a display, a printer, etc. and can be used when outputting an inquiry, a process result, etc. to a user.

The external storage device 8105 is, for example, a magnetic disk device, an optical disk device, a magneto-optical disk device, etc. The above described program and data are stored in the external storage device 8105, and loaded onto the memory 8102 for use as necessary. The external storage device 8105 can also be used as a database of various types.

The media drive device 8106 drives a portable storage medium 8109, and accesses the stored contents. The portable storage medium 8109 can be any computer-readable storage medium such as a memory card, a floppy disk, CD-ROM (compact disk read only memory), an optical disk, a magneto-optical disk, etc. The above described program and data are stored in the portable storage medium 8109, and loaded onto the memory 8102 for use as necessary.

The network connection device 8107 communicates with other devices through an optional network (line) such as a LAN (local area network), etc., and converts data for communications. When it is necessary, the above described program and data are received from an external device, and they are loaded onto the memory 8102 to be used.

Figure 96:
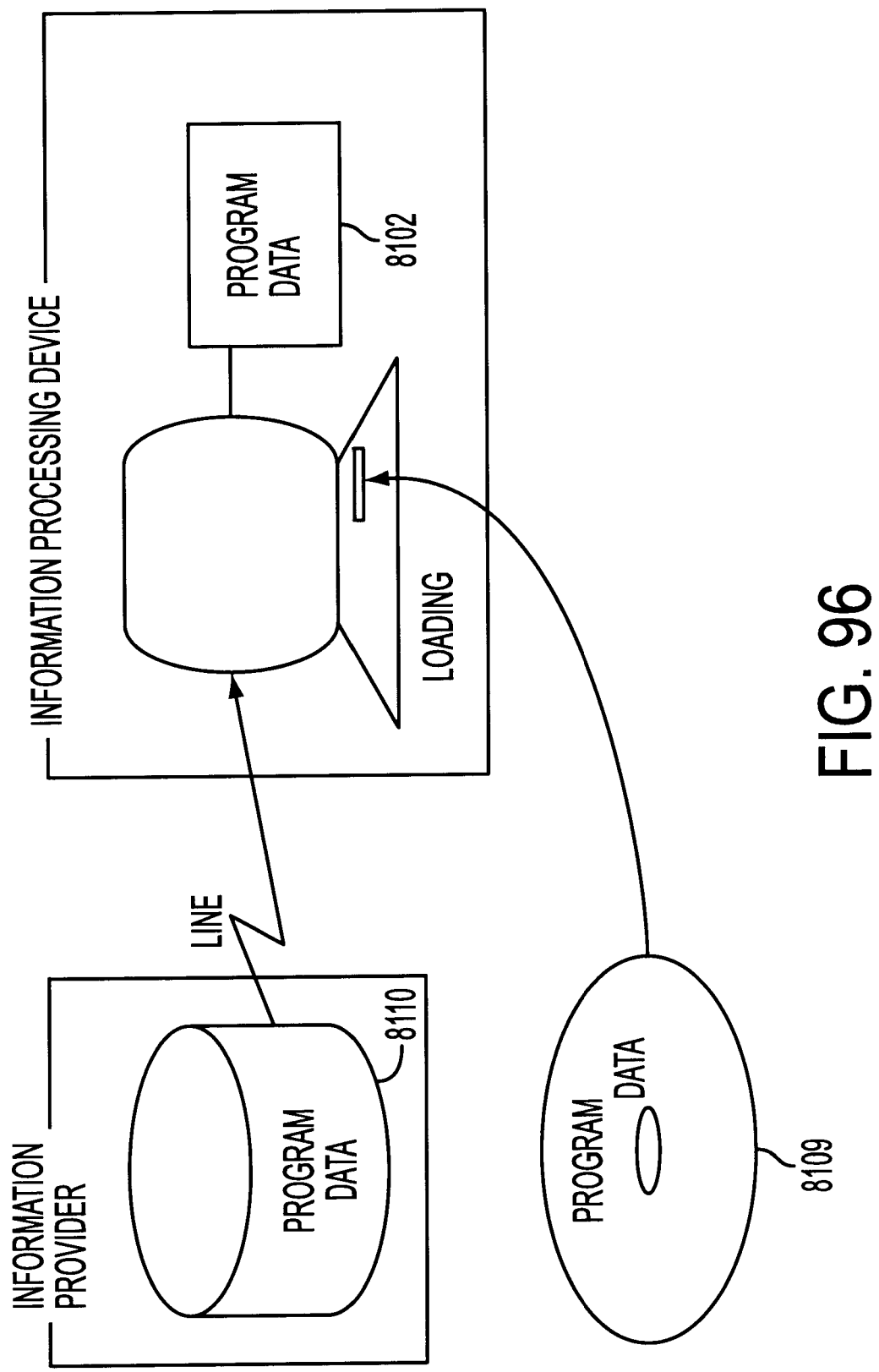
FIG. 96 shows storage media.

FIG. 96 shows computer-readable storage media capable of providing the program and data for the information processing device shown in FIG. 95. The program and data stored in the portable storage medium 8109 and an external database 8110 are loaded onto the memory 8102. The CPU 8101 executes the program using the data and performs a necessary process.

As described above, according to the present invention, a payer (purchaser of goods, service requester, etc.) can indicate his or her payment capacity to the payee (seller, service provider, etc.) when he or she purchases goods or requests a service by informing the payee of the money information including the information about provisional settlement settled at a notification that an object item of the payment (providing goods, services, etc.) has been executed. The payee can secure the expenses for the goods or services according to the money information. Therefore, the payee can solve the problem of a collection risk about goods and services.

A payer or a confirmor who confirms the object item of payment admits final settlement after confirming the contents (color, size, pattern, quality, manufacturer's name, type, authentication, etc.) of ordered goods and received goods after receipt of the goods when the goods are purchased. Therefore, the purchaser can obtain desired goods. When the purchaser orders a service, the final settlement is admitted after confirming the result of the work performed by a service provider (white-ant exterminating, field work of cleaning and washing, repairing a house, etc.), thereby easily avoiding insufficient working. Therefore, both payer and payee can be free of risk and the settlement process can be successfully performed.

With the above described configuration, a payee can confirm with authentication of the issuing financial institution that the issuing financial institution has secured in the account of the payer the money information containing the provisional settlement information settled upon receipt of the confirmation notification that the object item for which payment is to be made has been executed. Therefore, goods, services, etc. can be provided without depending on a payer's personal credit.

Since the money information containing the provisional settlement information includes the information about an object item for which payment is made, the issuing financial institution can confirm necessary information according to more detailed information at the final settlement and can effectively avoid the occurrences of accidents in the settlement performed in response to an illegal settlement request. Furthermore, it prevents a payer from using the money information containing the provisional settlement information for other uses.

According to the present invention, since the payment object information is encrypted (blinded) using an encryption key so that only the issuing financial institution can decrypt the information, the money information can be prevented from being illegally copied by a third party for other uses.

Furthermore, according to the present invention, a payer pays to a payee after the payer generates provisional settlement information using electronic money having information for identifying whether or not the provisional settlement information is contained. Final settlement is made after the payer or a confirmor has confirmed the contents of the goods or services provided from the payee. Therefore, both payer and payee are free of risk, and the settlement process can be successfully performed. The payer determines at the transfer of electronic money whether it is paid as final settlement electronic money without provisional settlement information or as provisional settlement electronic money with the generated provisional settlement information. Therefore, the electronic money can be paid effectively and safely depending on payment conditions.

According to the present invention, when the money information containing the provisional settlement information is stored in a portable storage medium such as a portable card, etc., a payer can transmit payment to a payee online through a network, etc. when purchasing goods, or can pay by directly providing the portable storage medium. As a result, the convenience in payment can be improved and the opportunities that the goods are sold can be extended.

According to the present invention, the portable storage medium can be issued from a terminal such as an ATM, etc. connected to an issuing financial institution. As a result, an issue of a forged portable storage medium can be suppressed. Furthermore, since a portable storage medium can be issued by any terminal unit without designating a specific location, a payer (a person who requests an issue of a portable storage medium) can obtain the medium at any time when a terminal unit is operable even after the windows of the issuing financial institution are closed.

According to the present invention, a payee puts the portable storage medium transferred as provisionally settled money information from a payer into the terminal unit such as an ATM, etc. connected to the issuing financial institution to issue a final settlement request. Therefore, even a payee not provided with a processing unit connected through a network can process a transaction using the provisional settlement system.

According to the present invention, when a portable storage medium is issued from a terminal unit such as an ATM, etc. connected to the issuing financial institution, it is indicated whether or not an automatic collection is performed upon completion of a process. If it is indicated that a portable storage medium is automatically collected, it can be collected upon confirmation of a process, thereby avoiding illegal operations and saving resources by re-using the portable storage medium.

Furthermore, according to the present invention, an illegal use of a portable storage medium can be avoided by writing information which prohibits the re-use of the medium after a process is completed even if the automatic collection is not performed on the medium.

According to the present invention, since a final settlement request can be accepted from a payee but final settlement cannot be made without a final settlement admission from a payer. Therefore, a payer's payment risk can be avoided.

According to the present invention, when a payee issues a final settlement request to a payer's financial institution, the payee specifies, as request for receipt of transfer information when final settlement is made, the transfer destination information addressed to the payee's financial institution containing the payee's account, or the payee's electronic wallet information. Thus, when the final settlement is made, the transfer is automatically executed to the payee specified in the request for receipt of transfer information.

According to the present invention, a transaction is processed through an intermediate for transmission (transaction management device, etc.). Therefore, a transmitter of transaction information need not receive an encryption key of a receiver or send the transmitter's encryption key. Since the transmitter transmits a message after encrypting it using a unique encryption key between a transmission intermediate and the transmitter, the transmitter need not transmit or receive an encryption key or a decryption key to or from the receiver. Therefore, there is no risk that a third party may read the transaction information. Furthermore, the transmitter can easily manage the encryption key, thereby largely improving the security.

Furthermore, according to the present invention, a transmission intermediate decrypts an encrypted electronic message transmitted from the transmitter using a unique decryption key between the intermediate and the transmitter, thereby easily authenticating the transmitter.

According to the present invention, since a receiver receives an electronic message encrypted using a unique encryption key between the intermediate and the receiver, the receiver need not consider the encryption key of the transmitter. Additionally, the receiver can easily manage the encryption key, thereby largely improving the security.

Furthermore, according to the present invention, since transaction conditions cannot be confirmed if a transaction is processed only between the parties concerned, a transaction management device is provided. The entire process of the transaction can be correctly performed by transmitting and receiving the transaction information by a payer, a payee, and a financial institution through the transaction management device.

According to the present invention, when the transaction management device manages transaction information, it manages the information with authentication of a transmitter, thereby avoiding a refusal of the transmitter's personal identity or the transaction.

Furthermore, according to the present invention, when a payee has to issue a transaction cancellation request to the transaction management device due to an unsuccessful transaction, the transaction management device monitors the occurrence of a transaction cancellation request process performed by the payee. Therefore, the payer need not check the transition cancellation conditions.

According to the present invention, the transaction management device manages the period from the occurrence of a cancellation event predetermined for each transaction to an issue of a cancellation request. If the cancellation request from the payee is not issued within the period, then the device performs the cancellation request process on behalf of the payee. As a result, the cancellation process can be performed without delay.

Furthermore, according to the present invention, the transaction management device monitors based on the date and time on which a receiver receives goods whether or not the receiver has issued a final settlement admission request and whether or not the goods were returned. Therefore, the transaction conditions such as final settlement through provisional settlement, cancellation of a transaction, etc. can be correctly recognized.

Furthermore, according to the present invention, the transaction management device manages the period from the receipt of goods to an issue of a final settlement admission request or a return-of-goods request. If the receiver does not issue a final settlement admission request or a return-of-goods request within the period, then it issues a final settlement admission request on behalf of the receiver. Therefore, the transaction can be processed without delay after receipt of goods until a final settlement admission request.

Furthermore, according to the present invention, when a receiver returns goods and a notification that a return-of-goods procedure has been followed, the transaction management device issues a transaction cancellation request on behalf of the receiver. Therefore, the cancellation process can be performed without delay after return of goods.

Furthermore, according to the present invention, a deliverer's processing unit receives a delivery request from a payee, manages a receipt signature of a delivery destination, and generates delivery certification information including a payment ID related to delivered goods, thereby certifying the fact that the goods have been delivered.

Furthermore, according to the present invention, the deliverer's processing unit manages the signature of a requester when a returned goods delivery request is issued from a receiver, and generates delivery certification information including a payment ID related to the goods to be returned, thereby certifying the fact that a return-of-goods process has been started.

Furthermore, according to the present invention, when the deliverer's processing unit delivers goods to be returned to a payee, it manages the receipt signature of a payee, and generates final return-of-goods certification information including a payment ID related to the goods to be returned. As a result, it certifies the fact that the returned goods have been delivered to the payee.

According to the present invention, when a deliverer's processing unit generates each of the delivery certification information certifying that goods have been delivered, the return-of-goods certification information certifying that the returned goods have been accepted, and the final return-of-goods certification information certifying that the returned goods have been delivered to the payee, the information is entered in the transaction management device. As a result, correct conditions in each of the transaction processes can be recognized. Furthermore, a transaction trouble can be avoided by using each certification information as the third-party admission information.

Furthermore, according to the present invention, the transaction management device manages the period from a receiver's receipt of goods to an issue of a final settlement admission request or a return-of-goods request. If no final settlement admission request or return-of-goods request has been issued within the period, then the transaction management device issues a final settlement admission request on behalf of the receiver. At this time, since the final settlement admission request is issued as containing the delivery certification information of the deliverer's processing unit as authentication information, the process can be performed by the substitute at a higher reliability.

According to the present invention, after a receiver issues a return-of-goods request and the returned goods are delivered to a payee, the transaction management device issues a cancellation request on behalf of the receiver with a final return-of-goods certification information of the deliverer's management device added as authentication information. Thus, the process can be performed by a substitute at a higher reliability.

Furthermore, according to the present invention, a receiver issues a cancellation request with the return-of-goods certification information added as authentication information certifying that the return-of-goods request has been accepted. As a result, the receiver can also issue a transaction cancellation request and the cancellation process can be quickly performed.

Furthermore, according to the present invention, a payee manages the period after a receiver has received goods until a final settlement admission request or a return-of-goods request is issued, and monitors whether or not a final settlement admission request or a return-of-goods request has been issued. If neither of these requests have been issued, the payee issues a final settlement admission request including as authentication information the delivery certification information of a transaction management device which certifies that the goods have been delivered to the receiver. Therefore, the payee can issue a final settlement admission request instead of the receiver, and can quickly perform a final settlement process.

Furthermore, according to the present invention, the processing unit at a financial institution receives the final return-of-goods certification information certifying that the payee has received returned goods, receives a notification that there is a problem with the returned goods from the payee or the transaction management device, anticipates a case where a cancellation process cannot be performed, and manages the receipt period of a return-of-goods claim for each transaction. Then, it monitors whether or not a return-of-goods claim notification is issued within the period. Therefore, if there is a defect found in the goods returned from the good receiver, then the cancellation process is reserved to avoid a trouble in the return-of-goods process.

Furthermore, according to the present invention, when the processing unit at the financial institution receives a notification that returned goods have been correctly received from the payee who received the returned goods or the transaction management device, the cancellation process can be quickly performed without waiting for the expiry of the return-of-goods claim receipt period.

Furthermore, according to the present invention, the transaction management device in the digital contents sales system manages a decryption key for digital contents on behalf of a payee, and passes the decryption key at a demand from a payer. Therefore, the transaction management device can correctly manage whether or not the digital contents have successfully reached the payer.

Furthermore, according to the present invention, when the transaction management device transmits a decryption key for digital contents at a demand of a payer, it manages the signature of the payer, and generates the third party admission information, thereby avoiding the rejection of the payer.

Furthermore, according to the present invention, when the transaction management device receives a notification from a payer that digital contents cannot be decrypted it obtains the digital contents transmitted from the payee to the payer, and compares them with the digital contents from the payer. As a result, it can be monitored whether or not the digital contents of the payer have been illegally amended.

Furthermore, when the transaction management device finds no defect in the digital contents as a comparison result, then it decrypts the contents using a decryption key transmitted to the payer. Therefore, the validity of the digital contents and the decryption key can be managed.

Furthermore, according to the present invention, the transaction management device compares the decrypted digital contents with the un-encrypted digital contents received from the payee, and correctly manages whether or not the decrypted digital contents have been illegally amended.

Furthermore, according to the present invention, the transaction management device re-transmits a decryption key to a payer if there is a defect found in the decryption key as a result of the comparison. Therefore, the transaction of the digital contents can be performed without delay.

Furthermore, according to the present invention, if the transaction management device finds as a comparison result a defect in the digital contents transmitted from the payee to the payer, then it transmits to the payee a notification such as a cancellation request, etc. to stop the payment process by the payer, thereby performing a cancellation process without delay.

Furthermore, according to the present invention, when the transaction management device finds as a comparison result a defect in the digital contents, the digital contents are re-transmitted to the payer, thereby performing the transaction of the digital contents without delay.

Furthermore, according to the present invention, a payer can be different from a confirmor (goods receiver, service receiver, etc.) who confirms an object item for which payment is made. Therefore, using money information including provisional settlement information, presents can be transmitted to a family or a third party, or a service of cleaning a house, etc. by a service provider, can be easily presented on Mother's day or a special day such as a birthday.

Furthermore, according to the present invention, a confirmor who confirms an object item for which payment is to be made, can immediately issue a final settlement admission request after confirming the contents of the received goods or receiving a service. Therefore, the confirmor can make a final settlement (payment) more quickly than a payer who issues a final settlement admission request. Furthermore, the confirmor need not communicate with a payer for the final settlement admission request.

Furthermore, according to the present invention, the money information containing provisional settlement information can include as payment condition information the execution term about the object item for which payment is to be made. Therefore, it can be objectively checked or monitored whether or not goods can be delivered by a predetermined deadline (within the execution term), and whether or not a requested service has been performed within the execution term.

Furthermore, according to the present invention, when a payee cannot deliver ordered goods or a requested service within an execution term for an object item for which payment is to be made, a payer or a confirmor who confirms the object item for which payment is to be made can issue a cancellation request for the paid money information containing provisional settlement information. Therefore, a risk of a lost profit due to expiry can be avoided. A risk of a lost profit due to expiry refers to that goods and a service lose their values when they cannot be delivered or provided by a specified date such as a birthday, Mother's day, Christmas Eve, etc.

Furthermore, according to the present invention, a transaction management device monitors the execution term, that is, payment condition information, of an object item for which payment is to be made. Therefore, if ordered goods or requested services cannot be delivered or provided by the payee within the execution term, then the transaction management device can issue a cancellation request for paid money information containing provisional settlement information instead of the payer according to objective information. Furthermore, a payer or a confirmor who confirms an object item for which payment is to be made need not check or monitor as described above, and therefore even children and elder people can safely place an order for a service or goods.

Furthermore, according to the present invention, a payee monitors the execution term, that is, payment condition information, of an object item for which payment is to be made. If ordered goods or requested services cannot be delivered or provided within the execution term, then the payee notifies the payer or the confirmor who confirms the object item for which payment is to be made. Therefore, the payer or the confirmor can issue a rapid cancellation request.

The above described effects relate to the system and device according to the present invention. Similar effects can be expected when a storage medium according to the present invention is used.

What is claimed is:

1. A provisional settlement system comprising:
   means for transferring money information, which is settled according to a notification of confirmation that an object item for which payment is to be made has been executed, containing provisional settlement information to a payee; and
   means for making final settlement for the money information based on the confirmation that the object item for which payment is to be made has been executed.

2. The system according to claim 1, wherein
   said money information containing the provisional settlement information is generated by an issuing financial institution, and an amount of the money information is freezed in a balance of an account of a payer in the issuing financial institution, and is non-transferable until the final settlement is made.

3. The system according to claim 1, wherein
   said money information containing the provisional settlement information includes object information indicating the object item for which payment is to be made.

4. The system according to claim 3, wherein
   said object information is assigned a blind signature using an encryption key of an issuing financial institution which is not public.

5. The system according to claim 1, wherein
   said money information containing the provisional settlement information is stored in a portable storage medium.

6. The system according to claim 5, wherein
   said portable storage medium is issued from a terminal unit connected to an issuing financial institution to a payer.

7. The system according to claim 5, wherein
   said portable storage medium can be applied to a terminal unit connected to an issuing financial institution by the payee, and the terminal unit comprises means for transmitting a final settlement request according to the provisional settlement information stored in the portable storage medium.

8. The system according to claim 7, wherein
   said terminal unit comprises means for collecting the portable storage medium after the payee has issued the final settlement request.

9. The system according to claim 7, wherein
   said terminal unit comprises means for writing information inhibiting a re-use to the portable storage medium upon normal completion of a process for the final settlement request.

10. The system according to claim 1, further comprising:
    means for storing a final settlement request from the payee;
    means for storing a final settlement admission request from the payer; and
    means for performing the final settlement based on the stored final settlement request and final settlement admission request.

11. The system according to claim 10, wherein
    said final settlement request contains request for receipt of transfer information containing transfer destination.

12. The system according to claim 1, further comprising:
    a transaction management device for mediating transmission and receipt of transaction information.

13. The system according to claim 12, wherein
    said transaction management device comprises transaction information management means for storing the transaction information with authentication information about a transmitter.

14. The system according to claim 12, wherein
    said transaction management device comprises means for monitoring a transaction cancellation request from the payee.

15. The system according to claim 14, wherein
    said transaction management device comprises means for issuing a cancellation request on behalf of the payee when the transaction management device does not receive the cancellation request from the payee within a predetermined period.

16. The system according to claim 12, wherein
    said transaction management device comprises means for monitoring whether or not one of a final settlement admission request and a return-of-goods request is issued by a goods receiver after the goods receiver has received goods when the object item for which payment is to be made relates to goods.

17. The system according to claim 16, wherein
    said transaction management device comprises means for issuing the final settlement admission request on behalf of the goods receiver when neither of the final settlement admission request and the return-of-goods request are issued within a predetermined period.

18. The system according to claim 16, wherein
    said transaction management device comprises means for issuing a transaction cancellation request when a return-of-goods procedure is followed.

19. The system according to claim 12, wherein
    said transaction management device comprises:
    means for monitoring at least one of a final settlement admission request and a return-of-goods request; and
    means for transmitting third-party delivery certification information containing a payment identifier relating to purchase of goods as authentication information and issuing the final settlement admission request when none of the final settlement admission request and the return-of-goods request are issued.

20. The system according to claim 12, wherein
    said transaction management device comprises means for transmitting third-party return-of-goods certification information containing a payment identifier relating to purchase of goods as authentication information and issuing a transaction cancellation request.

21. The system according to claim 20, further comprising:
    means for monitoring a return-of-goods claim notification from one of a seller and a transaction management device after the goods have been returned; and
    means for reserving a transaction cancellation process when the return-of-goods claim notification is received within a predetermined period.

22. The system according to claim 21, further comprising:
    means for immediately performing the transaction cancellation process even within the predetermined period when a returned goods receipt notification is received from one of the seller and the transaction management device.

23. The system according to claim 12, wherein
    said transaction management device comprises:
    means for monitoring an execution term, contained in payment condition information, of the object item for which payment is to be made; and means for transmitting the payment condition information as authentication information and issuing a transaction cancellation request when the object item is not executed within the execution term.

24. The system according to claim 1, wherein said object item for which payment is to be made relates to goods; and at least one of a purchaser and a receiver of the goods has means for transmitting third-party return-of-goods certification information containing a payment identifier relating to purchase of the goods as authentication information, and issuing a transaction cancellation request.

25. The system according to claim 24, further comprising:

means for monitoring a return-of-goods claim notification from one of a seller and a transaction management device after the goods are returned; and means for reserving a transaction cancellation process when the return-of-goods claim notification is received within a predetermined period.

26. The system according to claim 25, further comprising:

means for immediately performing the transaction cancellation process even within the predetermined period when a returned goods receipt notification is received from one of the seller and the transaction management device.

27. The system according to claim 1, wherein said payee has:
- means of monitoring at least one of a final settlement admission request and a return-of-goods request; and
- means for issuing the final settlement admission request by transmitting third-party delivery certification information, as authentication information, containing a payment identifier related to purchase of goods when one of the final settlement admission request and the return-of-goods request is not issued within a predetermined period.

28. The system according to claim 1, wherein a payer who transfers the money information containing the provisional settlement information to the payee is different from a confirmor who confirms the object item executed by the payee.

29. The system according to claim 1, further comprising:

means for storing a final settlement request from the payee;

means for storing a final settlement admission request from a confirmor who confirms the object item for which payment is to be made; and means for making the final settlement based on the stored final settlement request and final settlement admission request.

30. The system according to claim 1, wherein said money information containing the provisional settlement information includes payment condition information indicating an execution term of the object item for which payment is to be made.

31. The system according to claim 30, further comprising:

means for issuing a transaction cancellation request by transmitting the payment condition information as authentication information from one of a payer and a confirmor who confirms an object item for which payment is to be made when the object item is not executed within the execution term of the object item.

32. The system according to claim 1, wherein said payee has:

means for monitoring an execution term, contained in payment condition information, for the object item for which payment is to be made; and means for notifying one of a payer and a confirmor who confirms the object item for which payment is to be made when the object item is not executed within the execution term.

33. An electronic money settlement system comprising:

means for transferring, to a payee, electronic money, that is, money information which contains information identifying whether or not provisional settlement information is contained, and is settled according to a notification of confirmation that an object item for which payment is to be made has been executed; and means for making final settlement for the money information containing the provisional settlement information based on confirmation that the object item for which payment is to be made has been executed.

34. The system according to claim 33, wherein said money information containing the provisional settlement information is stored in a portable storage medium.

35. The system according to claim 34, wherein said portable storage medium is issued from a terminal unit connected to an issuing financial institution to a payer.

36. The system according to claim 34, wherein said portable storage medium can be applied to a terminal unit connected to an issuing financial institution by the payee, and the terminal unit comprises means for transmitting a final settlement request according to the provisional settlement information stored in the portable storage medium.

37. The system according to claim 36, wherein said terminal unit comprises means for collecting the portable storage medium after the payee has issued the final settlement request.

38. The system according to claim 37, wherein said terminal unit comprises means for writing information inhibiting a re-use to the portable storage medium upon normal completion of a process for the final settlement request.

39. The system according to claim 33, further comprising:

means for storing a final settlement request from the payee;

means for storing a final settlement admission request from the payer; and means for performing the final settlement based on the stored final settlement request and final settlement admission request.

40. The system according to claim 39, wherein said final settlement request contains request for receipt of transfer information containing transfer destination.

41. The system according to claim 33, further comprising:

a transaction management device for mediating transmission and receipt of transaction information.

42. The system according to claim 41, wherein said transaction management device comprises transaction information management means for storing the transaction information with authentication information about a transmitter.

43. The system according to claim 41, wherein said transaction management device comprises means for monitoring a transaction cancellation request from the payee.

44. The system according to claim 43, wherein
said transaction management device comprises means for issuing a cancellation request on behalf of the payee when the transaction management device does not receive the cancellation request from the payee within a predetermined period.

45. The system according to claim 41, wherein
said transaction management device comprises means for monitoring whether or not one of a final settlement admission request and a return-of-goods request is issued by a goods receiver after the goods receiver has received goods when the object item for which payment is to be made relates to goods.

46. The system according to claim 45, wherein
said transaction management device comprises means for issuing the final settlement admission request on behalf of the goods receiver when none of the final settlement admission request and the return-of-goods request are issued within a predetermined period.

47. The system according to claim 45, wherein
said transaction management device comprises means for issuing a transaction cancellation request when a return-of-goods procedure is followed.

48. The system according to claim 41, wherein
said transaction management device comprises:
 means for monitoring at least one of a final settlement admission request and a return-of-goods request; and
 means for transmitting third-party delivery certification information containing a payment identifier relating to purchase of goods as authentication information and issuing the final settlement admission request when none of the final settlement admission request and the return-of-goods request are issued.

49. The system according to claim 41, wherein
said transaction management device comprises means for transmitting third-party return-of-goods certification information containing a payment identifier relating to purchase of goods as authentication information and issuing a transaction cancellation request.

50. The system according to claim 49, further comprising:
 means for monitoring a return-of-goods claim notification from one of a seller and a transaction management device after the goods have been returned; and
 means for reserving a transaction cancellation process when the return-of-goods claim notification is received within a predetermined period.

51. The system according to claim 50, further comprising:
 means for immediately performing the transaction cancellation process even within the predetermined period when a returned goods receipt notification is received from one of the seller and the transaction management device.

52. The system according to claim 41, wherein
said transaction management device comprises:
 means for monitoring an execution term, contained in payment condition information, of the object item for which payment is to be made; and
 means for transmitting the payment condition information as authentication information and issuing a transaction cancellation request when the object item is not executed within the execution term.

53. An encryption intermediate system having a transaction management device for mediating transmission from a first party to a second party, comprising:
 means for encrypting data using a unique encryption key between the first party and the transaction management device when the first party transmits the data to the second party; and
 means for requesting the transaction management device to transmit encrypted data to the second party.

54. The system according to claim 53, wherein
said transaction management device comprises means for decrypting data received from the first party using a unique decryption key between the first party and the transaction management device.

55. The system according to claim 54, wherein
said transaction management device comprises means for encrypting decrypted data using a unique encryption key between the second party, that is, a destination of the data, and the transaction management device.

56. A delivery system having a processing unit of a seller of goods, a processing unit of at least one of a purchaser and a receiver of the goods, and a delivery management device provided for a deliverer of the goods, wherein
said delivery management device comprises:
 means for storing delivery information based on a delivery request from the seller's processing unit; and
 means for generating third-party delivery certification information containing a signature of the receiver of the goods and a payment identifier relating to purchase of the goods when the deliverer has delivered the goods to the receiver.

57. The system according to claim 56, further comprising:
a transaction management device for mediating transmission and receipt of at least a part of transaction information among the seller, purchaser, receiver, and deliverer, wherein
 said transaction management device comprises means for storing at least one of the third-party delivery certification information including the payment identifier, first third-party return-of-goods certification information, and second third-party return-of-goods certification information.

58. A delivery system having a processing unit of a seller of goods, a processing unit of at least one of a purchaser and a receiver of the goods, and a goods delivery management device provided for a deliverer of the goods, wherein
said goods delivery management device comprises:
 means for storing return-of-goods delivery information based on a returned goods delivery request from the receiver; and
 means for generating first third-party return-of-goods certification information containing a signature of the receiver and a payment identifier relating to purchase of the goods.

59. The system according to claim 58, further comprising:
a transaction management device for mediating transmission and receipt of at least a part of transaction information among the seller, purchaser, receiver, and deliverer, wherein
 said transaction management device comprises means for storing at least one of the third-party delivery certification information including the payment identifier, first third-party return-of-goods certification information, and second third-party return-of-goods certification information.

60. The system according to claim 58, further comprising a returned goods delivery management device provided for a deliverer for delivering returned goods, wherein
said returned goods delivery management device comprises means for generating second third-party returnof-goods certification information containing a receipt signature of the seller and the payment identifier in the returned goods delivery information.

61. The system according to claim 60, further comprising:

a transaction management device for mediating transmission and receipt of at least a part of transaction information among the seller, purchaser, receiver, and deliverer, wherein said transaction management device comprises means for storing at least one of the third-party delivery certification information including the payment identifier, first third-party return-of-goods certification information, and second third-party return-of-goods certification information.

62. A digital contents sales system having at least a seller's processing unit, a purchaser's processing unit, and a mediating transaction management device, wherein said transaction management device comprises:

management means for managing a decryption key of digital contents to be sold through the seller's processing unit; and means for transmitting the decryption key to the purchaser's processing unit at a demand from the purchaser's processing unit.

63. The system according to claim 62, wherein said transaction management device comprises means for generating third-party witness information by adding a signature of the purchaser and authentication of the transaction management device when the decryption key is transmitted to the purchaser's processing unit.

64. The system according to claim 62, wherein said transaction management device comprises:

means for receiving a notification from the purchaser's processing unit that the digital contents cannot be decrypted using the decryption key; and means for comparing the digital contents received from the seller's processing unit with the digital contents returned from the purchaser's processing unit.

65. The system according to claim 64, wherein said transaction management device comprises means for decrypting the digital contents using the decryption key when a comparison result indicates a coincidence.

66. The system according to claim 65, wherein said transaction management device comprises:

means for re-demanding the seller's processing unit for digital contents encrypted using a unique encryption key between the transaction management device and the seller's processing unit; and means for comparing decrypted digital contents with re-demanded digital contents.

67. The system according to claim 66, wherein said transaction management device comprises means for assuming that the decryption key transmitted to the purchaser's processing unit is defective when compared digital contents match each other, and re-transmitting a decryption key.

68. The system according to claim 66, wherein said transaction management device comprises means for assuming that the digital contents transmitted to the purchaser's processing unit is defective when compared digital contents do not match each other, and notifying the seller's processing unit of a defect.

69. The system according to claim 64, wherein said transaction management device comprises means for retransmitting the digital contents received from the seller's processing unit to the purchaser's processing unit when compared digital contents do not match each other.

70. A transaction management device which mediates transmission of data from a first party to a second party, comprising:

means for receiving data through unique encryption protocol between the first party and the transaction management device; and means for transmitting the received data through a unique encryption protocol between the second party and the transaction management device.

71. A transaction management device which mediates a provisional settlement process performed at a notification of confirmation that an object item for which payment is to be made has been executed, comprising:

means for monitoring at least one of a final settlement admission request and a return-of-goods request to be issued after a receiver of goods has received the goods; and means for transmitting third-party delivery certification information as authentication information and issuing the final settlement admission request on behalf of the receiver when none of the final settlement admission request and the return-of-goods request are issued within a predetermined period.

72. A transaction management device which mediates a provisional settlement process performed at a notification of confirmation that an object item for which payment is to be made has been executed, comprising:

means for monitoring whether or not a seller issues a cancellation request through return of goods; and means for transmitting third-party return-of-goods certification information as authentication information and issuing the cancellation request on behalf of the seller when the cancellation request is not issued within a predetermined period.

73. A transaction management device for mediating sales of digital contents, comprising:

means for managing a decryption key for digital contents encrypted by a seller and transmitted to a purchaser;

means for transmitting the decryption key to the purchaser; and means for issuing third-party witness certification information.

74. A transaction management device for mediating sales of digital contents, comprising:

means for determining whether or not digital contents received by a purchaser are defective;

means for notifying the purchaser when it is determined that the digital contents are defective; and means for re-transmitting a decryption key to the purchaser when it is determined that the decryption key is defective.

75. A transaction management device which mediates among a delivery management device provided for a deliverer of goods, a seller's processing unit, and a purchaser's and receiver's processing unit, comprising:

means for receiving an entry of third-party delivery certification information of the delivery management device;

means for receiving an entry of first third-party return-of-goods certification information certifying that a return-of-goods request has been issued; and means for receiving an entry of second third-party return-of-goods certification information certifying that a seller has received returned goods.

76. A terminal unit connected to a financial institution, comprising:
- means for storing a portable storage medium for storing money information containing provisional settlement information which is settled at a notification of confirmation that an object item for which payment is to be made has been executed; and
- means for issuing the portable storage medium.

77. A terminal unit connected to a financial institution, comprising:
- means for reading information stored on a portable storage medium for storing money information containing provisional settlement information which is settled at a notification of confirmation that an object item for which payment is to be made has been executed; and
- means for transmitting a final settlement request to a financial institution according to read information.

78. A terminal unit connected to a financial institution, comprising:
- means for reading information stored on an inserted portable storage medium; and
- means for automatically collecting the portable storage medium after completion of a process when the portable storage medium stores collection information.

79. A delivery management device provided for a deliverer of goods, comprising:
- means for storing goods delivery information based on a goods delivery request from a seller; and
- means for generating third-party delivery certification information containing a payment identifier relating to purchase of the goods and a signature of one of a receiver and a substitute when the deliverer delivered the goods to the receiver.

80. The device according to claim 79, further comprising:
- means for entering the third-party delivery certification information in a transaction management device.

81. The device according to claim 79, further comprising:
- means for notifying the seller of the third-party delivery certification information after delivering goods.

82. A delivery management device provided for a deliverer of goods, comprising:
- means for storing returned goods delivery information based on a returned goods delivery request from a receiver of the goods; and
- means for generating first third-party return-of-goods certification information containing a payment identifier relating to purchase of the goods and a signature of one of the receiver, who issued a return-of-goods request, and a substitute.

83. The device according to claim 82, further comprising:
- means for entering the first third-party return-of-goods certification information in a transaction management device.

84. The device according to claim 82, further comprising:
- means for generating second third-party return-of-goods certification information containing a receipt signature of the seller and the payment identifier relating to the purchase of the goods when returned goods are delivered to the seller.

85. The device according to claim 84, further comprising:
- means for entering the second third-party return-of-goods certification information in a transaction management device.

86. The device according to claim 82, further comprising:
- means for issuing, to the receiver, returned goods delivery acceptance receipt certification containing the payment identifier relating to the purchase of the goods.

87. A financial process device provided in a financial institution, comprising:
- means for accepting a request for an issue of money information, which is settled upon receipt of a confirmation notification that an object item for which payment is to be made has been executed, containing provisional settlement information;
- means for freezing an amount of the money information within a balance of an account of a payer, and managing the amount as a non-transferable amount until the final settlement is made; and
- means for issuing the money information containing the provisional settlement information.

88. The device according to claim 87, further comprising:
- means for writing, in the money information, object information indicating the object item for which payment is to be made.

89. The device according to claim 88, further comprising:
- means for accepting the money information transferred to a payee and details of an executed object item for which payment is to be made; and
- means for checking validity between the object information included in the money information and the details of the executed object item.

90. The device according to claim 87, further comprising:
- means for writing, in the money information, object information indicating the object item for which payment is to be made; and
- means for providing a blind signature for the object information.

91. A financial process device provided in a financial institution, comprising:
- means for accepting a request for receipt of transfer of provisional settlement money from a payee;
- means for confirming whether or not a final settlement admission request has been issued;
- means for performing one of money transfer and transfer of electronic money to the payee based on contents of the request for receipt of transfer when final settlement admission is issued; and
- means for storing request for receipt of transfer information in a database when no final settlement admission is issued.

92. A financial process device provided in a financial institution, comprising:
- means for accepting a final settlement admission request; and
- means for checking validity of the accepted final settlement admission request.

93. The device according to claim 92, further comprising:
- means for confirming acceptance of a final settlement request from a payee when contents of the final settlement admission request are correct;
- means for making a payment based on contents of a request for receipt of transfer when the request is issued in the final settlement request; and
- means for issuing a demand notification for a final settlement request process.

94. A financial process device provided in a financial institution, comprising:

means for accepting a provisional settlement cancellation request; and means for checking validity of the accepted provisional settlement cancellation request.

95. The device according to claim 94, wherein said means for checking the validity accepts and checks one of first third-party return-of-goods certification information certifying that a return-of-goods request has been issued and second third-party return-of-goods certification information certifying a receipt of returned goods by payee, and setting the number of days for adjustment when the checked third-party return-of-goods certification information is correct.

96. A financial process device provided in a financial institution, comprising:

means for accepting a provisional settlement cancellation request;

means for accepting a return-of-goods claim; and means for reserving a provisional settlement cancellation process when a return-of-goods claim corresponding to a provisional settlement cancellation request is issued.

97. A payment process device provided for a payer, comprising:

means for issuing a request for money information, which is settled upon receipt of a confirmation notification that an object item for which payment is to be made has been executed, containing provisional settlement information; and means for storing the money information including the provisional settlement information.

98. The device according to claim 97, comprising:

means for issuing an entry request for object information indicating the object item for which payment is to be made in the money information containing the provisional settlement information.

99. A payment process device provided for a payer, comprising:

means for requesting a payee to execute an object item for which payment is to be made; and means for transferring, to the payee, money information, which is settled upon receipt of a confirmation notification that the object item has been executed, containing provisional settlement information.

100. The device according to claim 99, comprising:

means for issuing a final settlement admission request based on confirmation that the object item has been executed when an execution result is normal.

101. The device according to 99, further comprising:

means for issuing a return-of-goods request when the contents of goods, which are the object item for which payment is to be made, are not normal based on confirmation of the contents of the goods;

means for accepting third-party return-of-goods certification information certifying that the return-of-goods request has been received; and means for issuing a provisional settlement cancellation request.

102. A sales management device provided for a seller of goods, comprising:

means for accepting an order of goods from a purchaser of the goods;

means for accepting money information containing provisional settlement information from the purchaser; and means for issuing a final settlement request after transmitting the goods to a receiver of the goods.

103. The device according to claim 102, further comprising:

means for monitoring at least one of a final settlement admission request and a return-of-goods request after the receiver receives the goods; and means for transmitting third-party delivery certification information as authentication information certifying that the receiver has received the goods, and issuing the final settlement admission request on behalf of the receiver when neither of the final settlement admission request and the return-of-goods request are issued within a predetermined period.

104. The device according to claim 102, further comprising:

means for accepting a notification of a cancellation request through return of the goods;

means for issuing a provisional settlement cancellation request in response to the notification of the cancellation request; and means for requesting a return-of-goods claim when the return of the goods is not normal based on confirmation of the contents of returned goods.

105. A receipt process device provided for a receiver of goods, comprising:

means for receiving a result of receipt confirmation of goods sent from a seller; and means for issuing a final settlement admission request when the goods are normal based on the result of the receipt confirmation of the goods.

106. The device according to claim 105, further comprising:

means for issuing a return-of-goods request to return the goods when the goods are not normal based on the result of the receipt confirmation of the goods;

means for receiving third-party return-of-goods certification information certifying that the return-of-goods request has been received; and means for issuing a provisional settlement cancellation request.

107. A payment process device provided for one of a payer and a confirmor who confirms an object item for which payment is to be made, comprising:

means for monitoring an execution term for the object item for which payment is to be made contained in payment condition information; and means for issuing a transaction cancellation request by transmitting the payment condition information as authentication information when the object item is not executed within the execution term.

108. A sales management device provided for a payee, comprising:

means for receiving an object item for which payment is to be made from a payer;

means for receiving money information, which is settled upon receipt of a confirmation notification that the object item has been executed, containing provisional settlement information;

means for monitoring an execution term for the object item for which payment is to be made; and means for notifying one of the payer and a confirmor who confirms the object item when the object item has not been executed within the execution term.

109. A portable storage medium for storing money information, which is transferred to a payee and settled upon receipt of a confirmation notification that an object item for which payment is to be made has been executed, containing provisional settlement information.

110. The medium according to 109, wherein
said money information containing the provisional settlement information includes object information indicating the object item for which payment is to be made.

111. A computer-readable storage medium storing a program used to direct a computer, which is a transaction management device for mediating transmission of data from a first party to a second party, to perform the functions of:
receiving data using a unique encryption protocol between the first party and the transaction management device; and
transmitting received data using a unique encryption protocol between the transaction management device and the second party.

112. A computer-readable storage medium storing a program used to direct a computer, which is a transaction management device for mediating a provisional settlement process, to perform the functions of:
monitoring at least one of a final settlement admission request and a return-of-goods request to be issued after a receiver of goods has received the goods; and
transmitting third-party delivery certification information as authentication information and issuing the final settlement admission request on behalf of the receiver when neither of the final settlement admission request and the return-of-goods request are issued within a predetermined period.

113. A computer-readable storage medium storing a program used to direct a computer, which is a transaction management device for mediating a provisional settlement process, to perform the functions of:
monitoring whether or not a seller issues a cancellation request through return of goods; and
transmitting third-party return-of-goods certification information as authentication information and issuing the cancellation request on behalf of the seller when the cancellation request is not issued within a predetermined period.

114. A computer-readable storage medium storing a program used to direct a computer, which is a transaction management device for mediating sales of digital contents, to perform the functions of:
managing a decryption key for digital contents encrypted by a seller and transmitted to a purchaser;
transmitting the decryption key to the purchaser; and
issuing third-party witness certification information.

115. A computer-readable storage medium storing a program used to direct a computer, which is a transaction management device for mediating sales of digital contents, to perform the functions of:
determining whether or not digital contents received by a purchaser are defective;
notifying the purchaser when it is determined that the digital contents are defective; and
re-transmitting a decryption key to the purchaser when it is determined that the decryption key is defective.

116. A computer-readable storage medium storing a program used to direct a computer, which is a transaction management device for mediating among a delivery management device provided for a deliverer of goods, a seller's processing unit, and at least one of a purchaser's and receiver's processing unit, to perform the functions of:

receiving an entry of third-party delivery certification information of the delivery management device;
receiving an entry of first third-party return-of-goods certification information certifying that a return-of-goods request has been issued; and
receiving an entry of second third-party return-of-goods certification information certifying that a seller has received returned goods.

117. A storage medium storing a program used to direct a central processing unit and an input/output device of a terminal unit connected to a financial institution to perform the function of:
issuing a portable storage medium for storing money information, which is settled at a notification of confirmation that an object item for which payment is to be made has been executed, containing provisional settlement information.

118. A storage medium storing a program used to direct a central processing unit and an input/output device of a terminal unit connected to a financial institution to perform the function of:
transmitting to the financial institution a final settlement request based on a portable storage medium storing money information, which is settled at a notification of confirmation that an object item for which payment is to be made has been executed, containing provisional settlement information.

119. A storage medium storing a program used to direct a central processing unit and an input/output device of a terminal unit connected to a financial institution to perform the function of:
automatically collecting an inserted portable storage medium after completion of a process when the portable storage medium stores collection information.

120. A computer-readable storage medium storing a program used to direct a computer, which is a delivery management device provided for a deliverer of goods, to perform the functions of:
storing goods delivery information based on a goods delivery request from a seller; and
generating third-party delivery certification information containing a payment identifier relating to purchase of the goods and a receipt signature of one of a receiver and a substitute when the goods are delivered to the receiver.

121. A computer-readable storage medium storing a program used to direct a computer, which is a delivery management device provided for a deliverer of goods, to perform the functions of:
storing return-of-goods delivery information based on a returned goods delivery request from a receiver of the goods; and
generating third-party return-of-goods certification information containing a payment identifier relating to purchase of the goods and a signature of one of the receiver, who issued a return-of-goods request, and a substitute.

122. A computer-readable storage medium storing a program used to direct a computer, which is a financial process device provided in a financial institution, to perform the functions of:
accepting a request for an issue of money information, which is settled upon receipt of a confirmation notification that an object item for which payment is to be made has been executed, containing provisional settlement information;

transferring money information from a balance of an account of a payer to a provisional settlement balance;

issuing the money information containing the provisional settlement information; and issuing authentication of the financial institution.

123. A computer-readable storage medium storing a program used to direct a computer, which is a financial process device provided in a financial institution, to perform the functions of:

accepting a request for receipt of transfer of money information, which is settled upon receipt of a confirmation notification that an object item for which payment is to be made has been executed, containing provisional settlement information;

confirming whether or not a final settlement admission request has been issued;

transferring one of money and electronic money to a payee based on contents of the request for receipt of transfer when a final settlement is admitted; and storing request for receipt of transfer information in a database when the final settlement is not admitted.

124. A computer-readable storage medium storing a program used to direct a computer, which is a financial process device provided in a financial institution, to perform the functions of:

accepting a final settlement admission request for money information, which is settled upon receipt of a confirmation notification that an object item for which payment is to be made has been executed, containing provisional settlement information; and checking validity of the accepted final settlement admission request.

125. A computer-readable storage medium storing a program used to direct a computer, which is a financial process device provided in a financial institution, to perform the functions of:

accepting a provisional settlement cancellation request for money information, which is settled upon receipt of a confirmation notification that an object item for which payment is to be made has been executed, containing provisional settlement information; and checking validity of the accepted provisional settlement cancellation request.

126. A computer-readable storage medium storing a program used to direct a computer, which is a financial process device provided in a financial institution, to perform the functions of:

accepting a provisional settlement cancellation request for money information, which is settled upon receipt of a confirmation notification that an object item for which payment is to be made has been executed, containing provisional settlement information;

accepting a return-of-goods claim; and reserving a provisional settlement cancellation process when a return-of-goods claim corresponding to a provisional settlement cancellation request is issued.

127. A computer-readable storage medium storing a program used to direct a central processing unit and an input/output device, which form a payment process device provided for a payer, to perform the function of:

requesting an issue of money information, which is settled upon receipt of a confirmation notification that an object item for which payment is to be made has been executed, containing provisional settlement information.

128. A storage medium storing a program used to direct a central processing unit and an input/output device, which form a payment process device provided for a payer, to perform the functions of:

requesting a payee for an object item for which payment is to be made; and transferring money information, which is settled upon receipt of a confirmation notification that the object item for which payment is to be made has been executed, containing provisional settlement information.

129. A computer-readable storage medium storing a program used to direct a computer, which is a sales management device provided for a seller of goods, to perform the functions of:

accepting an order of the goods from a purchaser of the goods;

accepting money information containing provisional settlement information from the purchaser; and requesting for a final settlement after delivering the goods to a receiver.

130. A storage medium storing a program used to direct a central processing unit and an input/output device, which form a receipt process device provided for a receiver of goods, to perform the function of:

issuing a final settlement admission request when the goods are normal based on a receipt confirmation of the goods delivered from a seller.

131. A storage medium storing a program used to direct a central processing unit and an input/output device, which form a payment process device provided for one of a payer and a confirmor who confirms an object item for which payment is to be made, to perform the functions of:

monitoring an execution term for the object item for which payment is to be made included in payment condition information; and issuing a transaction cancellation request by transmitting the payment condition information as authentication information when the object item is not executed within the execution term.

132. A computer-readable storage medium storing a program used to direct a computer, which is a sales management device provided for a payee, to perform the functions of:

accepting an object item for which payment is to be made from a payer;

accepting money information, which is settled upon receipt of a confirmation notification that an object item for which payment is to be made has been executed, containing provisional settlement information;

monitoring an execution term, for the object item for which payment is to be made, included in payment condition information;

notifying one of the payer and a confirmor who confirms the object item for which payment is to be made when the object item is not executed within the execution term.

* * * * *

UNITED STATES PATENT AND TRADEMARK OFFICE
CERTIFICATE OF CORRECTION

PATENT NO.:     6,085,168
DATED      :    July 4, 2000
INVENTOR(S):    Nobuyuki MORI, et al.

It is certified that an error appears in the above-identified patent and that said Letters Patent is hereby corrected as shown below:

[57]    Abstract

Line 5, change "purchaser —s" to --purchaser's--

Signed and Sealed this

Seventeenth Day of April, 2001

*Attest:*

NICHOLAS P. GODICI

*Attesting Officer*      *Acting Director of the United States Patent and Trademark Office*